US010303742B2

(12) United States Patent
Joshi

(10) Patent No.: US 10,303,742 B2
(45) Date of Patent: May 28, 2019

(54) METHOD AND APPARATUS FOR BROWSING INFORMATION

(71) Applicant: Vikas Balwant Joshi, Herndon, VA (US)

(72) Inventor: Vikas Balwant Joshi, Herndon, VA (US)

(73) Assignee: Vikas Balwant Joshi, Hemdon, VA (US)

( * ) Notice: Subject to any disclaimer, the term of this patent is extended or adjusted under 35 U.S.C. 154(b) by 132 days.

(21) Appl. No.: 14/293,719

(22) Filed: Jun. 2, 2014

(65) Prior Publication Data

US 2015/0121181 A1 Apr. 30, 2015

Related U.S. Application Data

(60) Provisional application No. 61/829,757, filed on May 31, 2013, provisional application No. 61/892,701, filed on Oct. 18, 2013.

(51) Int. Cl.

| | |
|---|---|
| ***G06F 3/00*** | (2006.01) |
| ***G06F 17/21*** | (2006.01) |
| ***G06F 17/27*** | (2006.01) |
| ***G06F 17/30*** | (2006.01) |

(52) U.S. Cl.

CPC ........ *G06F 17/211* (2013.01); *G06F 17/2745* (2013.01); *G06F 17/30719* (2013.01)

(58) Field of Classification Search

CPC ............... G06F 17/211; G06F 17/2745; G06F 17/30719

See application file for complete search history.

(56) References Cited

U.S. PATENT DOCUMENTS

| | | | | |
|---|---|---|---|---|
| 6,279,017 | B1 * | 8/2001 | Walker | G06F 17/211 715/201 |
| 8,285,752 | B1 * | 10/2012 | Golan | G06F 17/30306 707/688 |
| 8,510,647 | B2 * | 8/2013 | Madden | G06F 8/75 715/236 |
| 8,635,528 | B2 * | 1/2014 | Byron | G06F 17/30873 704/235 |
| 2002/0178007 | A1 | 11/2002 | Slotznick et al. | |
| 2007/0294614 | A1 | 12/2007 | Jacquin et al. | |
| 2008/0222518 | A1 | 9/2008 | Walker | |

(Continued)

OTHER PUBLICATIONS

International Search Report and Written Opinion dated Feb. 12, 2015, issued in corresponding PCT application PCT/US2014/040530, 10 pages.

(Continued)

*Primary Examiner* — Kyle R Stork

(74) *Attorney, Agent, or Firm* — Snyder, Clark, Lesch & Chung, LLP

(57) ABSTRACT

Disclosed is a method of generating a multi-level summary of an article. The method may comprise generating, by a computing device, a low-level summary from article-matter in an article. The method may also comprise generating, by the computing device, a mid-level summary based on the low-level summary and the article-matter. The method may also comprise generating, by the computing device, an upper-level summary based on the mid-level summary, the low-level summary, and the article-matter.

24 Claims, 105 Drawing Sheets

Browse-element width and margins

(56) References Cited

U.S. PATENT DOCUMENTS

| | | | | |
|---|---|---|---|---|
| 2009/0106208 | A1 | 4/2009 | Matellanes et al. | |
| 2010/0057699 | A1 | 3/2010 | Shidhar et al. | |
| 2010/0195909 | A1 | 8/2010 | Wasson et al. | |
| 2012/0143595 | A1 * | 6/2012 | Li | G06F 17/30719 704/9 |
| 2012/0210203 | A1 * | 8/2012 | Kandekar | G06F 17/30719 715/230 |

OTHER PUBLICATIONS

International Preliminary Report on Patentability dated Dec. 10, 2015, issued in corresponding PCT application PCT/US2014/040530, 8 pages.

* cited by examiner

Apple, America and a Squeezed Middle Class

When Barack Obama joined Silicon Valley's top luminaries for dinner in California last February, each guest was asked to come with a question for the president.

But as Steven P. Jobs of Apple spoke, President Obama interrupted with an inquiry of his own: what would it take to make iPhones in the United States? Why can't that work come home? Mr. Obama asked.

Mr. Job's reply was unambiguous. "Those jobs aren't coming back," he said, according to another dinner guest.

The president's question touched upon a central conviction at Apple. It isn't just that workers are cheaper abroad. Rather, Apple's executives believe the vast scale of overseas factories as well as the flexibility, diligence and industrial skills of foreign workers have so outpaced their American counterparts that "Made in the U.S.A." is no longer a viable option for most Apple products.

Apple has become one of the best-known, most admired and most imitated companies on earth, in part through an unrelenting mastery of global operations. Last year, it earned over $400,000 in profit per employee, more than Goldman Sachs, Exxon Mobil or Google.

However, what has vexed Mr. Obama as well as economists and policy makers is that Apple — and many of its high-technology peers — are not nearly as avid in creating American jobs as other famous companies were in their heydays.

Not long ago, Apple boasted that its products were made in America. Today, few are. Almost all of the 70 million iPhones, 30 million iPads and 59 million other products Apple sold last year were manufactured overseas.

Apple employs 43,000 people in the United States and 20,000 overseas, a small fraction of the over 400,000 American workers at General Motors in the 1950s, or the hundreds of thousands at General Electric in the 1980s.

Many more people work for Apple's contractors: an additional 700,000 people engineer, build and assemble iPads, iPhones and Apple's other products. But almost none of them work in the United States. Instead, they work for foreign companies in Asia, Europe and elsewhere, at factories that almost all electronics designers rely upon to build their wares.

"Apple's an example of why it's so hard to create middle-class jobs in the U.S. now," said Jared Bernstein, who until last year was an economic adviser to the White House. "If it's the pinnacle of capitalism, we should be worried."

In its early days, Apple usually didn't look beyond its own backyard for manufacturing solutions. A few years after Apple began building the Macintosh in 1983, for instance, Mr. Jobs bragged that it was "a machine that is made in America." In 1990, while Mr. Jobs was running NeXT, which was eventually bought by Apple, the executive told a reporter that "I'm as proud of the factory as I am of the computer." As late as 2002, top Apple executives occasionally drove two hours northeast of their headquarters to visit the company's iMac plant in Elk Grove, Calif.

But by 2004, Apple had largely turned to foreign manufacturing. Guiding that decision was Apple's operations expert, Timothy D. Cook, who replaced Mr. Jobs as chief executive last August, six weeks before Mr. Job's death. Most other American electronics companies had already gone abroad, and Apple, which at the time was struggling, felt it had to grasp every advantage.

Fig. 1 - The first page of an article titled "Apple, America and a Squeezed Middle Class"

```
<mrgns t="18" l="18" b="18" r="18" />
<ttl1 isb="0" isi="0" isu="0" frr="0" frg="0" frb="0">The vast scale of Overseas Factories</ttl1>
<ttl2 isb="0" isi="0" isu="0" frr="0" frg="0" frb="0">and Workers' Quality have outpaced the U.S.</ttl2>
<Nvgn_ttl>
<ttl_img />
<ttl_11>Overseas Factories, Workers'</ttl_11>
<ttl_12 no_space="6">Quality have outpaced the U.S.</ttl_12>
<ttl_21 />
<ttl_22 no_space="0" />
</Nvgn_ttl>
<kpExpndedPB>0</kpExpndedPB>
<CompoundGrp>0</CompoundGrp>
<cntnt><p>The president's question touched upon <span><br></span><span>        </span><span>   
</span><span></span>a central conviction at Apple. <span><br></span><span><br></span>It isn't just that workers are cheaper abroad. <span><br></span><span><br></span>Rather,
Apple's executives believe <span><br></span><span>        </span>the <span style="color: #C21F8B;">vast scale of overseas
factories</span> <span><br></span><span>        </span>as well as
<span><br></span><span>    </span><span>    </span><span>    </span>the <span style="color: #C21F8B;">flexibility,
diligence</span> <span><br></span><span>            </span><span>    </span>and <span
style="color: #C21F8B;">industrial skills</span> of foreign workers
<span><br></span><span>                </span><span>   
</span><span></span>have so outpaced their American counterparts <span><br></span><span style="font-size: 4px; color:
#F4F5F6;">                    </span><span style="font-size: 4px; color:
#F4F5F6;">-
</span><span><br></span><span>                    </span>that "Made in
the U.S.A." <span><br></span><span>                    </span>is <span
style="color: #C21F8B;">no longer a viable option for most Apple products.</span>
<span><br></span><span>                    </span><span>  
  </span><span>    </span>for most Apple products.<br></p></cntnt>
</pb>
</chldrn>
```

Fig. 2 – A small segment of the XML file. It shows the point-name : "The vast scale of …."

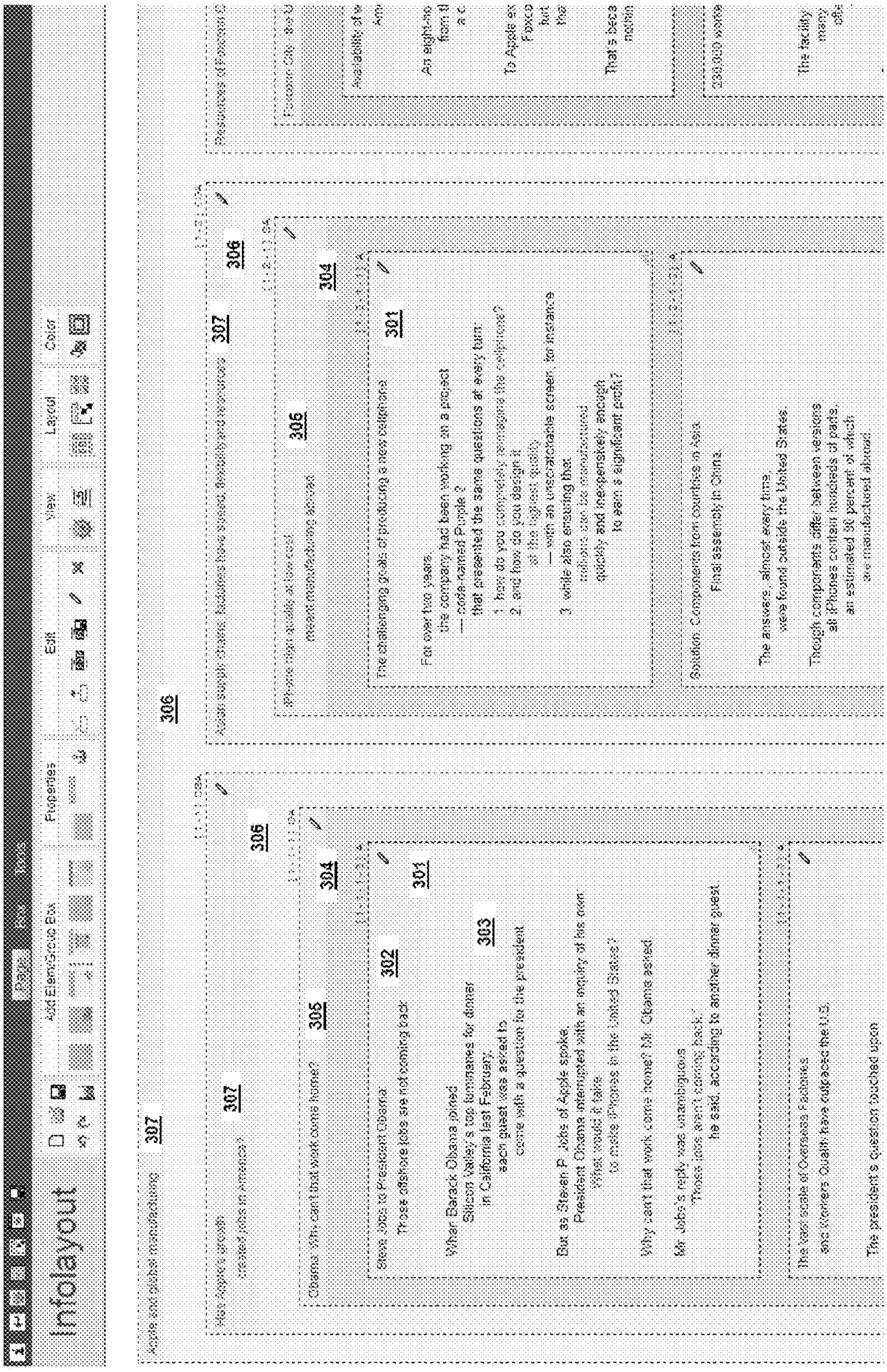
Fig. 3 – A small part of the detailed-view of the article "Apple, America and a Squeezed Middle Class"

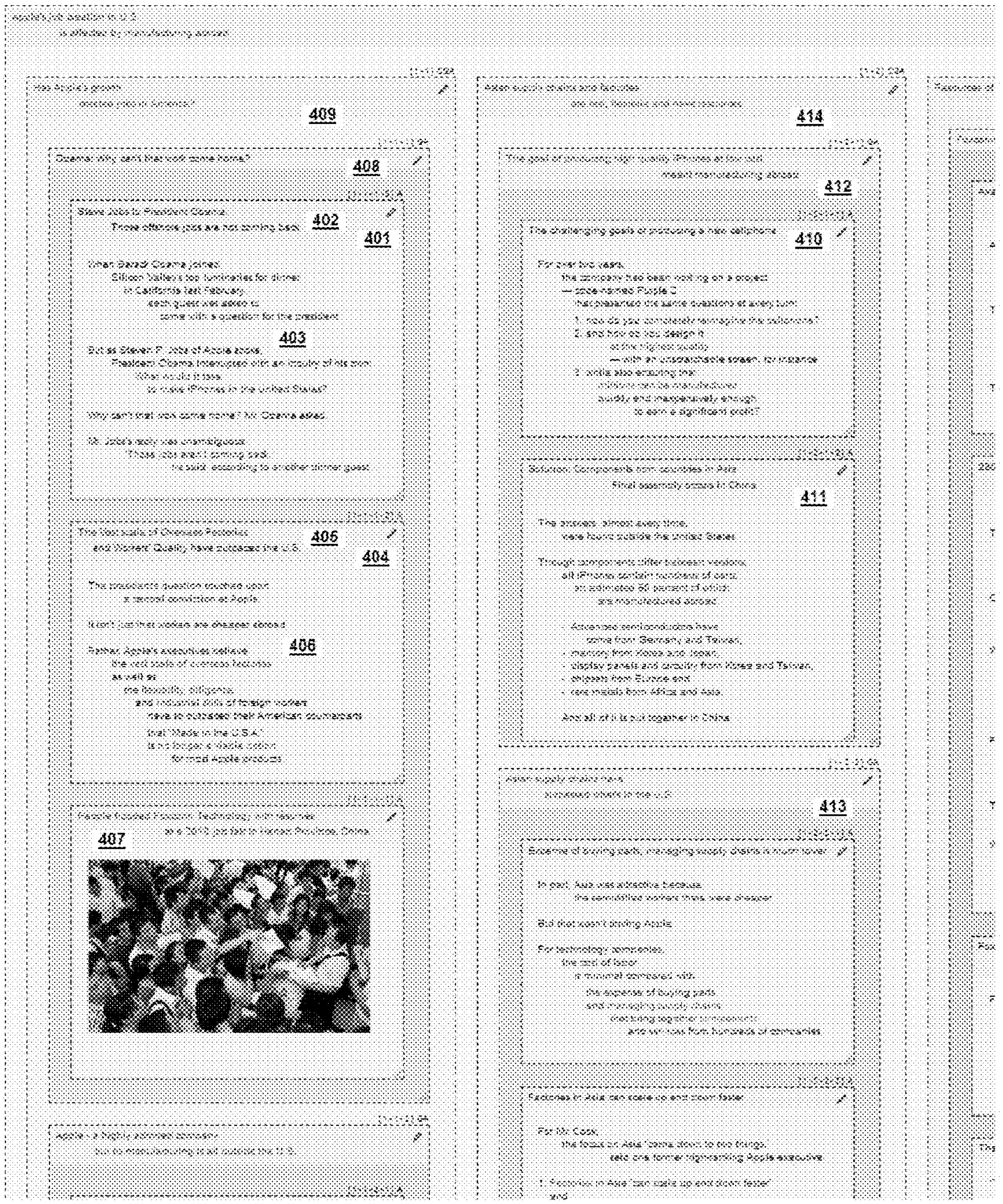
Fig. 4 – A zoomed-out version of the detailed-view of the article "Apple, America and a Squeezed Middle Class".

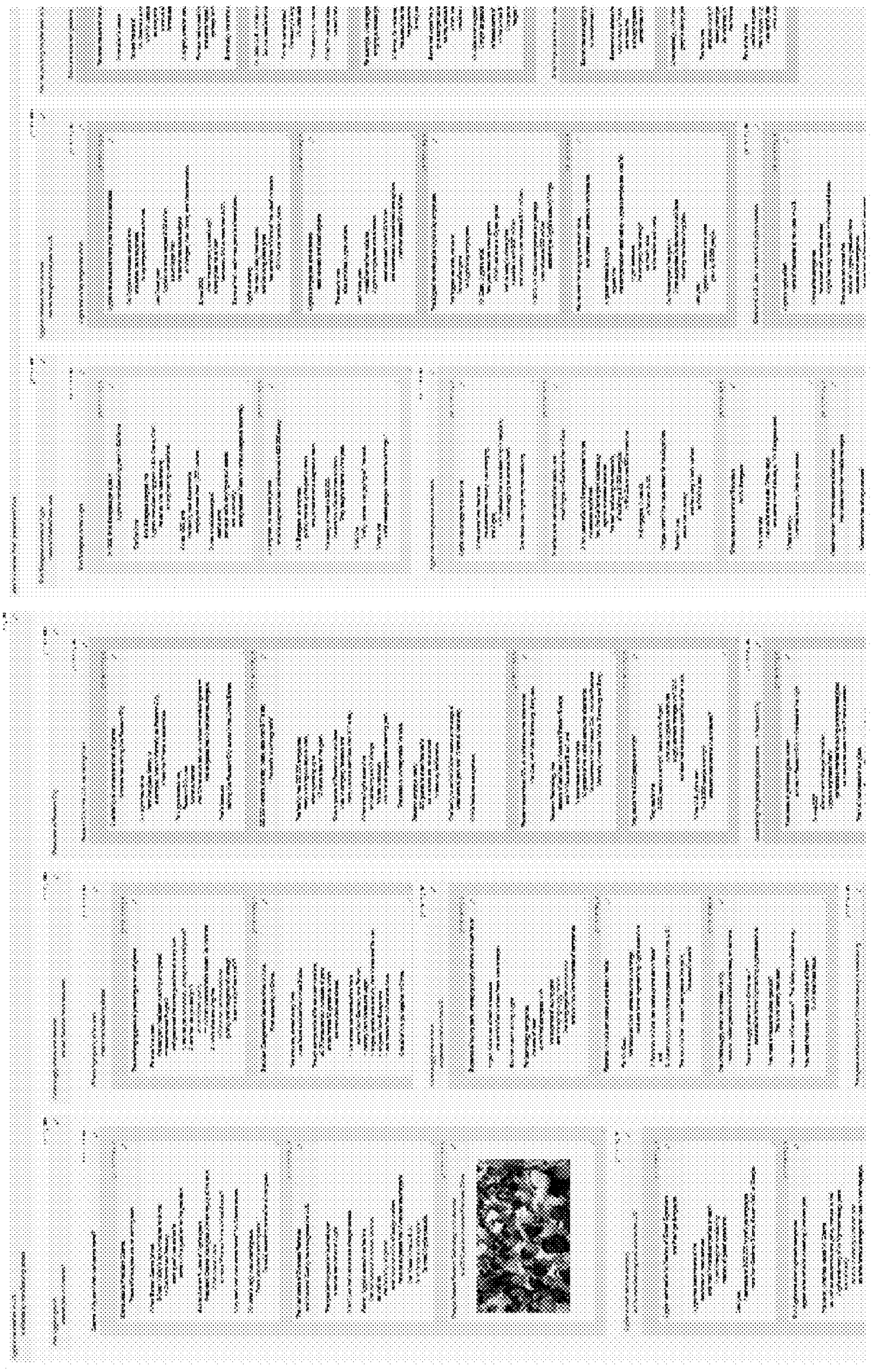
Fig. 5 – Another-zoomed-out Partial Detailed-view of the article "Apple, America and a Squeezed Middle Class"

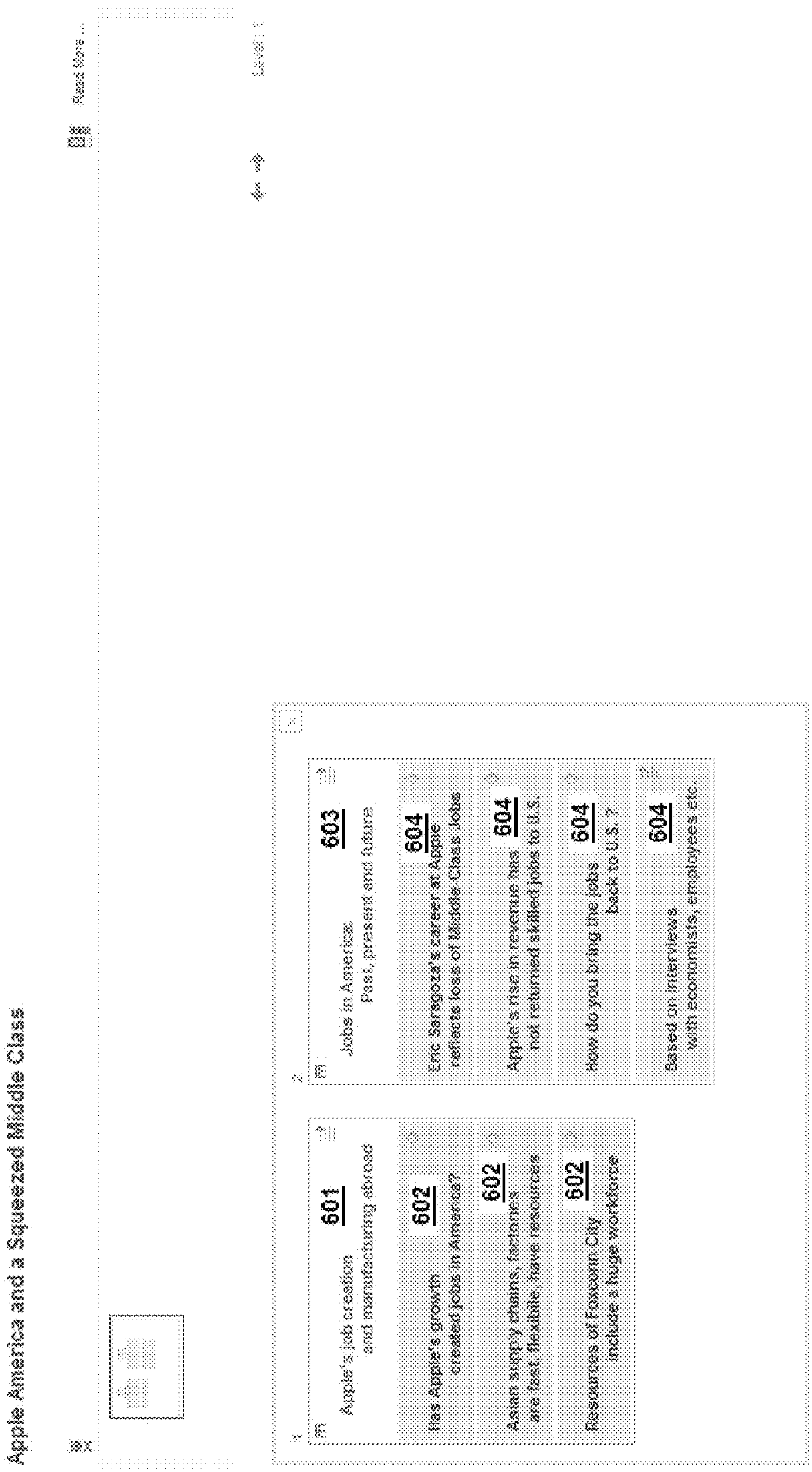
Fig. 6 – Level-1 graphical-browse-view of the article "Apple, America and a Squeezed Middle Class"

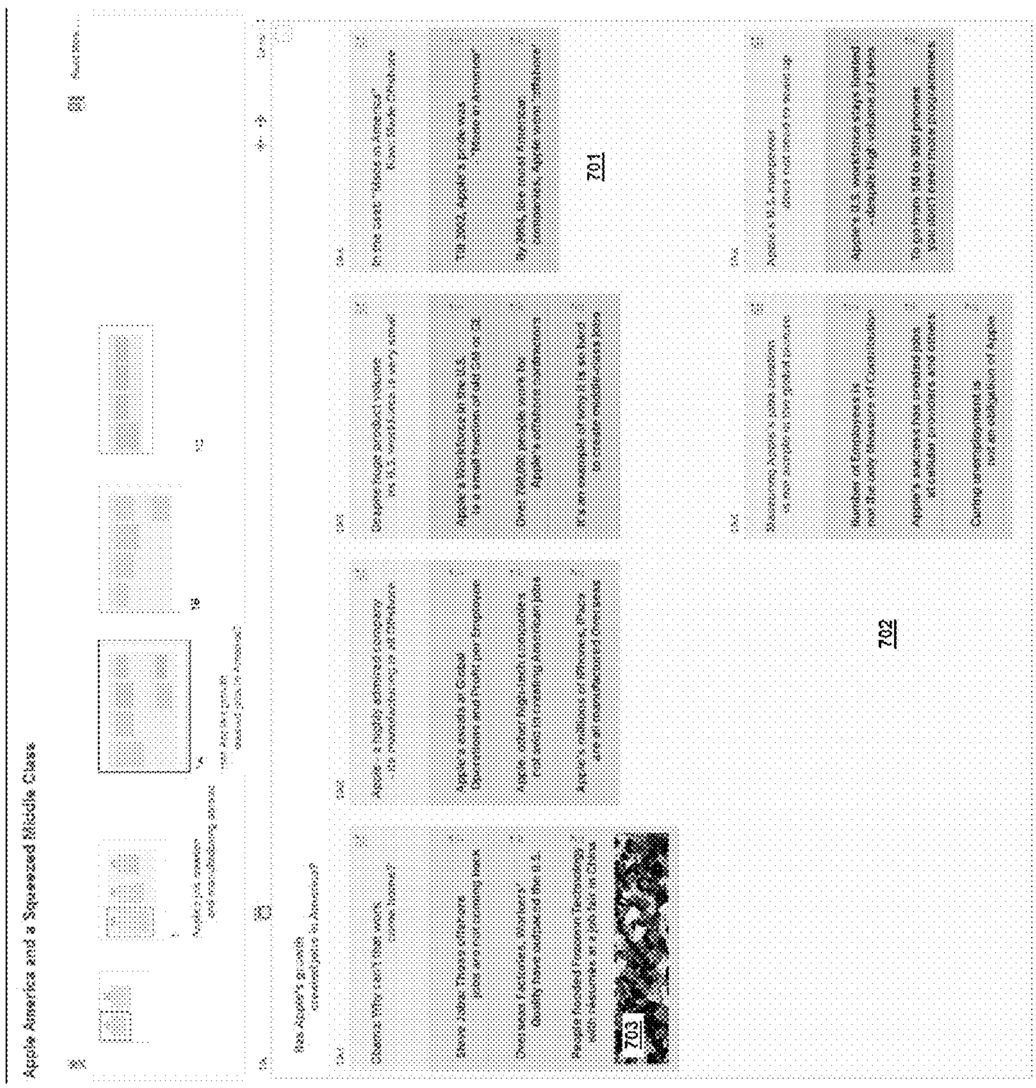
Fig. 7 – A level-3 Graphical-browse-view from the article “Apple, America and a Squeezed Middle Class”

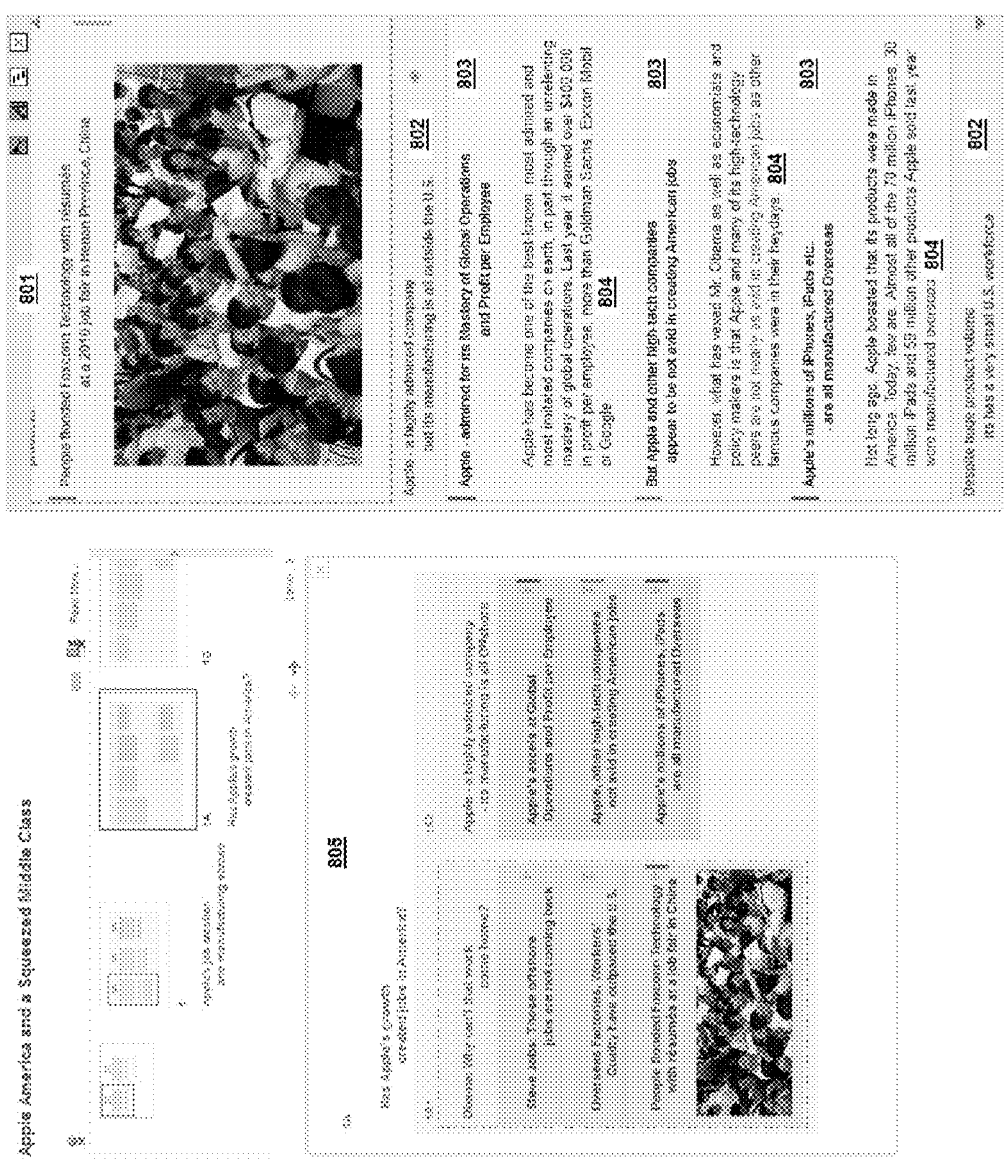
Fig. 8 – A snapshot of partial contents of the text-column of the article "Apple, America and a Squeezed Middle Class"

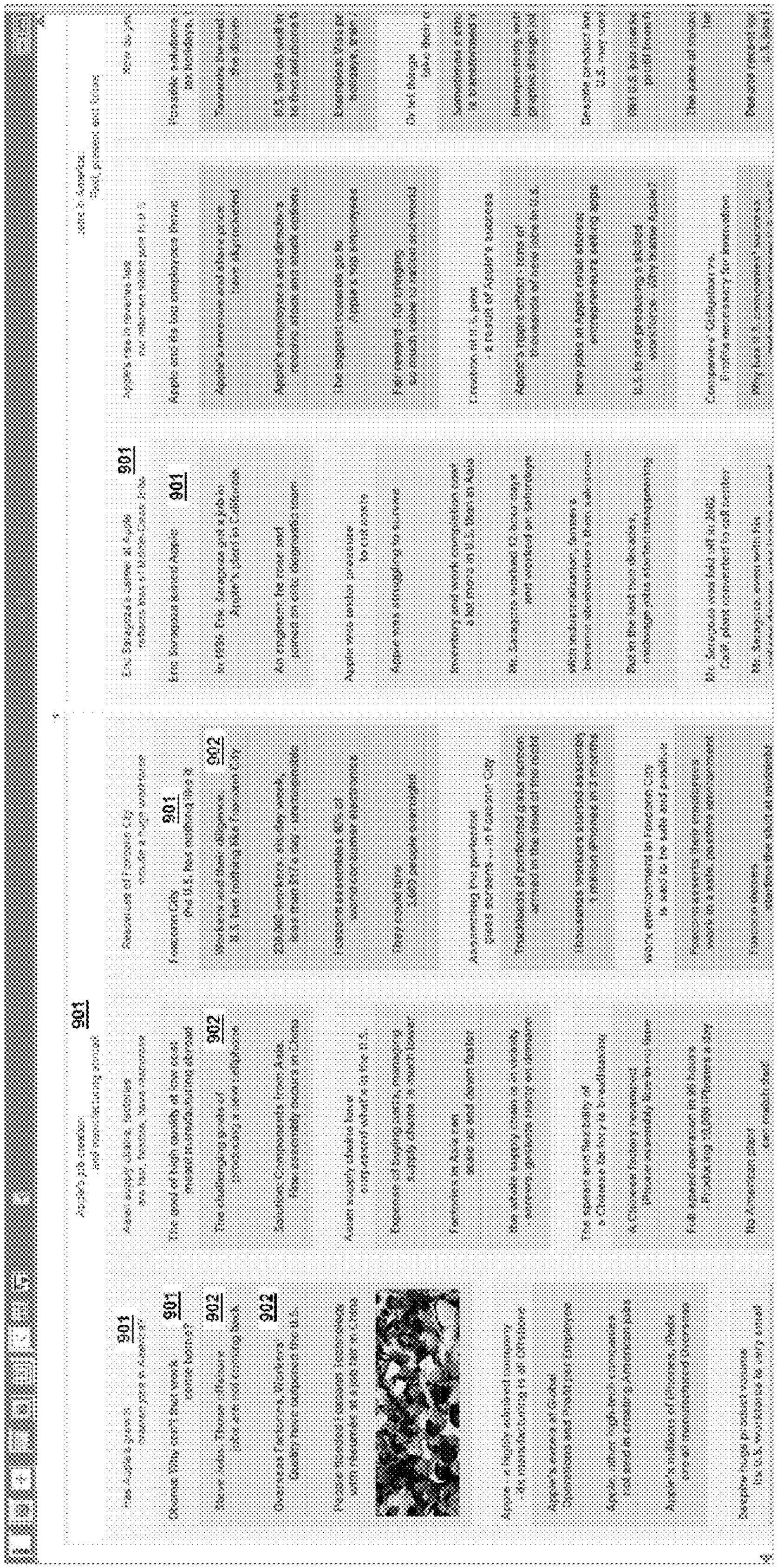
Fig. 9 – Collapsed-view of the article “Apple, America and a Squeezed Middle Class”

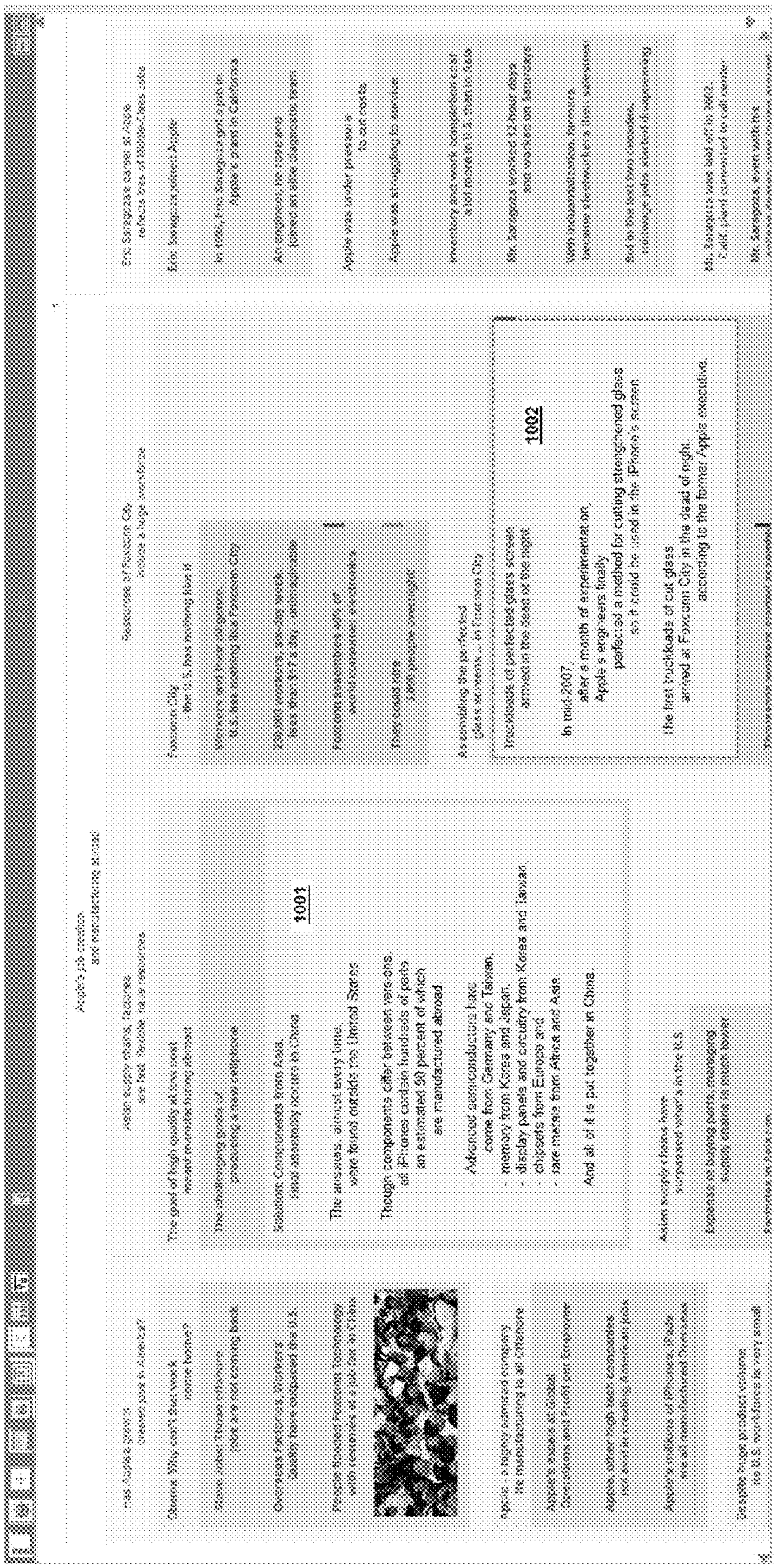
Fig. 10 – Expanded boxes in the Collapsed-view of the article “Apple, America and a Squeezed Middle Class”

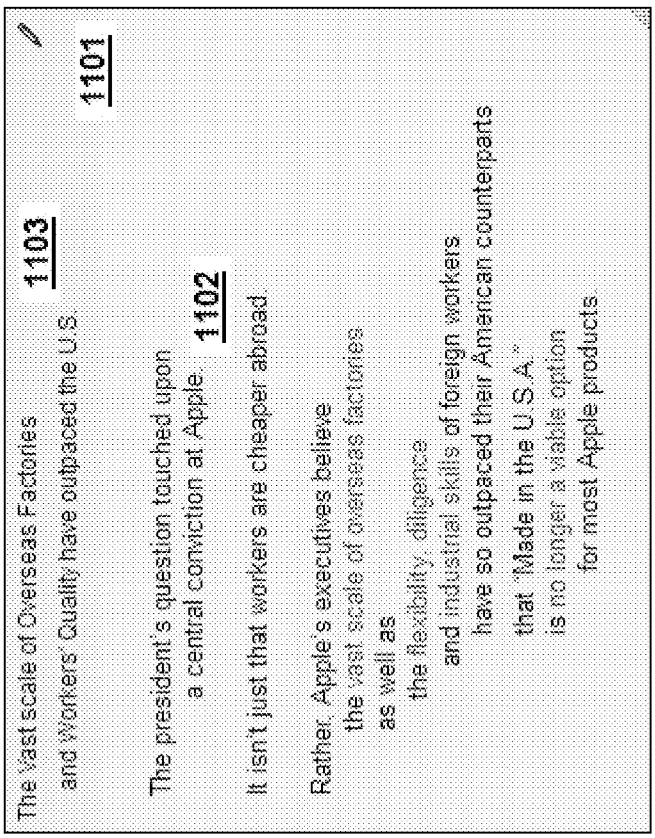
Fig. 11 – An Example of the point-box

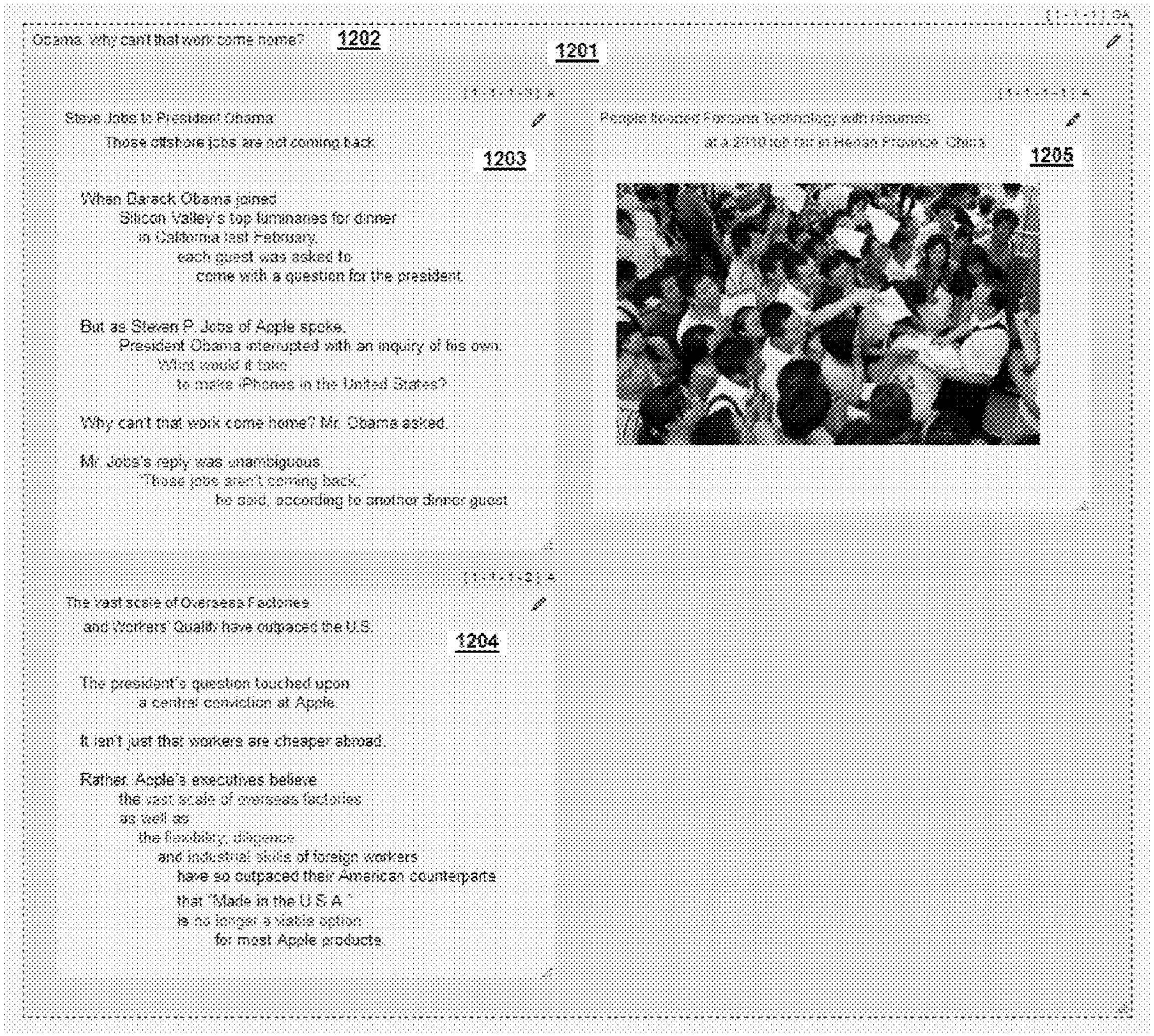
Fig.12 – An Example of the Simple-group-box

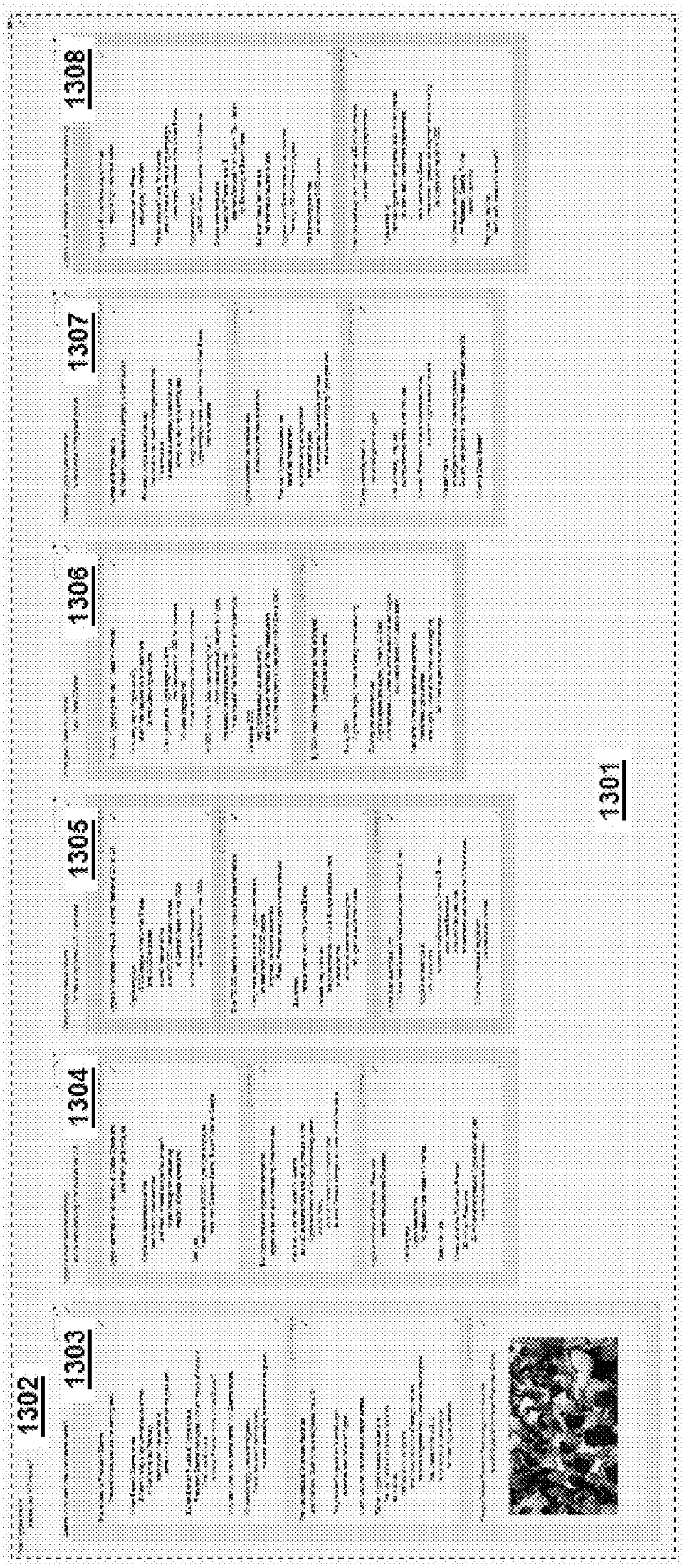
Fig.13 – An Example of the Compound-group-box

Fig. 14 – The layout of the detailed-view of the article "Apple, America and a Squeezed Middle Class"

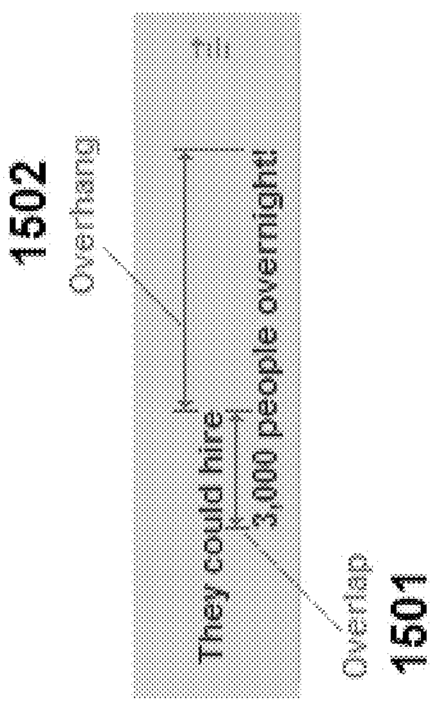
Fig.15 – Overlap and overhang in Browse-element-text

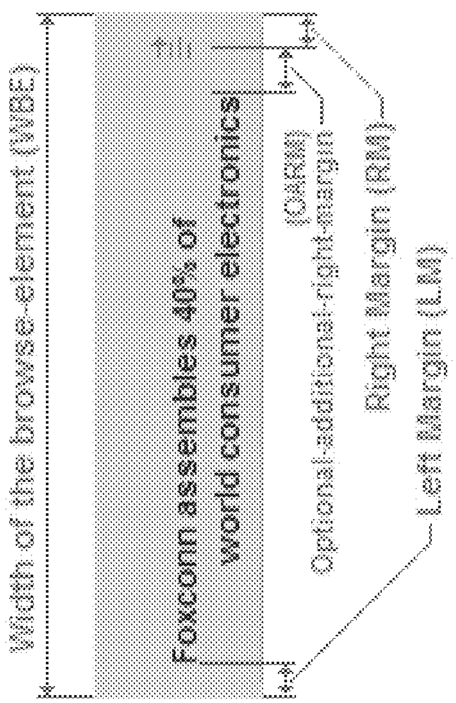
Fig.16 – Browse-element width and margins

1701
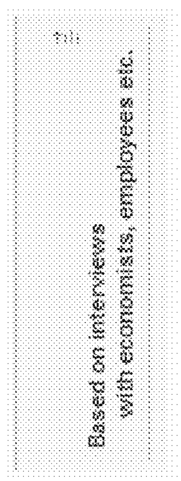
Fig.17 – A point-symbol

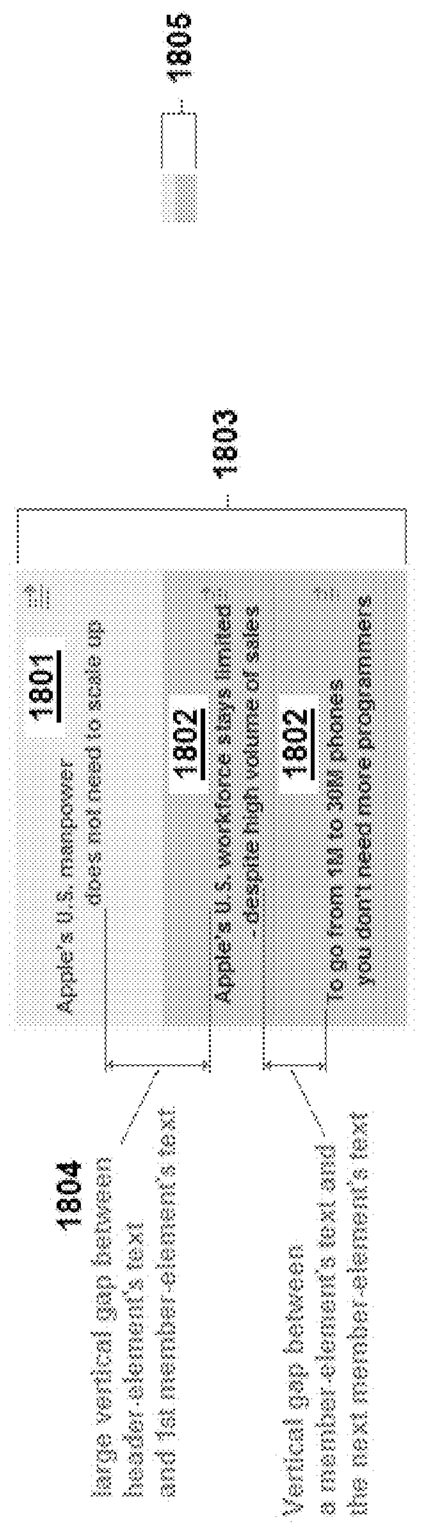
Fig.18 -- A Simple-group-symbol

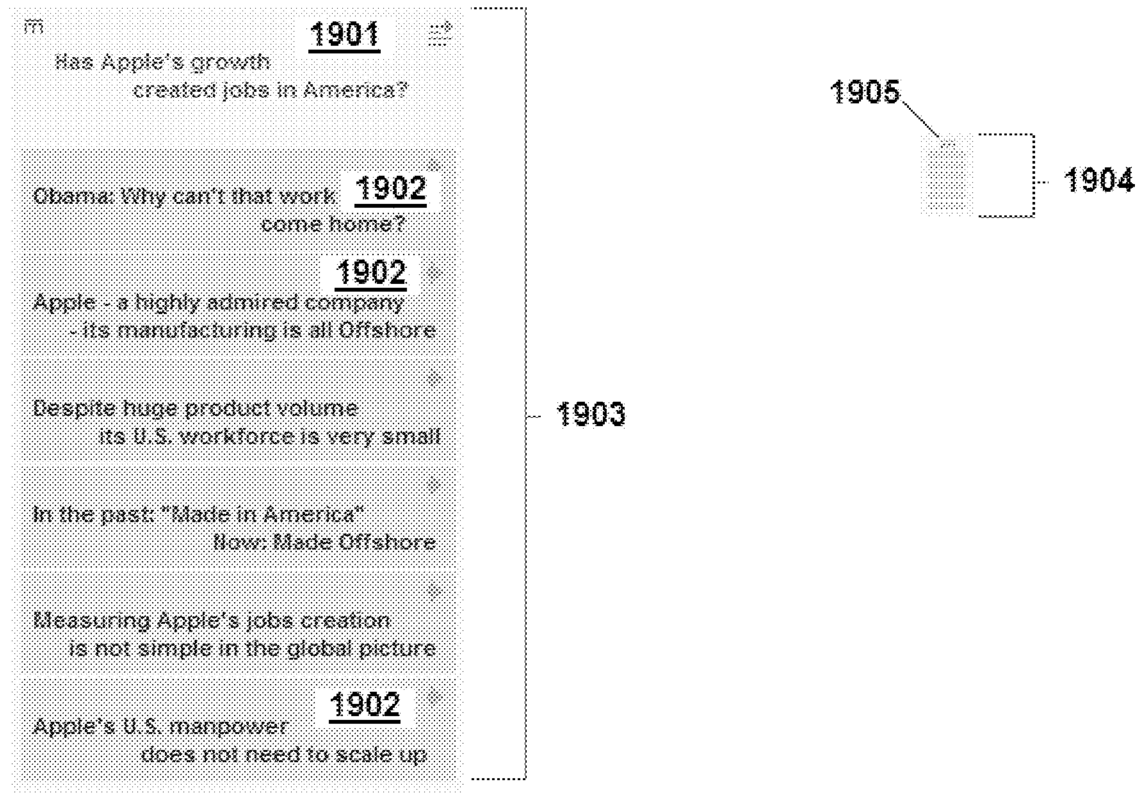
Fig.19 – A Compound-group-symbol

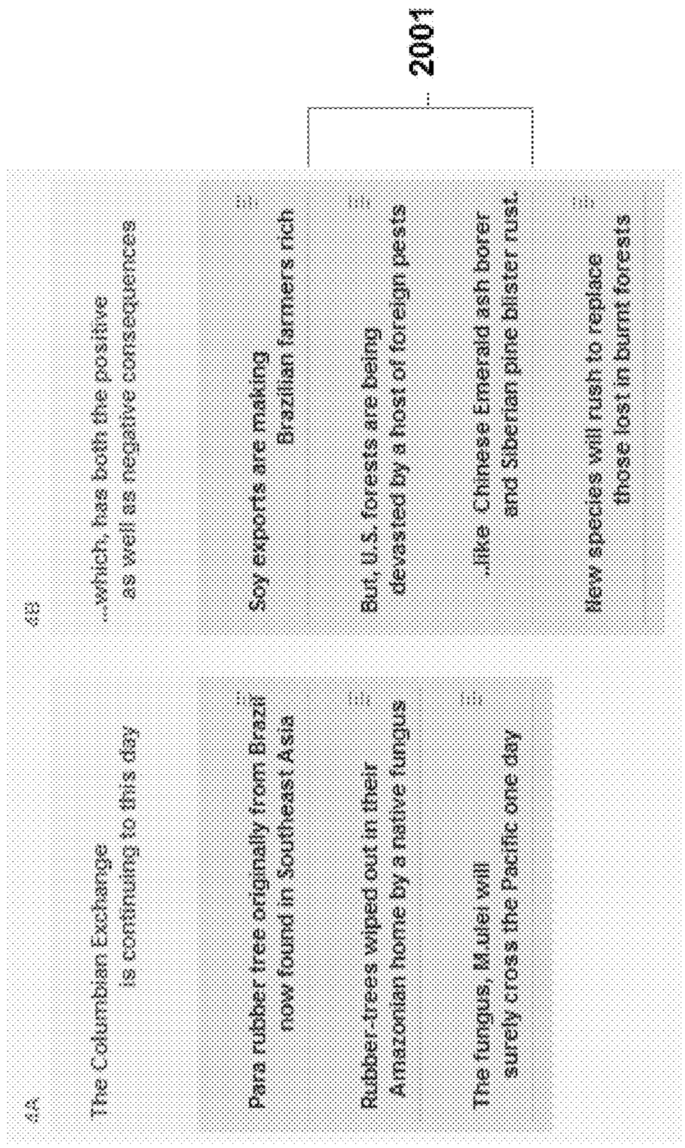
Fig.20 -- An example of the Double-height browse-element

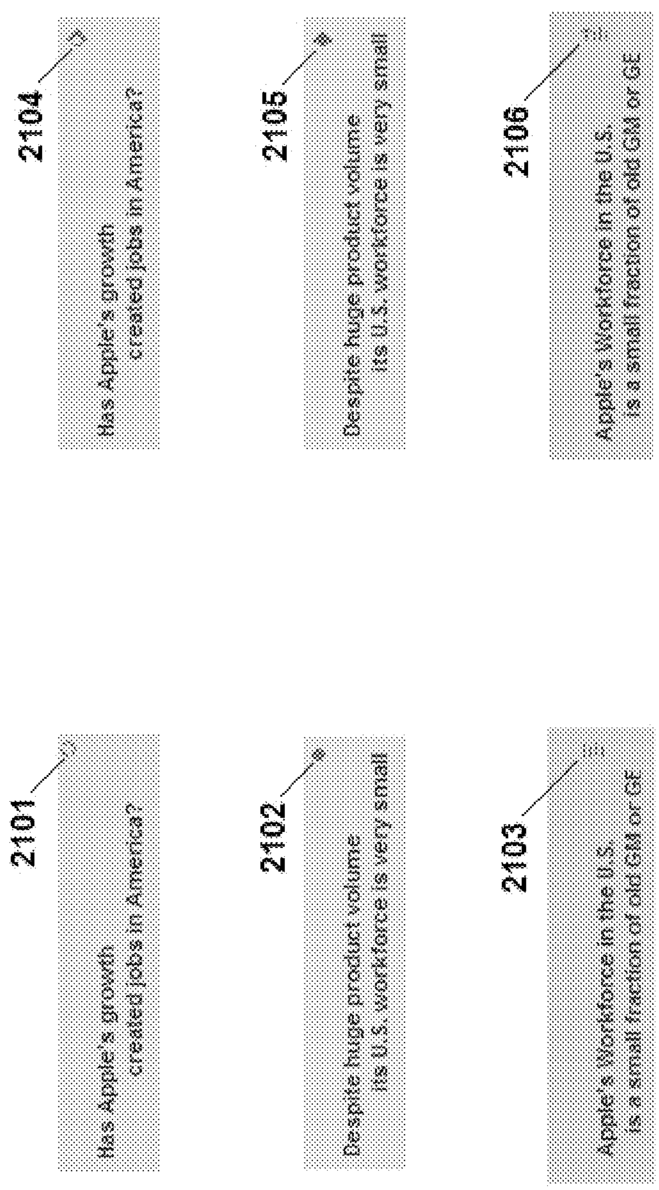
Fig.21 -- Icons to indicate the browse-element-type-and-action

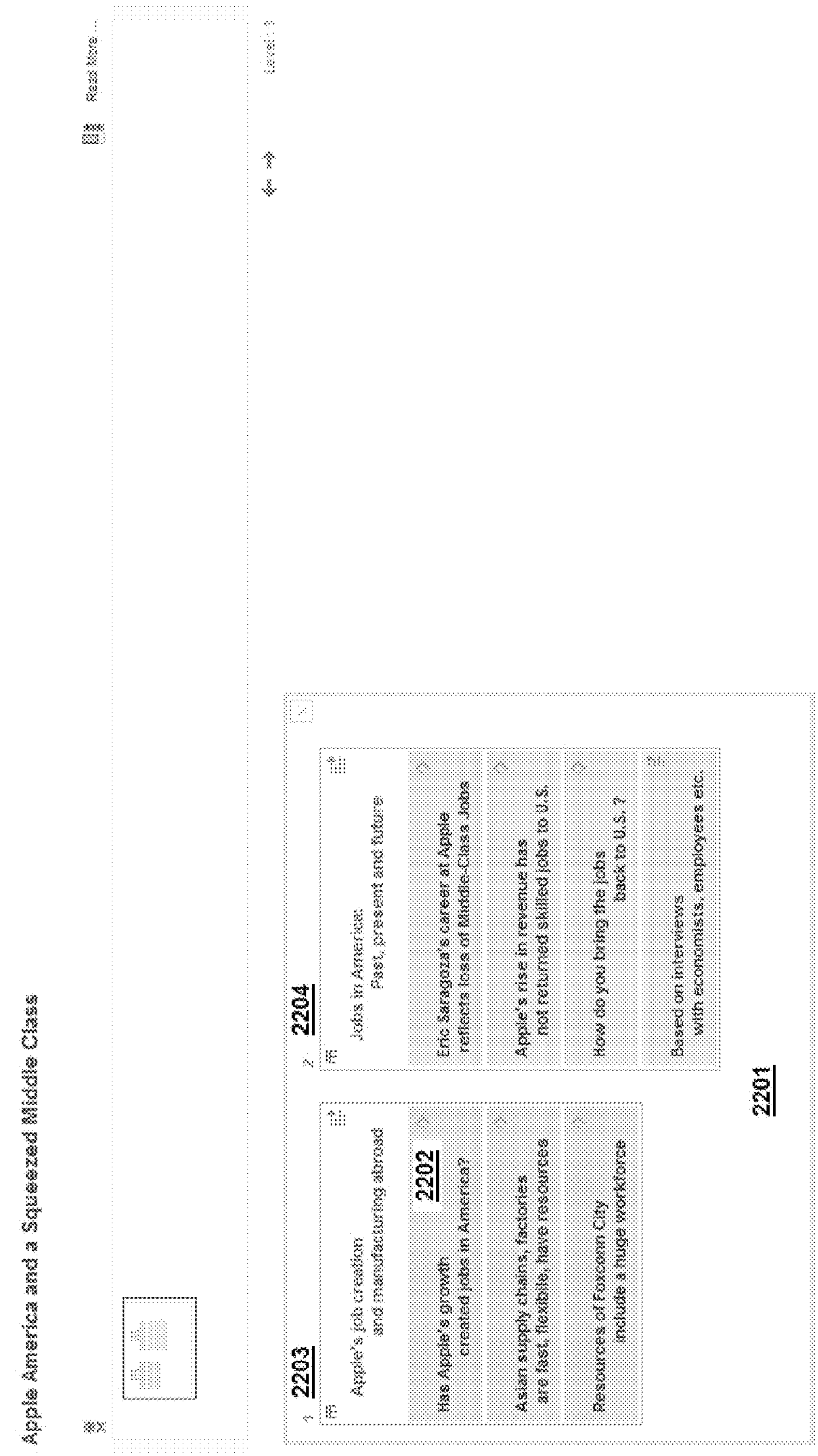
Fig. 22 – Level-1 Graphical-browse-view of the article "Apple, America and a Squeezed Middle Class"

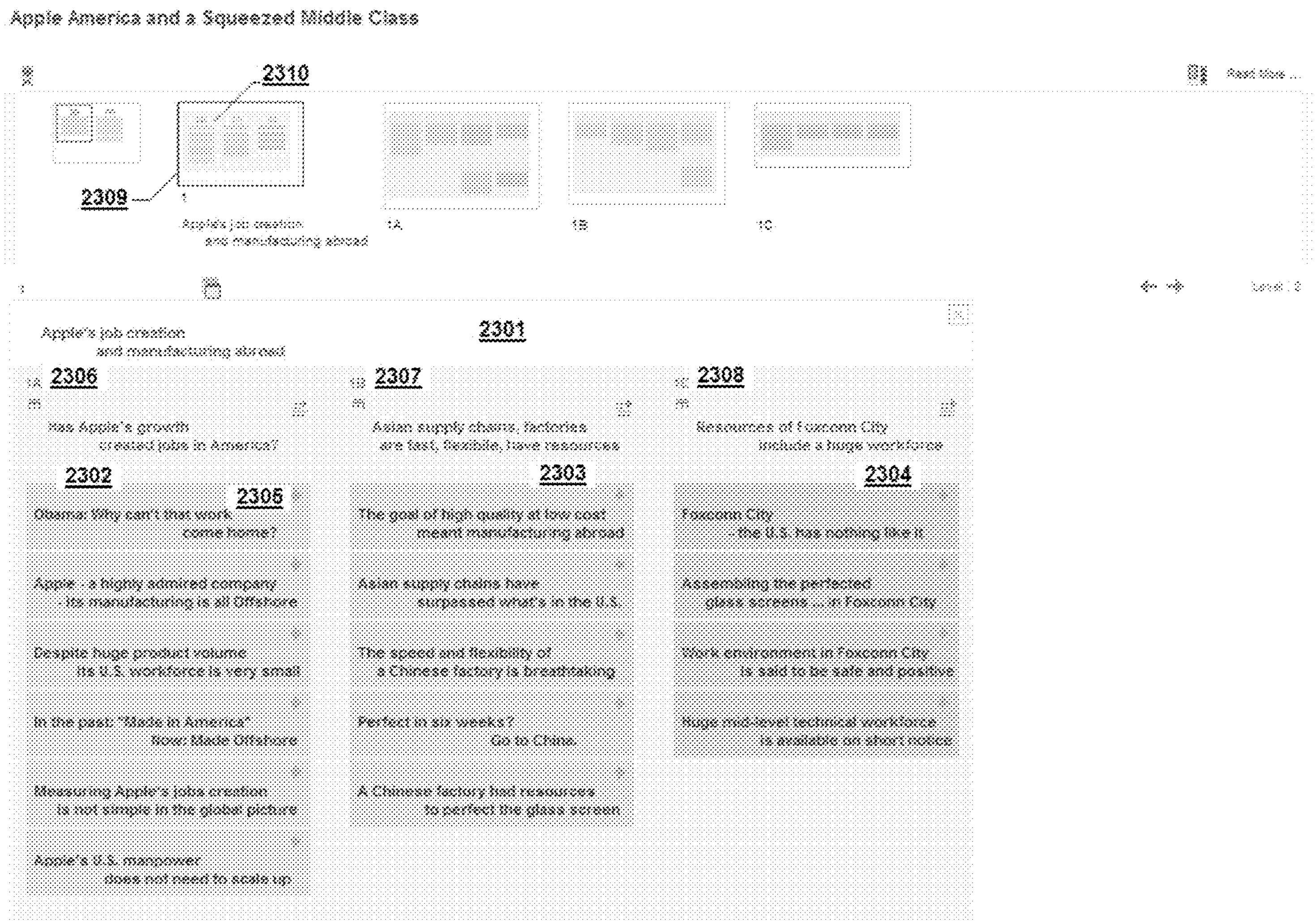
Fig. 23 – This level-2 graphical-browse-view corresponds to the compound-group "Apple's job creation and manufacturing abroad"

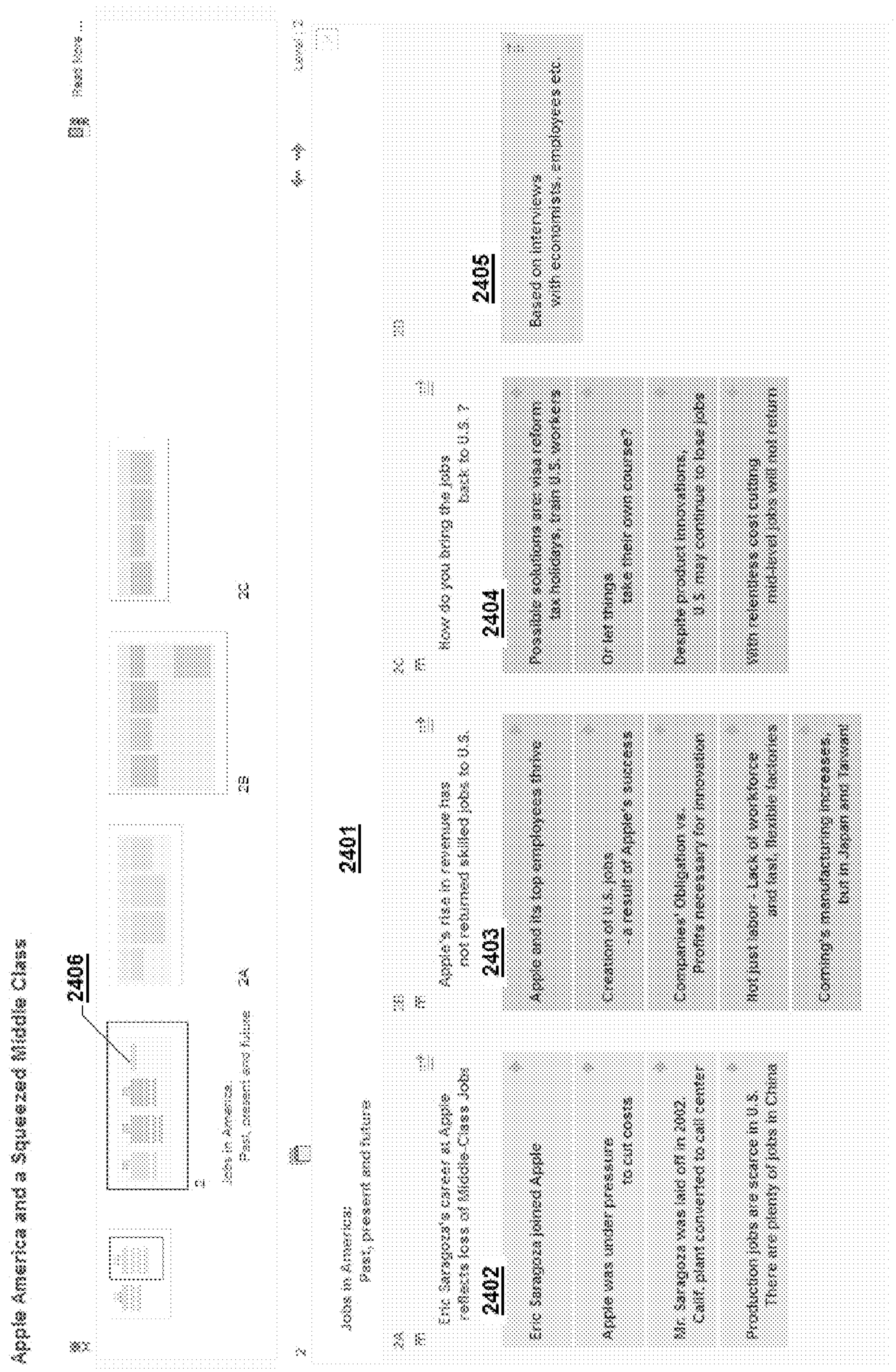
Fig. 24 – This level-2 graphical-browse-view corresponds to the compound-group "Jobs in America: Past, present and future"

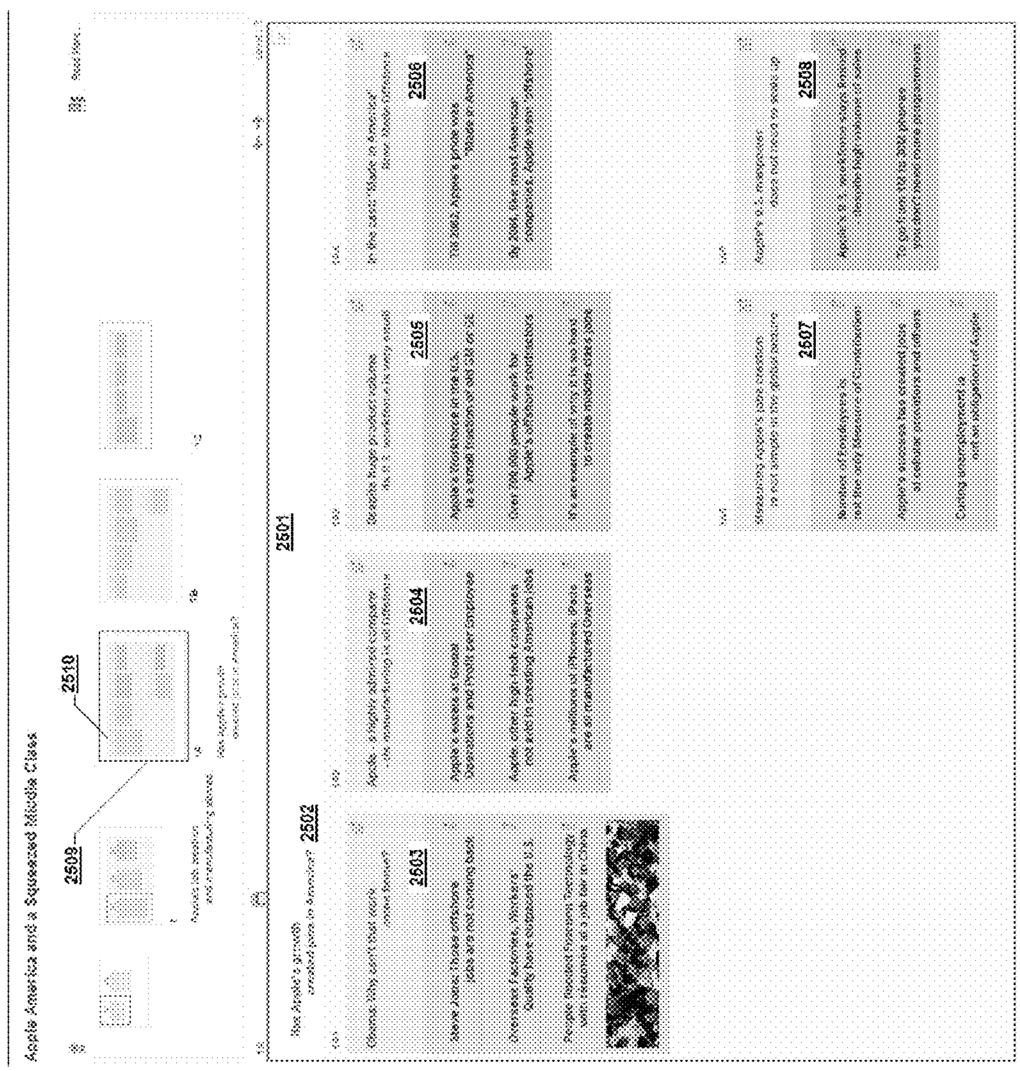
Fig. 25 – This level-3 graphical-browse-view corresponds to the compound-group “Has Apple’s growth created jobs in America?”

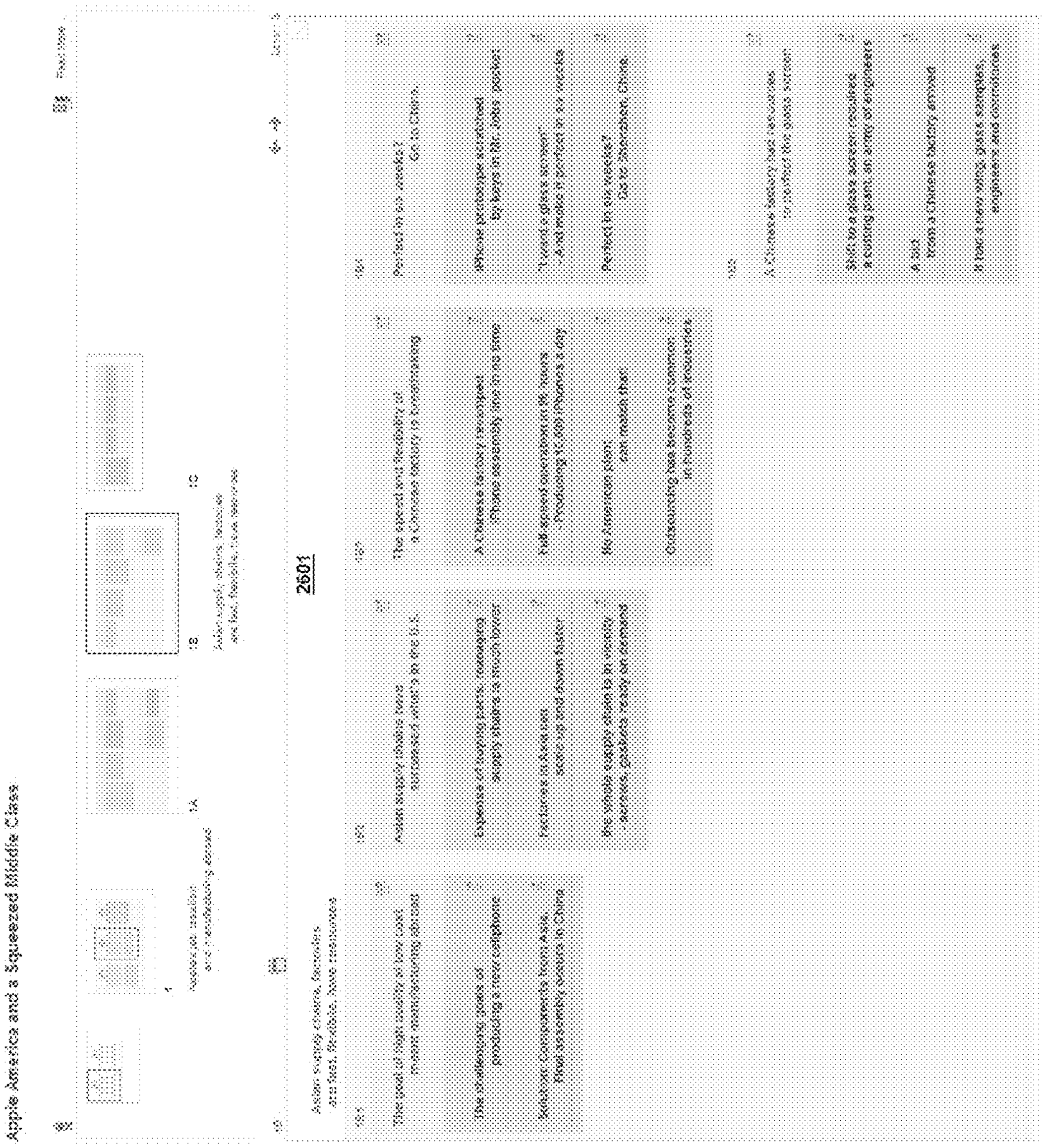
Fig. 26 – This level-3 graphical-browse-view corresponds to the compound-group "Asian supply chains and factories are fast, flexible and have resources"

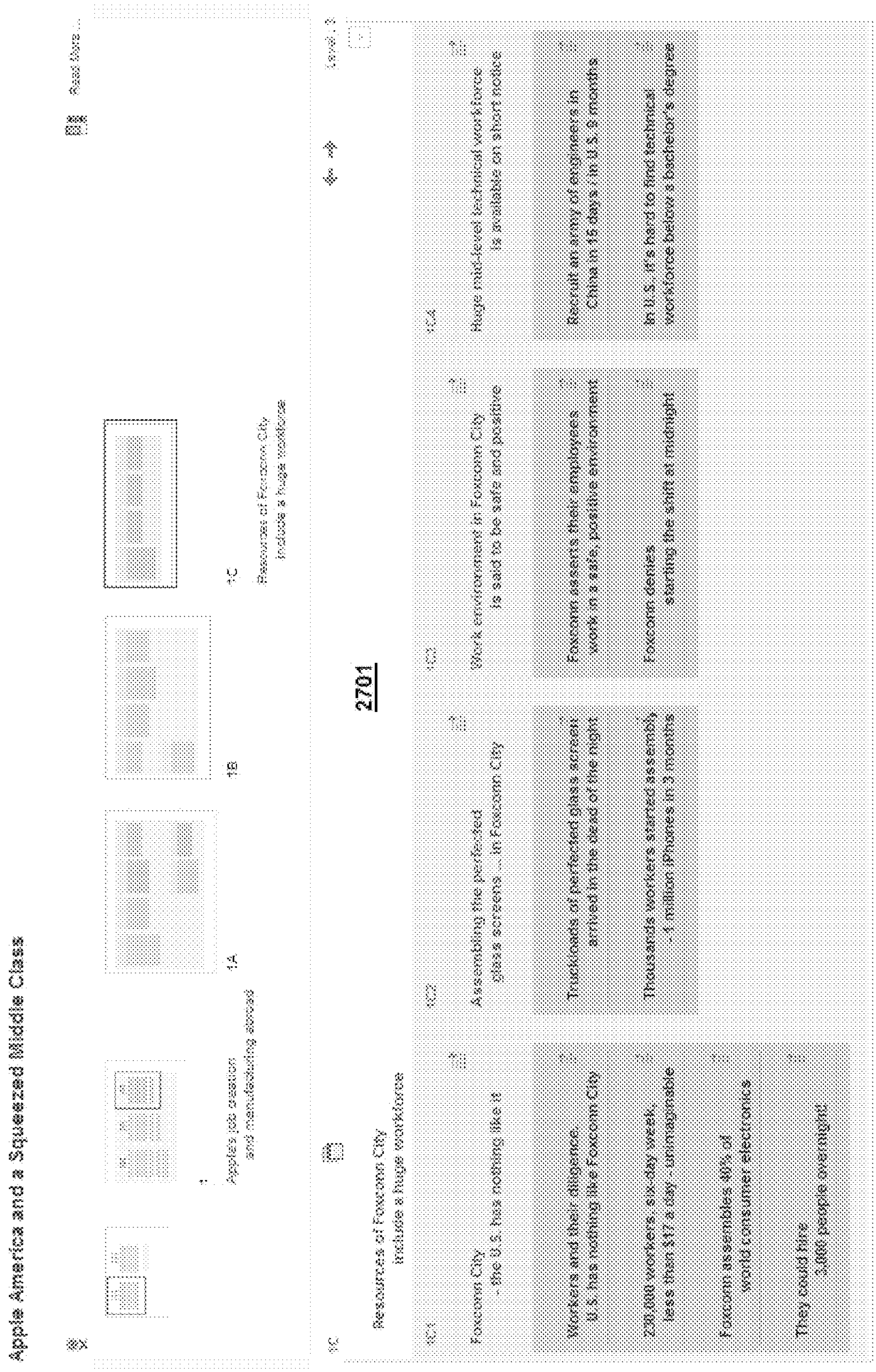
Fig. 27 – This level-3 graphical-browse-view corresponds to the compound-group "Resources of Foxconn City include a huge workforce"

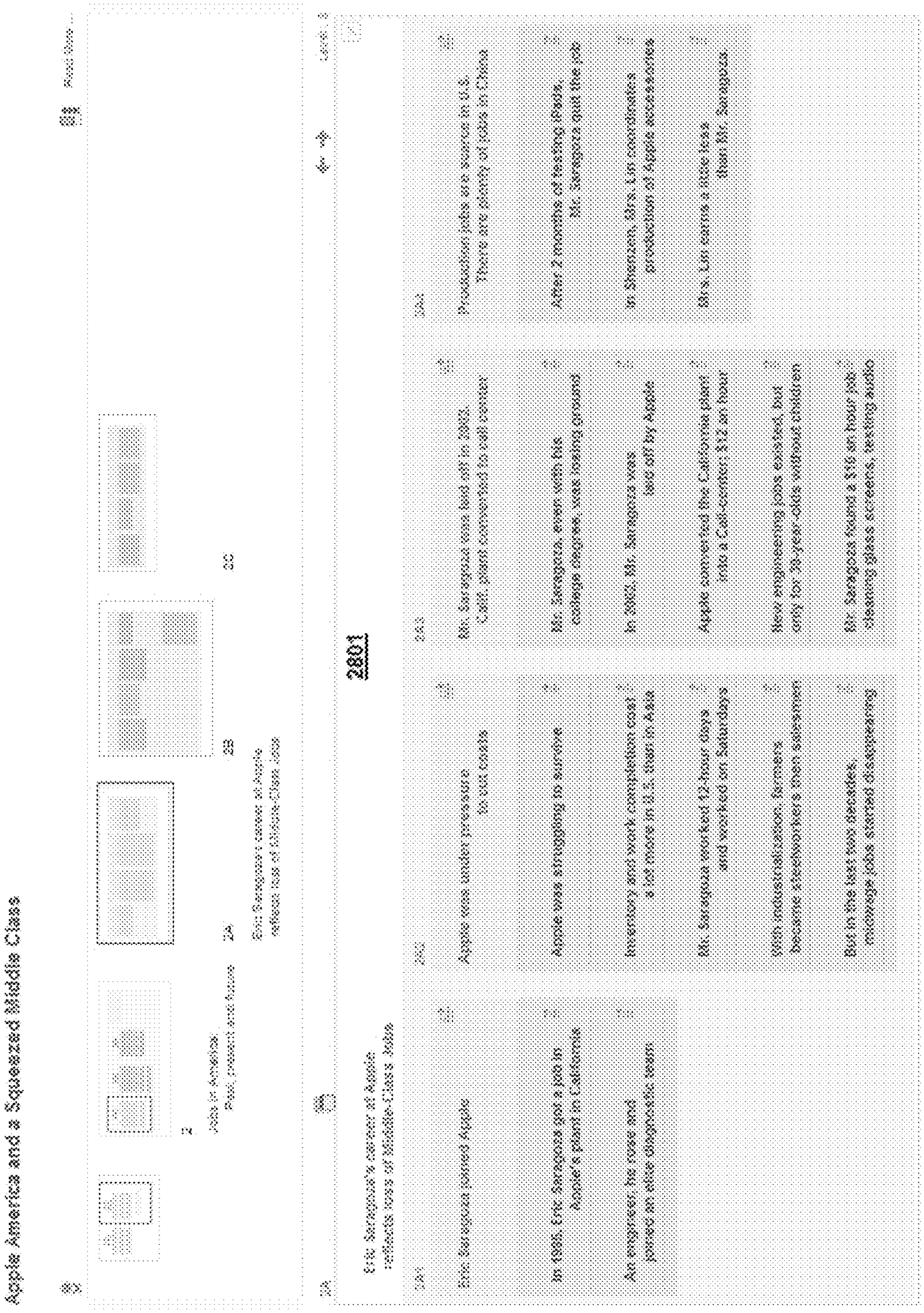
Fig. 28 – This level-3 graphical-browse-view corresponds to the compound-group "Eric Saragoza's career at Apple reflects loss of middle-class jobs"

Fig. 29 – This level-3 graphical-browse-view corresponds to the compound-group "Apple's meteoric rise in revenue has not returned skilled jobs to U.S."

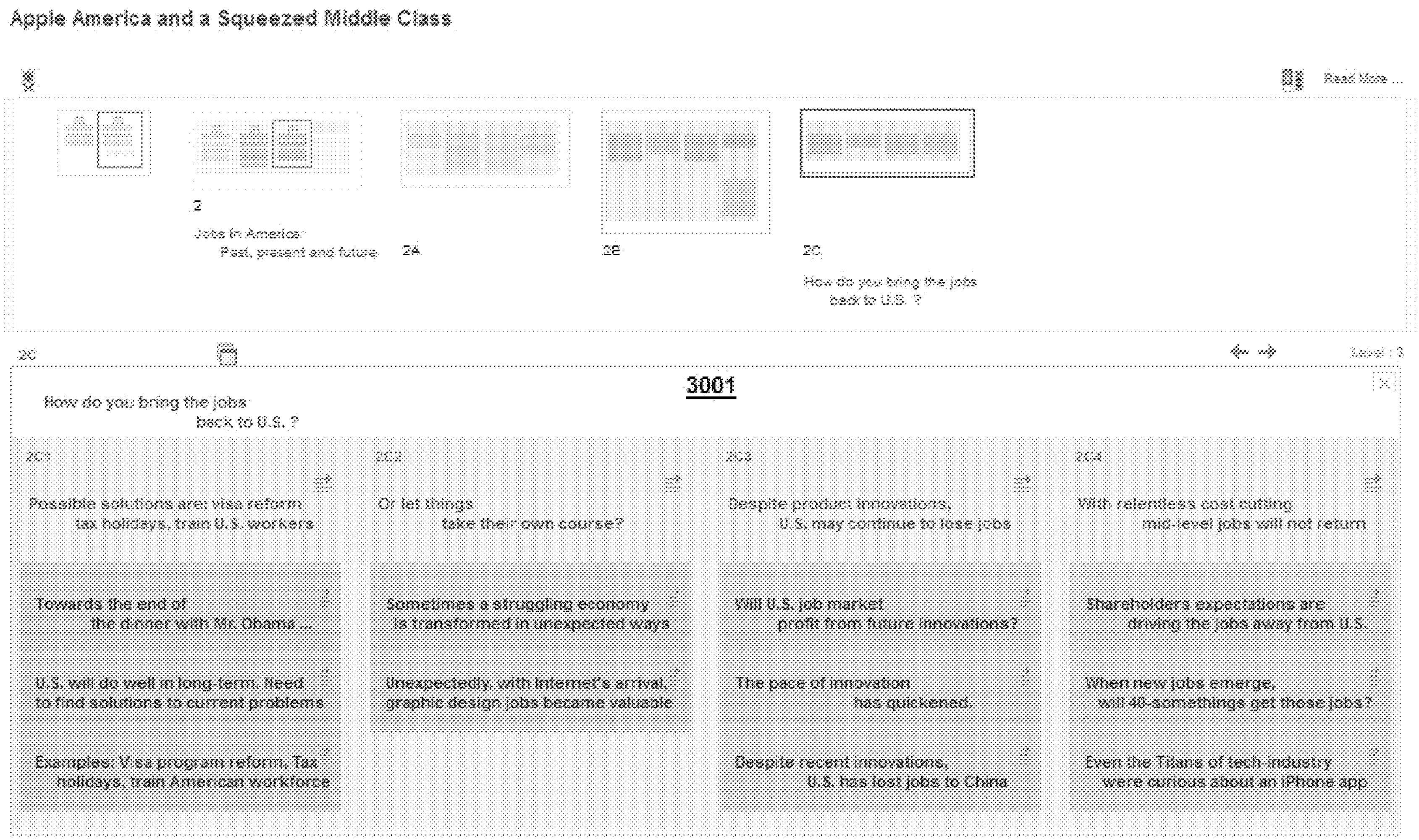
Fig. 30 – This level-3 graphical-browse-view corresponds to the compound-group "How do you bring the jobs back to U.S.?"

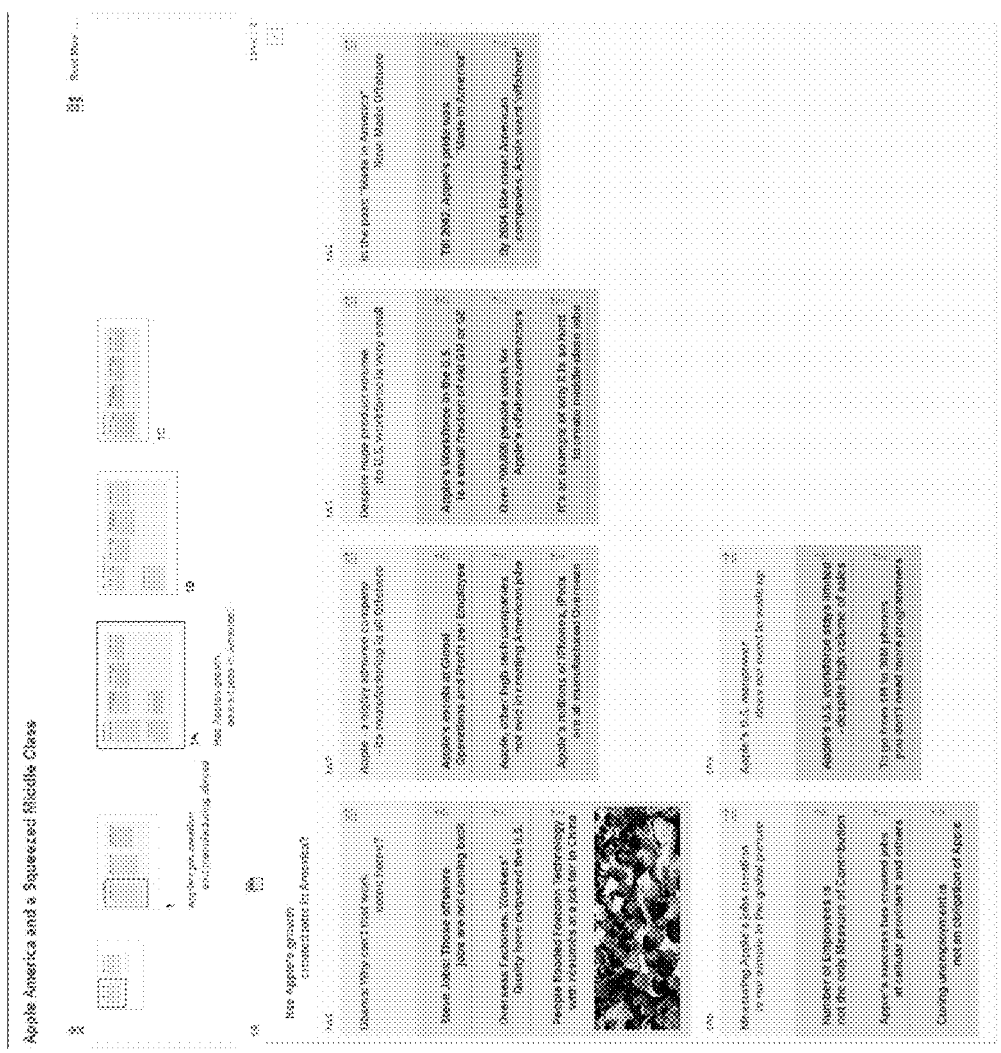
Fig. 31 – Left-justified placement of symbols in the last tier

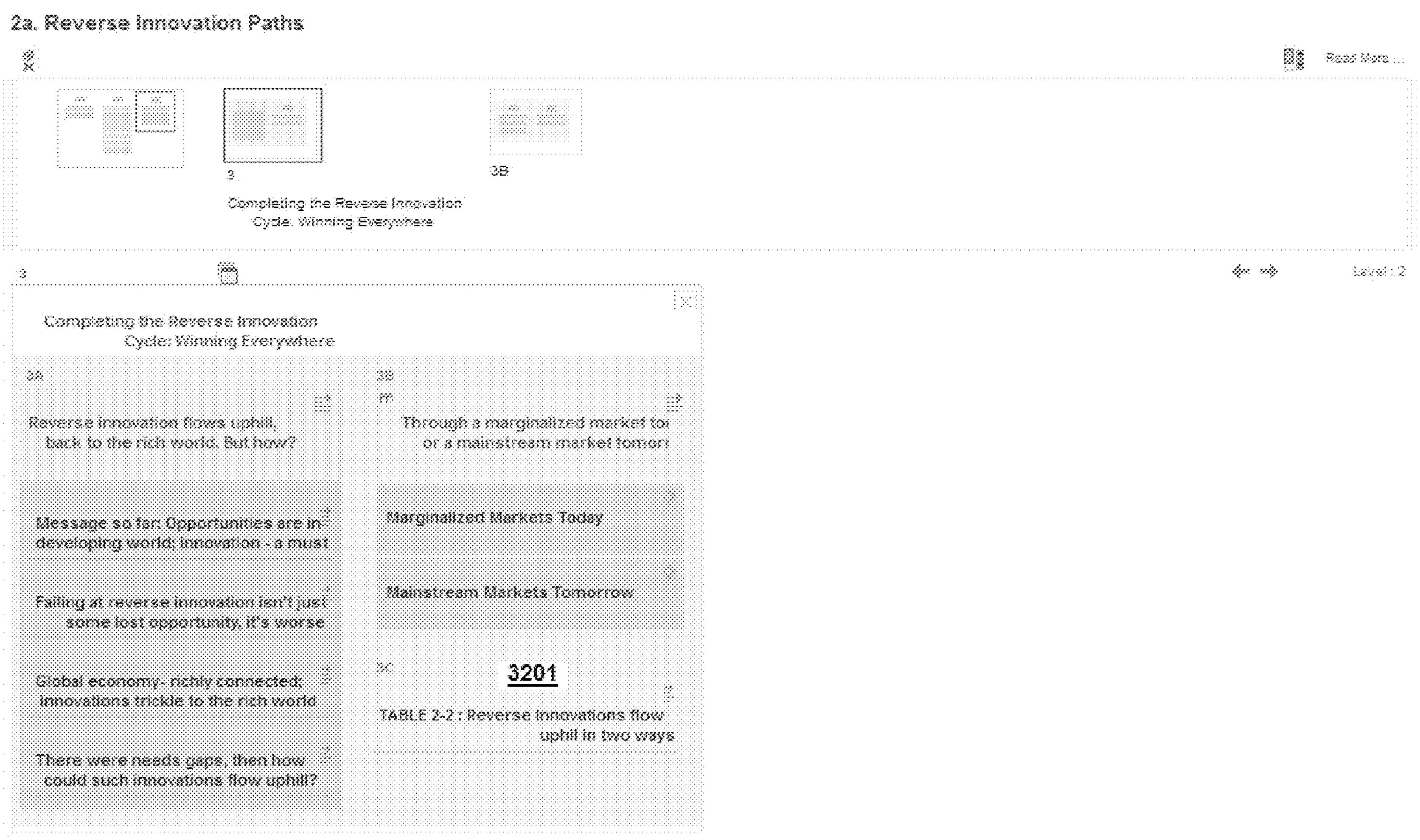
Fig. 32 – To show the placement of a point-symbol below a compound-group-symbol

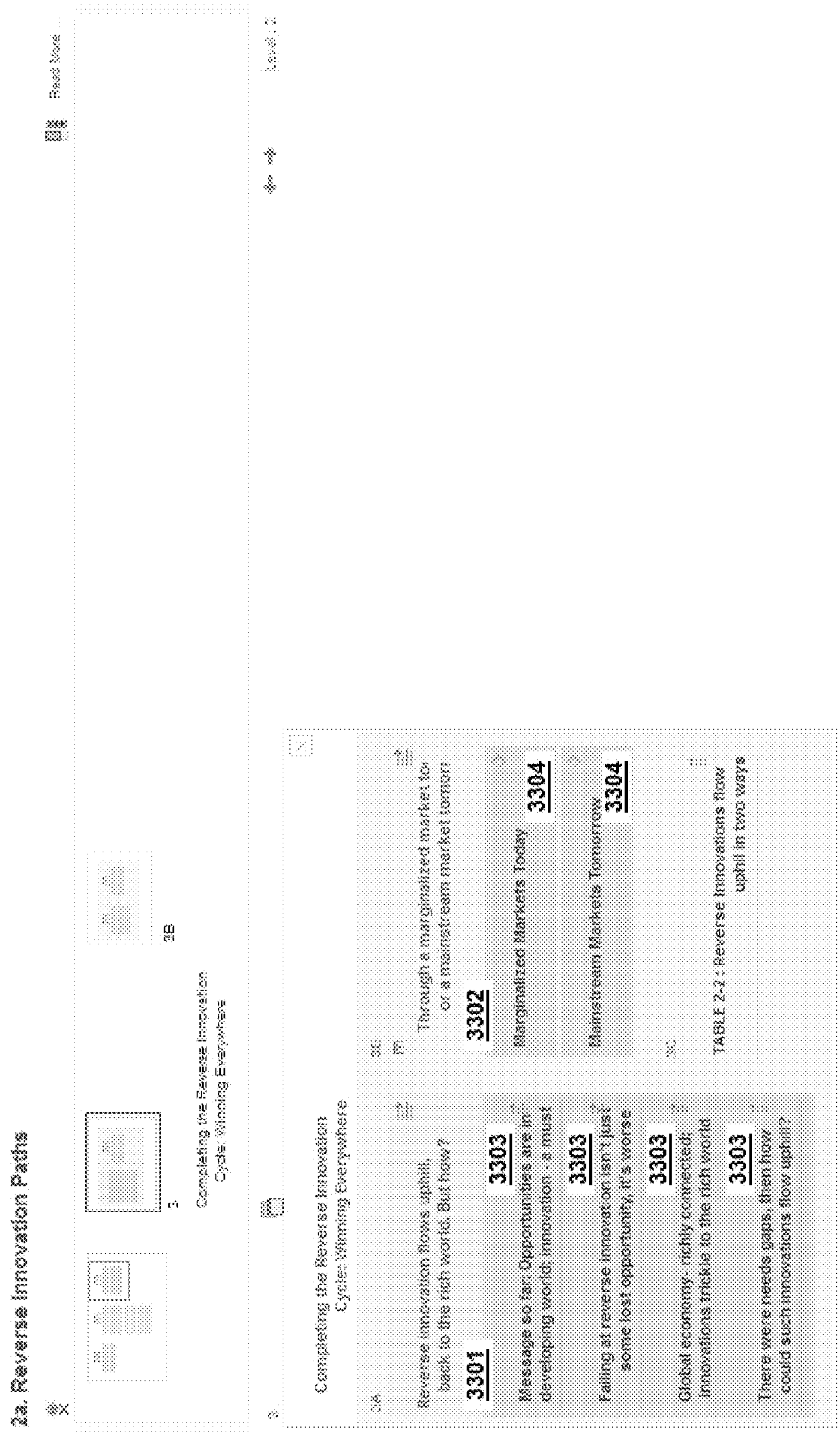
Fig. 33 -- A graphical-browse-view that shows summary at a mixed level of detail

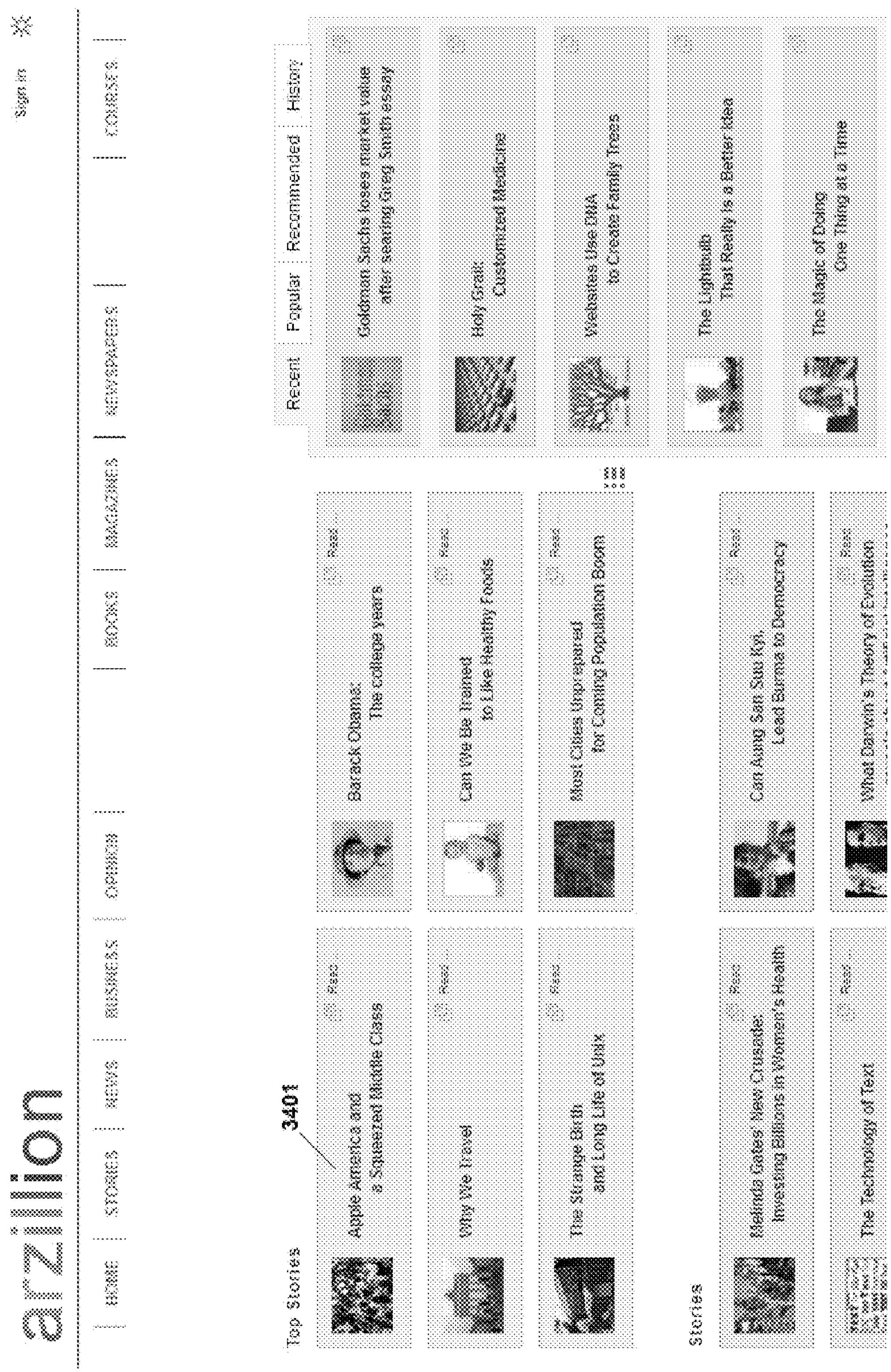
Fig. 34 – A list of article titles

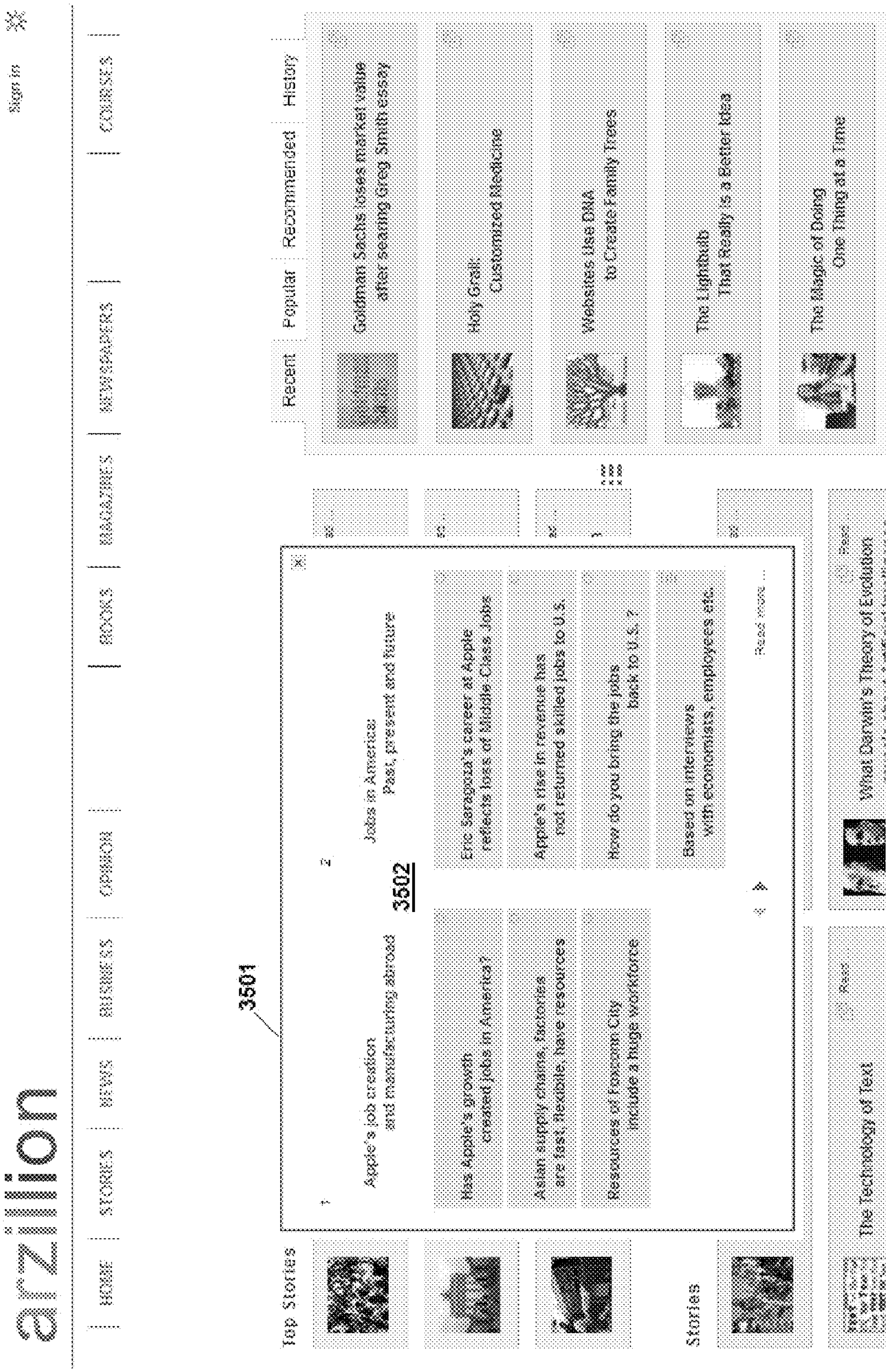
Fig. 35 – A preview of high-level summary of the article in the pop-up window

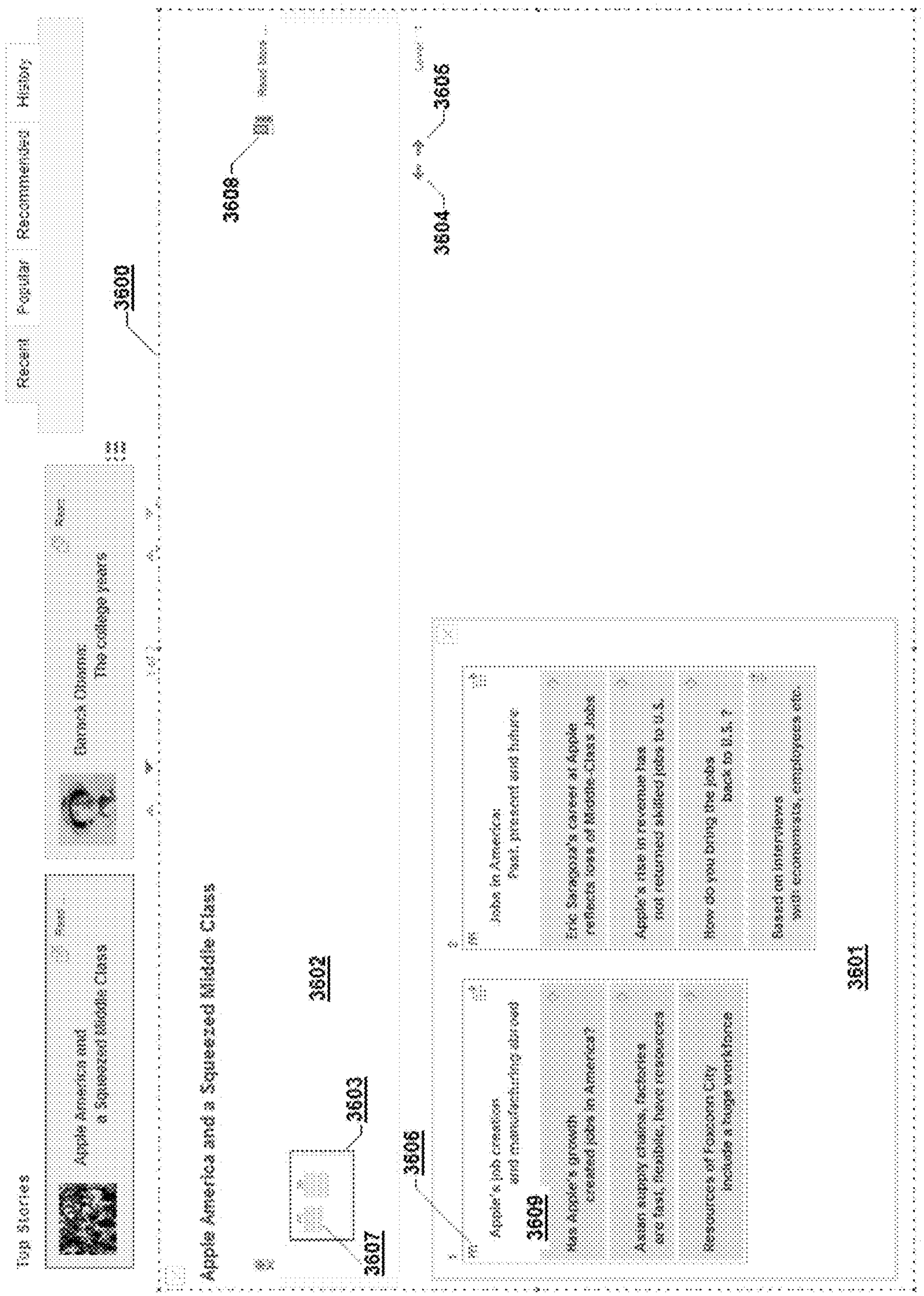
Fig. 36 – The Graphical-browse-area

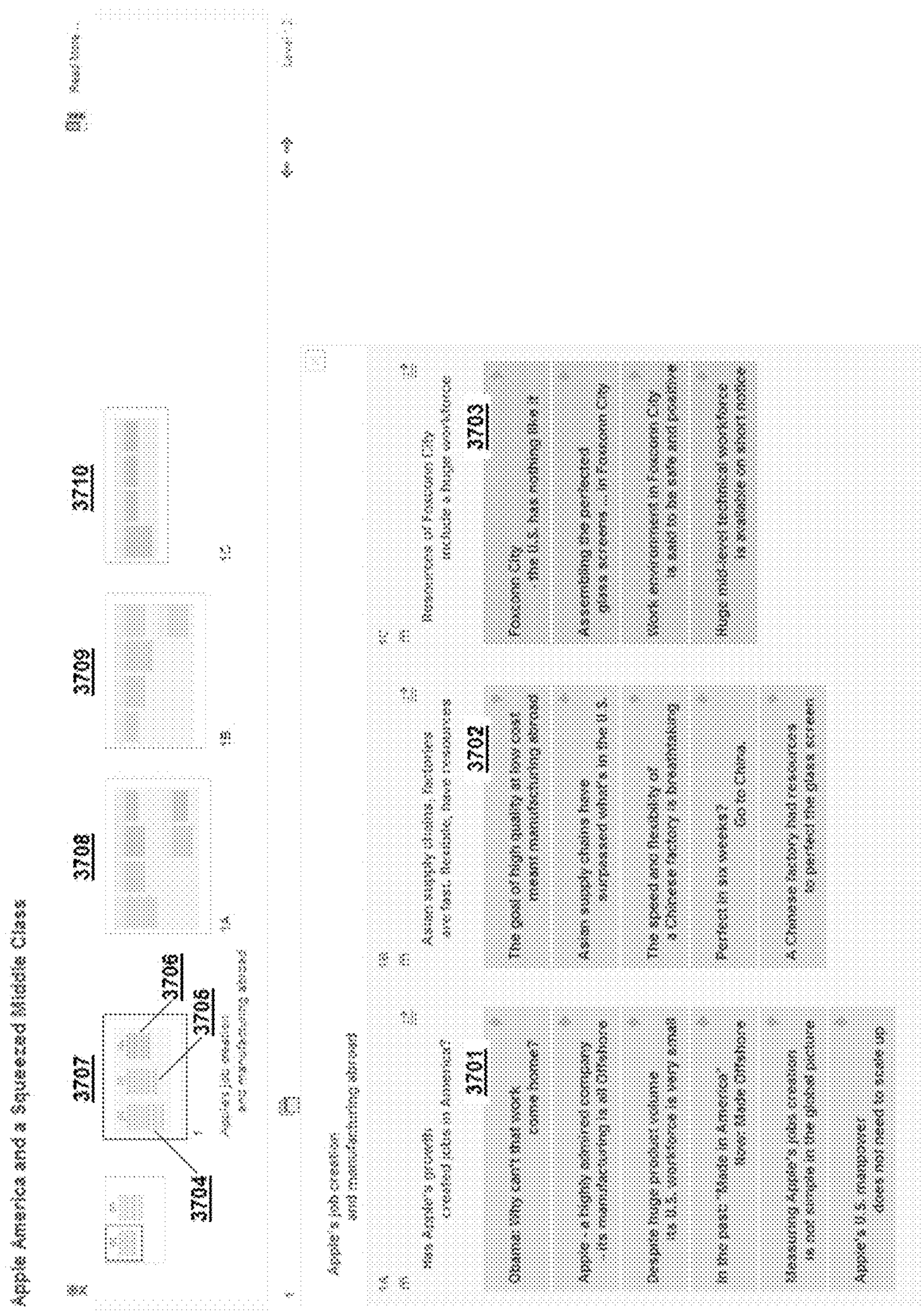
Fig. 37 – How the compound-group-symbols in a graphical-browse-view correspond to the miniature versions in the miniature-view and to the children of the miniature view

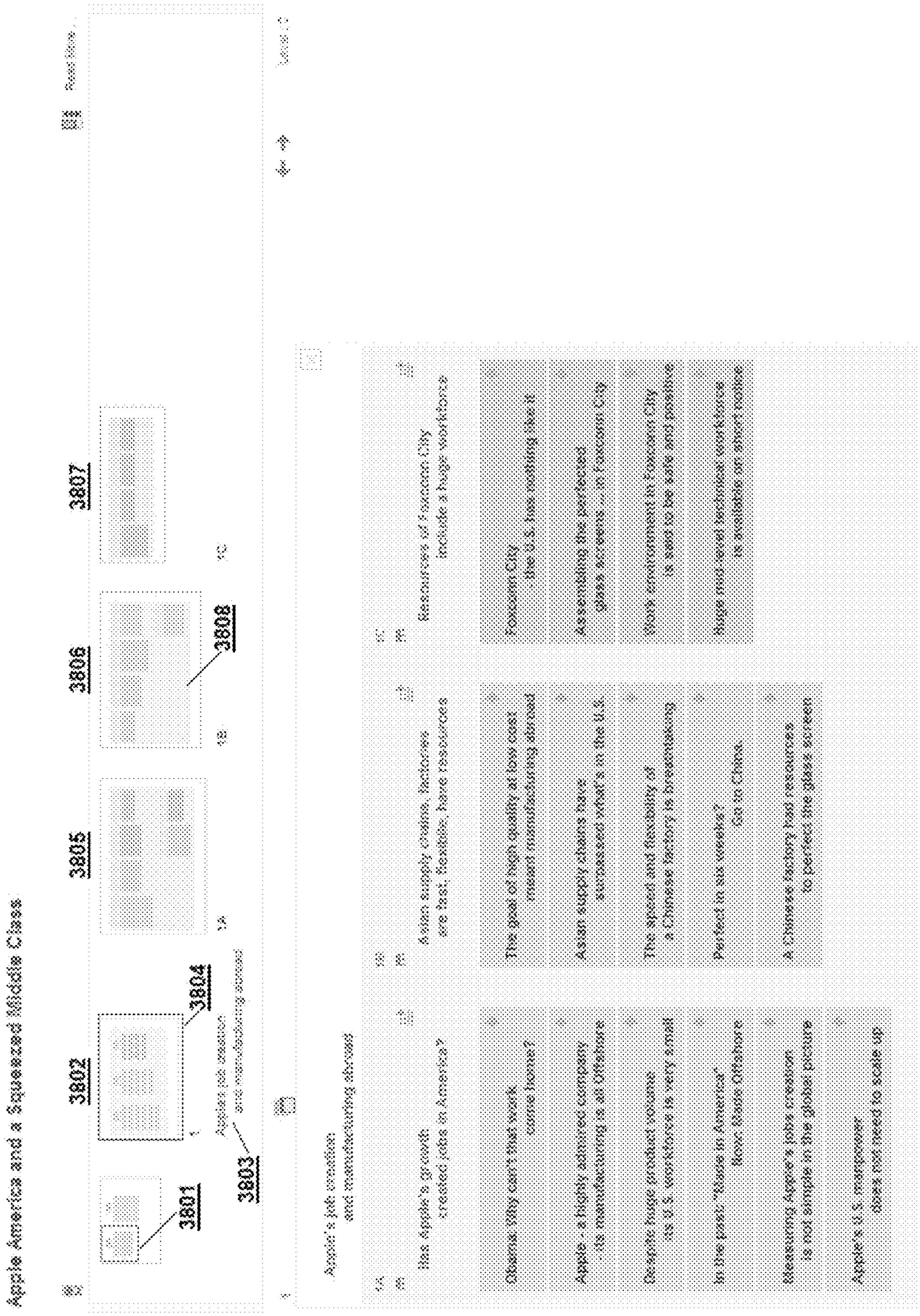
Fig. 38 – When the target miniature view is a level-2 miniature-view

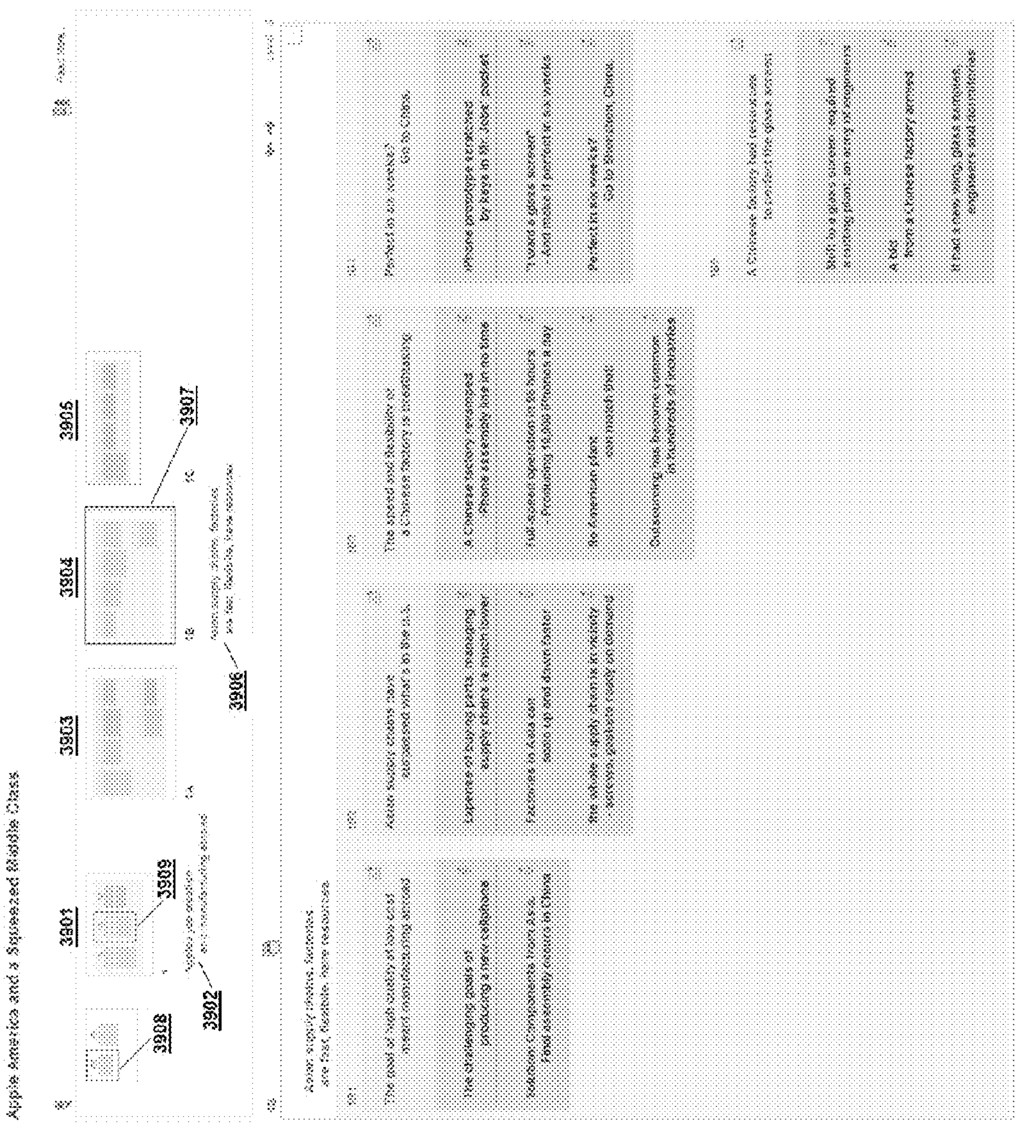
Fig. 39 – When the target miniature view is a level-3 miniature-view

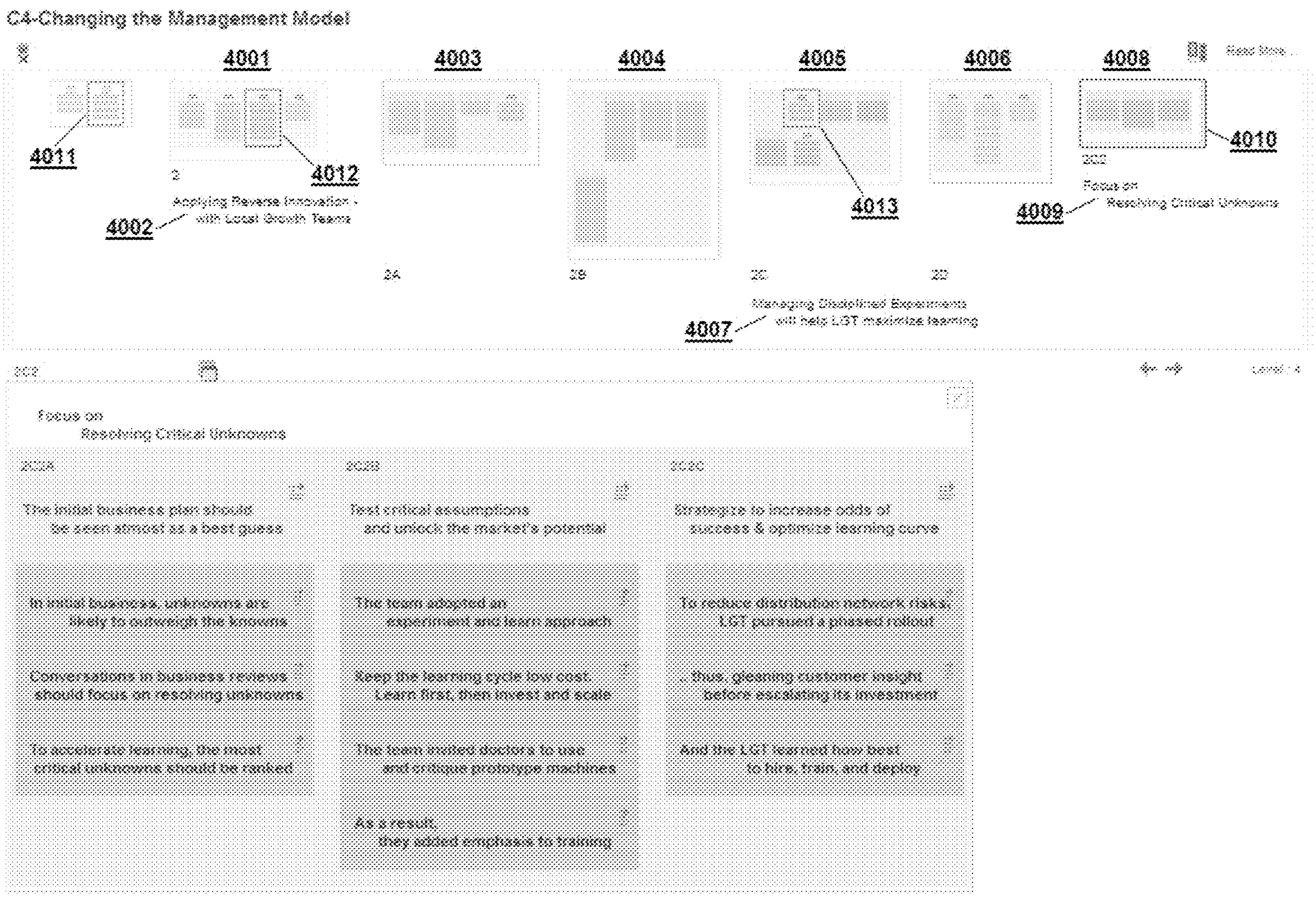
Fig. 40 – When the target miniature view is a level-4 miniature-view

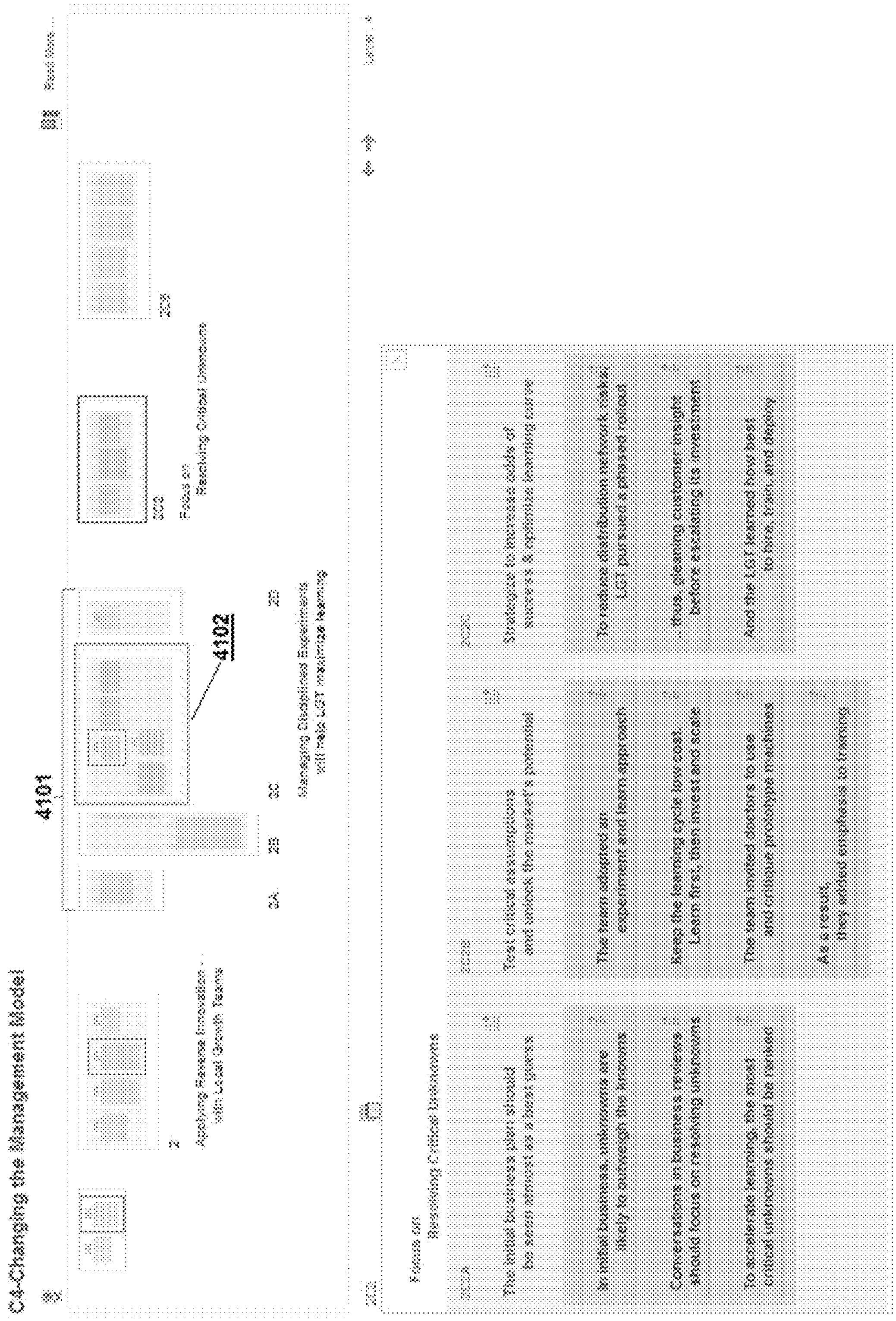
Fig. 41 – Level-3 miniature-views in a compact arrangement - when the target miniature view is a level-4 miniature-view

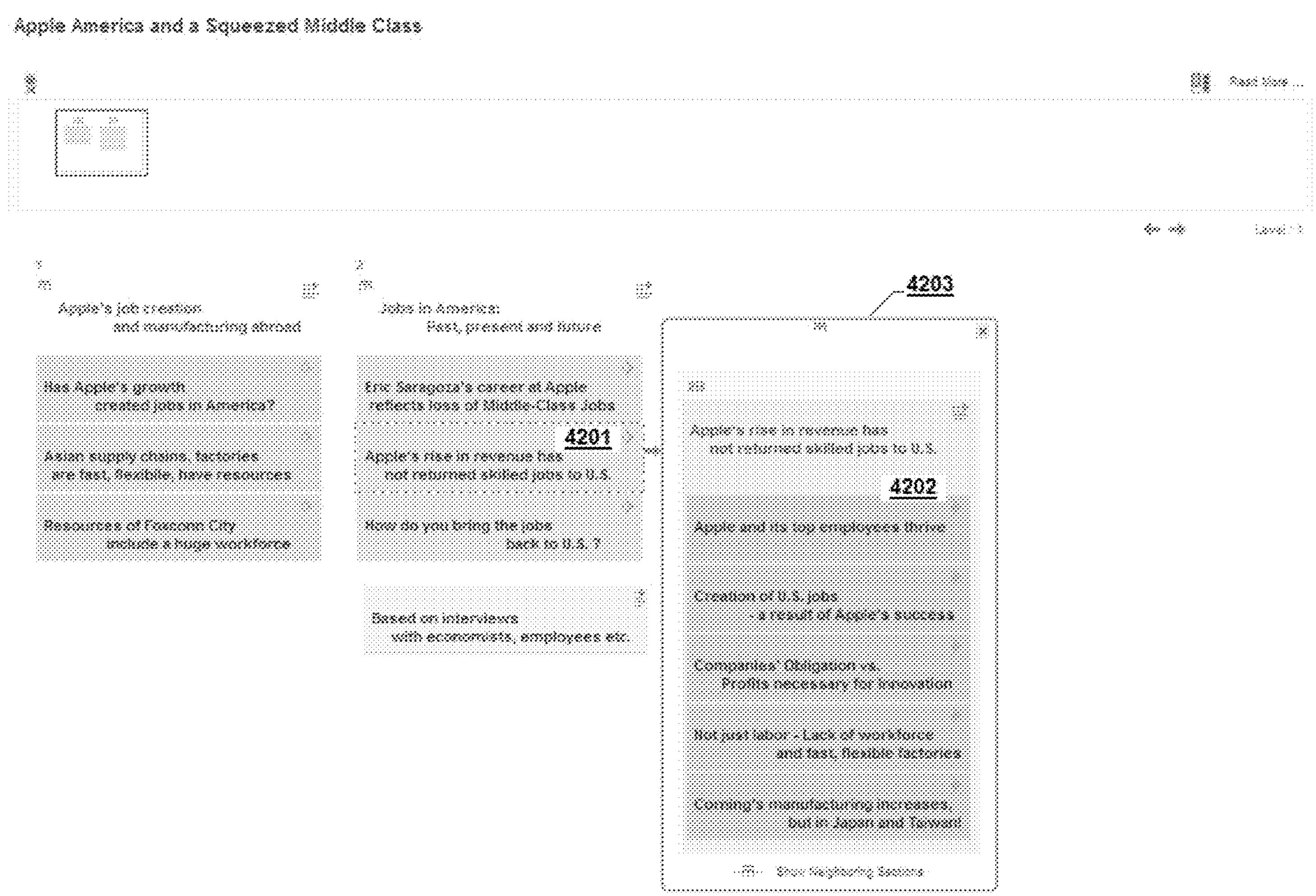
Fig. 42 – Pop-up window displayed when a member-element corresponding to a compound-group is clicked

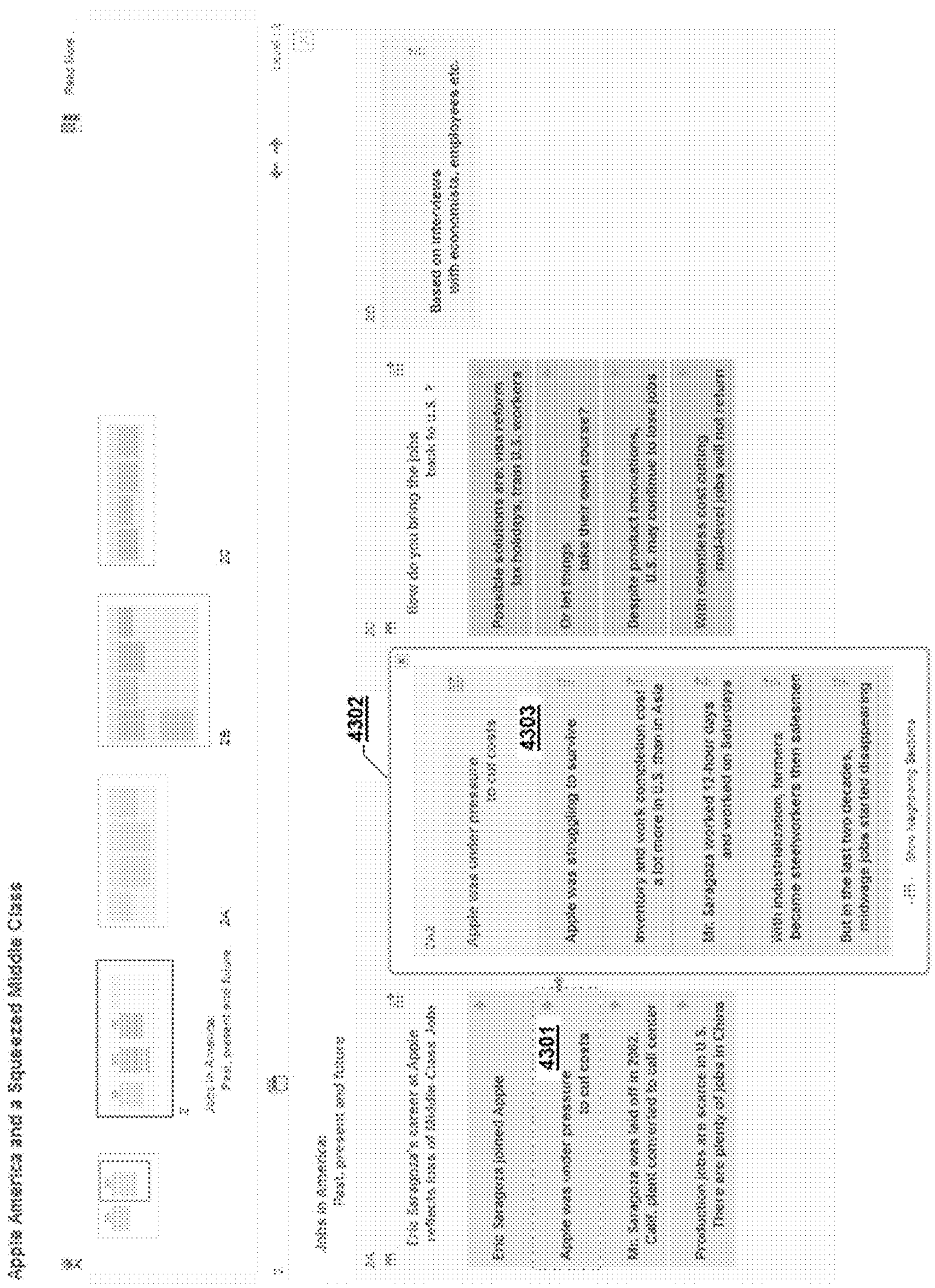
Fig. 43 – Pop-up window displayed when a member-element corresponding to a simple-group is clicked

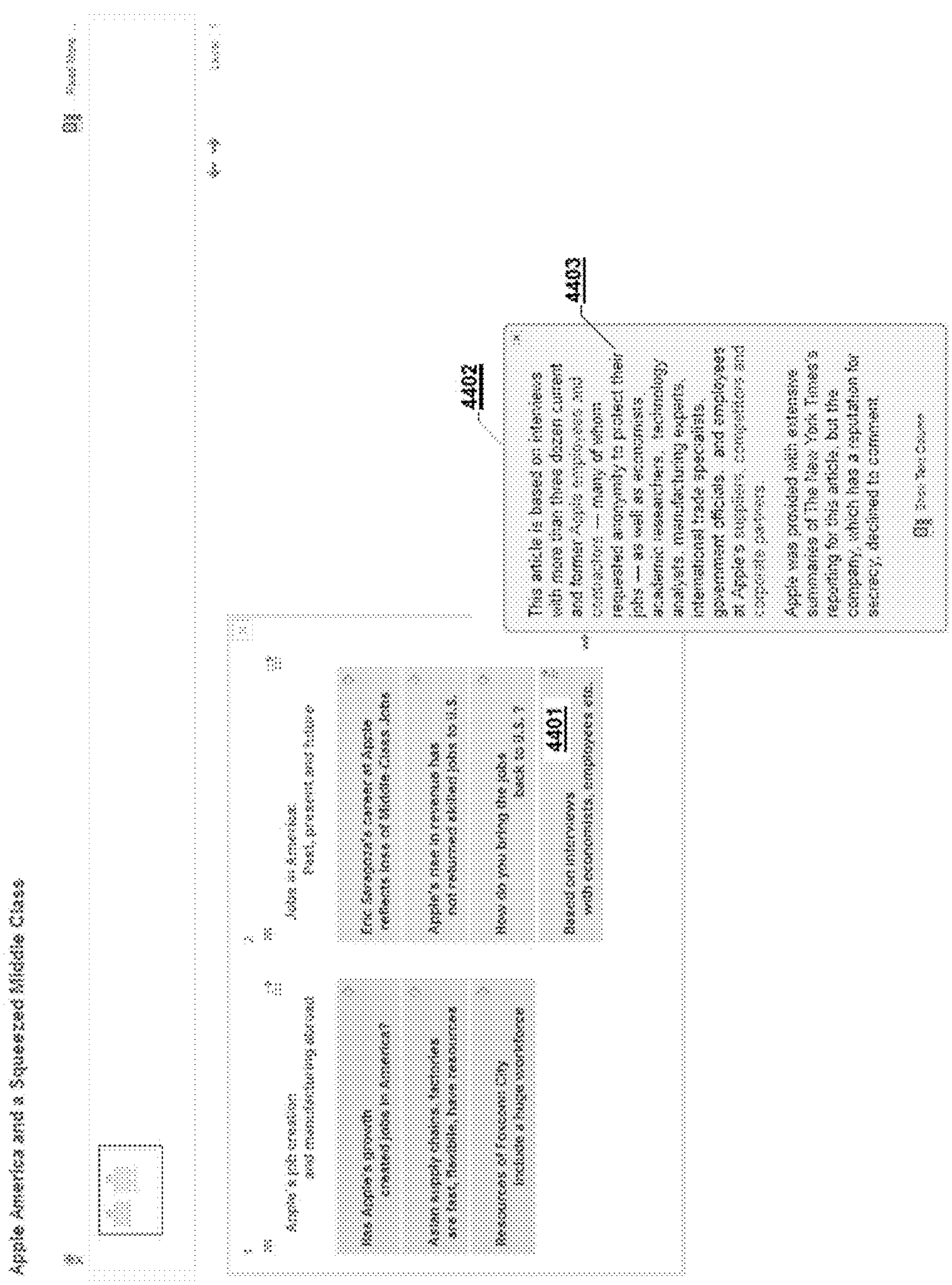
Fig. 44 – Pop-up window displayed when a member-element corresponding to a point is clicked

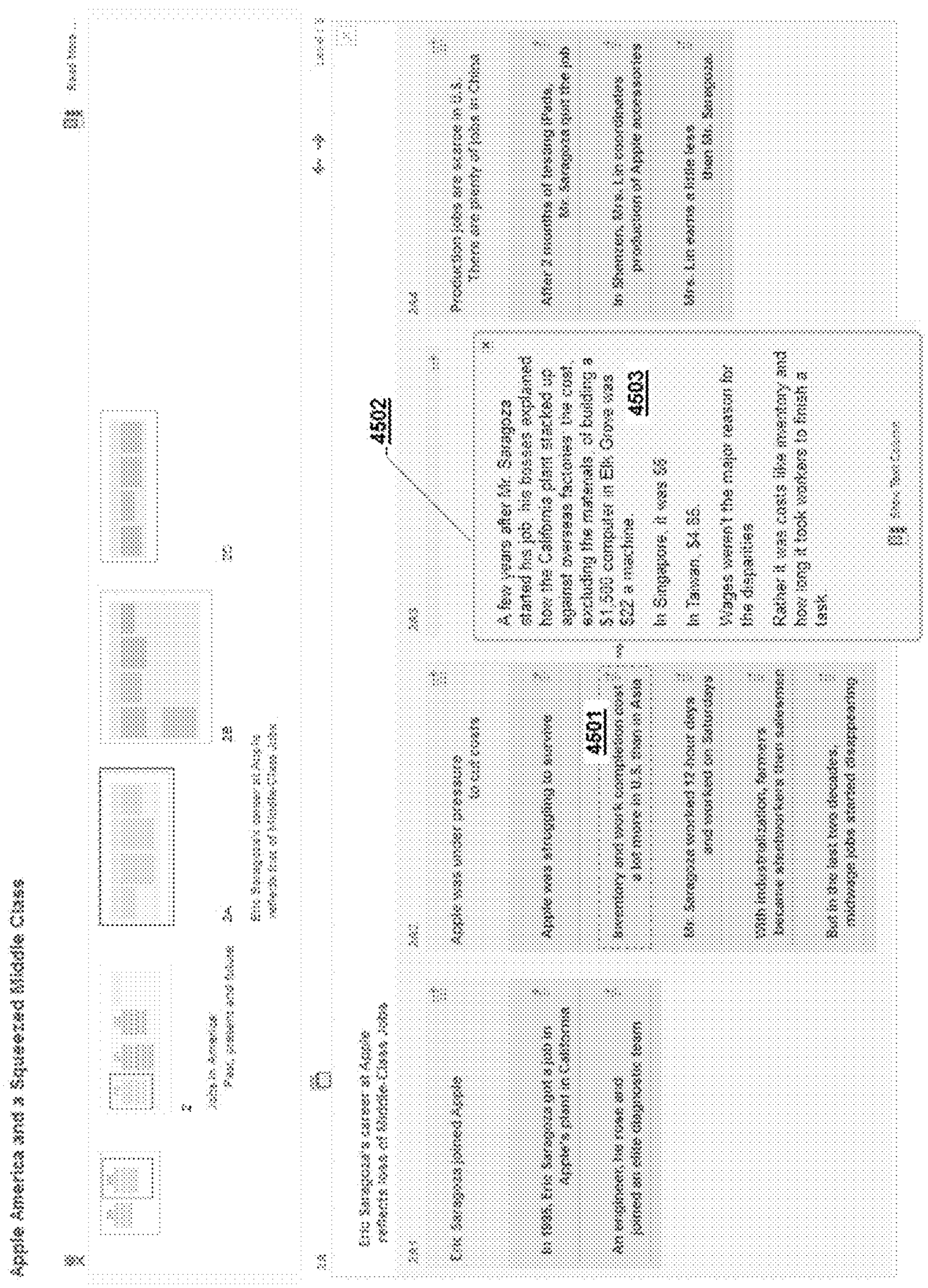
Fig. 45 – Pop-up window displayed when a simple-group-symbol's member-element is clicked

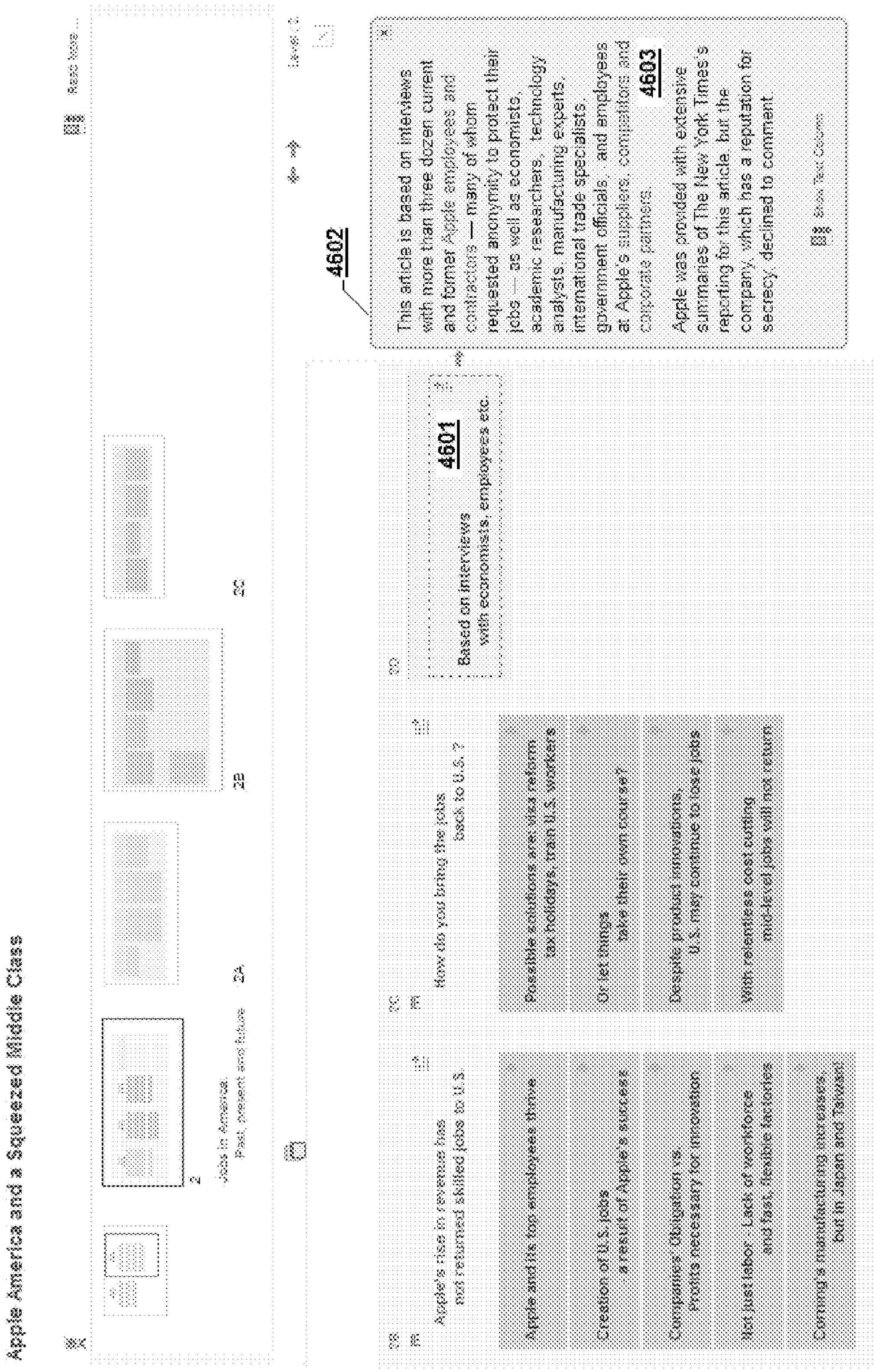
Fig. 46 – Pop-up window displayed when a point-symbol is clicked

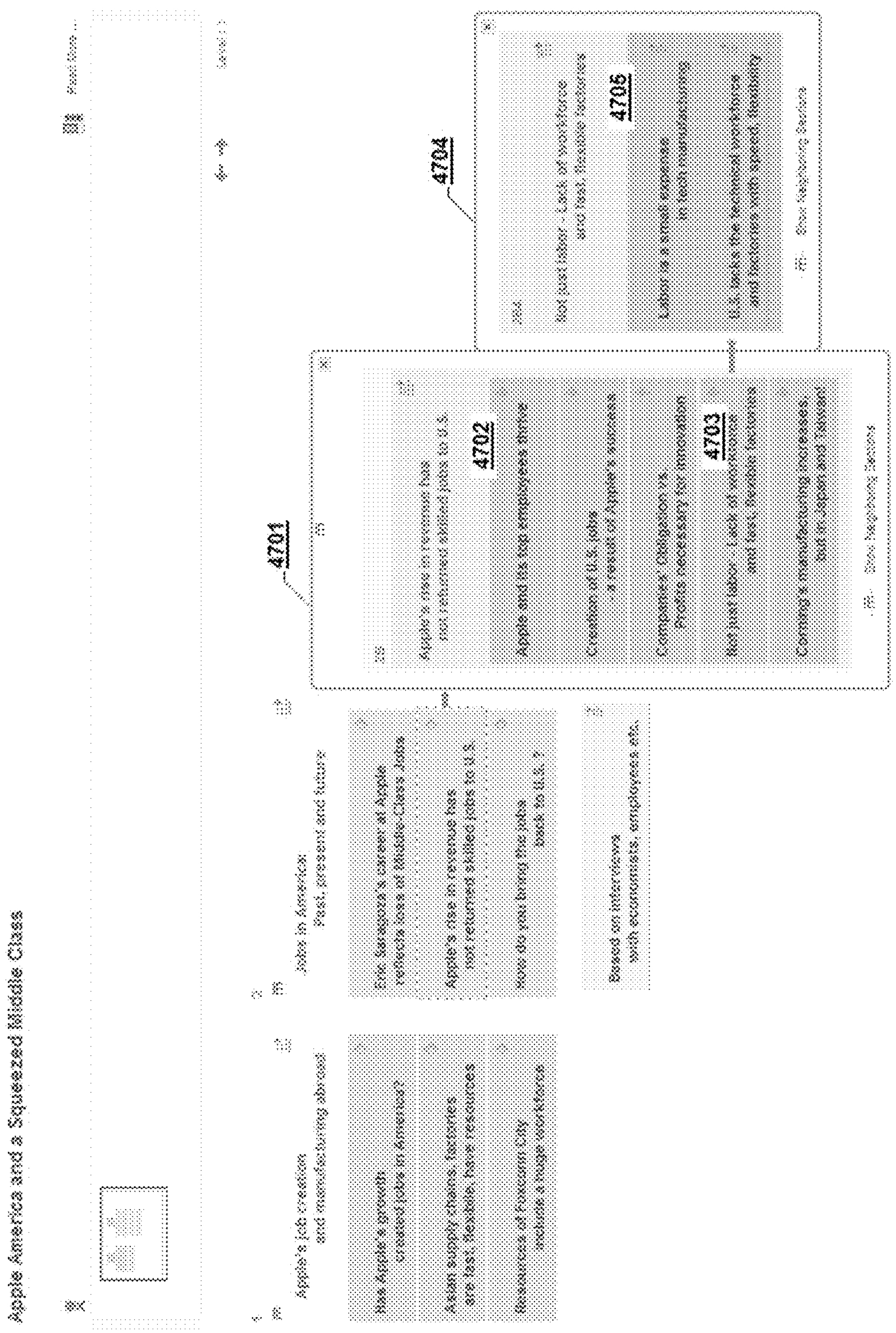
Fig. 47 – Pop-up window displayed when a member-element corresponding to a simple-group is clicked in a pop-up window

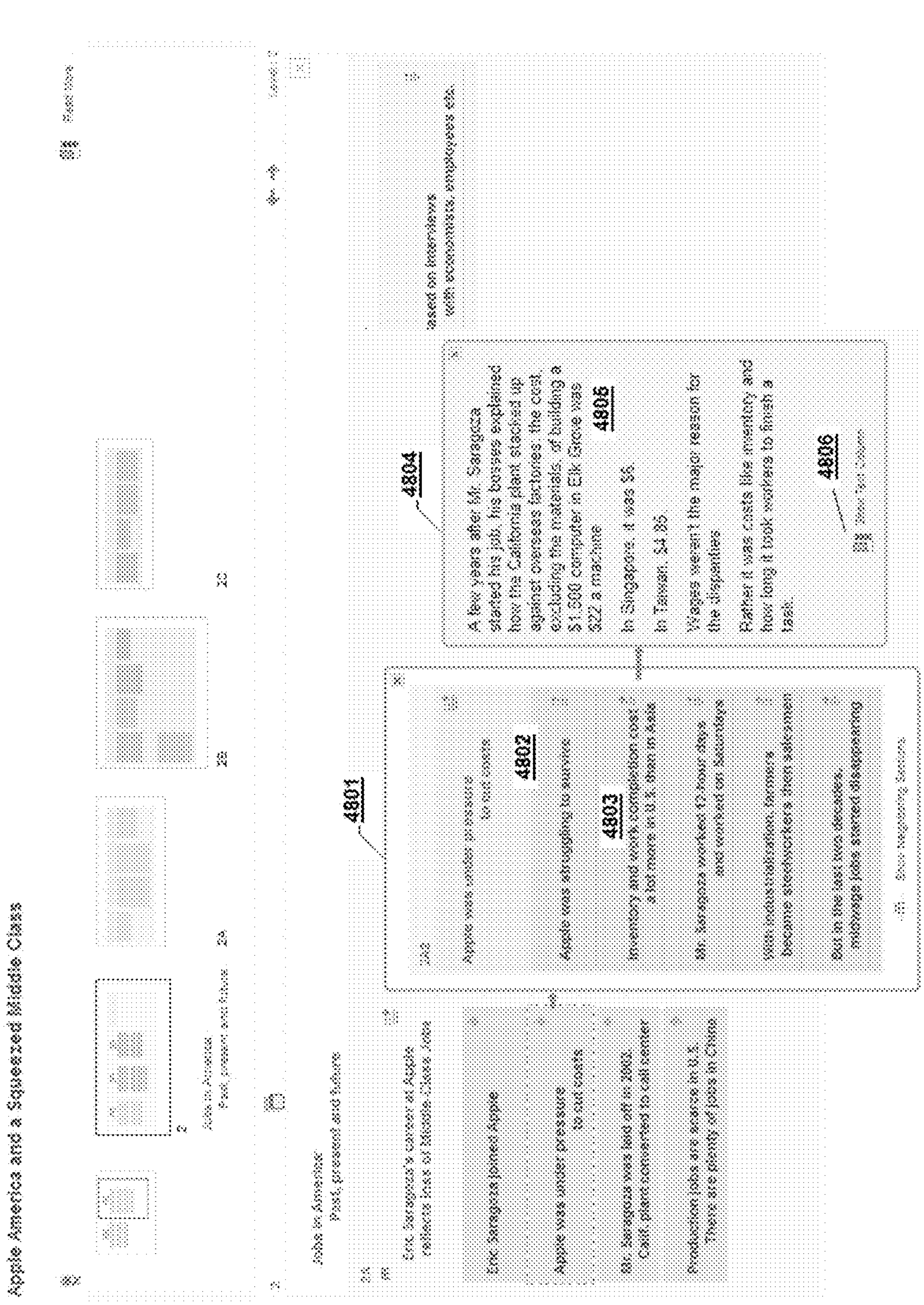
Fig. 48 – A pop-up window displayed when a member-element corresponding to a point is clicked in a pop-up window

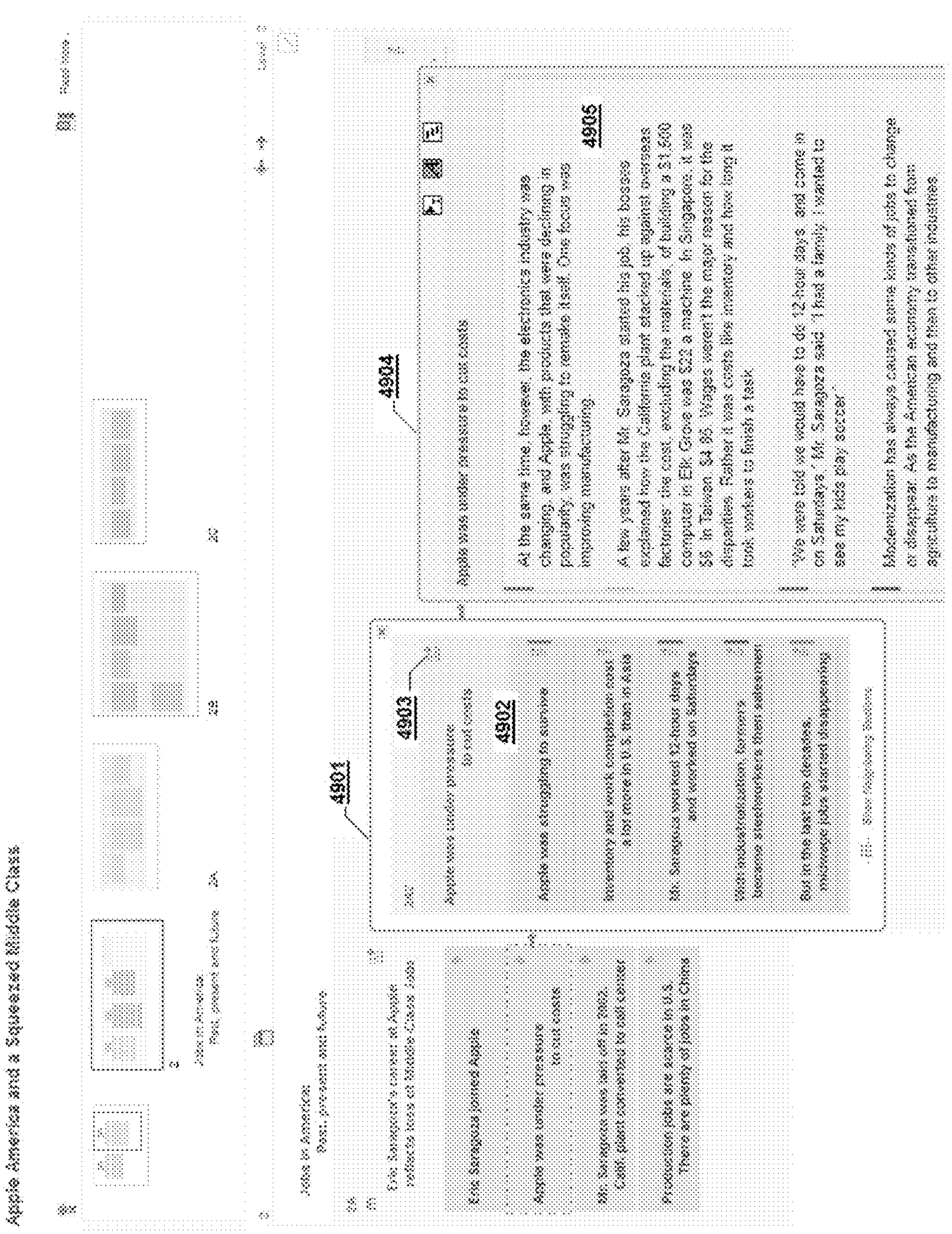
Fig. 49 – Pop-up window displayed when the "display-article-matter" icon in a header-element is clicked

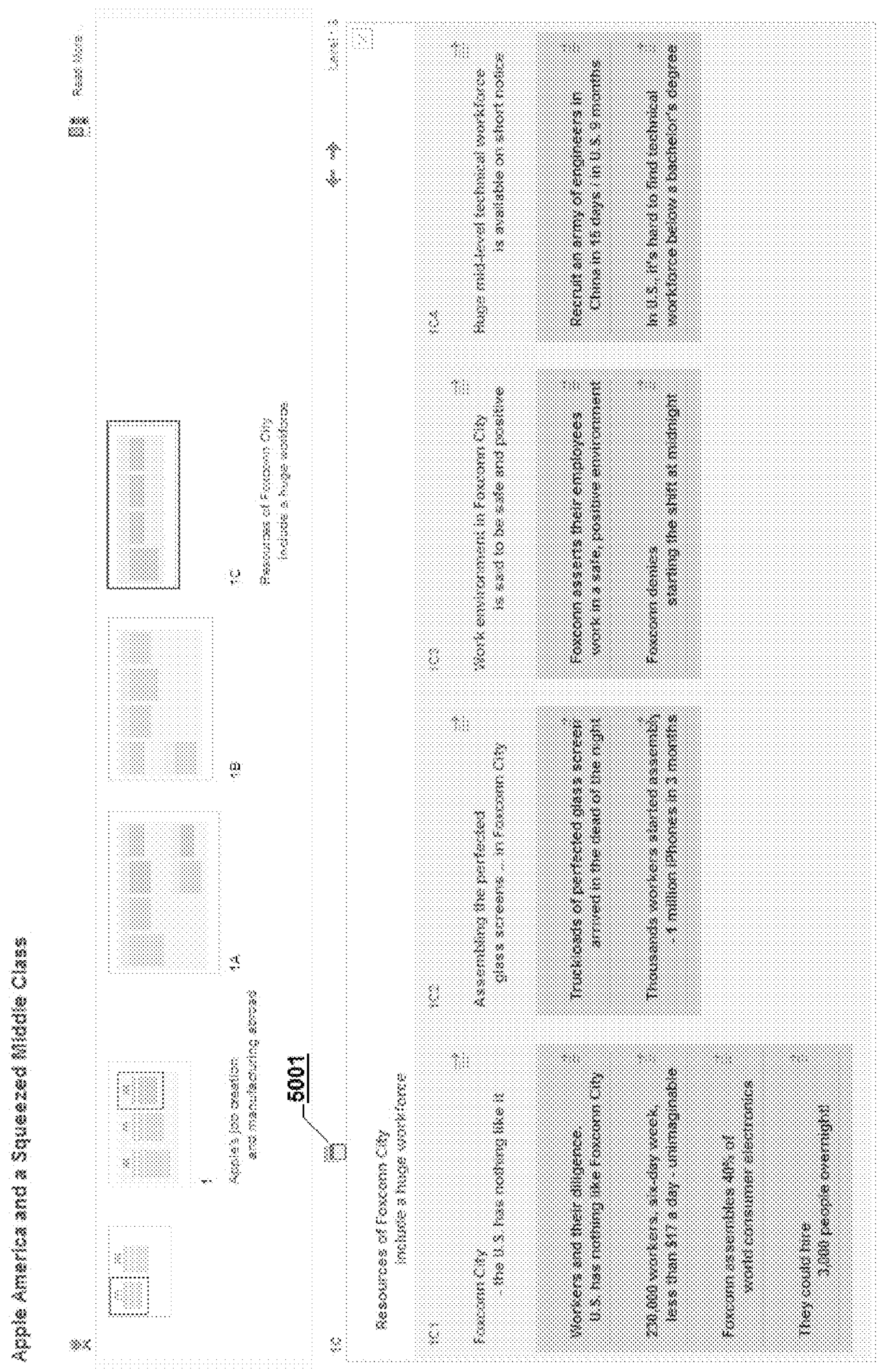
Fig. 50 – Click on the "Show Context" icon

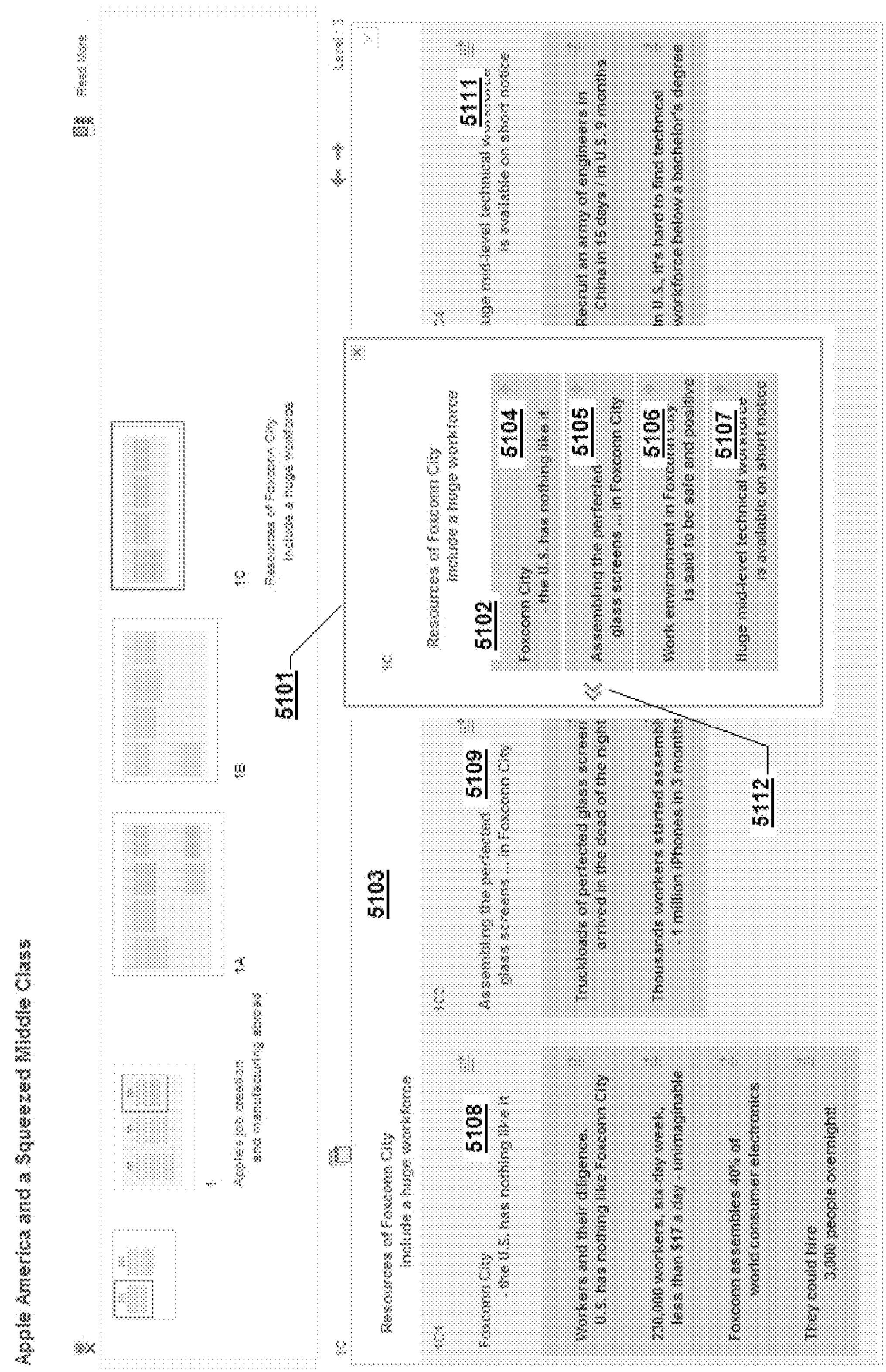
Fig. 51 – A context pop-up window shows the compound-group-symbol whose expansion is the current graphical-browse-view

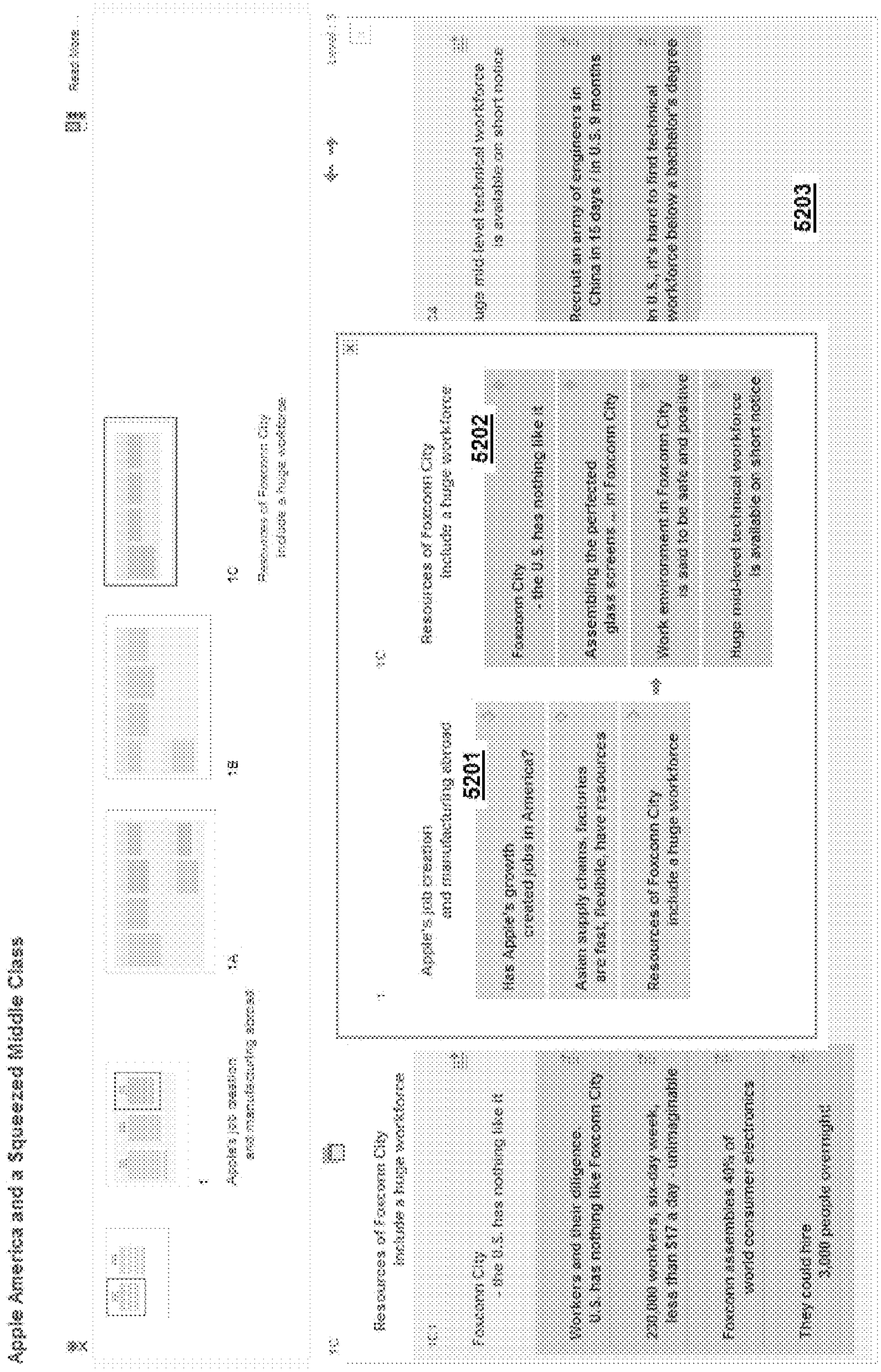
Fig. 52 – The context pop-up window expands to show the compound-group-symbol corresponding to the parent of the current graphical-browse-view

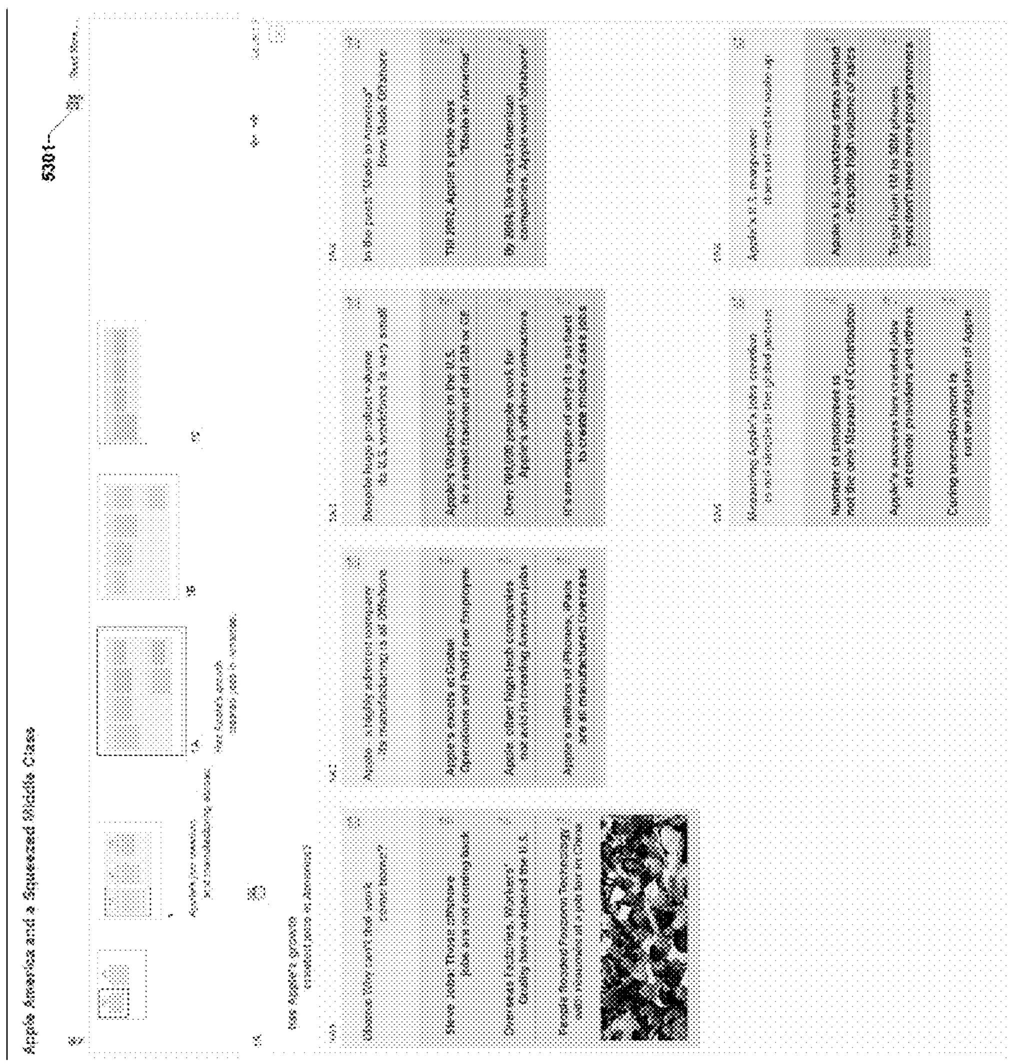
Fig. 53 – Click on the "Show/Hide text-column" icon

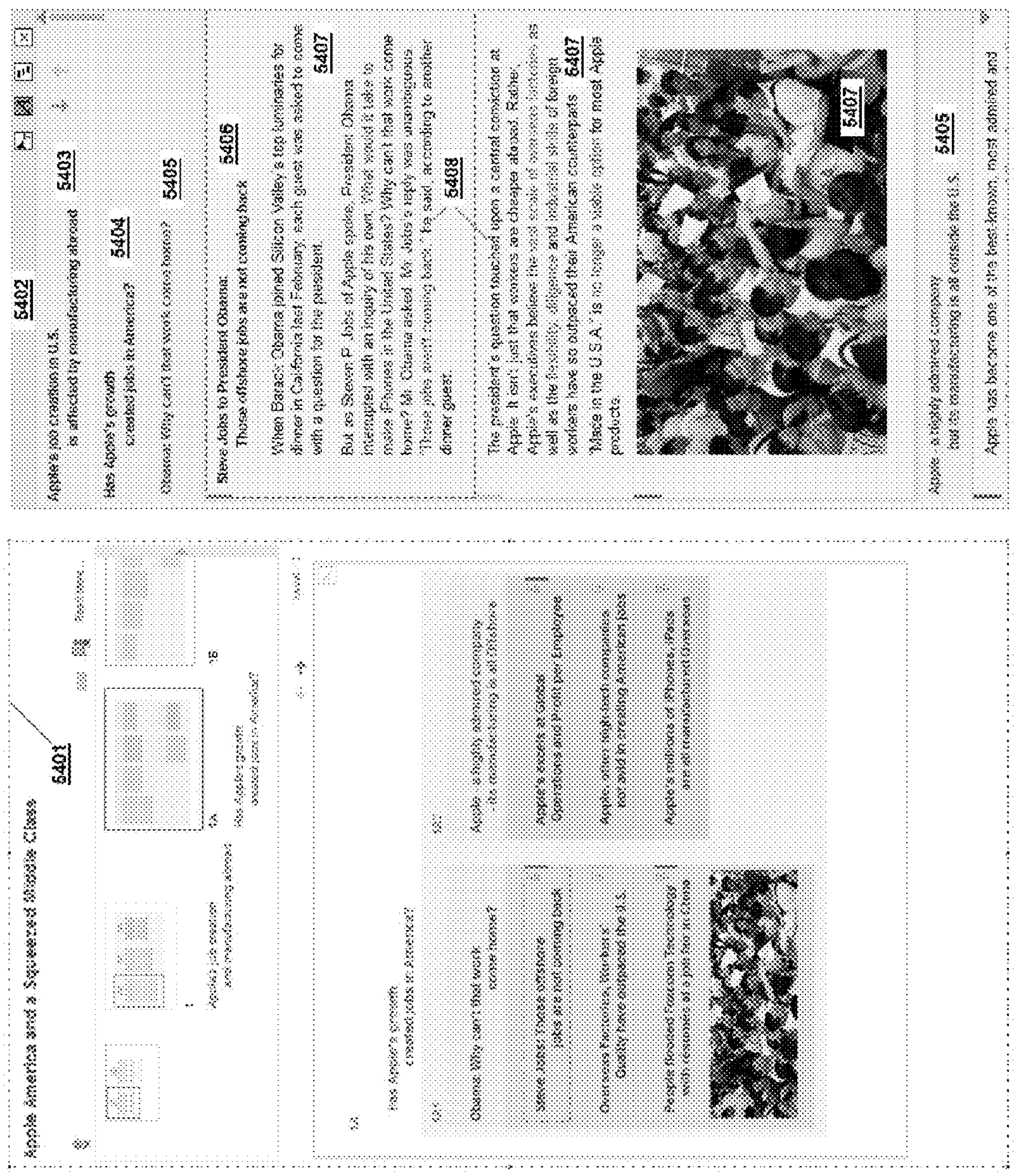
Fig. 54 – Text-column displayed as a result of clicking on the "Show/Hide text-column" icon. Text of the article is in wrap-around format.

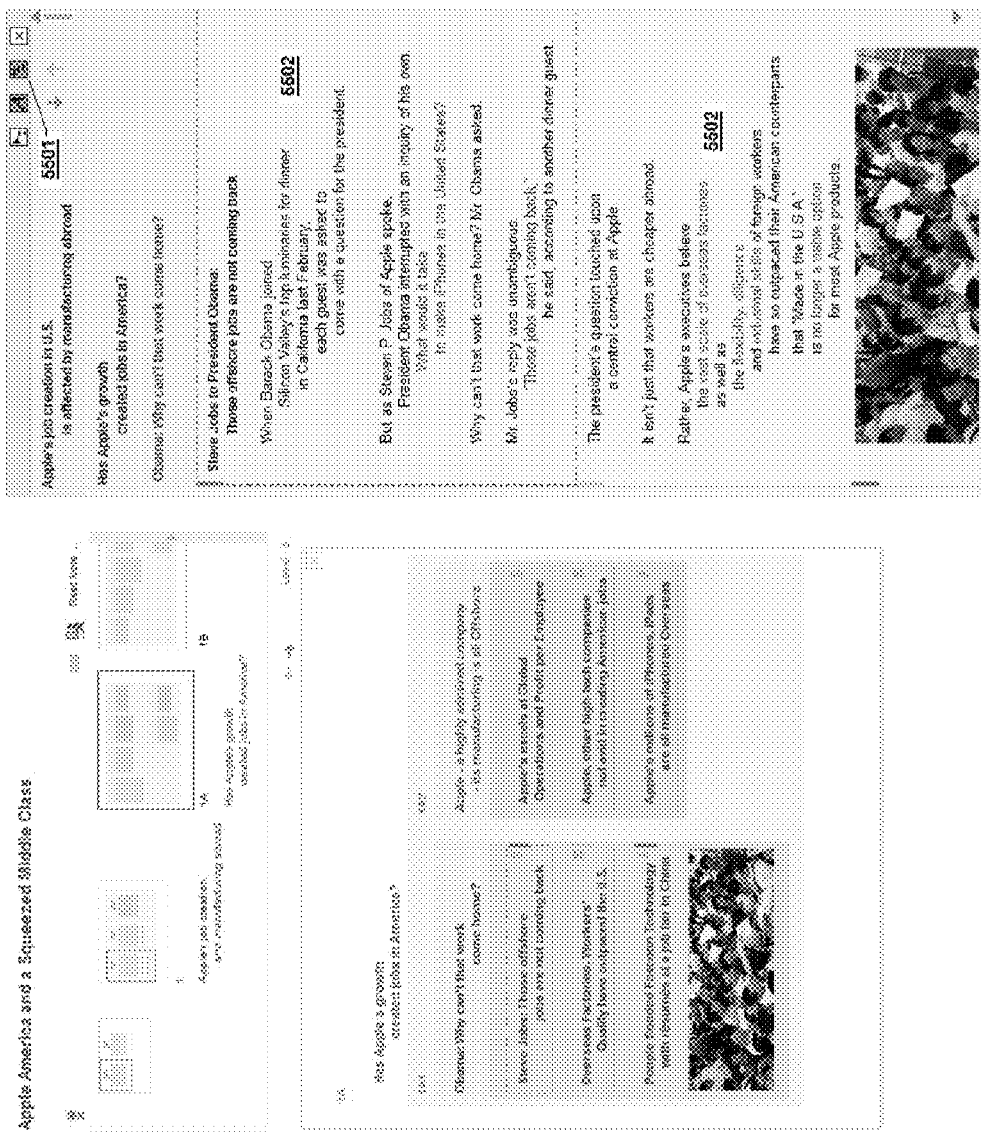
Fig. 55 – Text of the article is displayed in break-and-indent format

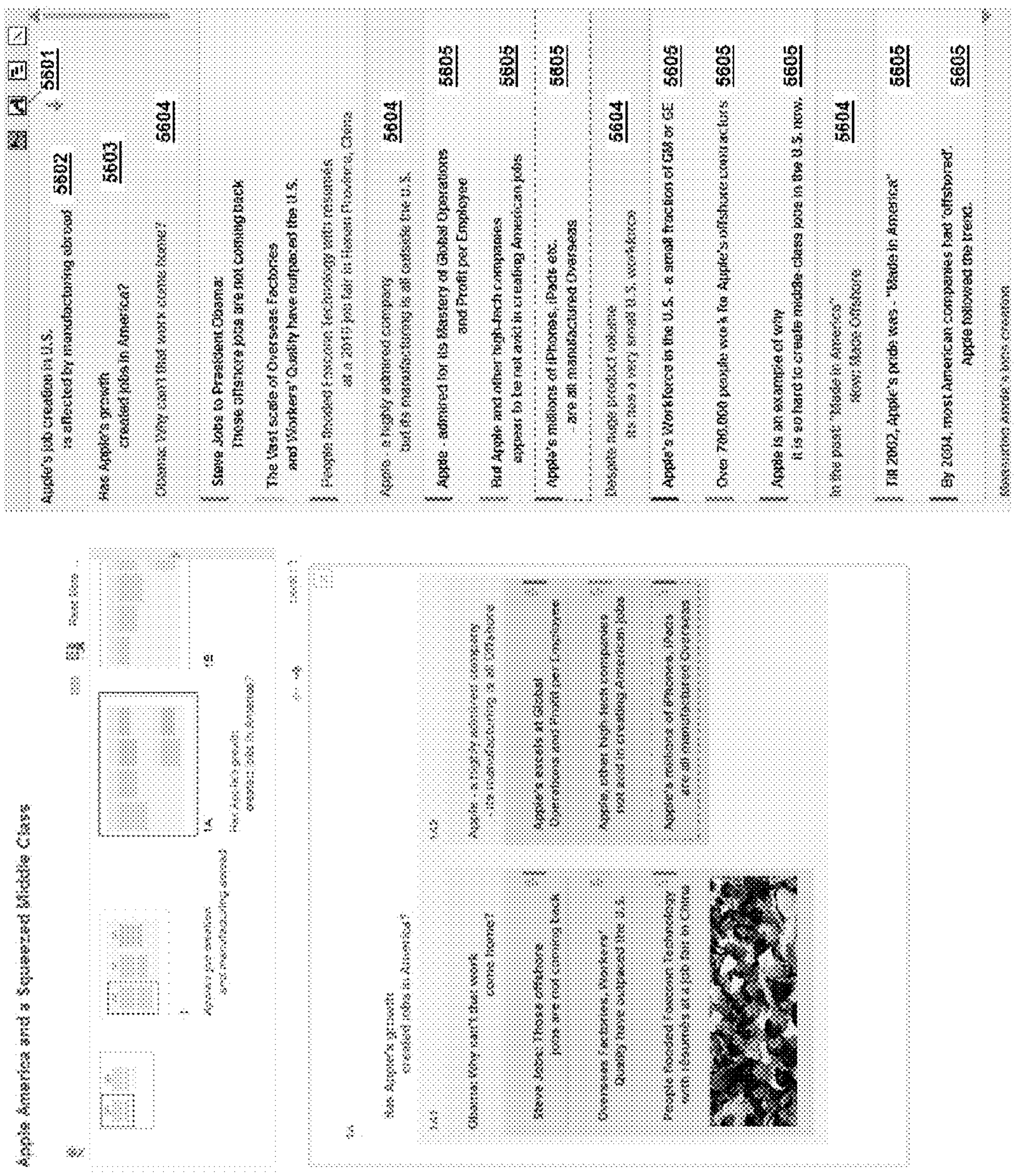
Fig. 56 – Deactivate “Show Article-Matter” icon to hide the article-matter in the text-column.

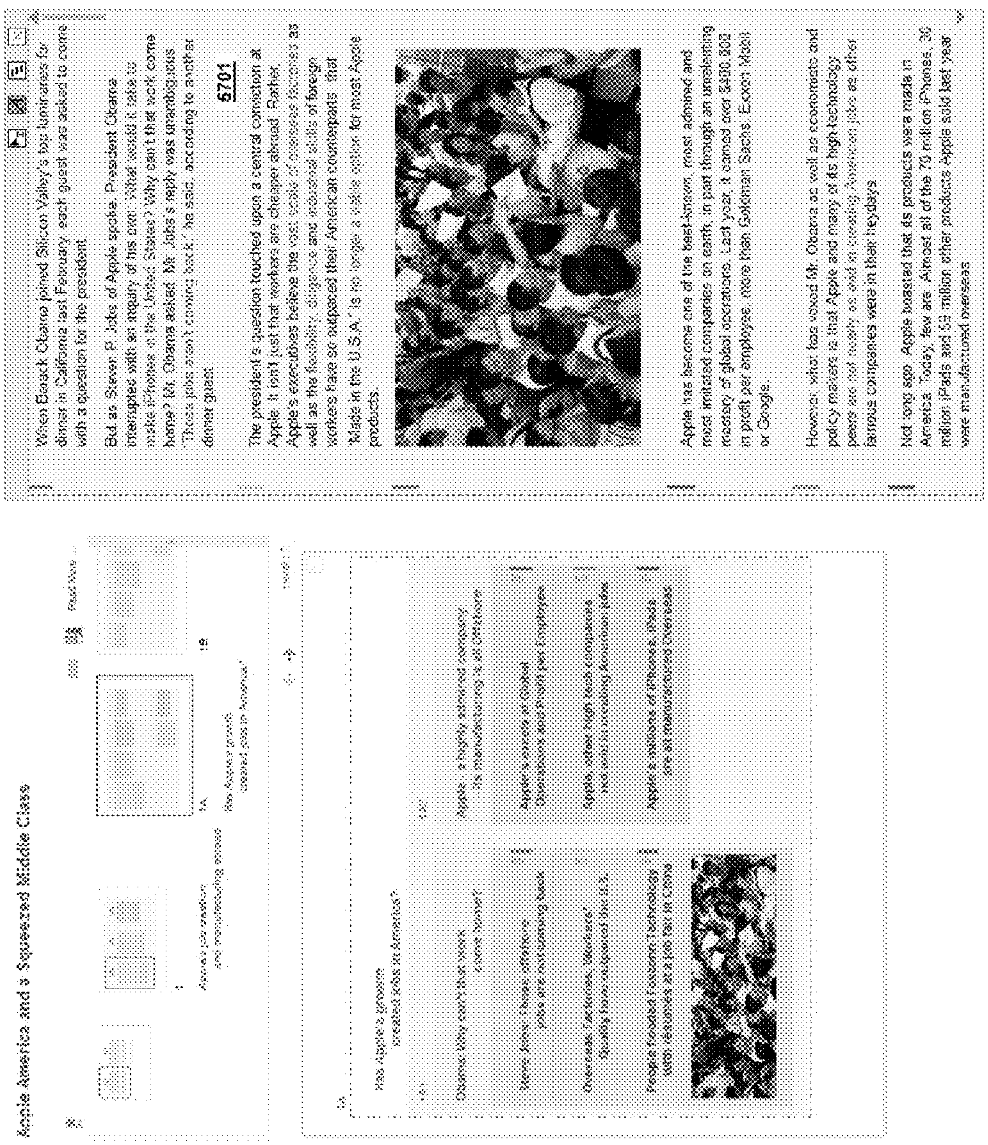
Fig. 57 – Article-matter displayed in continuous-read-mode

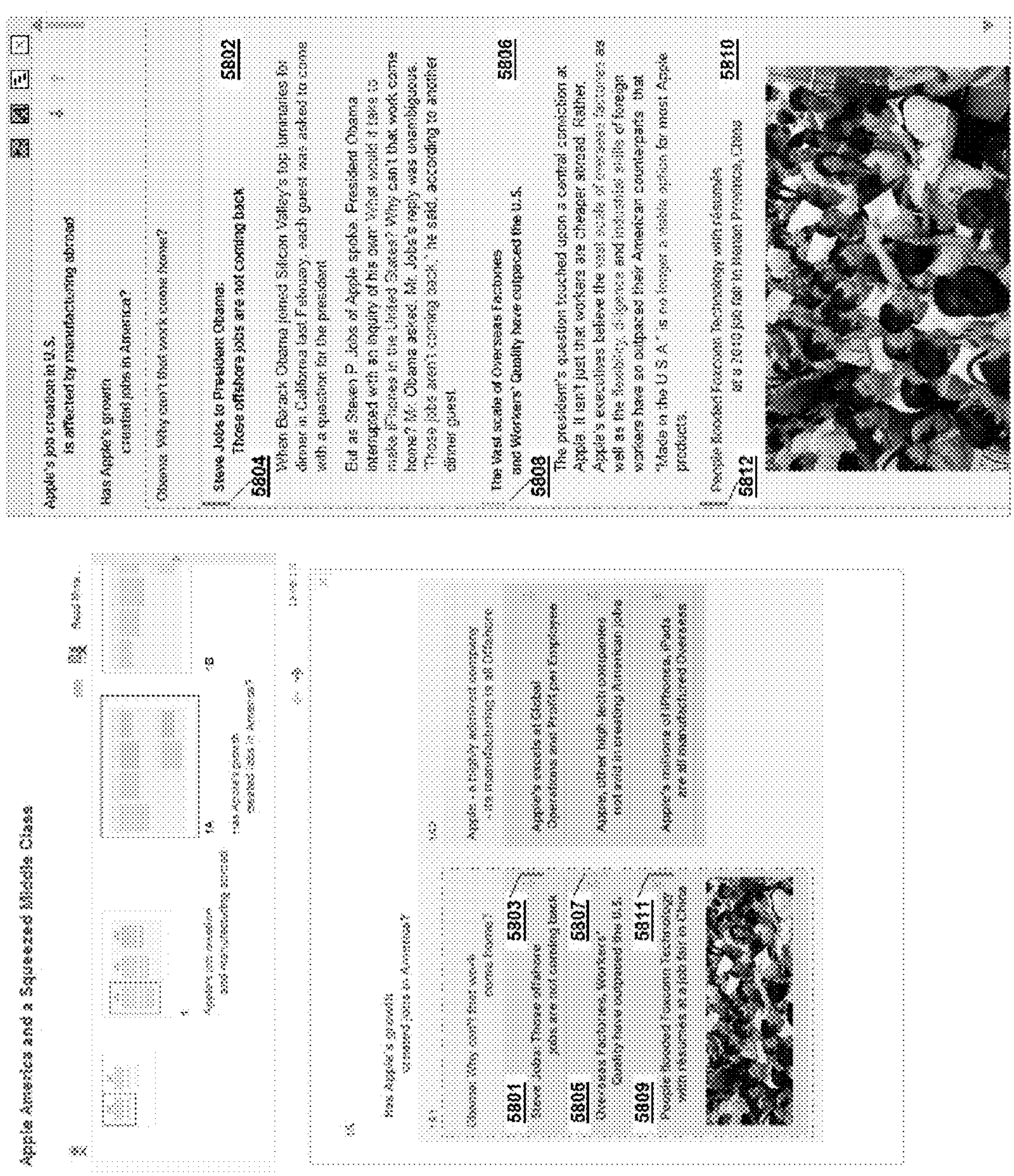
Fig. 58 – Color tags show the correspondence between point-boxes in the text-column and browse-elements in the graphical-browse-view

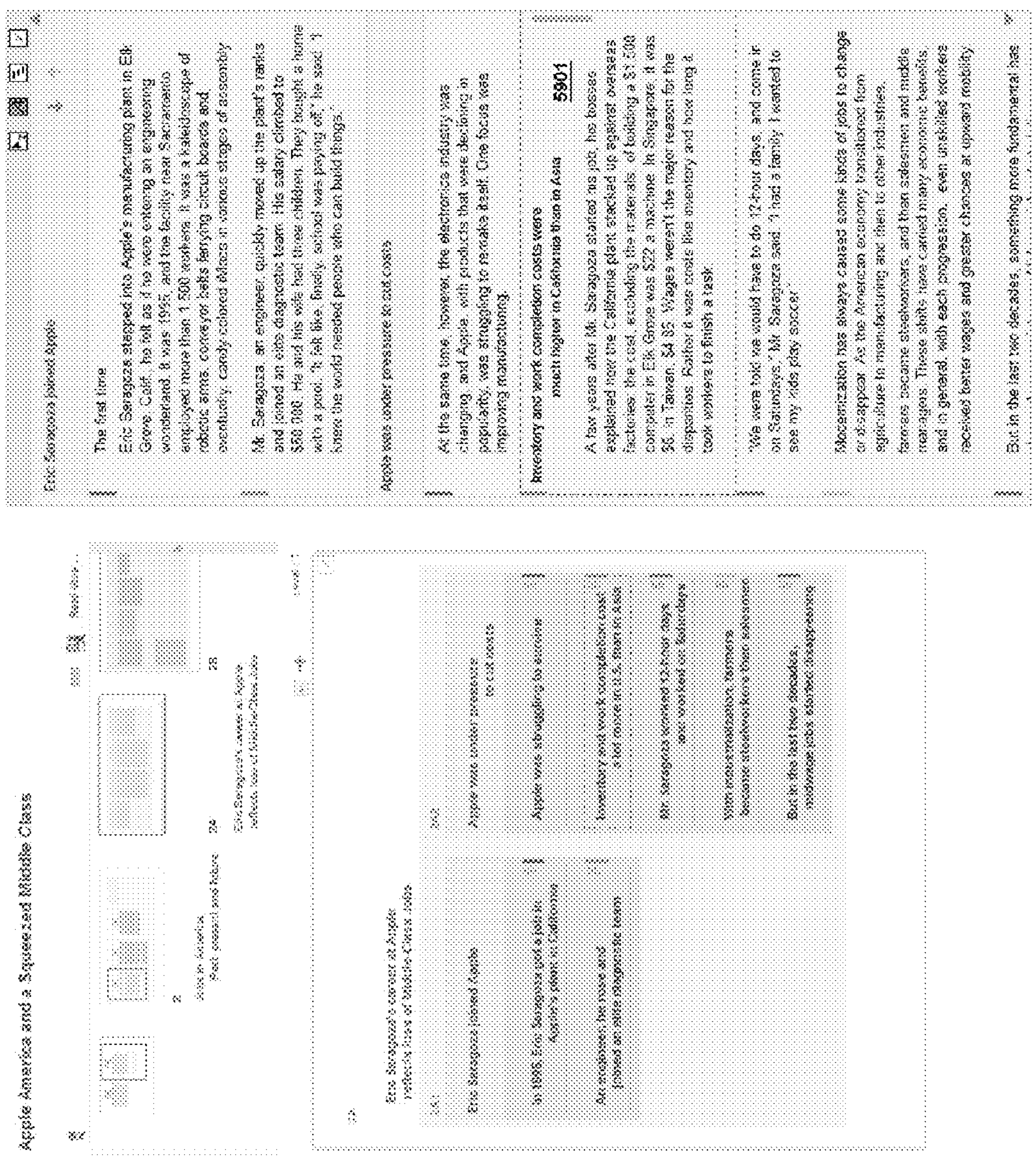
Fig. 59 – Text-column displayed when the “Show text-column” icon in an article-matter pop-up window is clicked Example 1:

```
Last year,
    it earned over $400,000 in profit per employee,
        more than Goldman Sachs, Exxon Mobil or Google.
```

Example 2:

```
Apple has become one of the
    best-known, most admired
      and most imitated companies on earth,
          in part through
          an unrelenting mastery of global operations.
```

Example 3:

```
Apple has become one of the
    best-known, most admired
        and most imitated companies on earth,
            in part through
                an unrelenting mastery of global operations.
```

Example 4:

```
In 1990, while Mr. Jobs was running NeXT,
              which was eventually bought by Apple,
    the executive told a reporter that
      "I'm as proud of the factory as I am of the computer."
```

Fig. 60 – Examples 1 through 4 of Break-and-Indent Formatting

Example 5:

A few years after Apple began building
the Macintosh in 1983, for instance,
Mr. Jobs bragged that
it was "a machine that is made in America."

Example 6:

Most other American electronics companies
had already gone abroad,
and Apple, which at the time was struggling,
felt it had to grasp every advantage.

Example 7:

Apple executives believe
there simply aren't
enough American workers
with the skills the company needs
or factories with sufficient speed and flexibility.

Example 8: An example of scatter:

Apple executives believe
there simply aren't
enough American workers
with the skills the company needs
or factories with sufficient speed and flexibility.

Fig. 61 – Examples 5 through 8 of Break-and-Indent Formatting

Example 9:

"Apple's an example of
why it's so hard
to create middle-class jobs in the U.S. now,"
said Jared Bernstein,
who until last year was
an economic adviser to the White House.

Example 10:

Apple employs
43,000 people in the United States
and 20,000 overseas, a small fraction of the
over 400,000 American workers
at General Motors in the 1950s, or the hundreds of thousands
at General Electric in the 1980s.

Example 11:

"I won't sell a product that gets scratched," he said tensely.

The only solution was
using unscratchable glass instead.

"I want a glass screen,
and I want it perfect in six weeks."

Fig. 62 – Examples 9 through 11 of Break-and-Indent Formatting

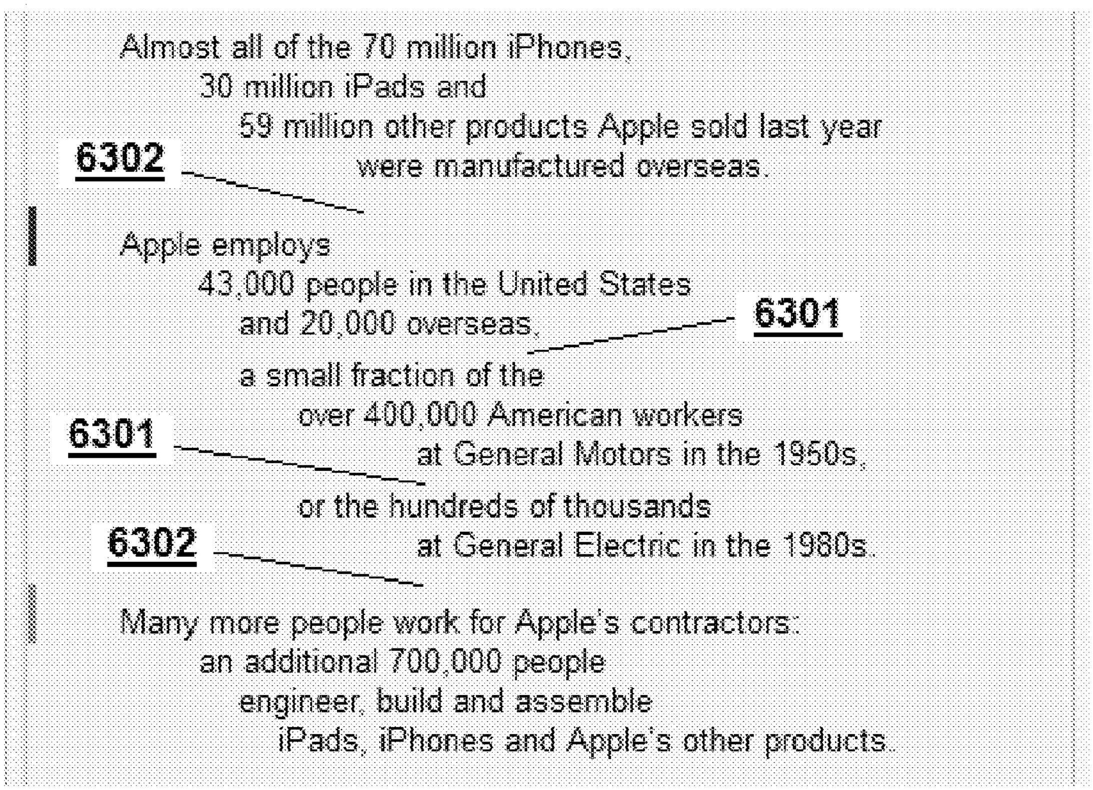
Fig. 63 – An example of vertical spacing in Break-and-Indent formatting Example 1:

Current art formatting #1:

Labor is a small expenditure
in tech manufacturing

Current art formatting #2:

Labor is a small expenditure
in tech manufacturing

Our program formats the browse-button-text as shown below:

Labor is a small expenditure
in tech manufacturing

Example 2:

Apple – a highly admired company
- its manufacturing is all offshore

Example 3:

Solitude is
a catalyst to innovation

Fig. 64 – Examples 1 through 3 of Browse-element-text Formatting

Edit
Text Column Preview
Text Popup
In part, Asia was attractive because
the semiskilled workers there
But that wasn't driving Apple.
For technology companies,
the cost of labor
is minimal compared with
6501
that bring together
and services from
Cut
Paste
Paste from Word
Delete
Split Here
Save As Title
6502
Create Elem Box With This Title
Create Group Box With This Title
Create Link...
Remove
View Source
Font

Fig. 65 – Copy selected-text to the point-name of the point-box

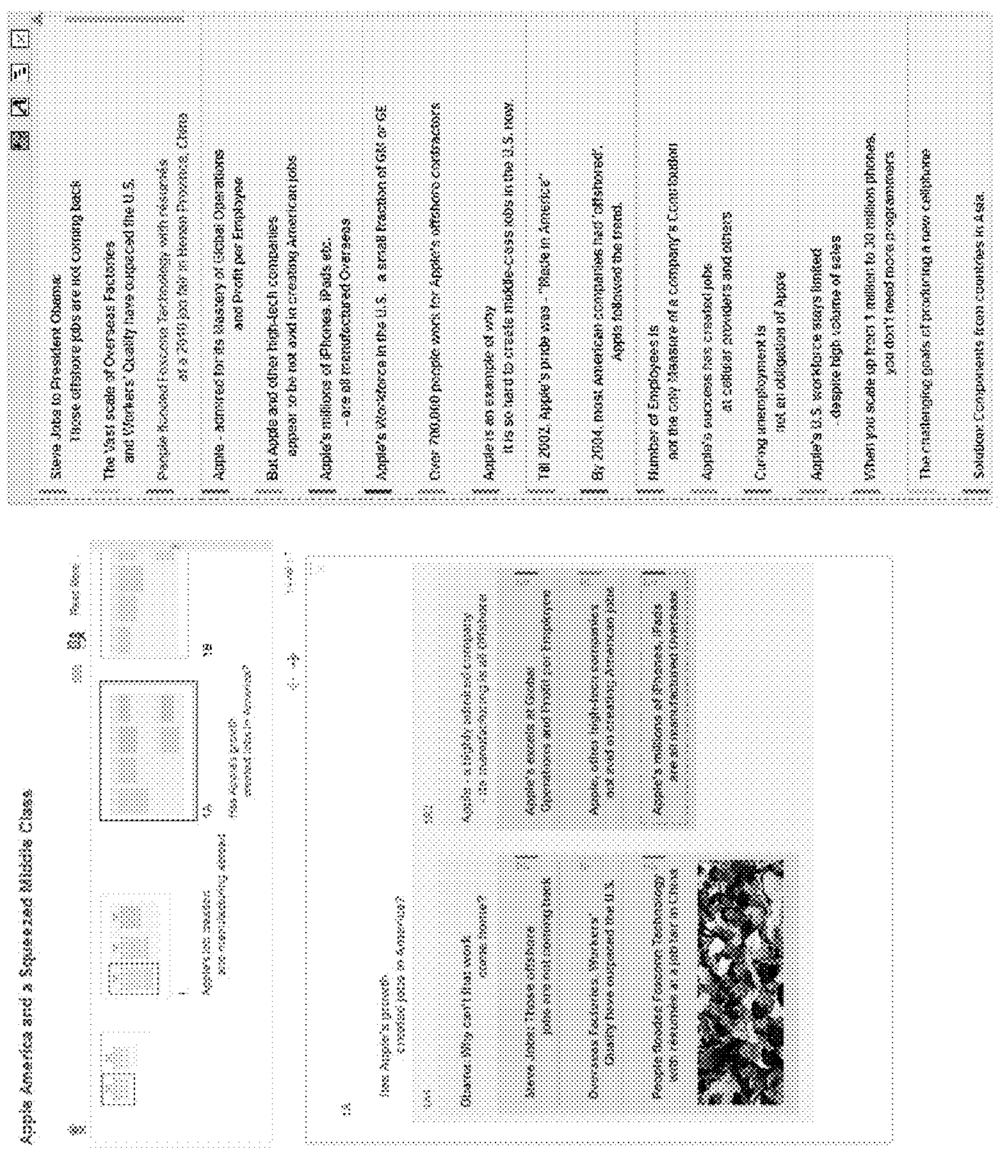
Fig. 66 – Text-column - A sequence of point-names provides summary at detailed level

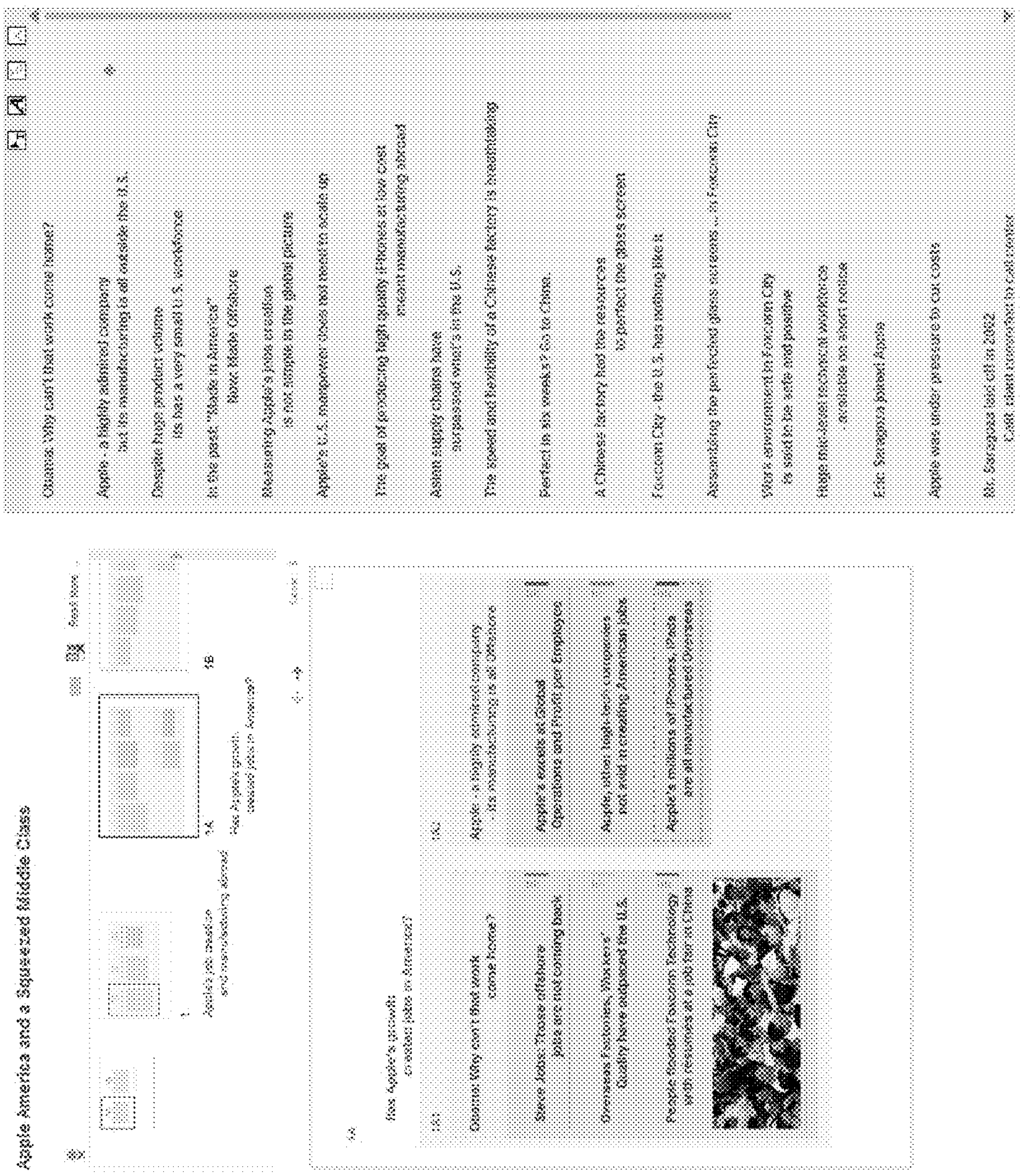
Fig. 67 -- Text-column - A sequence of simple-group-names provides summary at a higher level

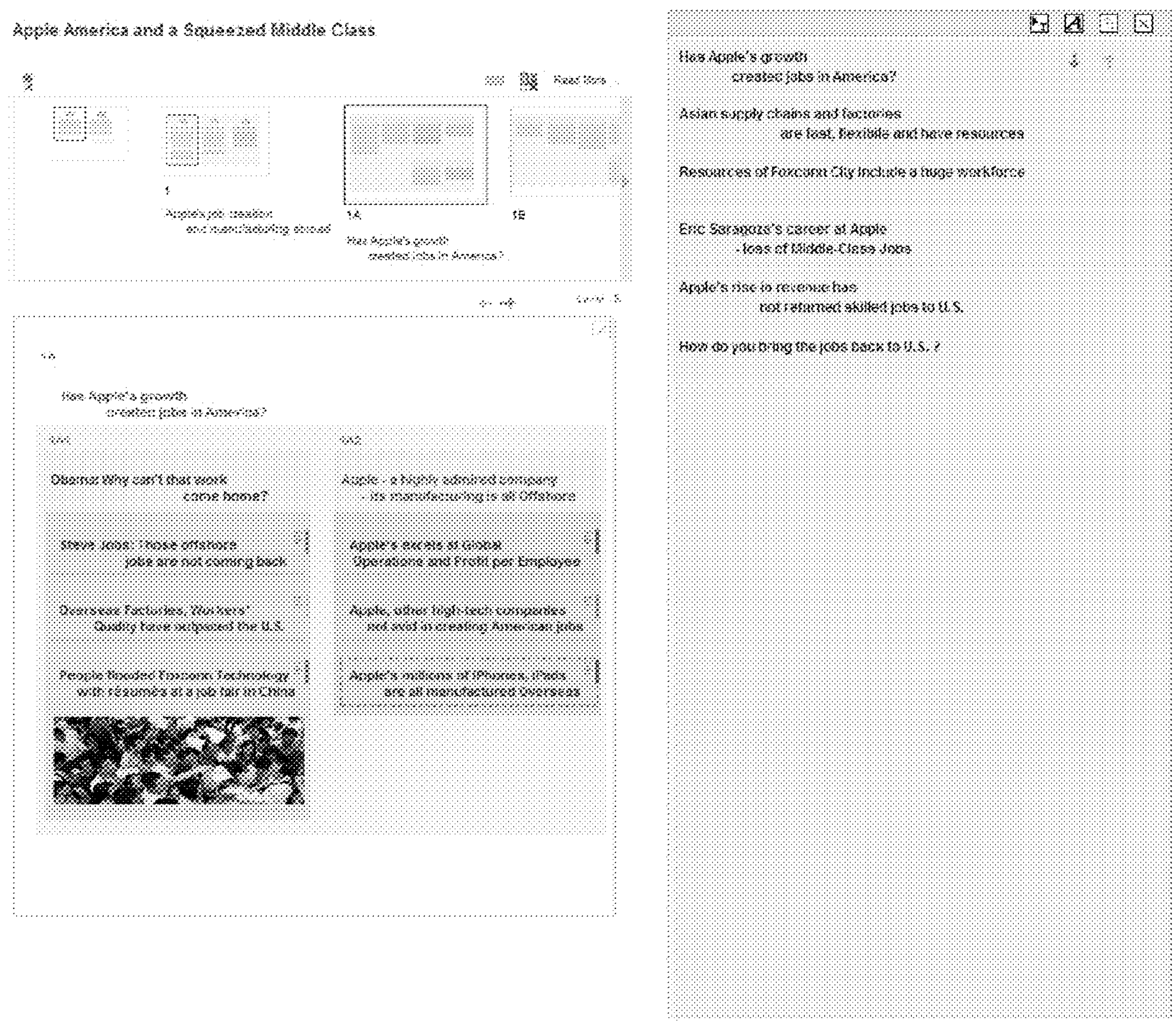
Fig. 68 – Text-column - A sequence of inner compound-group-group-names provides summary at an even higher level

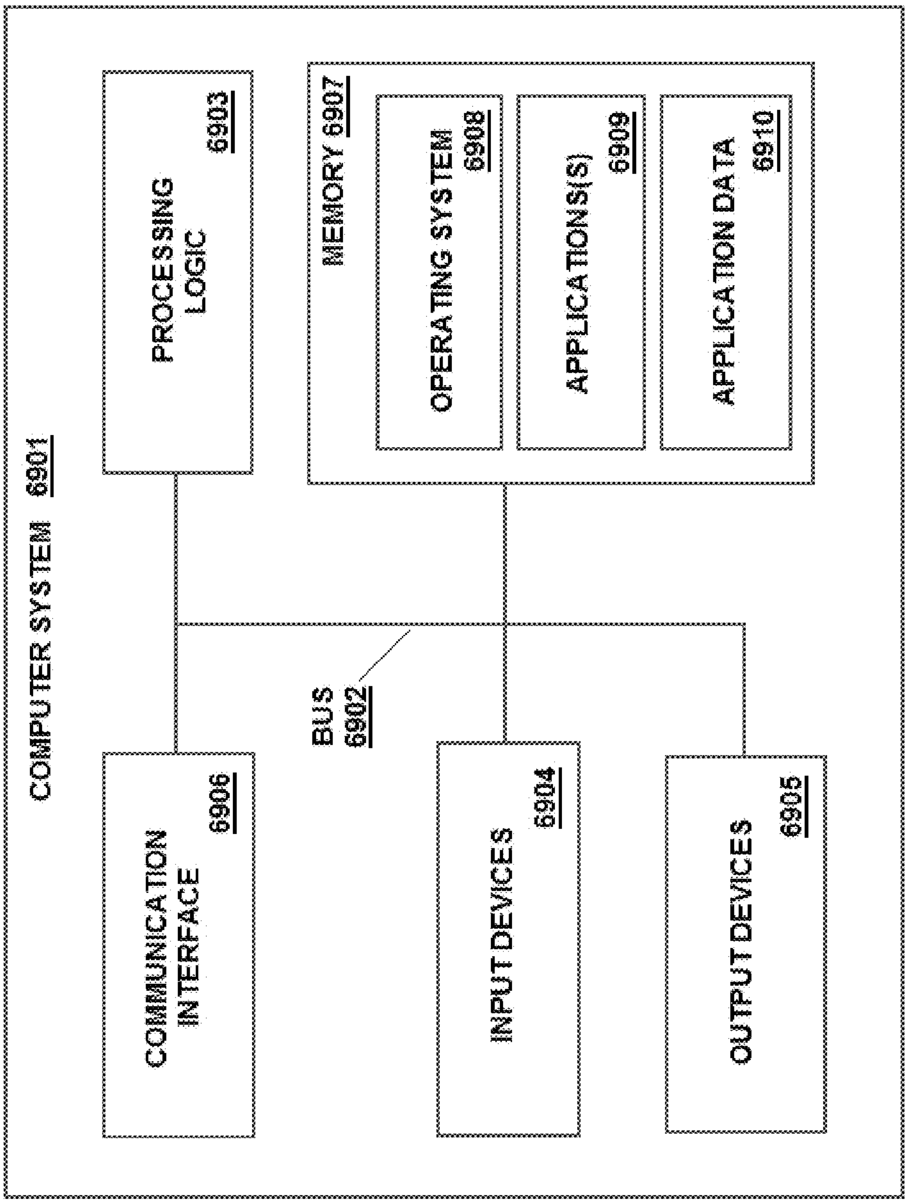
Fig. 69 – A block diagram of exemplary components of a computer system

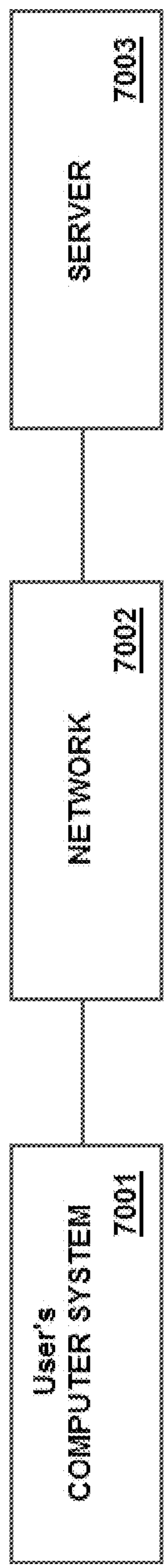
Fig. 70 – A user's computer system connected to server via network

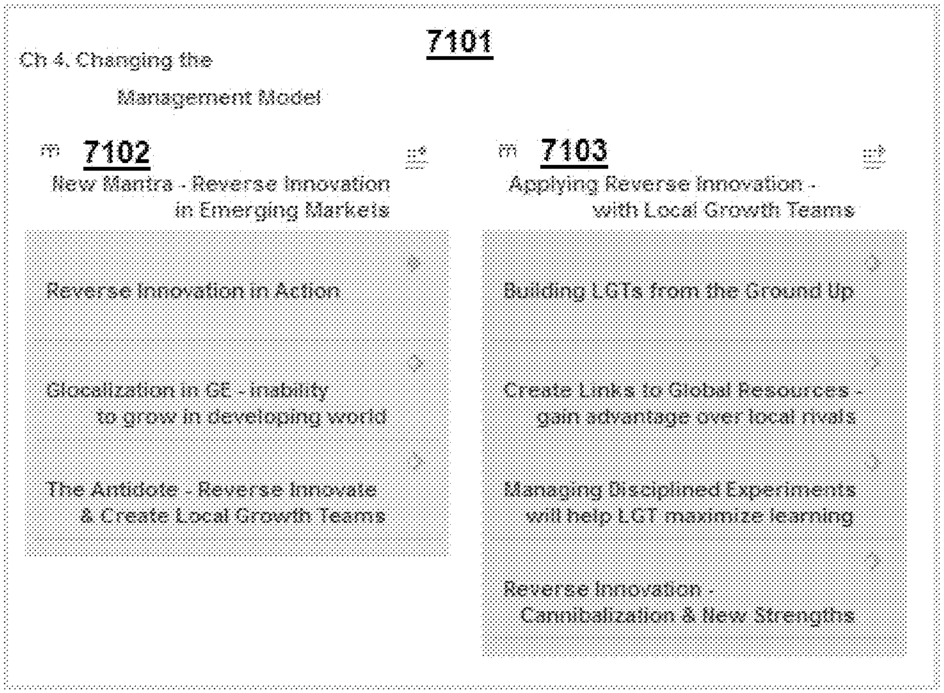
Fig. 71 –Level-1 graphical-browse-view of the article titled "Ch 4. Changing the Management Model".

New Mantra - Reverse Innovation in Emerging Markets
7201
Reverse Innovation in Action
7205
7202
A critical step - creating a reverse innovation mind set
Creating accommodating change to - complement the dominant logic
Execute a reverse innovation initiative - overturn dominant logic
It's improbable a reverse innovation initiative could ever thrive
7206
Glocalization in GE - inability to grow in developing world
7203
Glocalization has molded the way - multinationals are structured, run
Like V. Raja's case - head of GE Healthcare's business in India
How could Raja overcome the dominant logic?
The moral of Raja's real life story?
7207
The Antidote - Reverse Innovate & Create Local Growth Teams
7204
LGTs are small, cross-functional entrepreneurial units
Comparing LGT leaders and those incharge of existing business
Glocalization & Reverse Innovation can co-exist in a single company

Fig. 72 – The first of the two level-2 graphical-browse-views

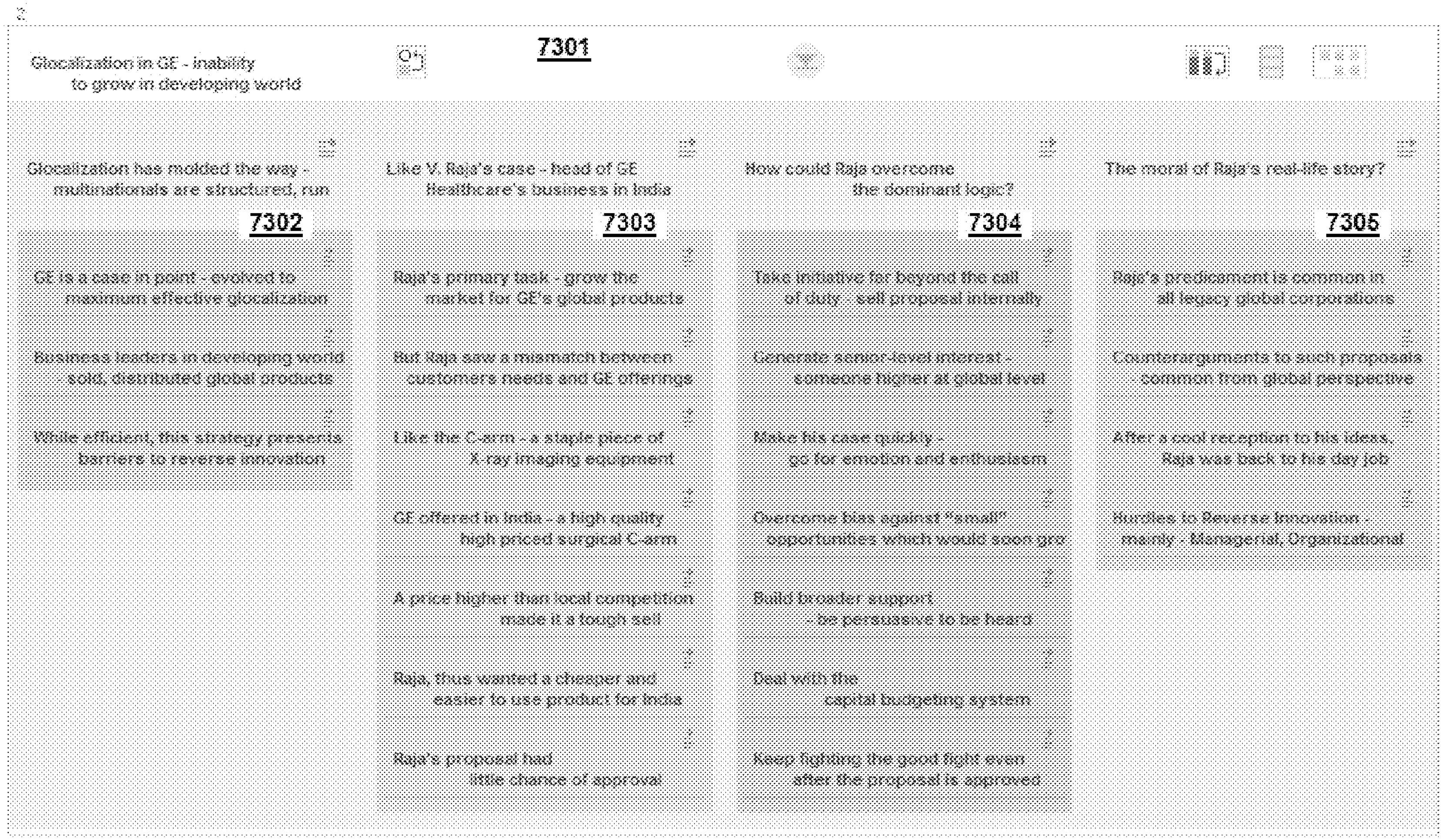
Fig. 73 – The graphical-browse-view named "Glocalization in GE – inability to grow in developing world".

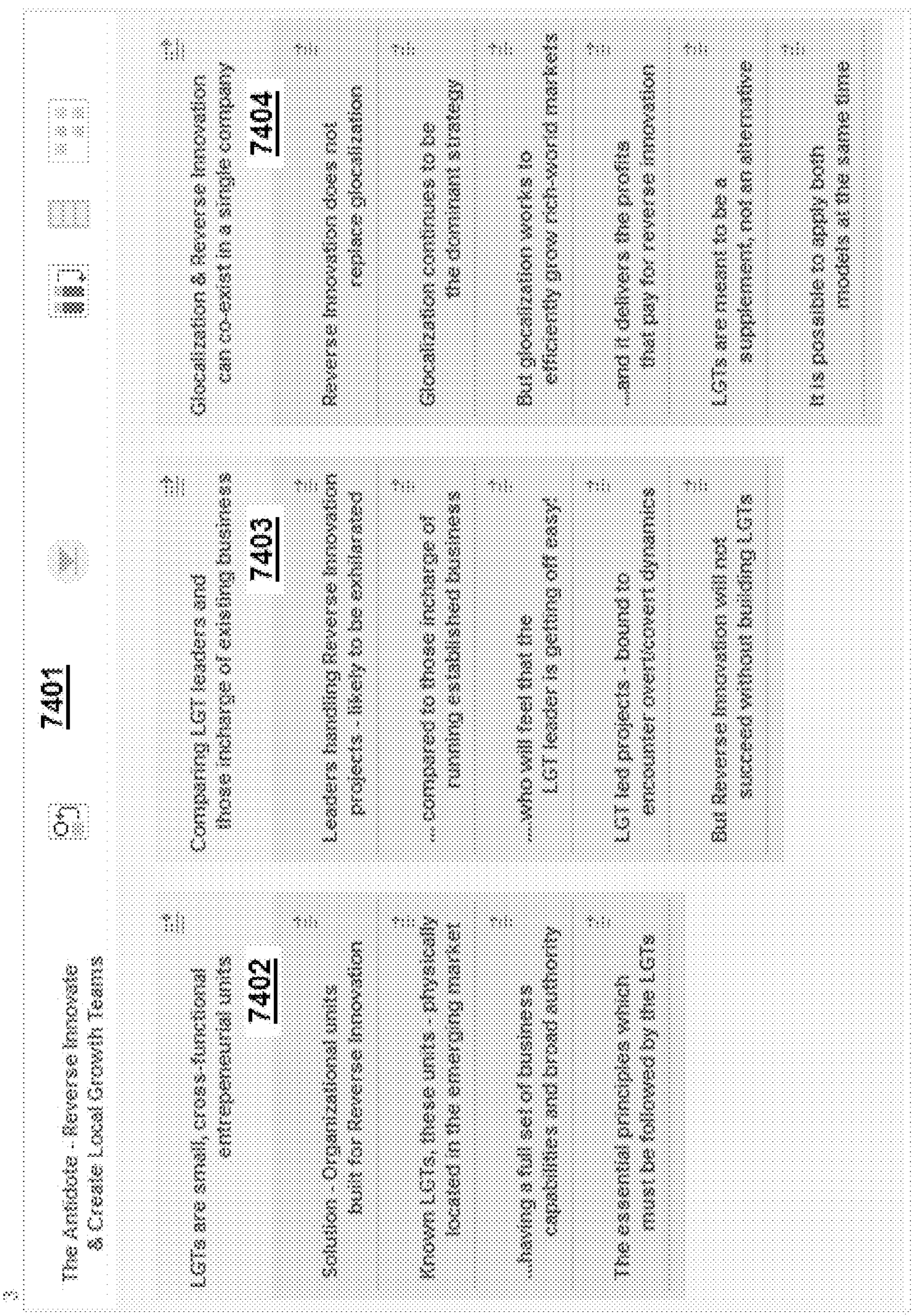
Fig. 74 – The graphical-browse-view named "The Antidote – Reverse Innovate & Create Local Growth Teams".

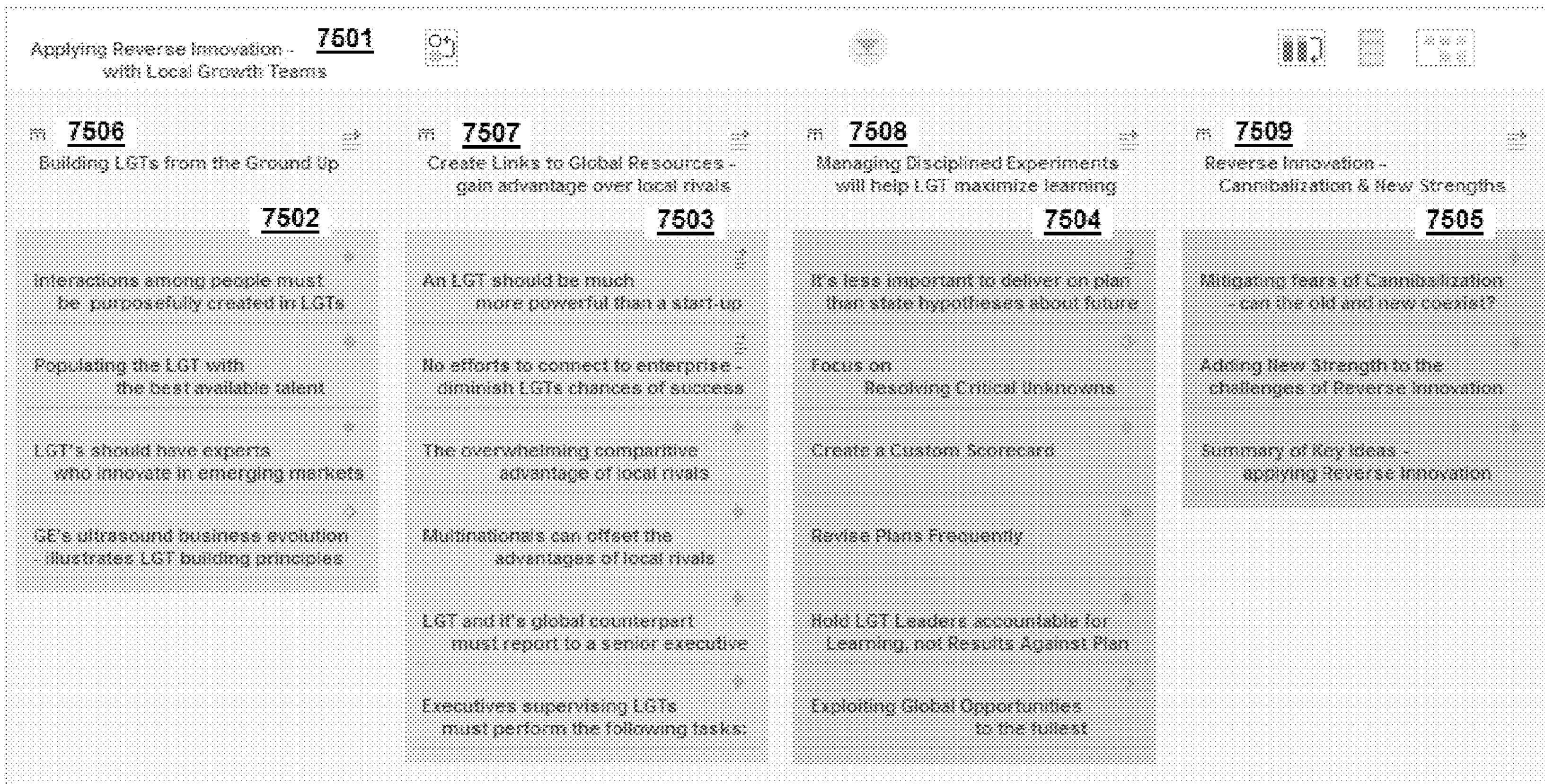
Fig. 75 – The second of the two level-2 graphical-browse-views

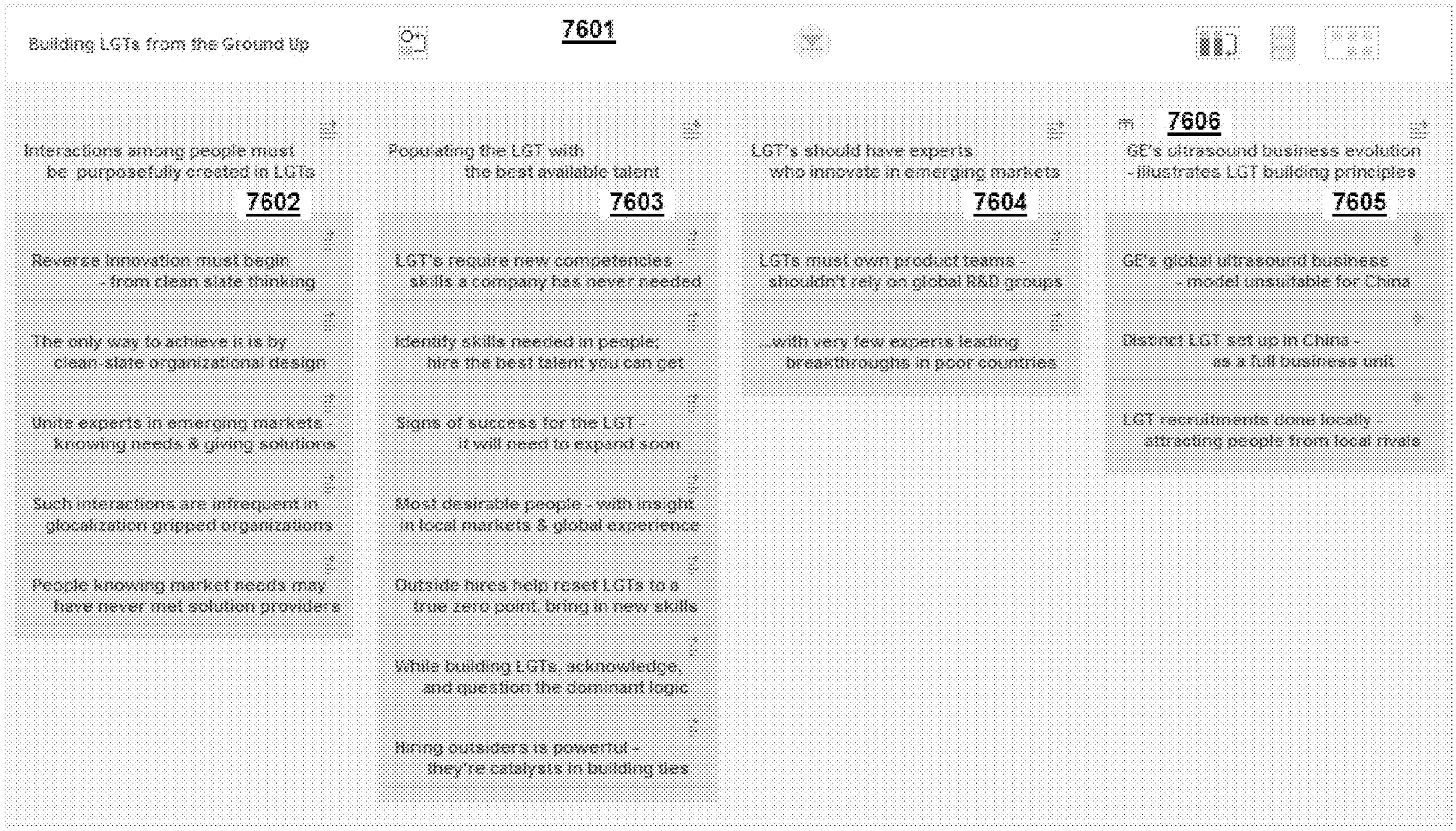
Fig. 76 – The graphical-browse-view named “Building LGTs from the Ground Up”.

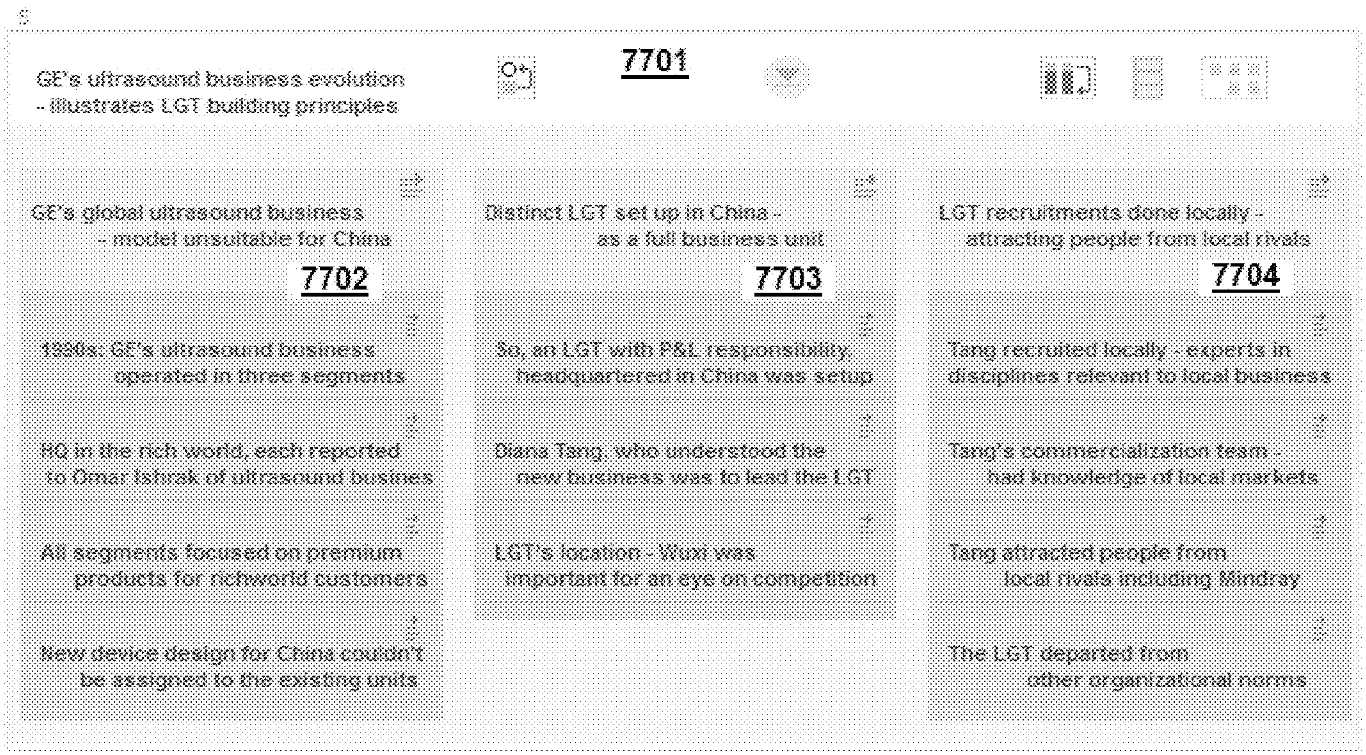
Fig. 77 – The graphical-browse-view named "GE's ultrasound business evolution – illustrates LGT building principles"

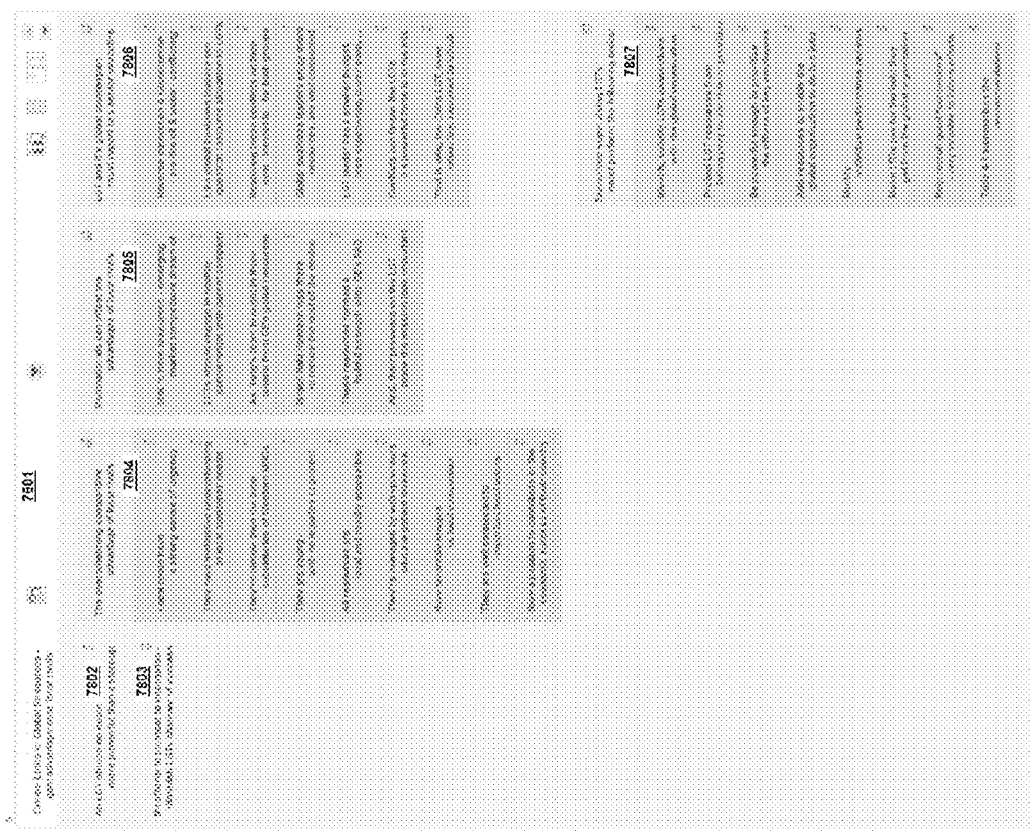
Fig. 78 – The graphical-browse-view named "Create Links to Global Resources – gain advantage over local rivals"

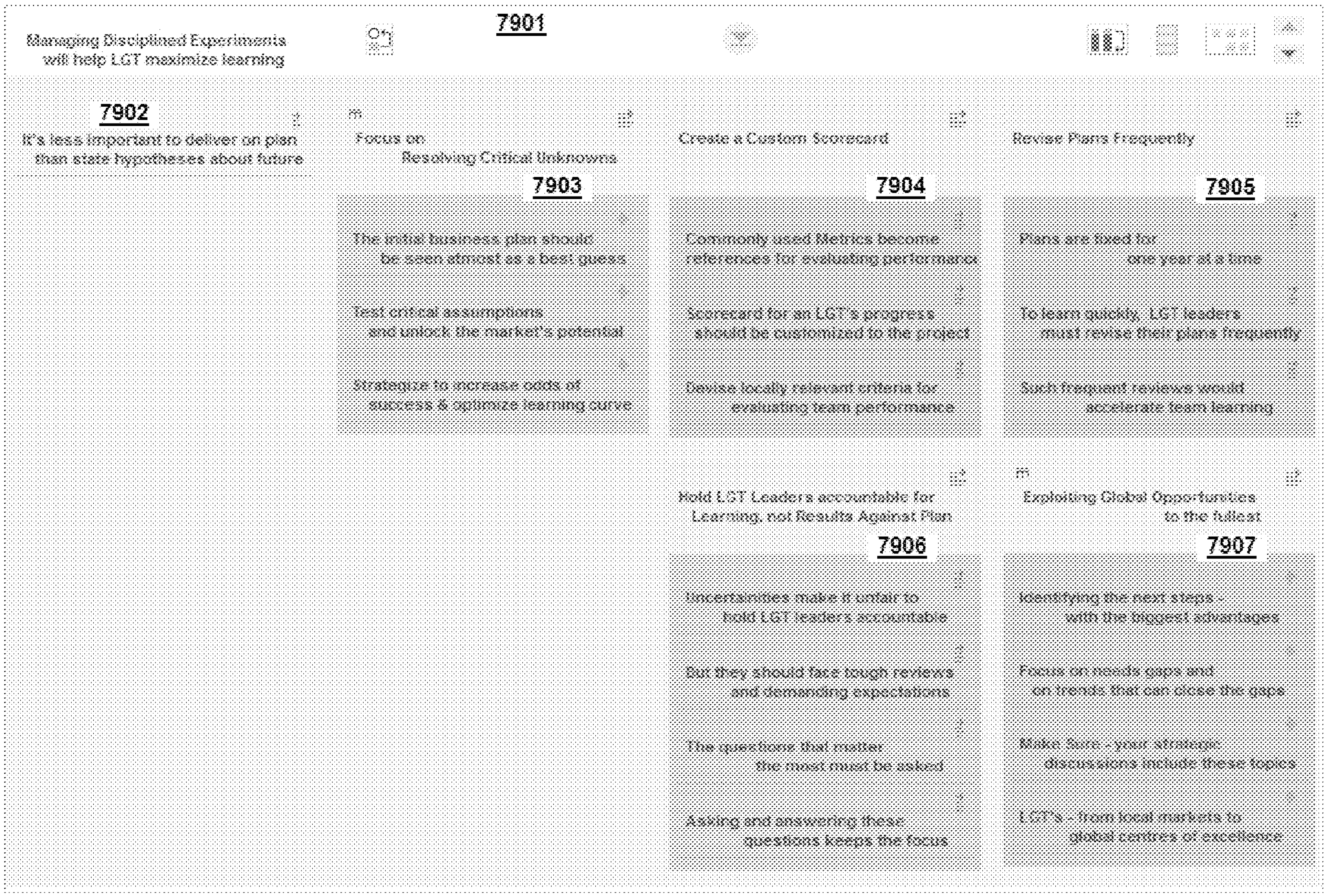
Fig. 79 – The graphical-browse-view named "Managing Disciplined Experiments will help LGT maximize learning"

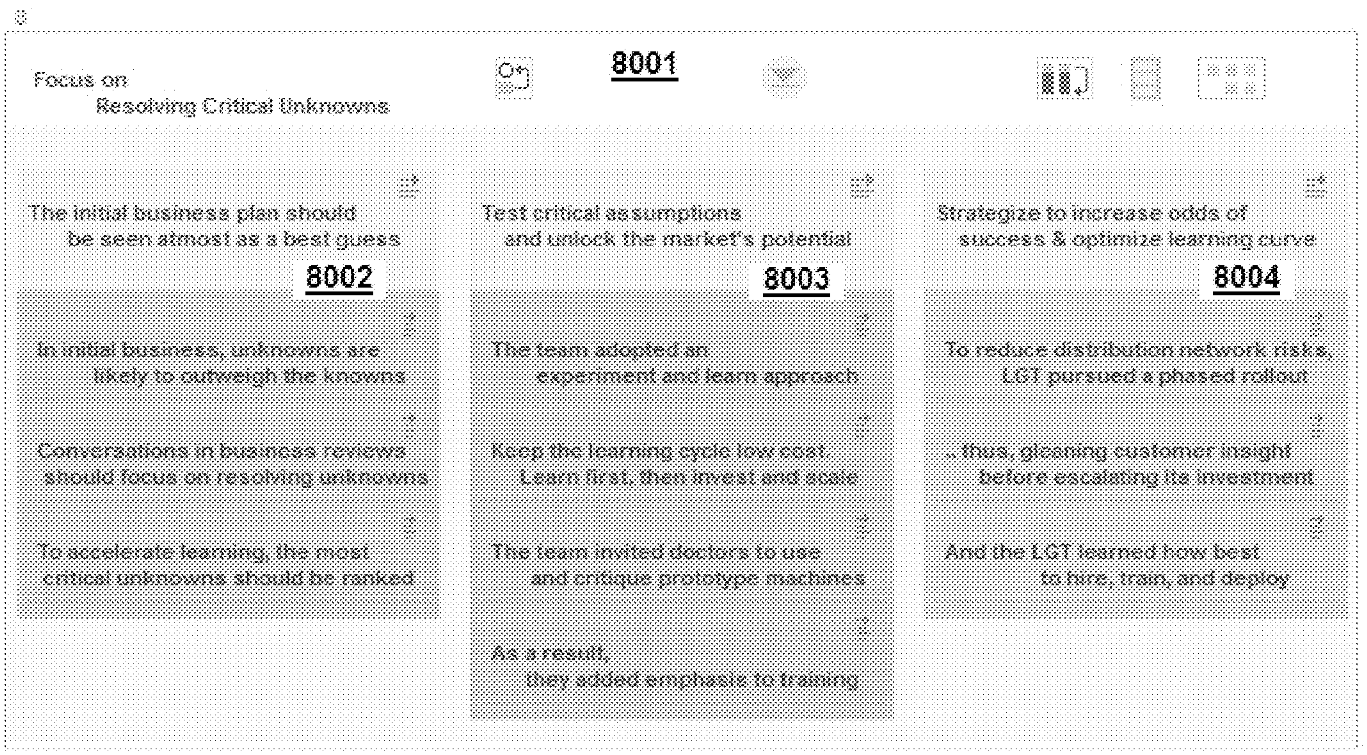
Fig. 80 – The graphical-browse-view named “Focus on Resolving Critical Unknowns”

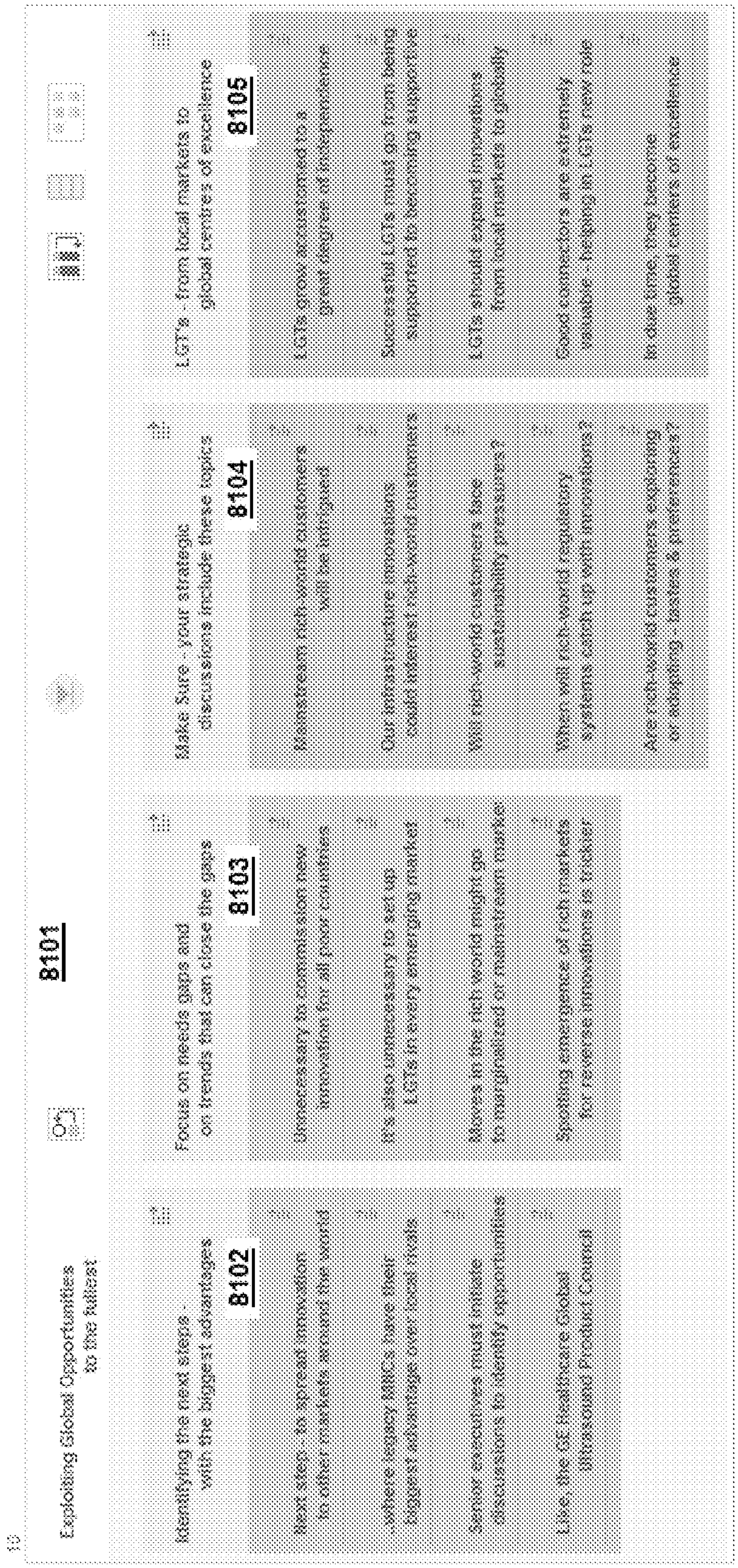
Fig. 81 – The graphical-browse-view named "Exploiting Global Opportunities to the fullest"

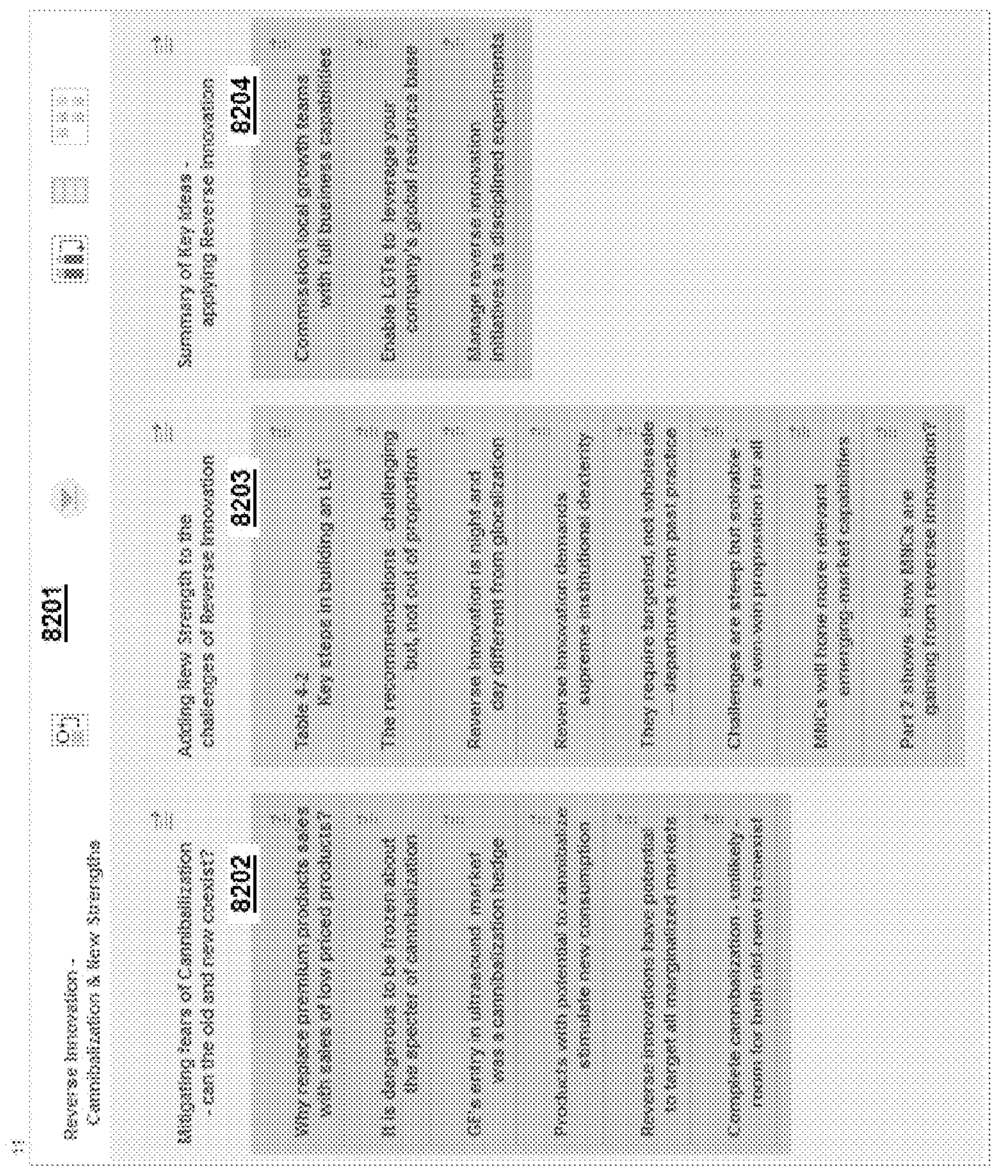
Fig. 82 – The graphical-browse-view named “Reverse Innovation – Cannibalization & New Strengths”

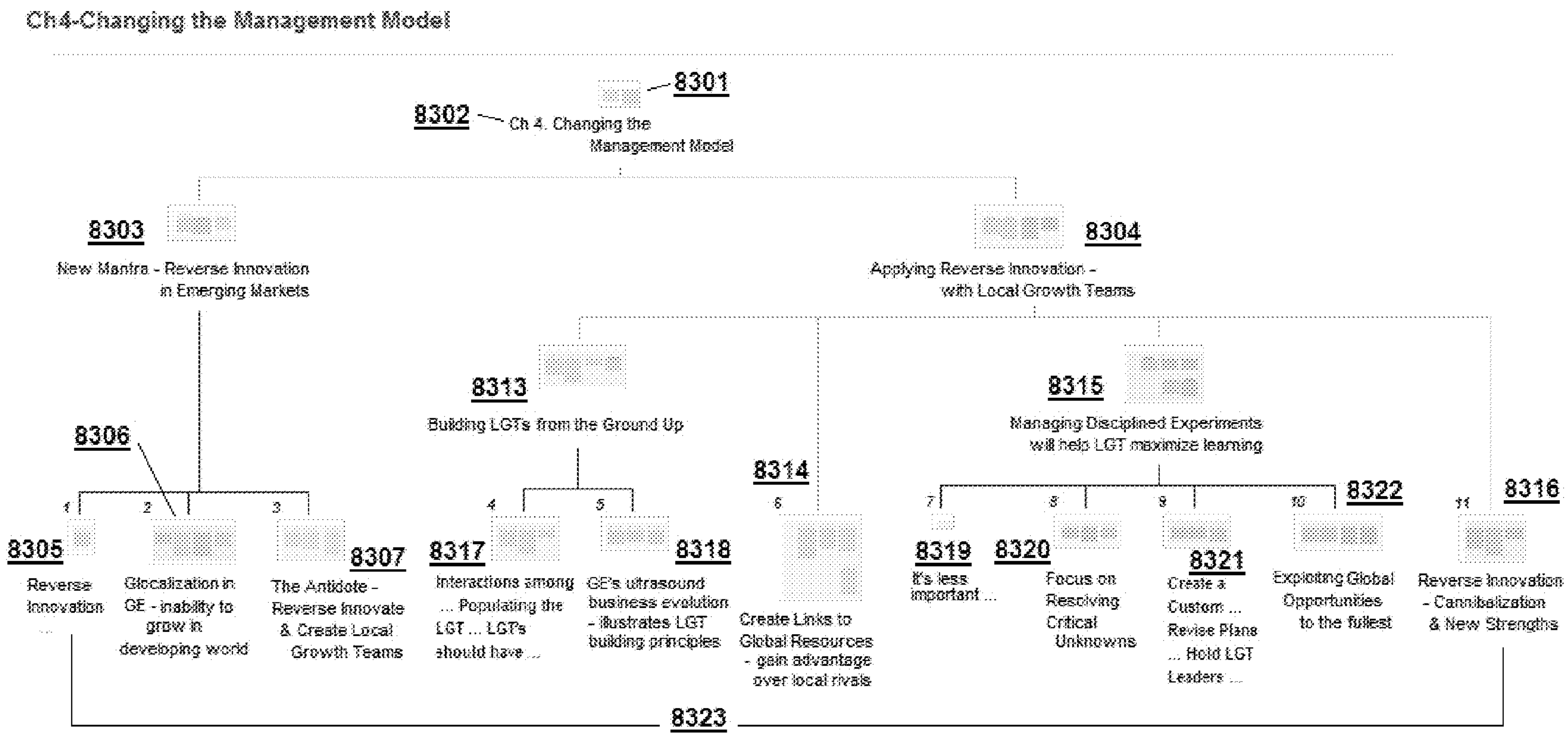
Fig. 83 – The miniature-views arranged in the form of a tree. A miniature-view and the name of the miniature-view form each node of the tree

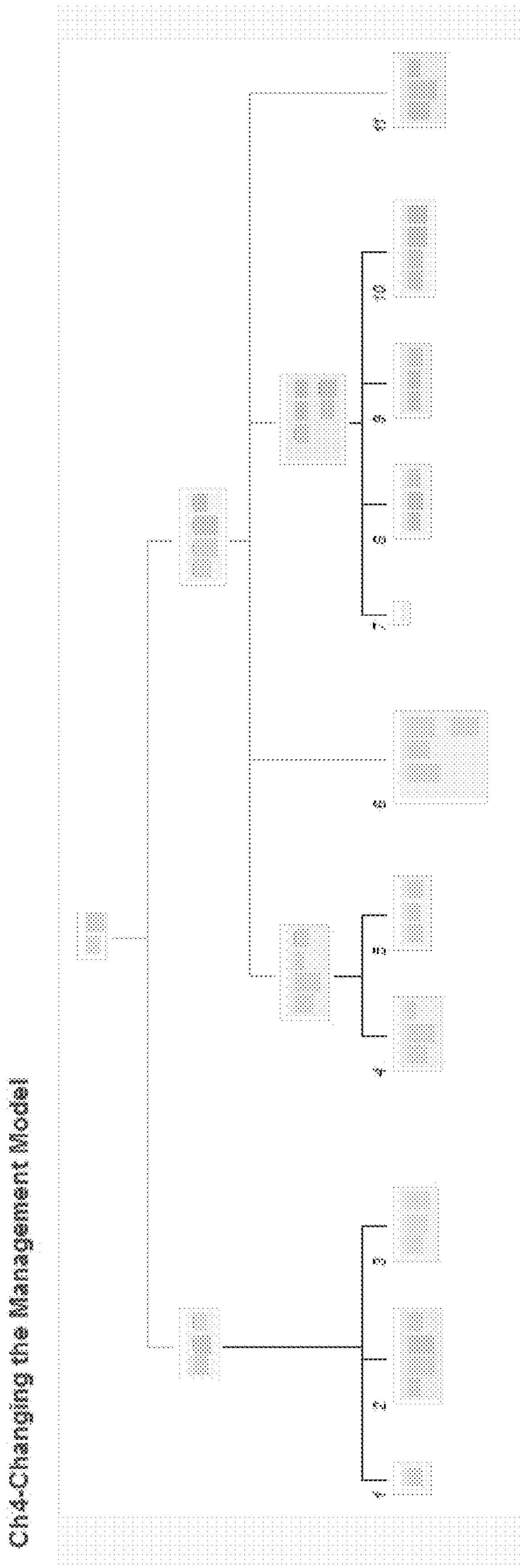
Fig. 84 – The program may display only the miniature-view at each node of the tree

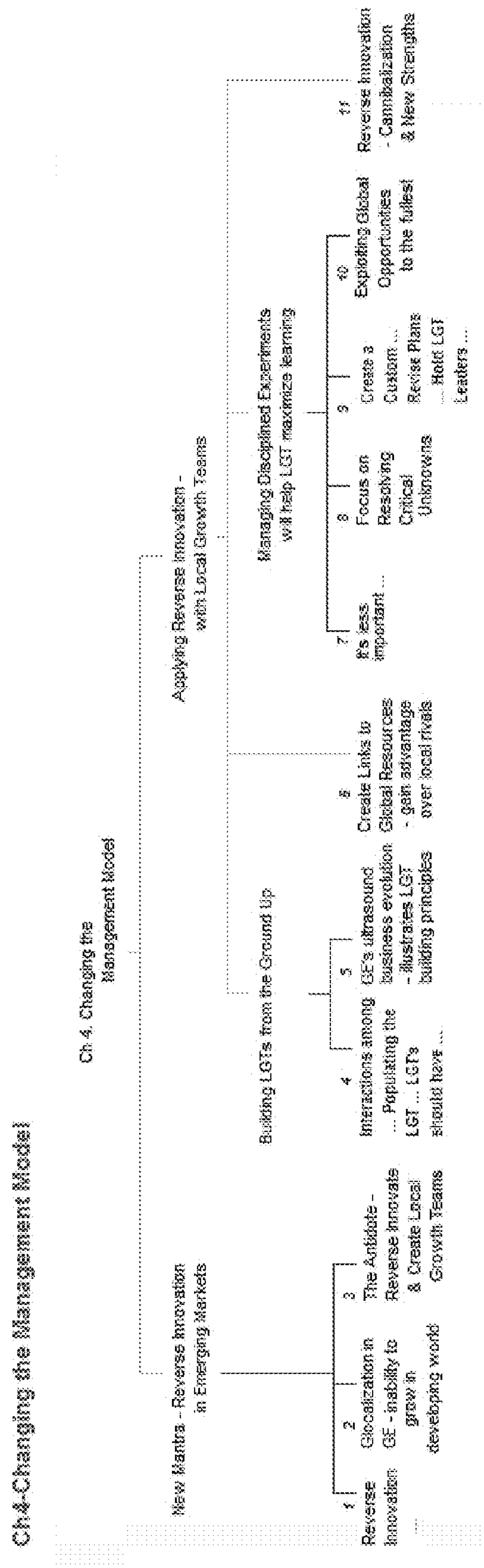
Fig. 85 – The program may display only the name of miniature-views at each node of the tree

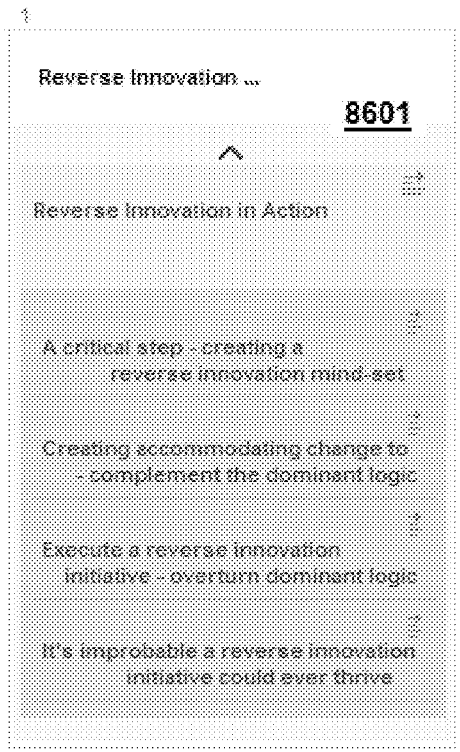
Fig. 86 – The graphical-browse-view named “Reverse Innovation …”

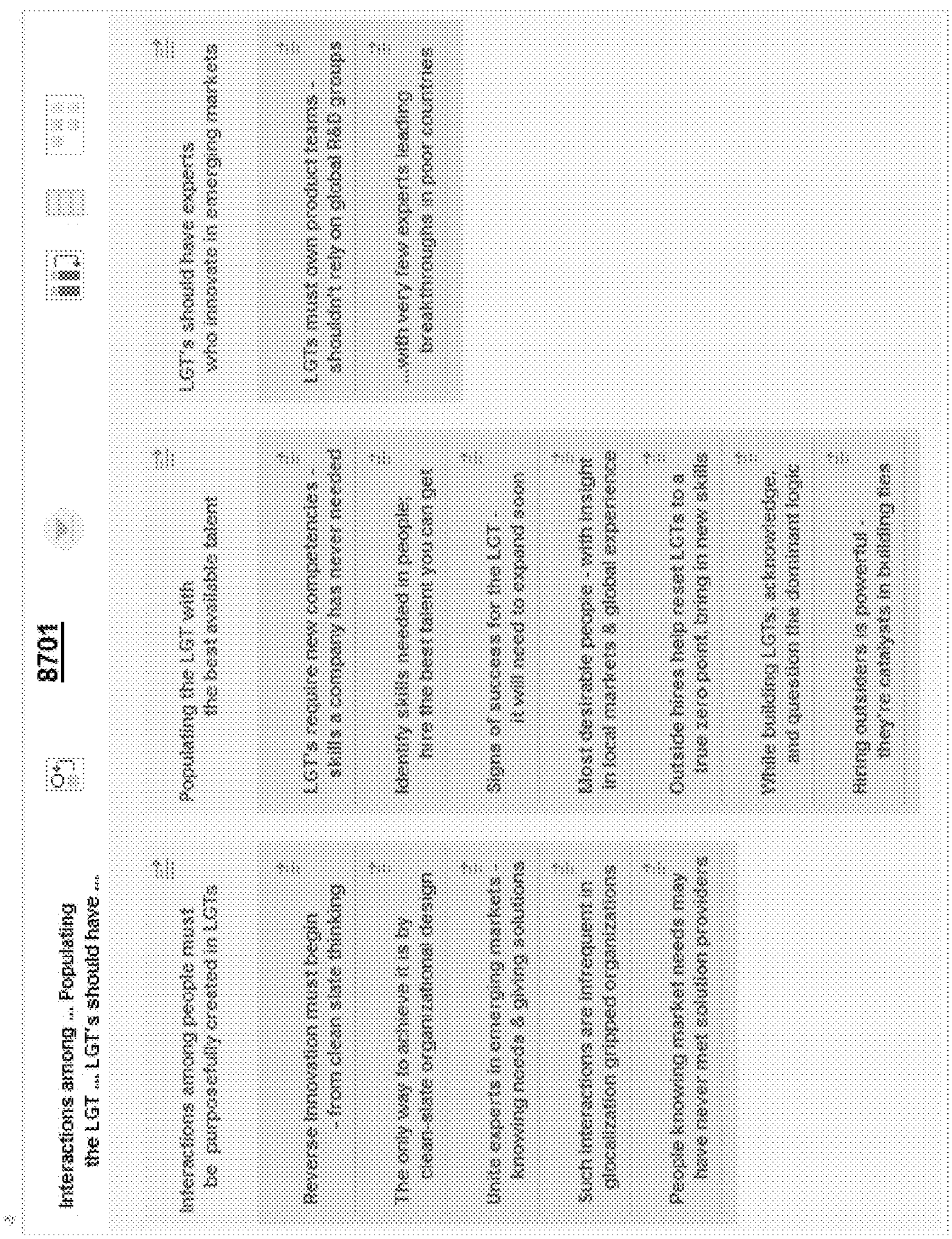
Fig. 87 – The graphical-browse-view named "Interactions among ... Populating the LGT ... LGT's should have ..."

Fig. 88 – The graphical-browse-view named "It's less important ..."

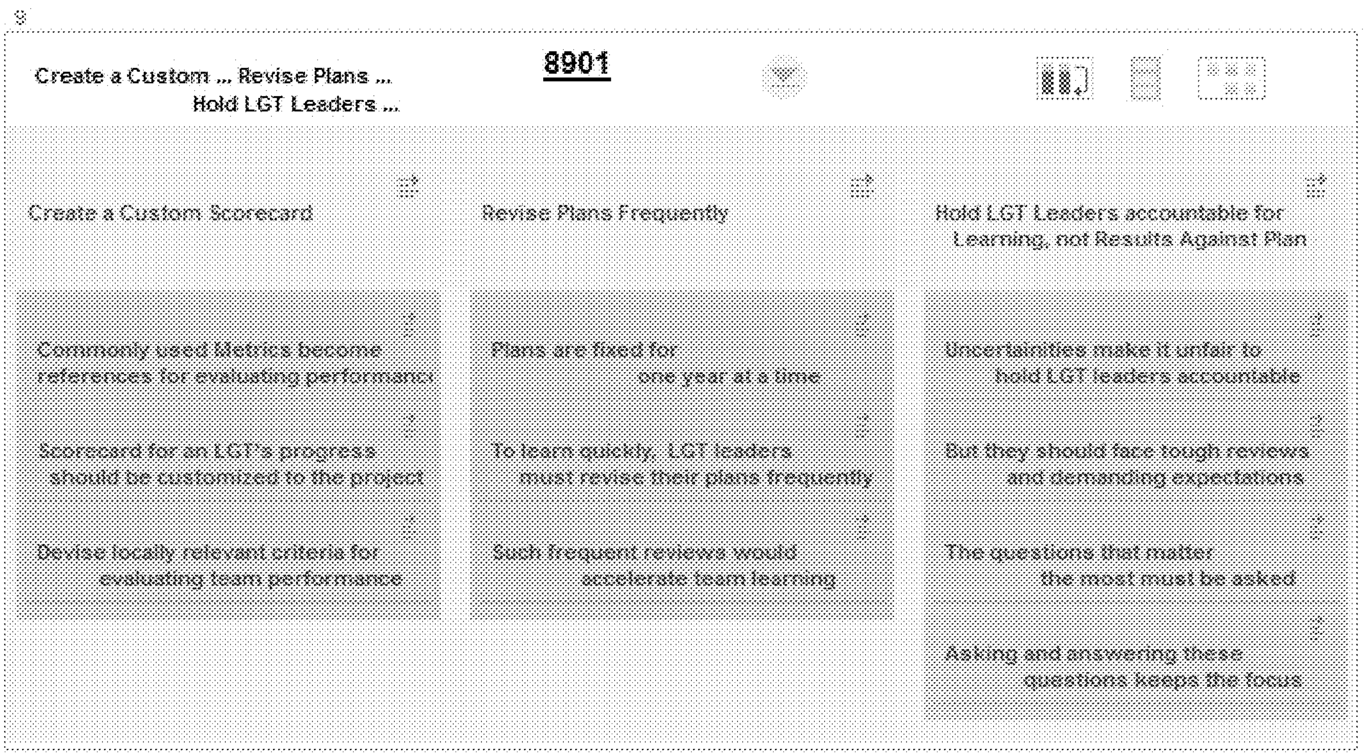
Fig. 89 – The graphical-browse-view named “Create a Custom … Revise Plans … Hold LGT Leaders …”

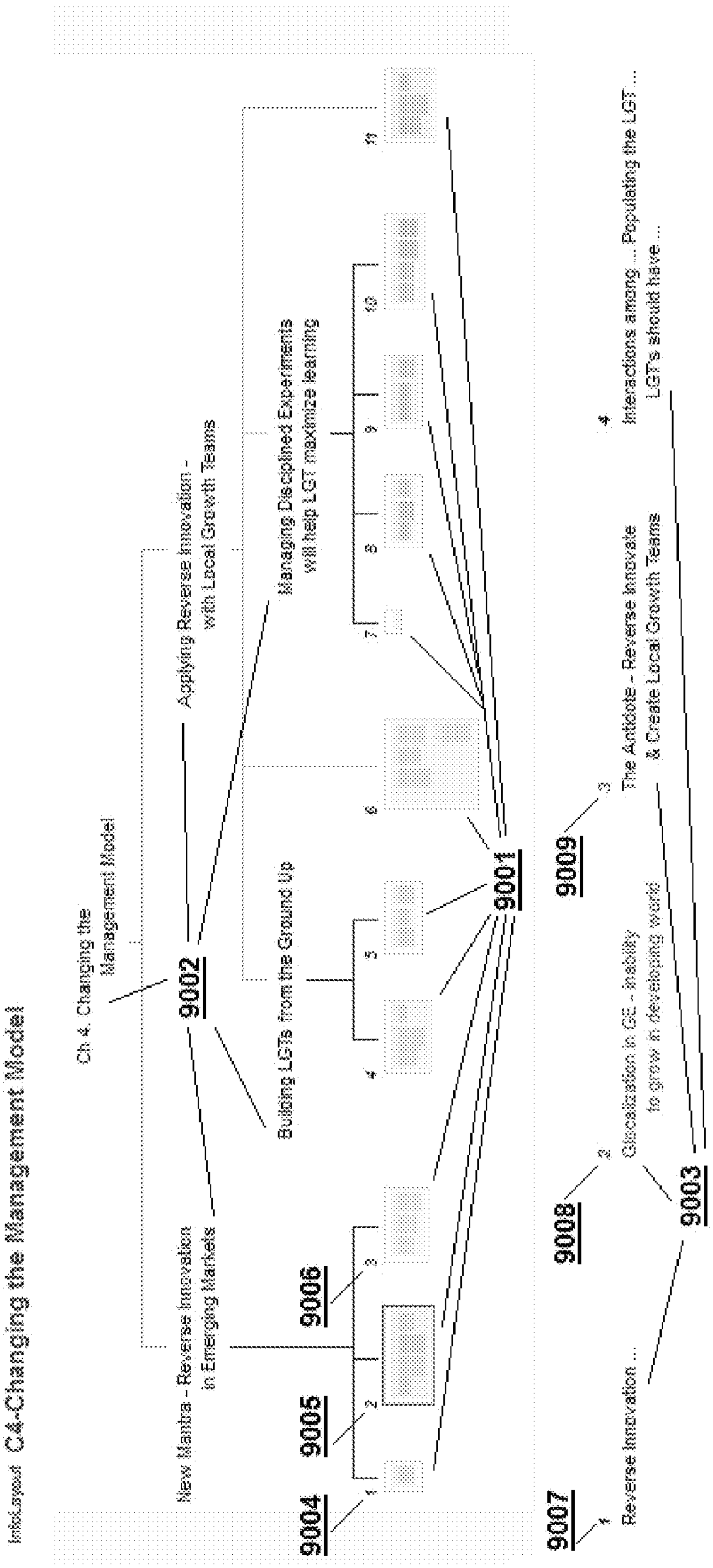
Fig. 90– The tree with miniature-views in the bottom-row and a left-right-scrollable list of names below it

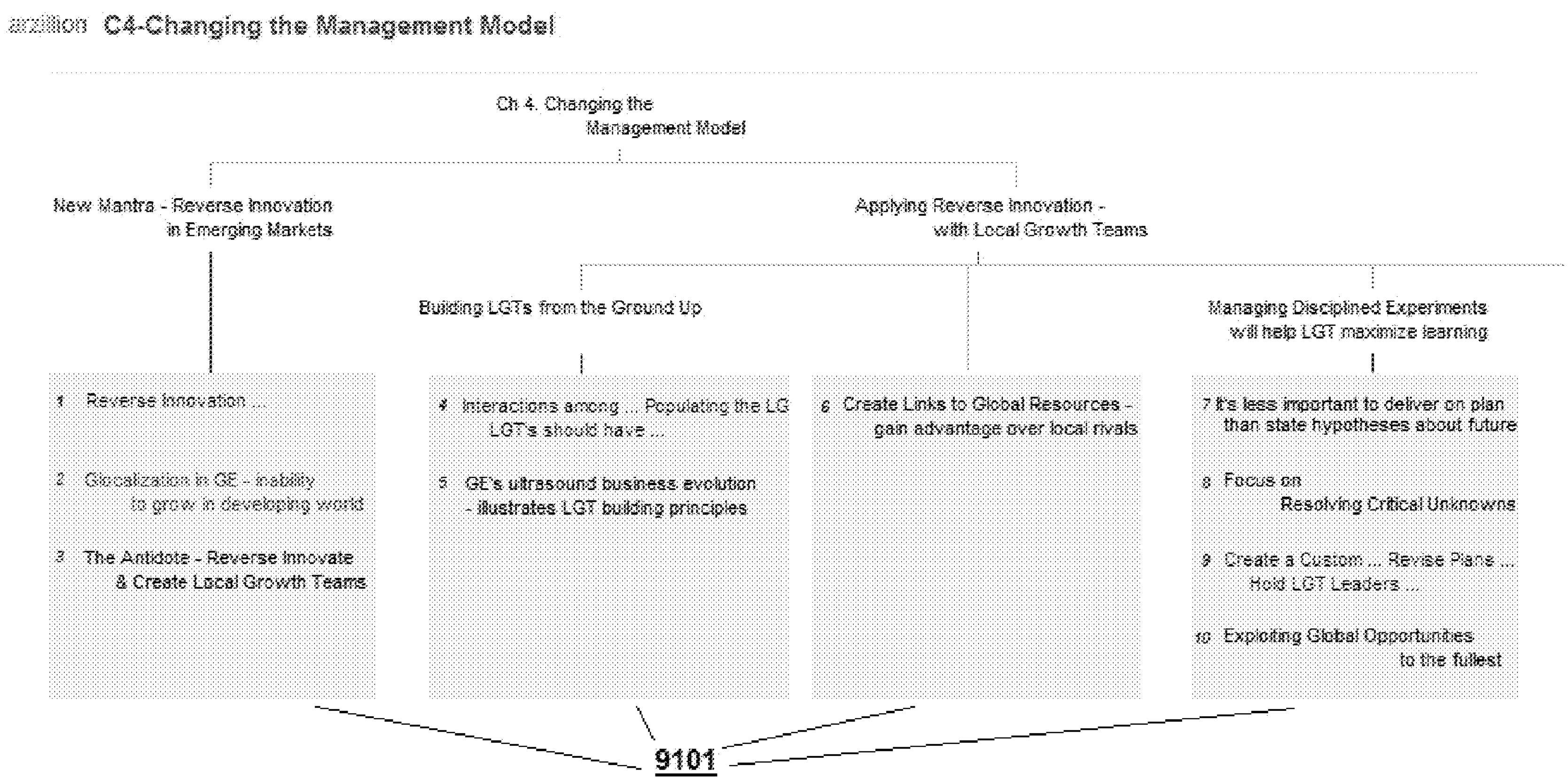
Fig. 91– The tree with a columnar arrangement of the names of bottom-row nodes

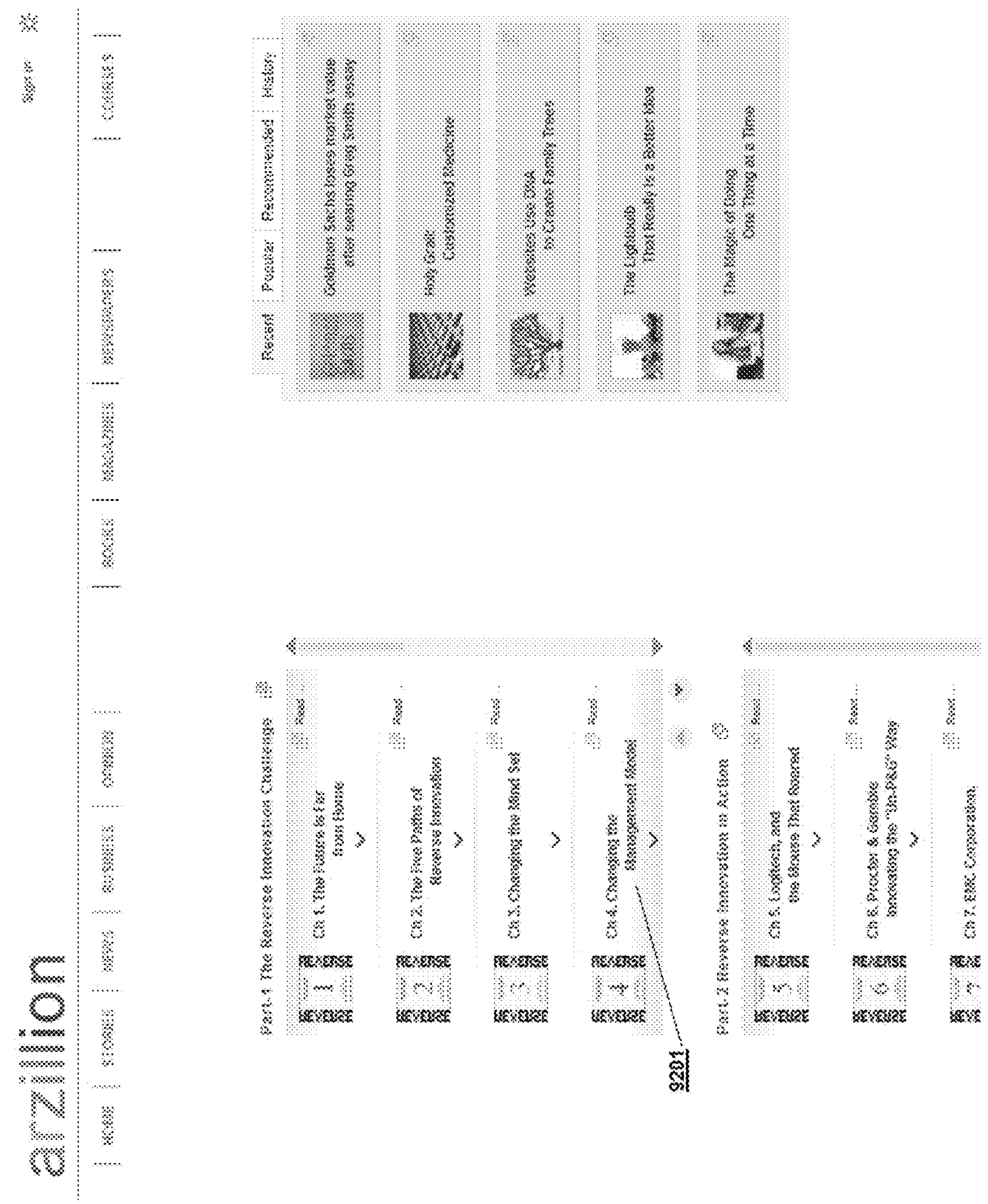
Fig. 92– An example of a list of article titles

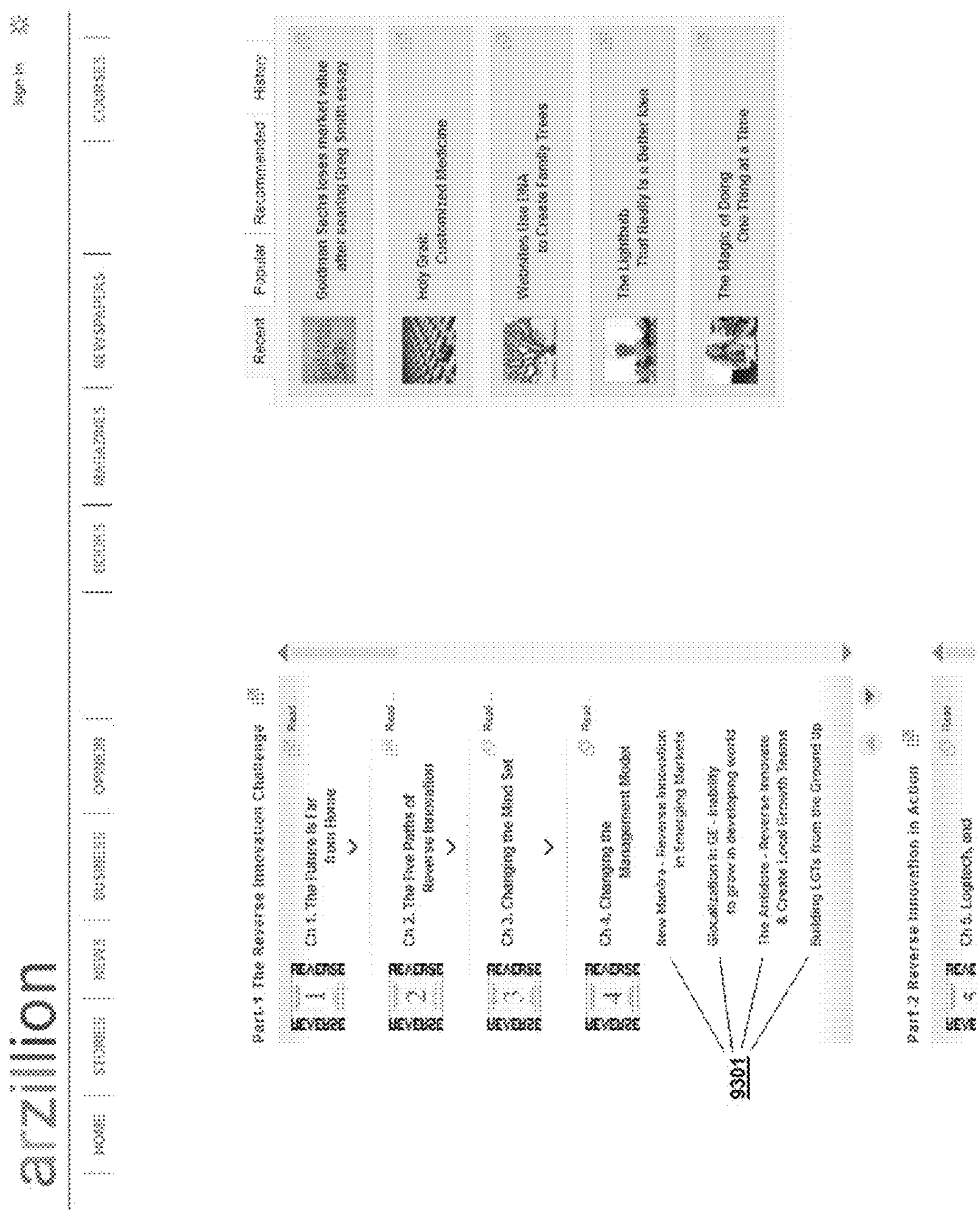
Fig. 93– The program may display low-level headings below the article's title

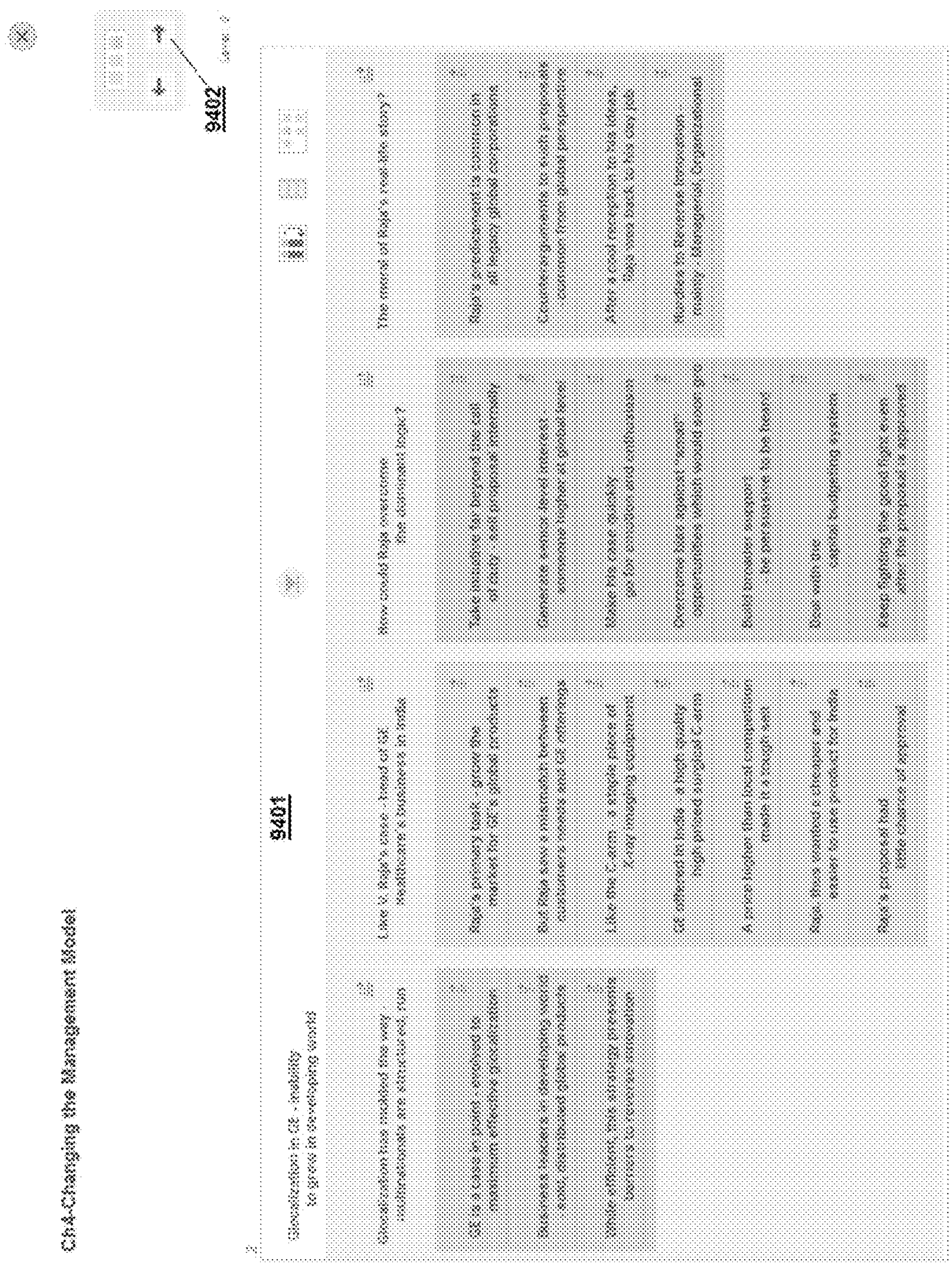
Fig. 94– Browse-area showing the graphical-browse-view of "Glocalization in GE – inability to grow in developing world"

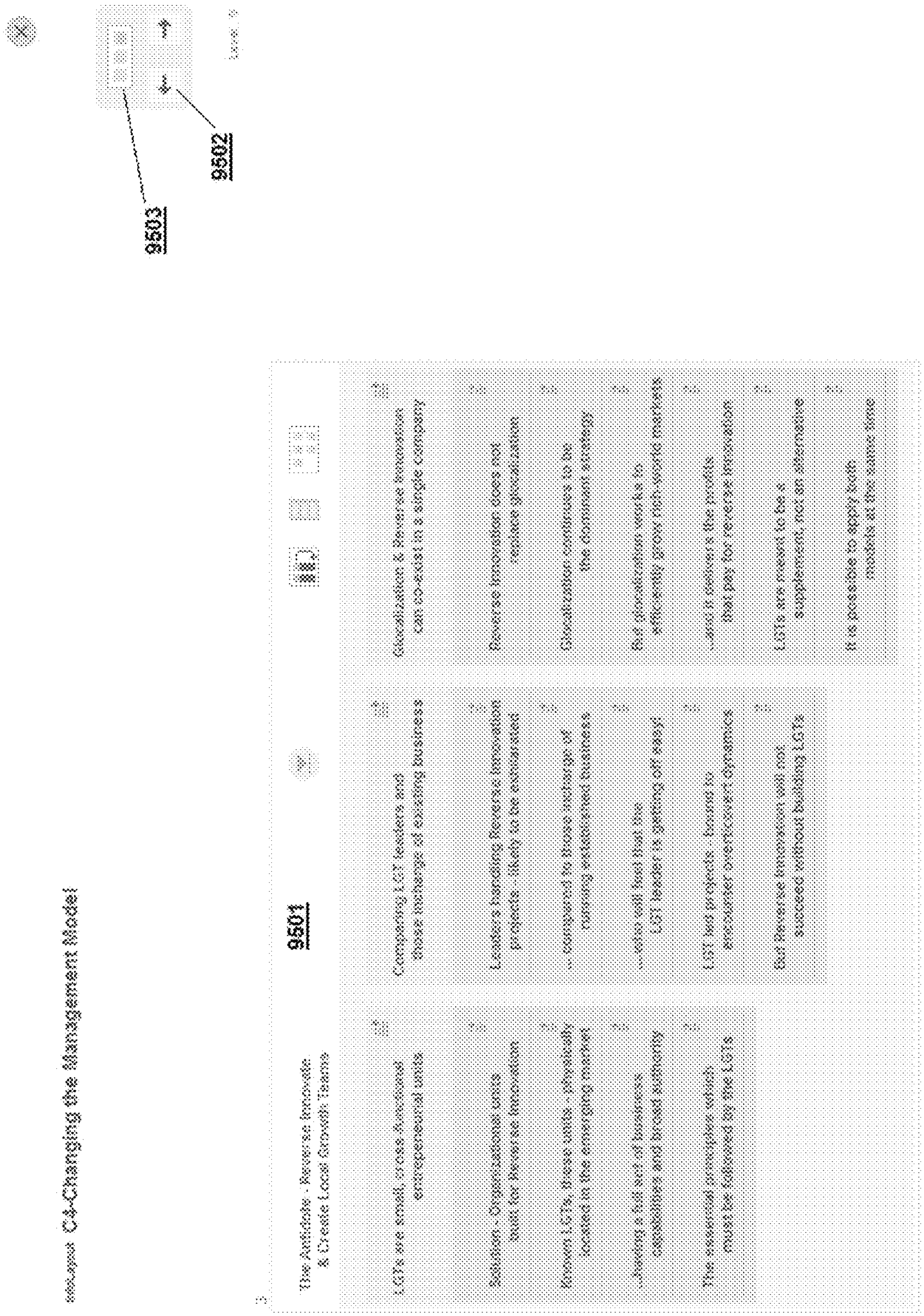
Fig. 95– Browse-area showing the graphical-browse-view of "The Antidote – Reverse Innovate & Create Local Growth Teams"

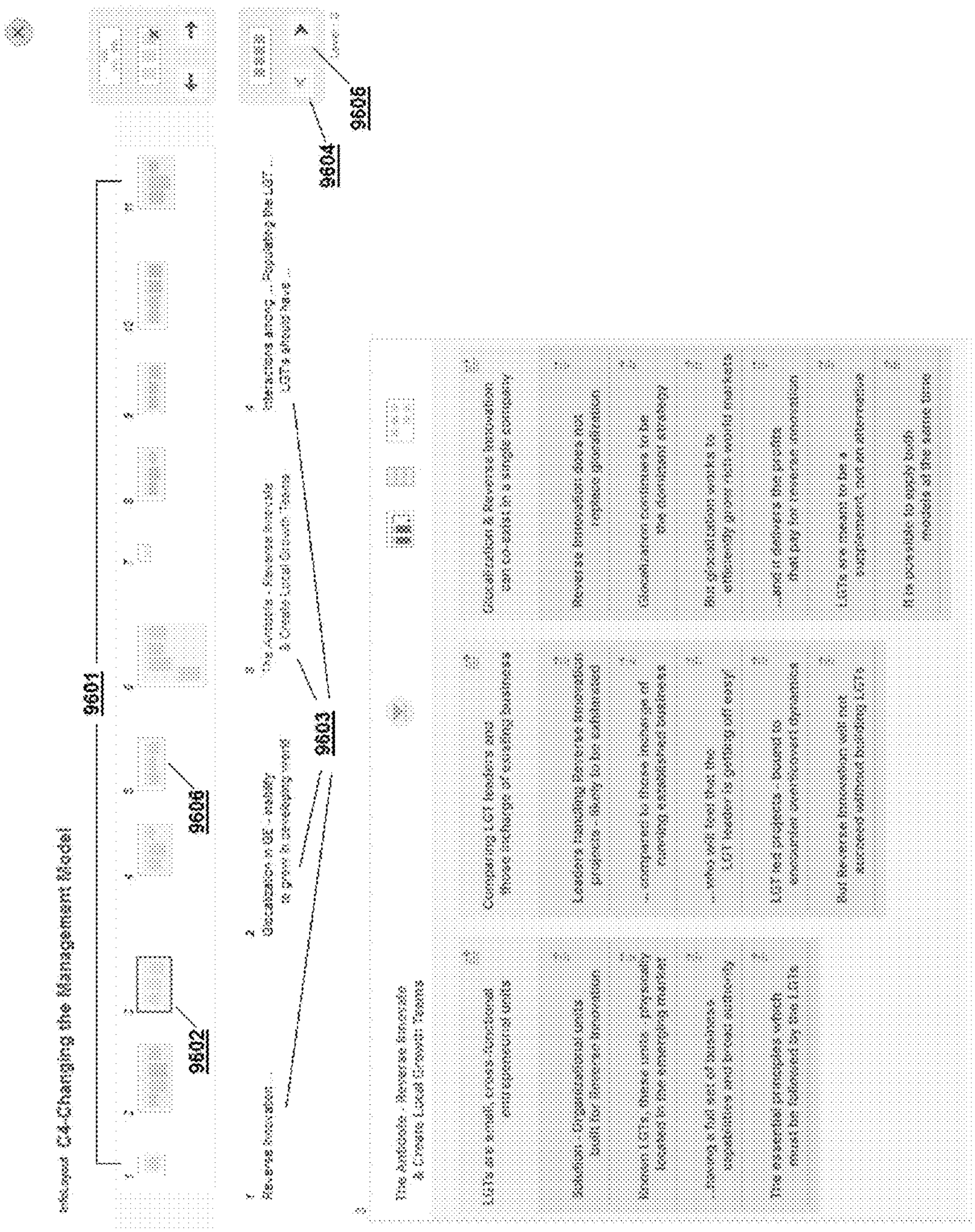
Fig. 96– Browse-area showing the miniature-views of the bottom-row nodes of the tree and the row of low-level headings

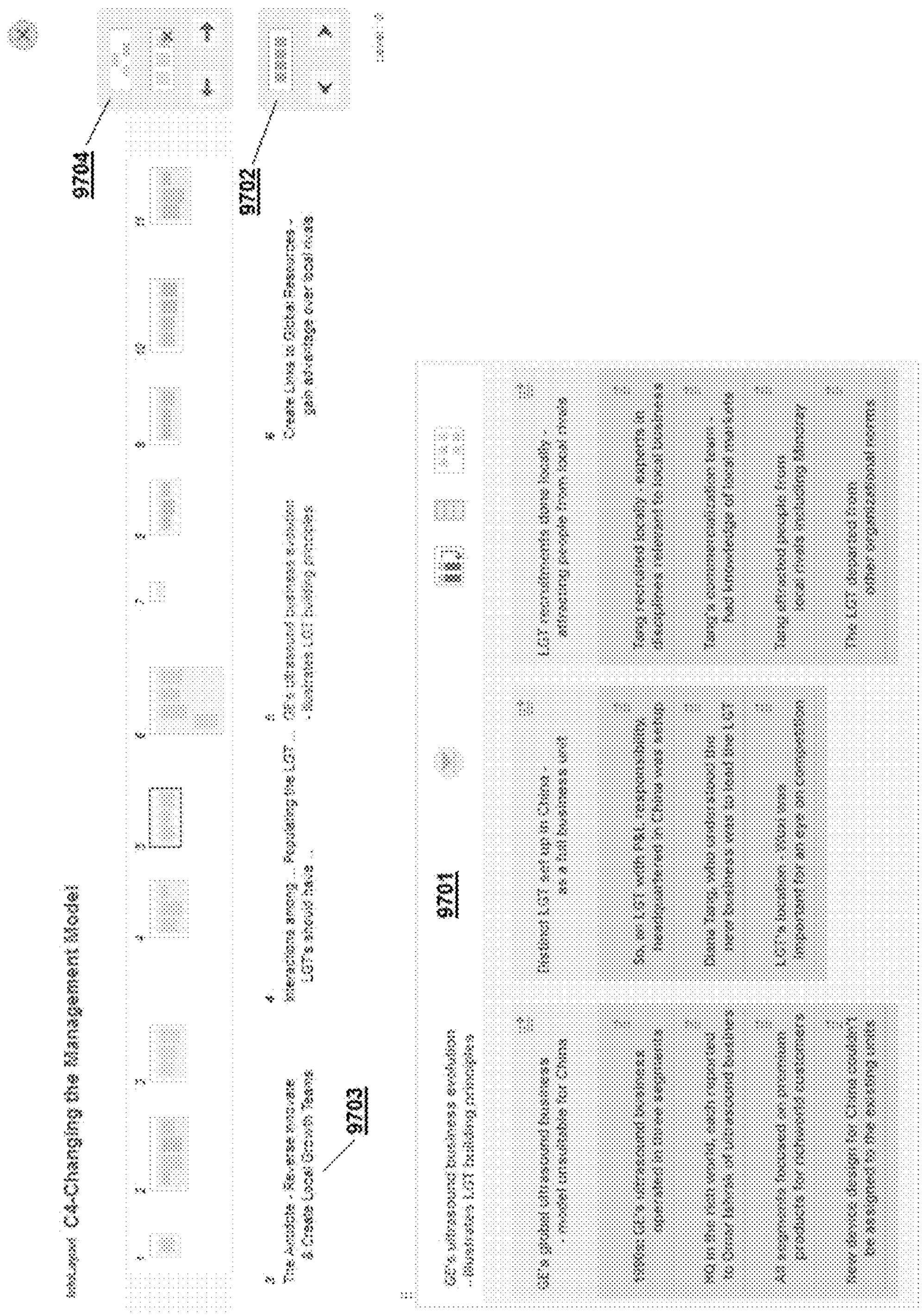
Fig. 97– Browse-area showing the graphical-browse-view of "GE's ultrasound business evolution – illustrates LGT building principles"

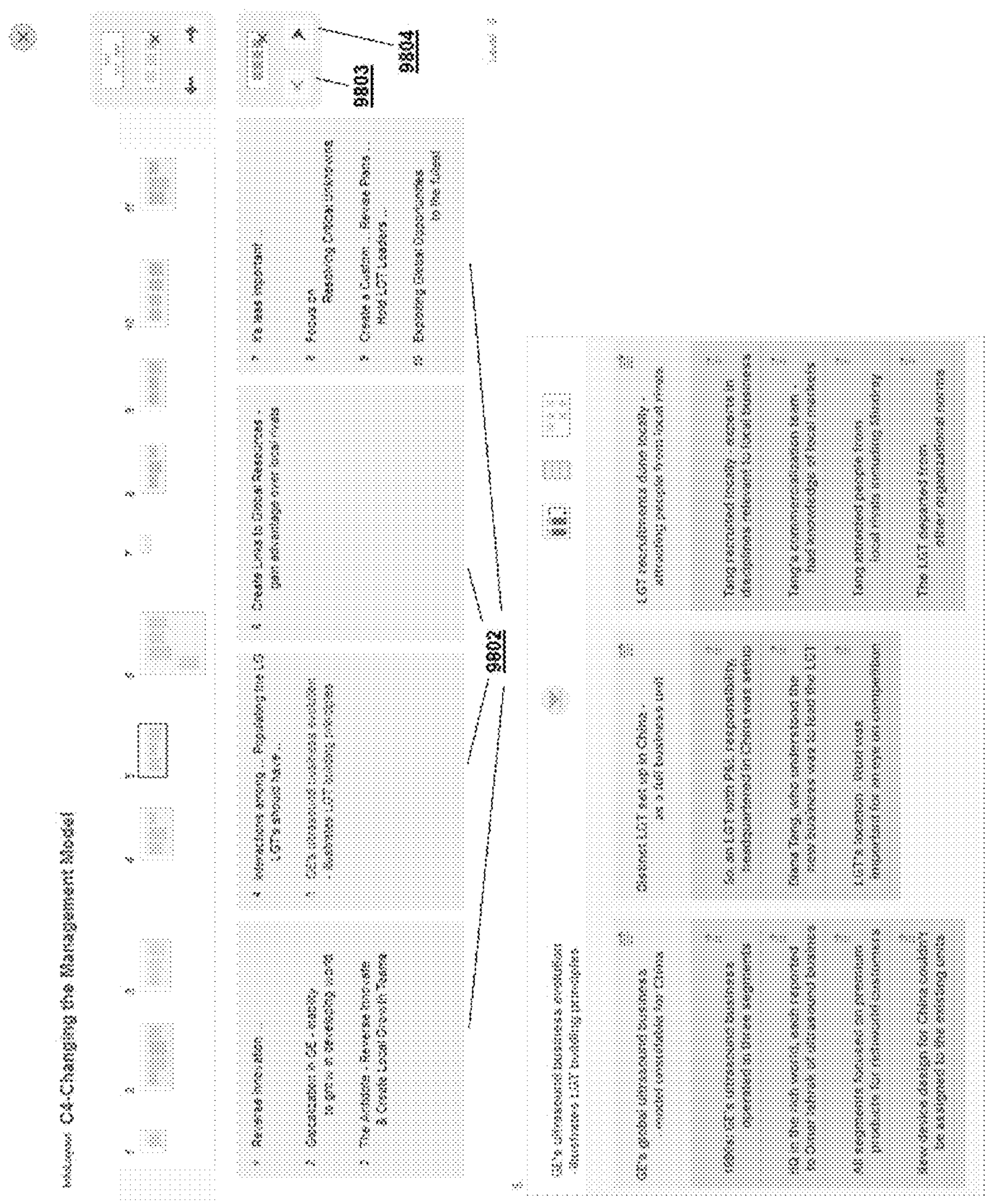
Fig. 98– Browse-area showing low-level headings in columnar grouping

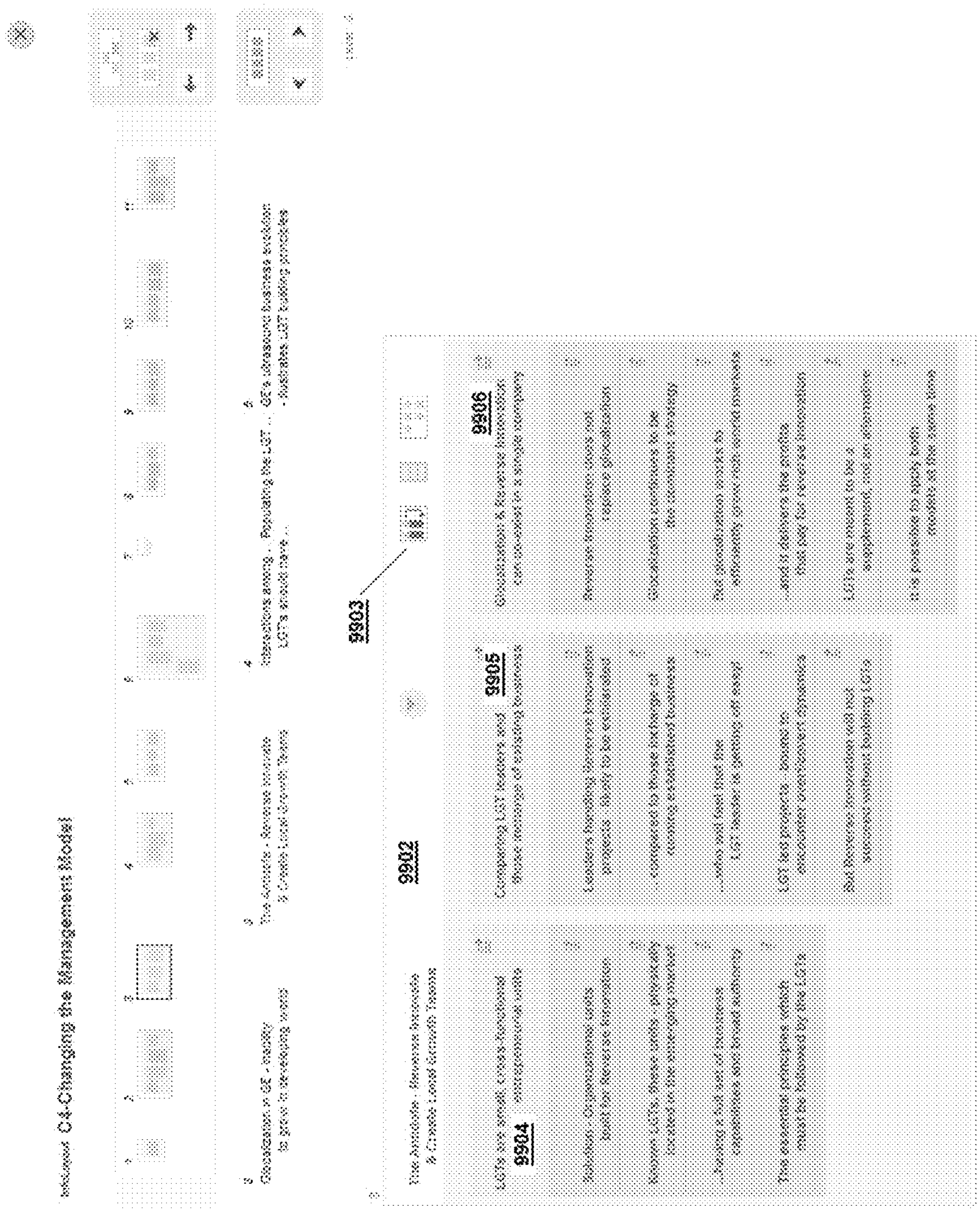
Fig. 99 – Browse-area showing the graphical-browse-view of “The Antidote – Reverse Innovate & Create Local Growth Teams”

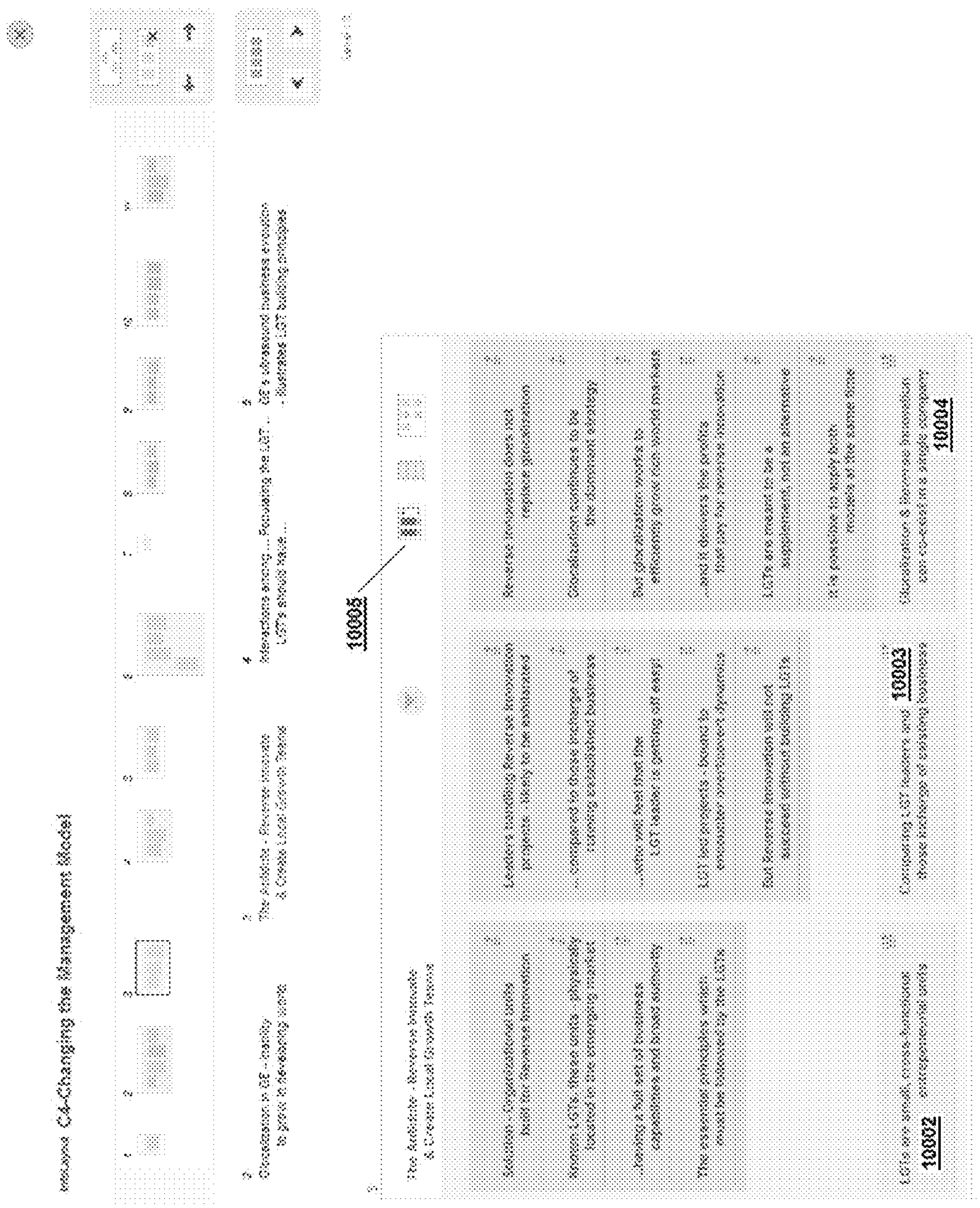
Fig. 100 – Displaying header-elements of simple-group-symbols and compound-group-symbols at the bottom of the tier

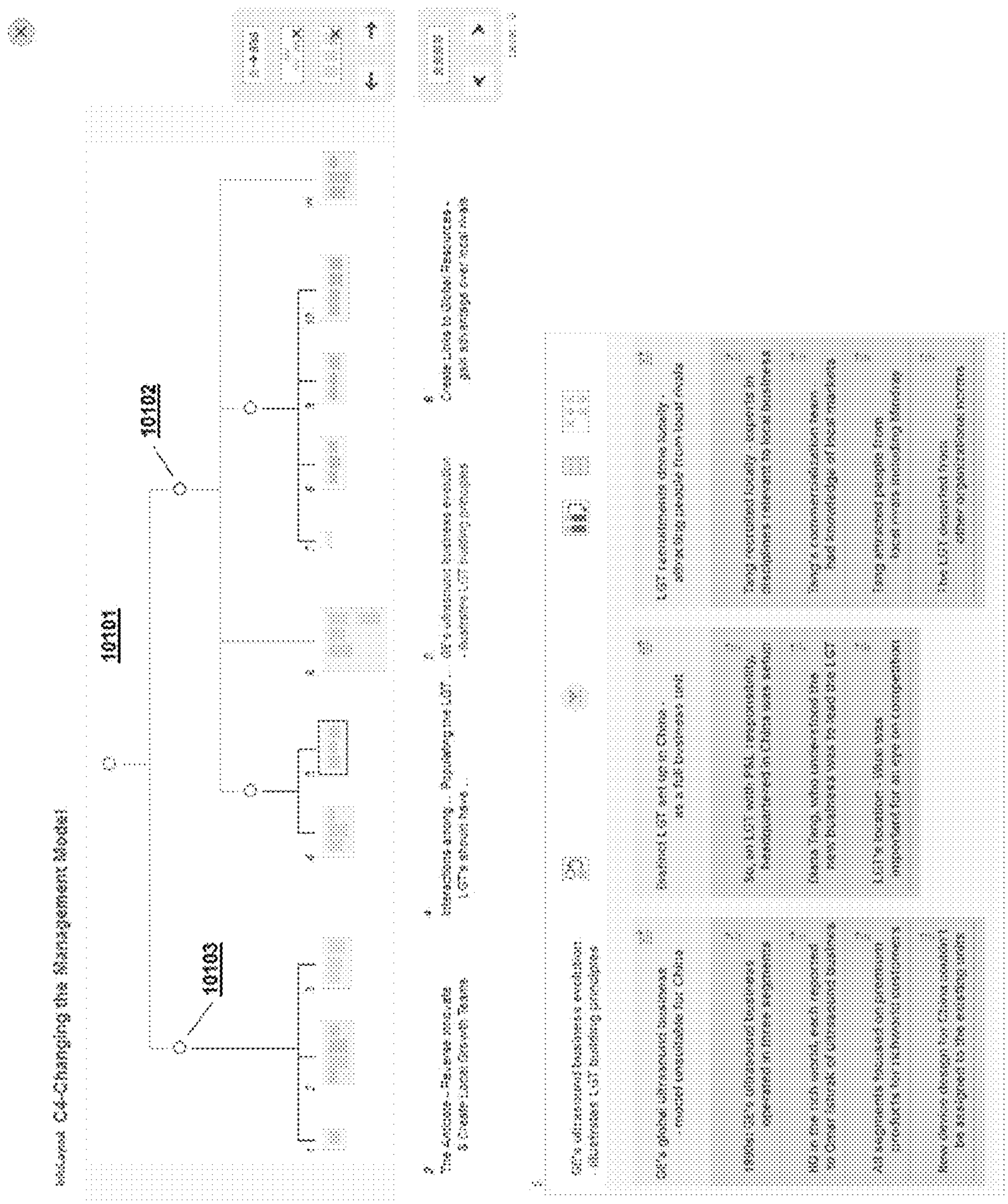
Fig. 101 – Show whole tree - Initially the upper nodes are shown with small symbols in place of miniature-views or names

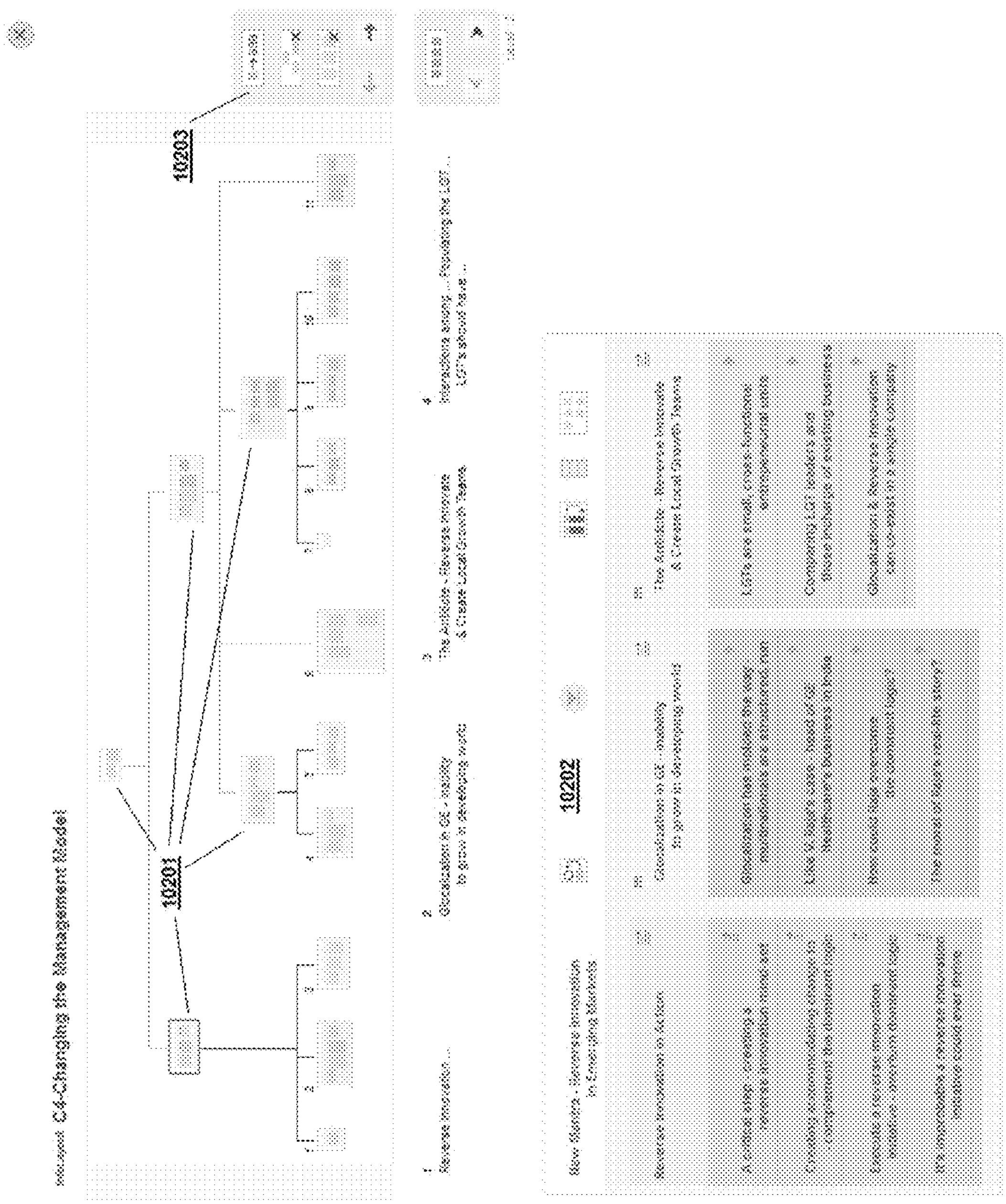
Fig. 102 – Show whole tree - with miniature-views at the nodes

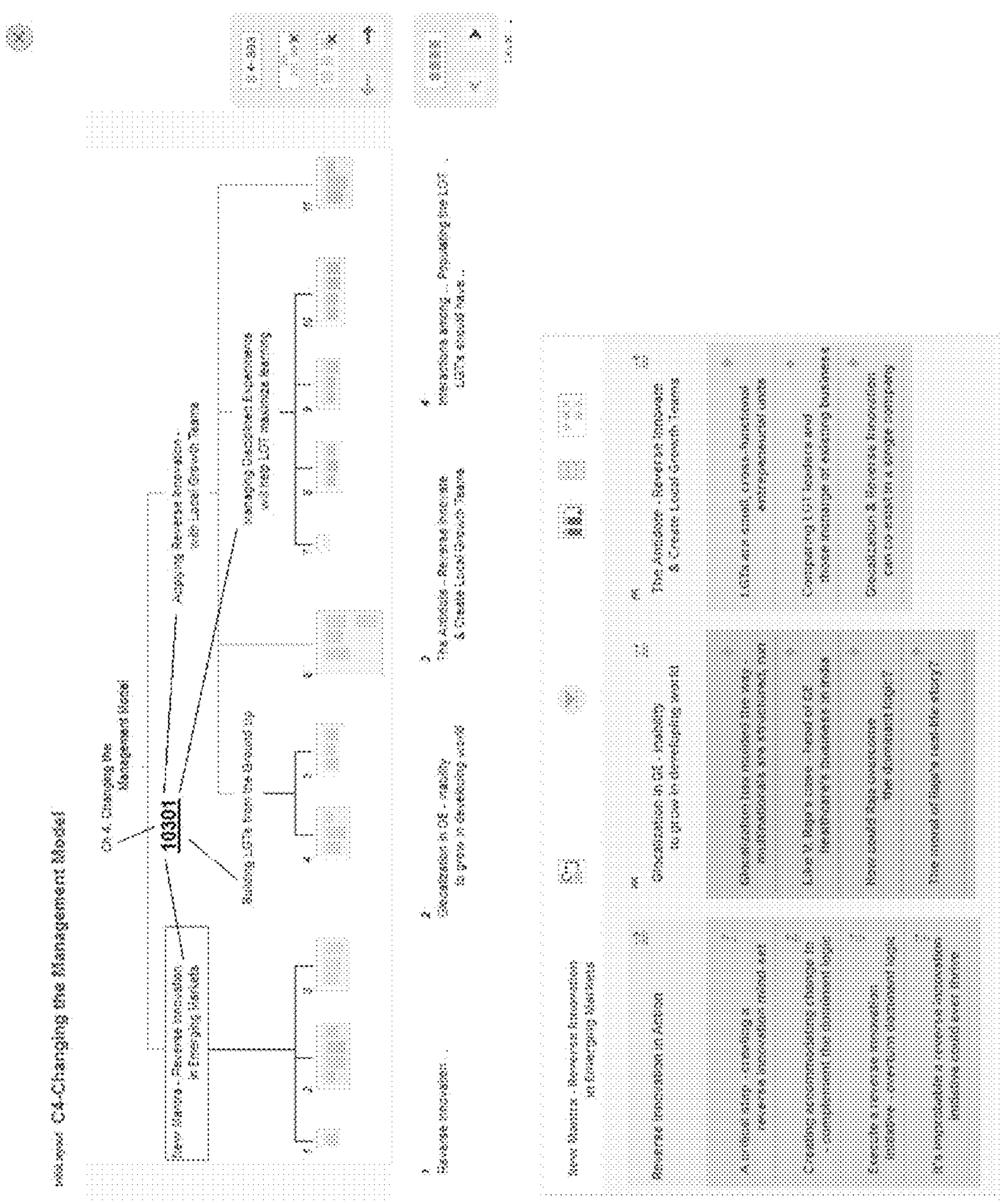
Fig. 103 – Show whole tree - with names at the upper nodes

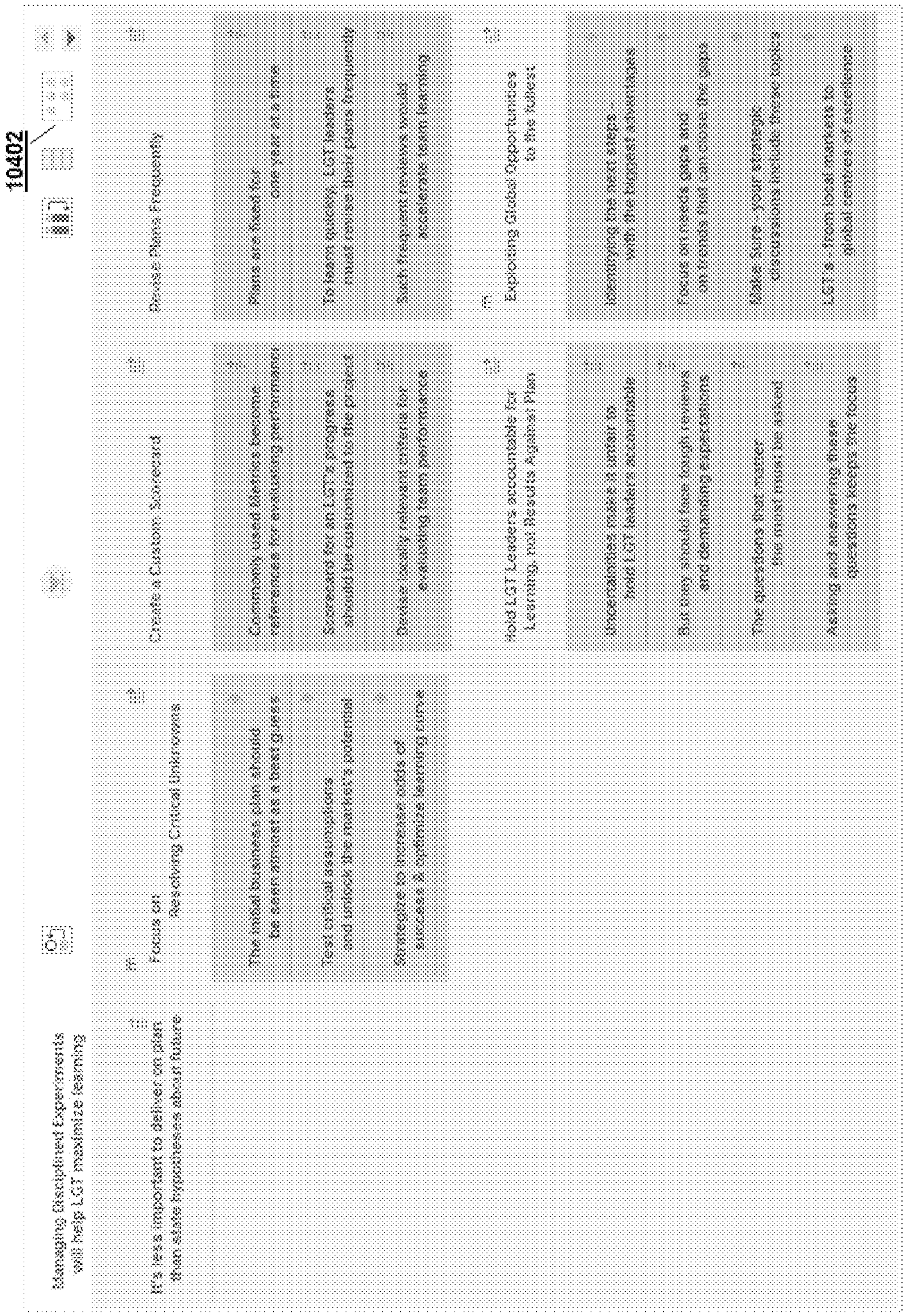
Fig. 104 – Graphical-browse-view named "Managing Disciplined Experiments will help LGT maximize learning"

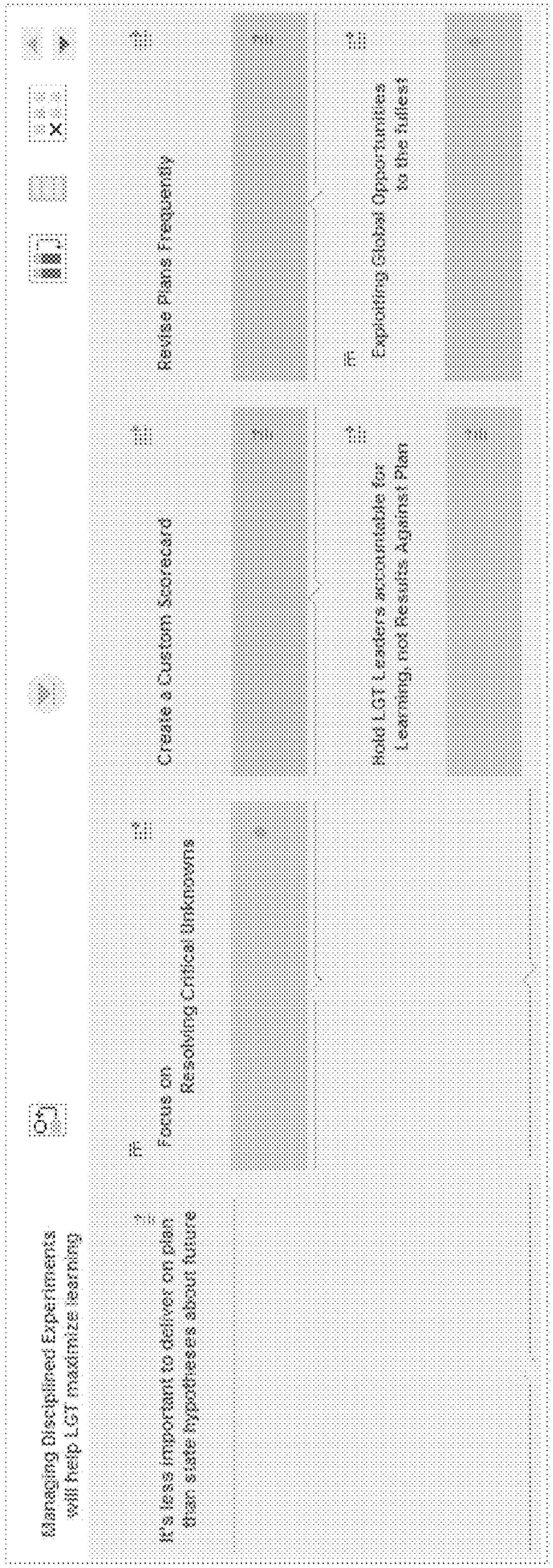
Fig. 105 -- Graphical-browse-view - showing header-elements only

METHOD AND APPARATUS FOR BROWSING INFORMATION

RELATED APPLICATIONS

This application claims the benefit of and priority to U.S. Provisional Patent Application No. 61/829,757, filed May 31, 2013, which is incorporated herein by reference. This application also claims the benefit of and priority to U.S. Provisional Patent Application No. 61/892,701, filed Oct. 18, 2013, which is incorporated herein by reference.

BACKGROUND

Disclosed is a method of browsing in text, graphics, tables, pictures, mathematical expressions, graphs, slide-shows, videos etc. using apparatus such as computer systems, tablets, smartphones etc. The current art browsing methods have adopted from the print medium, but there has been no significant innovation to capitalize on the ground-breaking advantages offered by computer systems for many decades.

Current Art of Browsing in an Article

In the current interactive computer medium, the typical means of browsing in an article consist of: a table of contents in the beginning of an article or a book; and/or hyperlinks on phrases in the body of the article.

A very common example is the table of contents at the start of an article in Wikipedia. Such tables of contents are based on a top-down structure. The contents of the article are divided into major sections. Major sections are divided into sub-sections. Each major section or sub-section is given a section heading. Each heading consists of a short phrase.

The abovementioned means of browsing were derived from the traditional print medium, where a table of contents at the beginning of a book, magazine, or article was the typical means of browsing.

SUMMARY

A new method to help in browsing, grasping and recalling information. In today's world of "information-overload", a huge volume of information becomes available everyday. A new method of browsing, grasping and recalling information can be useful. To be useful for everyone, such new method may utilize the existing environment of Internet browsers and laptops, desktops, tablets, smartphones etc. in a new way.

We describe a new method of browsing in an article which may enable the reader to grasp the main points of the article in significantly less time than the traditional browsing methods referred to above. It may also make it easier for the reader of the article to recall the contents of the article at a later time.

BRIEF DESCRIPTION OF THE DRAWINGS

FIG. 1 shows the first page of the article titled "Apple, America and a Squeezed Middle Class".

FIG. 2 shows a small segment of an XML file.

FIG. 3 shows a small part of the detailed-view of our example article.

FIGS. 4 and 5 show a zoomed-out version of a larger amount of the detailed-view of our example article.

FIG. 6 shows the level-1 graphical-browse-view of the article titled.

FIG. 7 shows a level-3 graphical-browse-view from the article

FIG. 8 shows a snapshot of partial contents of the text-column 801 of the article FIG. 9 shows the collapsed-view of the article titled.

FIG. 10 shows the collapsed view with two point-boxes in the expanded state

FIG. 11 shows an example of the point-box

FIG. 12 shows an example of the simple-group-box

FIG. 13 shows an example of the compound-group-box.

FIG. 14 shows the layout of the detailed-view of our example article.

FIG. 15 shows an example of an overlap.

FIG. 16 shows an example of the width of the browse-element and the margins.

FIG. 17 shows a browse-element in the form of a stand-alone point-symbol.

FIG. 18 shows a browse-element in form of a member-element in a simple-group-symbol.

FIG. 19 shows a browse-element in form of a member-element in a compound-group-symbol.

FIG. 20 shows the point-name or the group-name that can fit on four lines of a double-height browse-element.

FIG. 21 show the various instances of the browse-element-type-and-action icon.

FIGS. 22 through 30 show a graphical-browse-view.

FIG. 31 shows symbols in a left-justified placement in the last tier.

FIG. 32 shows the point-symbol below the simple-group-symbol or the compound-group-symbol that precedes it.

FIG. 33 shows a graphical-browse-view with summary at a mixed level of detail.

FIG. 34 shows a part of a webpage displayed by the program.

FIG. 35 shows a pop-up window.

FIG. 36 shows a graphical-browse-area below the article title area.

FIGS. 37 through 59 show different graphical-browse-views of an article.

FIG. 60 shows each phrase on a separate line and indent the text on each line.

FIG. 61 shows each phrase on a separate line and indent the phrases.

FIG. 62 shows each phrase on a separate line and indent the text on each line.

FIG. 63 shows small vertical space before the line that contains phrase.

FIG. 64 shows an example of a browse-element-text formatting.

FIG. 65 shows an example of selected-text and the command to save.

FIG. 66 shows a sequence of point-names that provides a point-by-point summary.

FIG. 67 shows a sequence of simple-group-names providing a summary of summary.

FIG. 68 shows a sequence of compound-group-names providing a further higher level of summary.

FIG. 69 is a block diagram of exemplary components of a computer system.

FIG. 70 is a block diagram of a computer system.

FIGS. 71 through 105 show different views for viewing and navigating an article.

DETAILED DESCRIPTION

The Term "Article" Includes

In the present context, the term article includes, but is not limited to, an article, any part or whole of a book, an interview, a design or test document, a legal document, a financial document, clinical notes; in fact any information that is represented in, but not limited to, text, graphics, tables, pictures, mathematical expressions, graphs, slide-shows, audio, video etc. One embodiment of the invention could be a general purpose computer system with a computer program that, when being loaded and executed, controls the computer system such that it carries out the methods described herein.

A Computer Program Receives the Article

The computer program may receive the article or one or more parts of the article in many possible forms such as, but not limited to, a file or other means such as scanner/OCR output, speech recognition output, a data stream, data in computer memory etc. or the article can be input by the user in part or as a whole.

In the present context, the term program includes, but is not limited to, a computer program, a group of computer programs etc.

Using the New Method, a Computer Program Constructs Graphical-Browse-Views Based on Multiple Level of Summaries of the Article The new method involves granulation of information in the article and a browsing structure based on information granules. Such granules may be individual points in the article, group of points in the article, group of groups of points in the article and so on.

A Point-by-Point Detailed Summary

With this method, the computer program may create a point-by-point summary of the article. In such a summary, the program may represent each point in the article with a short description of that point.

A Summary of Summary

The program may create a summary of the summary. The program may separate the points in the article into groups such that each group may contain a few points.

In the summary of summary, the program may represent each group of points with a short description of that group.

A Summary of Summary of Summary

The program may create a summary of the summary of the summary. The program may separate the groups of points into higher-level groups such that each higher-level group may contain a few groups of points.

In the summary of summary of summary, the program may represent each higher-level group with a short description of that group.

The program may apply this process iteratively by separating the higher-level groups into further higher-level groups and representing the further higher-level groups with a short description and so on. The program may use the hierarchical summaries in constructing a hierarchical browsing structure.

Graphical-Browse-Views

The program displays the browsing structure in an innovative method that may enable the user to make greater use of visual memory and topographic memory of the human mind and thus may make it easier for the user to view and recall the content and organization of the article.

The program may be used to add the said browsing structure to an existing article, modify an article to which the browsing structure has been added or create a new article along with the browsing structure.

The Program Utilizes Natural Language Processing Capabilities that are Supplemented by User-Input The program may utilize natural language processing. In one embodiment of the invention, it may perform operations such as, but not limited to, identifying the sequence of points in the article, creating a point-name for each point, identifying simple-groups, creating names for simple-groups, identifying compound-groups, creating names for compound-groups, creation of point-boxes, simple-group-boxes, compound-group-boxes, point-symbols, simple-group-symbols, compound-group-symbols, break-and-indent formatting, formatting of browse-element-text, creating the various graphical views, etc.

The program may receive input from the user in order to supplement its natural language processing capabilities. Thus in performing the operations such as those mentioned above, the program may receive input from the user to accomplish the operations.

Multi-Level Summaries

We illustrate this new method by considering an article titled "Apple, America and a Squeezed Middle Class".

Please note that both the foregoing general description and the following detailed description are exemplary and explanatory only and are not restrictive of the scope of the invention.

FIG. 1 shows the first page of the article titled "Apple, America and a Squeezed Middle Class".

Granulation

Identify Points in the Article and Assign Point-Names

The program may receive the article in form of input that may be encoded in a variety of formats such as, but not limited to, PDF, HTML, XML, .doc, .docx, .xls, .xlsx, mp3, .mpg, .mov, .wmv, GIF, JPG etc.

By decoding the input, the program may receive the article-text from the various parts of the article as follows.

a) The program may receive text from one or more bodies of text in the article.

b) The program may also receive text from other parts of the article such as, but not limited to, captions of pictures or slides, titles of figures or tables, text content of a table, audio to text conversion or from other programs that may provide a transcript of video or audio to text conversion, optical character recognition etc.

Such text may have links to their corresponding figures, tables, slides, video segments etc.

Each Article May be Viewed as a Sequence of Points

An article can be thought of as a sequence of points. In the content of an article, the author makes a point or observation followed by another point or observation and so on.

A point in the article may be expressed in the form of one or more words, phrases and/or sentences from the article-text. A point may also be expressed in the form of other parts of the article such as, but not limited to, part or whole of one or more slides or figures from the article, part or whole of one or more tables from the article, part or whole one or more videos in the article etc.

In the following, the term article-matter includes, but is not limited to, the article-text that the program receives as described above, together with any text, graphics, tables, pictures, mathematical expressions, graphs, slides, audio, videos etc. that are in the article or are associated with the article.

Identify all Points and Assign a Point-Name to Each Point

In the present method, the program may identify all the points in the article by analyzing the article-matter mentioned above.

A point in the article may be expressed in the form of a small number of sentences, phrases or words in the article-text. By analyzing those sentences, phrases and words, the program may create a short description of the point.

The program may receive input from the user to help it identify the points in the article and to create a short description of each point.

Example 1: Consider the Following Sentences from the Article

When Barack Obama joined Silicon Valley's top luminaries for dinner in California last February, each guest was asked to come with a question for the president.

But as Steven P. Jobs of Apple spoke, President Obama interrupted with an inquiry of his own: what would it take to make iPhones in the United States?

Why can't that work come home? Mr. Obama asked.

Mr. Job's reply was unambiguous. "Those jobs aren't coming back," he said, according to another dinner guest.

The program may identify the sentences above as constituting a point. The point is said to cover the article-text shown above. Alternatively, the article-text shown above is said to correspond to the point and vice versa.

The program may create a short description of the point as:

"Steve Jobs to President Obama: Those offshore jobs are not coming back."

We call the short description above, a point-name.

Example 2: Consider the Following Sentences from the Article

The president's question touched upon a central conviction at Apple. It isn't just that workers are cheaper abroad. Rather, Apple's executives believe the vast scale of overseas factories as well as the flexibility, diligence and industrial skills of foreign workers have so outpaced their American counterparts that "Made in the U.S.A." is no longer a viable option for most Apple products.

The program may identify the sentences above as constituting a point and it may create a short description of the point as:

"The Vast scale of Overseas Factories and Workers' Quality have outpaced the U.S."

In general, a point may be expressed in the form of—and thus it may cover and correspond to—a combination of: parts of or whole of one or more of items such as, but not limited to, a sentence, phrase or word in the article-text, a graphic element, table, slide, mathematical expression, an audio clip, a video clip etc.

For example,

A point may cover:

two sentences and five words from the text of the article, the caption of a graphical chart and a part of the graphical chart, a photograph, a time interval from an audio clip, a whole video clip and a time interval from another video clip.

Another point may cover just one sentence from the text of the article.

A Point-Name May Consist of a Complete Sentence or a Trimmed Version of a Sentence Each point-name may contain a complete sentence or a trimmed version of a sentence.

In the point-name, a sentence may be considered to be a complete sentence even if a period or other punctuation may be missing in the sentence.

As defined in English grammar, a complete sentence needs to a) contain a subject plus predicate unit and b) express a complete thought.

If a complete sentence is too long, the program drops one or more words from the sentence to create a trimmed version of the sentence or receives from the user a trimmed version of the sentence in which one or more words have been dropped. The trimmed version of the sentence may be or may not be a full sentence. For example, it may be almost a full sentence that still conveys the main idea of the point.

Consider the sentence

"It provides an intuitive interface for sharing news and photos."

It may be trimmed to

"Provides intuitive interface for sharing news, photos"

Here the subject "It" may be understood in the overall context.

Although the trimmed version above is not a proper, grammatically correct sentence, it conveys the idea almost as effectively as the original sentence.

The focus is on conveying a complete thought. A phrase such as "intuitive interface" does not convey a complete thought. The presence of predicate i.e. action verb, such as "provides" in the example above, is needed to convey a complete thought.

Four types of sentences are defined in English grammar: Declarative, Interrogative, Imperative and Exclamatory.

The present method predominantly uses declarative sentences as point-names to convey the ideas expressed in the points.

In addition to the full sentence or the trimmed version of a sentence, the point-name may contain additional words or sentences that help to better describe the ideas expressed in the point.

Table-1 shows a list of point-names and the corresponding article-matter. In the interest of brevity, it shows the article-matter and point-names of just a few points from the article. Please notice that the 3rd point in the table covers a photograph from the article.

Fine Granulation

By viewing each row of table-1, we see that, in many cases, the article-matter of a point consists of two or three sentences or sometimes just one sentence. This results in fine granulation of information.

Table-2 shows the list of point-names for the whole article.

In the table below, each row contains a point from the article. The left-column shows the article-matter covered by the point.

The right-column shows the point-name i.e. a short description of the point.

TABLE 1

A partial list of point-names and the corresponding article-matter from the article
In the table below, each row contains a point from the article. The left-column shows the article-matter covered by the point.
The right-column shows the point-name i.e. a short description of the point.

| Article-matter | Point-name |
|---|---|
| 1. When Barack Obama joined Silicon Valley's top luminaries for dinner in California last February, each guest was asked to come with a question for the president.<br>But as Steven P. Jobs of Apple spoke, President Obama interrupted with an inquiry of his own: what would it take to make iPhones in the United States?<br>Why can't that work come home? Mr. Obama asked.<br>Mr. Jobs's reply was unambiguous. "Those jobs aren't coming back," he said, according to another dinner guest. | Steve Jobs to President Obama: Those offshore jobs are not coming back. |
| 2. The president's question touched upon a central conviction at Apple. It isn't just that workers are cheaper abroad. Rather, Apple's executives believe the vast scale of overseas factories as well as the flexibility, diligence and industrial skills of foreign workers have so outpaced their American counterparts that "Made in the U.S.A." is no longer a viable option for most Apple products. | The Vast scale of Overseas Factories and Workers' Quality have outpaced the U.S. |
| 3. [image of people flooding Foxconn Technology with resumes at a 2010 job fair in Henan Province, China] | People flooded Foxconn Technology with résumés at a 2010 job fair in Henan Province, China |
| 4. Apple has become one of the best-known, most admired and most imitated companies on earth, in part through an unrelenting mastery of global operations. Last year, it earned over $400,000 in profit per employee, more than Goldman Sachs, Exxon Mobil or Google. | Apple - admired for its Mastery of Global Operations and Profit per Employee |
| 5. However, what has vexed Mr. Obama as well as economists and policy makers is that Apple - and many of its high-technology peers - are not nearly as avid in creating American jobs as other famous companies were in their heydays. | But Apple and other high-tech companies appear to be not avid in creating American jobs |

TABLE 1-continued

A partial list of point-names and the corresponding article-matter from the article
In the table below, each row contains a point from the article. The left-column shows the article-matter covered by the point.
The right-column shows the point-name i.e. a short description of the point.

| Article-matter | Point-name |
|---|---|
| 6. Not long ago, Apple boasted that its products were made in America. Today, few are. Almost all of the 70 million iPhones, 30 million iPads and 59 million other products Apple sold last year were manufactured overseas. | Apple's millions of iPhones, iPads etc. are all manufactured Overseas |
| 7. Apple employs 43,000 people in the United States and 20,000 overseas, a small fraction of the over 400,000 American workers at General Motors in the 1950s, or the hundreds of thousands at General Electric in the 1980s. | Apple's workforce in the U.S. - a small fraction of old GM or GE |
| 8. Many more people work for Apple's contractors: an additional 700,000 people engineer, build and assemble iPads, iPhones and Apple's other products. But almost none of them work in the United States. Instead, they work for foreign companies in Asia, Europe and elsewhere, at factories that almost all electronics designers rely upon to build their wares. | Over 700,000 people work for Apple's offshore contractors |
| 9. "Apple's an example of why it's so hard to create middle-class jobs in the U.S. now," said Jared Bernstein, who until last year was an economic adviser to the White House.<br>"If it's the pinnacle of capitalism, we should be worried." | Apple is an example of why it is so hard to create middle-class jobs in the U.S. now. |
| 10. In its early days, Apple usually didn't look beyond its own backyard for manufacturing solutions. A few years after Apple began building the Macintosh in 1983, for instance, Mr. Jobs bragged that it was "a machine that is made in America." In 1990, while Mr. Jobs was running NeXT, which was eventually bought by Apple, the executive told a reporter that "I'm as proud of the factory as I am of the computer." As late as 2002, top Apple executives occasionally drove two hours northeast of their headquarters to visit the company's iMac plant in Elk Grove, Calif. | Till 2002, Apple's pride was - "Made in America" |
| 11. But by 2004, Apple had largely turned to foreign manufacturing. Guiding that decision was Apple's operations expert, Timothy D. Cook, who replaced Mr. Jobs as chief executive last August, six weeks before Mr. Jobs's death. Most other American electronics companies had already gone abroad, and Apple, which at the time was struggling, felt it had to grasp every advantage. | By 2004, most American companies had 'offshored'. Apple followed the trend. |
| 12. Privately, Apple executives say the world is now such a changed place that it is a mistake to measure a company's contribution simply by tallying its employees - though they note that Apple employs more workers in the United States than ever before. | Number of Employees is not the only Measure of a company's Contribution |
| 13. They say Apple's success has benefited the economy by empowering entrepreneurs and creating jobs at companies like cellular providers and businesses shipping Apple products. | Apple's success has created jobs at cellular providers and others |
| 14. And, ultimately, they say curing unemployment is not their job.<br>"We sell iPhones in over a hundred countries," a current Apple executive said. "We don't have an obligation to solve America's problems. Our only obligation is making the best product possible." | Curing unemployment is not an obligation of Apple |

TABLE 2

| The list of point names from the article |
|---|
| 1. Steve Jobs to President Obama: Those offshore jobs are not coming back |
| 2. The Vast scale of Overseas Factories and Workers' Quality have outpaced the U.S. |
| 3. People flooded Foxconn Technology with résumés at a 2010 job fair in Henan Province, China |
| 4. Apple - admired for its Mastery of Global Operations and Profit per Employee |
| 5. But Apple and other high-tech companies appear to be not avid in creating American jobs |
| 6. Apple's millions of iPhones, iPads etc. - are all manufactured Overseas |
| 7. Apple's workforce in the U.S. - a small fraction of old GM or GE |
| 8. Over 700,000 people work for Apple's offshore contractors |
| 9. Apple is an example of why it is so hard to create middle-class jobs in the U.S. now |
| 10. Till 2002, Apple's pride was - "Made in America" |
| 11. By 2004, most American companies had 'offshored'. Apple followed the trend. |
| 12. Number of Employees is not the only Measure of a company's Contribution |
| 13. Apple's success has created jobs at cellular providers and others |
| 14. Curing unemployment is not an obligation of Apple |
| 15. Apple's U.S. workforce stays limited despite high volume of sales |
| 16. When you scale up from 1 million to 30 million phones, you don't need more programmers |
| 17. The challenging goals of producing a new cell phone |
| 18. Solution: Components from Asia. Final assembly occurs in China |
| 19. Expense of buying parts, managing supply chains is much lower |
| 20. Factories in Asia can scale up and down faster |
| 21. the whole supply chain is in close vicinity - screws, rubber gaskets available and ready on demand |
| 22. A Chinese factory revamped iPhone assembly line in no time |
| 23. Full-speed operation in 96 hours - producing 10,000 iPhones a day |
| 24. No American plant can match that! |
| 25. Outsourcing has become common in hundreds of industries |
| 26 IPhone prototype scratched by keys in Mr. Jobs' pocket |
| 27 "I want a glass screen" - And make it perfect in six weeks |
| 28 Perfect in six weeks? Go to Shenzhen, China. |
| 29 Shift to a glass screen required a cutting plant, an army of engineers |
| 30 A bid from a Chinese factory arrived |
| 31 It had a new wing, glass samples, engineers and dormitories |
| 32 Availability of workers and their diligence. America has nothing like Foxconn City |
| 33 230,000 workers, six-day week, less than $17 a day - "the scale is unimaginable" |
| 34 Foxconn assembles 40% of world consumer electronics - for Dell, HP, Moto, Samsung, Sony etc. |
| 35 They could hire 3,000 people overnight! |
| 36 Truckloads of perfected glass screen arrived in the dead of the night |
| 37 Thousands of workers immediately started assembly - in 3 months, Apple sold 1 million iPhones |
| 38 Foxconn asserts their employees work in a safe and positive environment |
| 39 Foxconn denies starting the shift at midnight |
| 40 Recruit an army of engineers in China 15 days/in U.S. 9 months |
| 41 In U.S. - it is hard to find technical workforce - above high school but below a bachelor's degree |
| 42 In 1995, Eric Saragoza got a job in Apple's manufacturing plant in California |
| 43 An engineer, he rose and joined an elite diagnostic team and earned a $50,000 salary |
| 44 Apple was struggling to survive |
| 45 Inventory and work completion costs were much higher in California than in Asia |
| 46 12-hour days and work on Saturdays for Mr. Saragoza |
| 47 Modernization - farmers became steelworkers then salesmen then middle managers |
| 48 But in the last two decades, mid-wage jobs started disappearing |
| 49 Mr. Saragoza, even with his college degree, was losing ground |
| 50 In 2002, Mr. Saragoza was laid off by Apple |
| 51 Apple converted the California plant into a Call-center. The new employees earned $12 an hour |
| 52 New engineering jobs existed, but only for 30-year-olds without children |
| 53 Mr. Saragoza found a $10 an hour job - cleaning glass screens and testing audio ports of iPhones and iPads |
| 54 After 2 months of testing iPads, Mr. Saragoza quit the job |
| 55 In Shenzen, Mrs. Lin is a project manager and coordinates the production of Apple accessories |
| 56 Mrs. Lin earns a little less than Mr. Saragoza. There are lots of jobs in Shenzhen. |
| 57 Apple's revenue and share price have skyrocketed |
| 58 Apple's employees and directors receive stock and stock options |
| 59 The biggest rewards go to Apple's top employees |

TABLE 2-continued

| The list of point names from the article |
|---|
| 60 Fair reward - for bringing so much value, and increase in domestic workforce too |
| 61 Apple's ripple effect - tens of thousands of new jobs in U.S. |
| 62 Numerous new jobs in Apple retail stores; entrepreneurs selling iPhone and iPad apps |
| 63 U.S. is not producing a skilled workforce - Why blame Apple? |
| 64 Why has companies' success not produced many U.S. jobs? What does corporate America owe the Americans? |
| 65 Companies' obligation to American workers has diminished |
| 66 A factor - America is not training enough people in mid-level skills |
| 67 Companies need to maximize profits to pay for innovation; else lose even more U.S. jobs over time |
| 68 Labor is a small expense in tech manufacturing - $65 more if built in the U.S. |
| 69 But U.S. lacks the technical workforce and factories with sufficient speed and flexibility |
| 70 iPhone's success gave a major boost to Corning's strengthened glass Sales |
| 71 With higher demand, Corning's manufacturing has increased mostly in Japan and Taiwan |
| 72 Ship it by boat/Ship it by air or built it next door to assembly factory? |
| 73 Given how the industry is structured, manufacturing domestically is not feasible |
| 74 Consumer electronics business has become an Asian business |
| 75 Towards the end of the dinner with Mr. Obama . . . |
| 76 Mr. Jobs: U.S. will do well in the long-term, but we need to talk about solutions to the current problems |
| 77 For example: Visa program reforms, tax holidays for bringing overseas profits home, train American workforce |
| 78 Sometimes a struggling economy is transformed in unexpected ways |
| 79 Unexpectedly, with Internet's arrival, graphic design jobs became valuable |
| 80 Will U.S. job market profit from future innovations? |
| 81 The pace of innovation has quickened. |
| 82 Despite recent innovations, U.S. has lost jobs to China |
| 83 Shareholders expectations of growth and profit are driving the jobs away from U.S. |
| 84 When new jobs emerge, will the 40-somethings be able to get those jobs? |
| 85 Even the Titans of tech-industry were curious about an iPhone app (and its scratchless screen:-) |
| 86 Based on interviews with economists, employees etc. |

Create Simple-Groups

The program may identify (or receives from the user, the identification of) a few points that are cohesive and may group them together. Based on the point-names and the article-matter covered by the points in the group, the program may create or receive from the user, a name for the group. For example, from the points listed above,

- points 1, 2 and 3 may be grouped together and the group may be named "Obama: Why can't that work come home?"
- points 4 through 6 may be grouped together and the group may be named "Apple—a much admired company but its manufacturing is all outside the U.S."
- points 7 through 9 may be grouped together and the group may be named "Despite huge product volume it has a very small U.S. workforce"

Each such group is said to be a simple-group. A simple-group may contain one or more points. The name of a simple-group is called a simple-group-name.

A Simple-Group-Name May Contain a Complete Sentence or a Trimmed Version of a Sentence Similar to the point-name described earlier in this document, each simple-group-name may contain a complete sentence or a trimmed version of sentence.

The present method predominantly uses declarative sentence in the simple-group-name to convey the ideas expressed in the simple-group i.e. the ideas in the article-matter covered by the simple-group.

In addition to the full sentence or the trimmed sentence, the simple-group-name may contain sentences or words that help to better describe the article-matter covered by the simple-group.

The Process May Continue Till all or Most Points are Combined into Simple-Groups The process may continue till all the points in the article have been considered and grouped together to form small cohesive groups. Sometimes, a few points may not be cohesive with any other points and hence may remain as standalone points.

The Simple-Group is Said to be the Parent of the Points Contained it

A simple-group is said to be the parent of the points contained by it. The points that are contained by it are said to be its immediate children. Also, such points are said to be siblings of each other.

Table-3 shows a) the point-names that have been grouped together b) the group-name of the resulting group.

Table-4 shows the list of simple-group-names.

In the table below, the left column shows the point-names that have been grouped together to form a simple-group. The right column shows the name of the simple-group i.e. the simple-group-name

TABLE 3

Simple-groups are created by grouping point-names
In the table below, the left column shows the point-names that have been grouped together to form a simple-group. The right column shows the name of the simple-group i.e. the simple-group-name

| | Point-names in the group | Group-name |
|---|---|---|
| 1. | 1. Steve Jobs: Those offshore jobs are not coming back.<br>2. The Vast scale of Overseas Factories and Workers' Quality have outpaced the U.S.<br>3. People flooded Foxconn Technology with resumes at a 2010 job fair in Henan Province, China | Obama: Why can't that work come home? |
| 2. | 4. Apple - admired for its Mastery of Global Operations and Profit per Employee<br>5. But Apple and other high-tech companies appear to be not avid in creating American jobs<br>6. Apple's millions of iPhones, iPads etc. - are all manufactured Overseas | Apple - a highly admired company but its manufacturing is all outside the U.S. |
| 3. | 7. Apple's workforce in the U.S. - a small fraction of old GM or GE<br>8. Over 700,000 people work for Apple's offshore contractors<br>9. Apple is an example of why it is so hard to create middle-class jobs in the U.S. now | Despite huge product volume it has a very small U.S. workforce |
| 4. | 10. Till 2002, Apple's pride was - "Made in America"<br>11. By 2004, most American companies had 'offshored'. Apple followed the trend. | In the past: "Made in America" Now: Made Offshore |
| 5. | 12. Number of Employees is not the only Measure of a company's Contribution<br>13. Apple's success has created jobs at cellular providers and others<br>14. Curing unemployment is not an obligation of Apple | Measuring Apple's jobs creation is not simple in the global picture |
| 6. | 15. Apple's U.S. workforce stays limited despite high volume of sales<br>16. When you scale up from 1 million to 30 million phones, you don't need more programmers | Apple's U.S. manpower does not need to scale up |
| 7. | 17. The challenging goals of producing a new cell phone<br>18. Solution: Components from Asia. Final assembly occurs in China | The goal of producing high quality iPhones at low cost meant manufacturing abroad |
| 8. | 19. Expense of buying parts, managing supply chains is much lower<br>20. Factories in Asia can scale up and down faster<br>21. the whole supply chain is in close vicinity - screws, rubber gaskets available and ready on demand | Asian supply chains have surpassed what's in the U.S. |
| 9. | 22. A Chinese factory revamped iPhone assembly line in no time<br>23. Full-speed operation in 96 hours - producing 10,000 iPhones a day<br>24. No American plant can match that!<br>25. Outsourcing has become common in hundreds of industries | The speed and flexibility of a Chinese factory is breathtaking |

TABLE 3-continued

Simple-groups are created by grouping point-names
In the table below, the left column shows the point-names that have been grouped together to form a simple-group. The right column shows the name of the simple-group i.e. the simple-group-name

| | Point-names in the group | Group-name |
|---|---|---|
| 10. | 26. IPhone prototype scratched by keys in Mr. Jobs' pocket<br>27. "I want a glass screen" - And make it perfect in six weeks<br>28. Perfect in six weeks? Go to Shenzhen, China. | Perfect in six weeks? Go to China. |
| 11. | 29. Shift to a glass screen required a cutting plant, an army of engineers<br>30. A bid from a Chinese factory arrived<br>31. It had a new wing, glass samples, engineers and dormitories | A Chinese factory had resources to perfect the glass screen |
| 12. | 32. Availability of workers and their diligence. America has nothing like Foxconn City<br>33. 230,000 workers, six-day week, less than $17 a day - "the scale is unimaginable"<br>34. Foxconn assembles 40% of world consumer electronics - for Dell, HP, Moto, Samsung, Sony etc.<br>35. They could hire 3,000 people overnight! | Foxconn City - the U.S. has nothing like it |
| 13. | 36. Truckloads of perfected glass screen arrived in the dead of the night<br>37. Thousands of workers immediately started assembly - in 3 months, Apple sold 1 million iPhones | Assembling the perfected glass screens . . . in Foxconn City |
| 14. | 38. Foxconn asserts their employees work in a safe and positive environment<br>39. Foxconn denies starting the shift at midnight | Work environment in Foxconn City is said to be safe and positive |
| 15. | 40. Recruit an army of engineers in China 15 days/in U.S. 9 months<br>41. In U.S. - it is hard to find technical workforce - above high school but below a bachelor's degree | Huge mid-level technical workforce - available on short notice |
| 16. | 42. In 1995, Eric Saragoza got a job in Apple's manufacturing plant in California<br>43. An engineer, he rose and joined an elite diagnostic team and earned a $50,000 salary | Eric Saragoza joined Apple |
| 17. | 44. Apple was struggling to survive<br>45. Inventory and work completion costs were much higher in California than in Asia<br>46. 12-hour days and work on Saturdays for Mr. Saragoza<br>47. Modernization - farmers became steelworkers then salesmen then middle managers<br>48. But in the last two decades, mid-wage jobs started disappearing | Apple was under pressure to cut costs |
| 18. | 49. Mr. Saragoza, even with his college degree, was losing ground<br>50. In 2002, Mr. Saragoza was laid off by Apple<br>51. Apple converted the California plant into a Call-center. The new employees earned $12 an hour<br>52. New engineering jobs existed, only for 30-year-olds without children | Mr. Saragoza laid off in 2002. Calif. Plant converted to call-center |

TABLE 3-continued

Simple-groups are created by grouping point-names
In the table below, the left column shows the point-names that have been grouped together to form a simple-group. The right column shows the name of the simple-group i.e. the simple-group-name

| | Point-names in the group | Group-name |
|---|---|---|
| | 53. Mr. Saragoza found a $10 an hour job - cleaning glass screens and testing audio ports of iPhones and iPads | |
| 19. | 54. After 2 months of testing iPads, Mr. Saragoza quit the job | Production jobs are scarce in U.S. There are plenty of jobs in China. |
| | 55. In Shenzen, Mrs. Lin is a project manager and coordinates the production of Apple accessories | |
| | 56. Mrs. Lin earns a little less than Mr. Saragoza. There are lots of jobs in Shenzhen. | |
| 20. | 57. Apple's revenue and share price have skyrocketed | Apple and its employees thrive |
| | 58. Apple's employees and directors receive stock and stock options | |
| | 59. The biggest rewards go to Apple's top employees | |
| | 60. Fair reward - for bringing so much value, and increase in domestic workforce too | |
| 21. | 61. Apple's ripple effect - tens of thousands of new jobs in U.S. | Creation of U.S. jobs - a result of Apple's success |
| | 62. Numerous new jobs in Apple retail stores; entrepreneurs selling iPhone and iPad apps | |
| | 63. U.S. is not producing a skilled workforce - Why blame Apple? | |
| 22. | 64. Why has companies' success not produced many U.S. jobs? What does corporate America owe the Americans? | Companies' Obligation, availability of skills, Profits necessary for innovation |
| | 65. Companies' obligation to American workers has diminished | |
| | 66. A factor - America is not training enough people in mid-level skills | |
| | 67. Companies need to maximize profits to pay for innovation; else lose even more U.S. jobs over time | |
| 23. | 68. Labor is a small expense in tech manufacturing - $65 more if built in the U.S. | Not just labor - Lack of workforce and fast, flexible factories |
| | 69. But U.S. lacks the technical workforce and factories with sufficient speed and flexibility | |
| 24. | 70. iPhone's success gave a major boost to Corning's strengthened glass Sales | Corning's manufacturing has increased - in Japan and Taiwan! |
| | 71. With higher demand, Corning's manufacturing has increased mostly in Japan and Taiwan | |
| | 72. Ship it by boat/Ship it by air or built it next door to assembly factory? | |
| | 73. Given how the industry is structured, manufacturing domestically is not feasible | |
| | 74. Consumer electronics business has become an Asian business | |
| 25. | 75. Towards the end of the dinner with Mr. Obama . . . | Solutions to current problems |
| | 76. Mr. Jobs: U.S. will do well in the long-term, but we need to talk about solutions to the current problems | |
| | 77. For example: Visa program reforms, tax holidays for bringing overseas profits home, train American workforce | |

TABLE 3-continued

| Simple-groups are created by grouping point-names In the table below, the left column shows the point-names that have been grouped together to form a simple-group. The right column shows the name of the simple-group i.e. the simple-group-name | | |
|---|---|---|
| | Point-names in the group | Group-name |
| 26. | 78. Sometimes a struggling economy is transformed in unexpected ways<br>79. Unexpectedly, with Internet's arrival, graphic design jobs became valuable | Or let things take their own course? |
| 27. | 80. Will U.S. job market profit from future innovations?<br>81. The pace of innovation has quickened.<br>82. Despite recent innovations, U.S. has lost jobs to China | Despite product innovations, U.S. may continue to lose jobs |
| 28. | 83. Shareholders expectations of growth and profit are driving the jobs away from U.S.<br>84. When new jobs emerge, will the 40-somethings be able to get those jobs?<br>85. Even the Titans of tech-industry were curious about an iPhone app (and its scratchless screen:-) | With relentless cost cutting, mid-level jobs will not return |

TABLE 4

| The complete list of simple-group names |
|---|
| 1. Obama: Why can't that work come home? |
| 2. Apple - a highly admired company but its manufacturing is all outside the U.S. |
| 3. Despite huge product volume it has a very small U.S. workforce |
| 4. In the past: "Made in America" Now: Made Offshore |
| 5. Measuring Apple's jobs creation is not simple in the global picture |
| 6. Apple's U.S. manpower does not need to scale up |
| 7. The goal of producing high quality iPhones at low cost meant manufacturing abroad |
| 8. Asian supply chains have surpassed what's in the U.S. |
| 9. The speed and flexibility of a Chinese factory is breathtaking |
| 10. Perfect in six weeks? Go to China. |
| 11. A Chinese factory had resources to perfect the glass screen |
| 12. Foxconn City - the U.S. has nothing like it |
| 13. Assembling the perfected glass screens . . . in Foxconn City |
| 14. Work environment in Foxconn City is said to be safe and positive |
| 15. Huge mid-level technical workforce - available on short notice |
| 16. Eric Saragoza joined Apple |
| 17. Apple was under pressure to cut costs |
| 18. Mr. Saragoza laid off in 2002. Calif. Plant converted to call-center |
| 19. Production jobs are scarce in U.S. There are plenty of jobs in China. |
| 20. Apple and its employees thrive |
| 21. Creation of U.S. jobs - a result of Apple's success |
| 22. Companies' Obligation, availability of skills, Profits necessary for innovation |
| 23. Not just labor - Lack of workforce and fast, flexible factories |
| 24. Corning's manufacturing has increased - in Japan and Taiwan! |
| 25. Solutions to current problems |
| 26. Or let things take their own course? |
| 27. Despite product innovations, U.S. may continue to lose jobs |
| 28. With relentless cost cutting, mid-level jobs will not return |

Create Compound-Groups

The program may identify (or receive from the user, the identification of) a few simple-groups that are cohesive and it may group them together. The program may create or receive from the user, a name for the new group—it is a short description of the simple-groups that are in the new group.

Whereas a simple-group contains a few points, the new group predominantly contains simple-groups. Hence the new group is called a compound-group and its name is said to be compound-group-name. A compound-group may possibly contain one or more standalone points that were not included in any simple-group.

A Compound-Group-Name May Contain a Complete Sentence or a Trimmed Version of a Sentence Similar to the point-name described earlier in this document, each compound-group-name may contain a complete sentence or a trimmed sentence.

The present method predominantly uses declarative sentence in the compound-group-name to convey the ideas expressed in the compound-group i.e. the ideas in the article-matter covered by the compound-group.

In addition to the full sentence or the trimmed sentence, the compound-group-name may contain words or sentences that help to better describe the article-matter covered by the compound-group.

The Process May Continue Till all or Most Simple-Groups and Standalone Points are Combined into Compound-Groups The process may continue till all the simple-groups in the article have been considered and grouped together to form compound-groups.

Sometimes, a few simple-groups may not be cohesive with any other group or point and hence they may remain as standalone simple-groups.

On the other hand, a standalone point that was not included in any simple-group, may be included directly in a compound-group, or it may continue to exist as a standalone point that has not been included in any simple-group or any compound-group.

The Compound-Group is Said to be the Parent of the Simple-Groups and Points that are Directly Contained by it A compound-group is said to be the parent of the simple-groups and points that are directly contained by it. The simple-groups and points that are directly contained by it are said to be its immediate children. Such simple-groups and points are also said to be siblings of each other. Table-5 shows a) the simple-groups that have been grouped together into a compound-group and b) the compound-group's name.

In the table below, the left column shows the names of simple-groups that have been grouped together to form a compound-group. The right column shows the compound-group-name.

TABLE 5

Compound-groups are created by grouping simple-groups together
In the table below, the left column shows the names of simple-groups that have been grouped together to form a compound-group. The right column shows the compoud-group-name.

| | Simple-groups that have been grouped together to form a Compound-group | Compound-group-name |
|---|---|---|
| 1. | 1. Obama: Why can't that work come home?<br>2. Apple - a highly admired company but its manufacturing is all outside the U.S.<br>3. Despite huge product volume it has a very small U.S. workforce<br>4. In the past: "Made in America" Now: Made Offshore<br>5. Measuring Apple's jobs creation is not simple in the global picture<br>6. Apple's U.S. manpower does not need to scale up | Has Apple's growth created jobs in America? |
| 2. | 7. The goal of producing high quality iPhones at low cost meant manufacturing abroad<br>8. Asian supply chains have surpassed what's in the U.S.<br>9. The speed and flexibility of a Chinese factory is breathtaking<br>10. Perfect in six weeks? Go to China.<br>11. A Chinese factory had resources to perfect the glass screen | Asian supply chains and factories are fast, flexible and have resources |
| 3. | 12. Foxconn City - the U.S. has nothing like it<br>13. Assembling the perfected glass screens . . . in Foxconn City<br>14. Work environment in Foxconn City is said to be safe and positive<br>15. Huge mid-level technical workforce - available on short notice | Resources of Foxconn City include a huge workforce |
| 4. | 16. Eric Saragoza joined Apple<br>17. Apple was under pressure to cut middle-class jobs costs<br>18. Mr. Saragoza laid off in 2002. Calif. Plant converted to call-center<br>19. Production jobs are scarce in U.S. There are plenty of jobs in China. | Eric Saragoza's career at Apple - loss of |
| 5. | 20. Apple and its employees thrive<br>21. Creation of U.S. jobs - a result of Apple's success<br>22. Companies' Obligation, availability of skills, Profits necessary for innovation<br>23. Not just labor - Lack of workforce and fast, flexible factories<br>24. Corning's manufacturing has increased - in Japan and Taiwan! | Apple's meteoric rise in revenue has not returned skilled jobs to U.S. |
| 6. | 25. Solutions to current problems<br>26. Or let things take their own course?<br>27. Despite product innovations, U.S. may continue to lose jobs<br>28. With relentless cost cutting, mid-level jobs will not return | How do you bring the jobs back to U.S.? |

Create Higher-Level Compound-Groups

TABLE 6

The list of six compound-group names
Table-6 lists the six compound-groups that are formed as described above.

| | |
|---|---|
| 1. | Has Apple's growth created jobs in America? |
| 2. | Asian supply chains and factories are fast, flexible and have resources |
| 3. | Resources of Foxconn City include a huge workforce |
| 4. | Eric Saragoza's career at Apple - loss of middle-class jobs |
| 5. | Apple's meteoric rise in revenue has not returned skilled jobs to U.S. |
| 6. | How do you bring the jobs back to U.S.? |

The program may identify (or receives from the user, the identification of) a few compound-groups that are cohesive and it may group them together. Such a new group may contain compound-groups and possibly simple-groups and points that were standing alone.

The program may create or receive from the user, a name for the new group—it is a short description of the groups and points that may be in the new group. The new group is also called a compound-group. and its name is said to be a compound-group-name. Since it may contain nested compound-groups, it may be thought of as a higher-level compound-group.

The Process May Continue Till all Groups and Points have been Considered for Combining into Higher-Level Compound-Groups In this way, the program may continue till all the compound-groups in the article have been considered and possibly grouped together to form compound-groups depending on their logical cohesiveness.

Sometimes, a few compound-groups may not be cohesive with any other groups or points and hence they may remain as standalone compound-groups.

On the other hand, a standalone point, a standalone simple-group, or a standalone compound-group may be included directly in a higher-level compound-group.

The process may continue iteratively till no more higher-level compound-groups can be formed.

In our example article, the program groups the first three compound-groups into a higher-level compound-group.

It groups the remaining three compound-groups and a standalone point into another higher-level compound-group.

The result is shown in Table-7.

In the table below, the left column shows the names of compound-groups that have been grouped together to form a higher-level compound-group. The right column shows the name of the higher-level compound-group.

TABLE 7

Compound-groups are grouped into higher-level compound-groups In the table below, the left column shows the names of compound-groups that have been grouped together to form a higher-level compound-group. The right column shows the name of the higher-level compound-group.

| | Compound-groups that have been grouped together into a Higher-level Compound-group | Higher-level Compound-group's name |
|---|---|---|
| 1. | 1. Has Apple's growth created jobs in America?<br>2. Asian supply chains and factories are fast, flexible and have resources<br>3. Resources of Foxconn City include a huge workforce | Apple's job creation in U.S. is affected by manufacturing abroad |
| 2. | 4. Eric Saragoza's career at Apple - loss of middle-class jobs<br>5. Apple's meteoric rise in revenue has not returned skilled jobs to U.S.<br>6. How do you bring the jobs back to U.S.?<br>7. Based on interviews with economists, employees etc. | Jobs in America: Past, present and future |

Note:
item 7 above is a point-name.

The Higher-Level Compound-Group is Said to be the Parent of the Compound-Group, Simple-Groups and Points that are Directly Contained by it A compound-group is said to be the parent of the compound-groups, simple-groups and points that are directly contained by it. The compound-groups, simple-groups and points that are directly contained by it are said to be its immediate children. Such compound-groups, simple-groups and points are said to be siblings of each other.

To explain the concept, we have used the words "higher-level" to describe compound groups created above. But they are compound-groups like any other compound-groups. Hence in the rest of this document, higher-level compound groups are referred to as compound-groups.

The Article is Said to be the Parent of all Outermost Groups and Points

A compound-group, simple-group or a point that is not contained by a compound-group or a simple-group is said to be at the outermost level. The article is said to be the parent of all such outermost groups and points. All such groups and points are said to be siblings of each other.

In this document, the term group-name refers to both the simple-group-name and the compound-group-name.

The Program May Create Multi-Level Summaries of the Article

In the present method, the program may assign a point-name to each successive point in the article. Each point-name may be composed of a full sentence or a trimmed version of a sentence plus additional words as described earlier in this document. A sequence of such point-names provides a point-by-point summary of the article or a part of the article as shown in FIG. 66.

The program may assign a simple-group-name to each group of points. Each simple-group-name may be composed of a full sentence or a trimmed version of a sentence plus additional words as described earlier in this document. A sequence of such simple-group-names provides a summary of summary, in other words, a higher-level summary of the article or a part of the article as shown in FIG. 67.

Similarly, the program may assign compound-group-names to groups of simple-groups. A sequence of compound-group-names provides a further higher level of summary of the article or a part of the article as shown in FIG. 68. And so on.

In this way, the program may create multiple levels of summaries of the article or a part of the article.

A traditional table of contents may provide an idea of the article-matter, but it does not provide summaries at multiple levels nor does it have fine granularity of the present method.

How the Present Method's Point-Names and Group-Names May be Distinguished

The present method's hierarchical assignment of point-names, simple-group-names, compound-group-names and higher-compound-group-names may be distinguished by one or more of the following:

a) The article-matter's size is not trivial. As a test for non-triviality, the article-matter contains more than 1000 words.

b) There are three or more levels of hierarchical organization, such as 1) points, 2) simple-groups and 3) compound-groups c) The set of headings at each level provides a summary of the article.

The set of point-names provides a summary of the article, set of simple-group-names provides a summary of the article. Due to the presence of standalone points, a few point-names may need to be considered together with a set of simple-group-names to provide a summary of the article.

A set of compound-group-names provides a summary of the article. Due to the presence of standalone points, standalone simple-groups and standalone compound-groups, few point-names and a few simple-group-names may need to considered together with a set of compound-group-names to provide the summary of the article.

Stated another way: Given a compound-group, the names of compound-groups, simple-groups and points that are immediate children of the given compound-group are such that those names together provide a summary of the article-matter that is covered by the given compound-group.

d) Fine granularity of points:

a) More than 65% of the points are such that each of those points covers three or less sentences in the article text.

b) More than 45% of the points are such that each of those points covers two or less sentences in the article text.

c) More than 15% of the points are such that each of those points covers one or less sentences in the article text.

e) Presence of full declarative sentences or trimmed version of sentences in point-names, simple-group-names and compound-group-names 1) More than 70% of the point-names contain a full declarative sentence or a trimmed version of a declarative sentence 2) More than 70% of the point-names contain the predicate part of a sentence 3) More than 50% of the simple-group-names may contain a full declarative sentence or a trimmed version of a declarative sentence
4) More than 50% of the simple-group-names contain the predicate part of a sentence
5) More than 50% of the compound-group-names may contain a full declarative sentence or a trimmed version of a declarative sentence
6) More than 50% of the compound-group-names contain a predicate part of a sentence

Convert to XML File

As described above, the program may identify the points, simple-groups and compound-groups in the article and assign point-names, simple-group-names and compound-group-names to them. In one embodiment of the invention, the program may output one or more XML files that together contain the information about, but not limited to, the point-names, group-names and the article-matter covered by the point-names and group-names.

In this document, the XML file serves only as an example; the program may use any alternative method of encoding the information.

The XML File

FIG. 2 shows a small segment of the XML file. It shows the point-name:

"The vast scale of Overseas Factories and Workers' Quality have outpaced the U.S."

This point-name has been attached to the following article-matter:

The president's question touched upon a central conviction at Apple. It isn't just that workers are cheaper abroad. Rather, Apple's executives believe the vast scale of overseas factories as well as the flexibility, diligence and industrial skills of foreign workers have so outpaced their American counterparts that "Made in the U.S.A." is no longer a viable option for most Apple products.

The article-text does not appear contiguously in FIG. 2 because formatting and color-highlighting markers have been inserted within the text shown in FIG. 2.

$2^{nd}$ Version and $3^{rd}$ Version of the Point-Name

In addition to the point-name that we have discussed so far, the program may create two more versions of the point-name that may be shorter than the $1^{st}$ version. Creation of these versions is further described in the description of point-box, simple-group-box and compound-group-box, later in this document.

For example, for the point-name we just saw:

"The vast scale of Overseas Factories and Workers' Quality have outpaced the U.S."

The program may create its $2^{nd}$ version as shown below.

Overseas Factories, Workers' Quality have outpaced the U.S."

In this example, the $2^{nd}$ version is shorter than the $1^{st}$ version shown above. As we will see later, the program may display the 2nd version in the form of browse-element-text in graphical-browse-views.

Its 3rd version is an even shorter version:

"outpaced the U.S."

As we will see later, the program may use the 3rd version in constructing a Universal Locator of Information Element (ULIE) that may be used for locating the point.

The program may create similar $2^{nd}$ and $3^{rd}$ versions of simple-group-names and compound-group-names. The program may receive input from the user in creating the $2^{nd}$ version and the 3rd version of the point-names and the group-names.

The XML File Contains a Hierarchical Organization of the Article's Contents

As described above, the XML file may contain a hierarchical organization of the article's content.

Compound-groups may contain simple-groups and/or compound-groups and possibly, points too.

Simple-groups may contain points.

Each point typically covers a small amount of article-matter.

The content of the XML file represents an articulated i.e. structured form of the article's content. We use the term arpage to refer to this articulated form of article's content.

Four Types of Graphical Views

In our new method, the program shows the contents of the XML file on one or more display units in the form of four main types of graphical views along with other supporting views. The four main types of views are:

a) Detailed-view
b) Graphical-browse-view
c) Text-column
d) Collapsed-view

The program may display each type of view alone. Or it may display one type of view together with one or more other types of views.

A Graphical Editor:

A graphical editor may be a part of the computer program in one embodiment of the invention. It may enable the user to view and edit the contents of the XML file.

The graphical editor may enable the user to complement the natural language processing ability of the program—such as by improving the point-names and group-names that may be created by the program. The graphical editor may also enable the user to improve the placement of point-boxes, group-boxes, attributes of the point-boxes, group-boxes etc.

The hierarchically organized content of the XML file may be viewed and edited more easily with a graphical editor than with a text-editor.

In one embodiment of the invention:

The program's graphical editor may enable the user to view and edit the XML file in a web browser such as Firefox, Internet Explorer, Chrome, Safari etc.

The graphical editor may also be used by the user to create the structured form of the article in the XML file from scratch—without having to first input the article contents to the program as described above.

a) A Brief Overview of the Detailed-View

FIG. 3 shows a small part of the detailed-view of our example article "Apple, America and a Squeezed Middle Class". It shows point-boxes, simple-group-boxes and compound-group-boxes.

In the Detailed-View:

each point in the article may be represented by a point-box 301 which shows the point-name 302 and the article-matter contained in the point-box 303 i.e. the article-matter that is covered by the point.

each simple-group may be displayed as a simple-group-box 304 which shows the simple-group-name 305 and point-boxes contained in it. In addition, it may show any article-matter that may belong directly to the simple-group.

each compound-group may be displayed as a compound-group-box 306 which shows the compound-group-name 307 and the compound-group-boxes, simple-group-boxes and point-boxes contained in it. In addition, it may show any article-matter that may belong directly to the compound-group.

In this document, we use the term group-box to refer to both the simple-group-box and the compound-group box instead of mentioning the two types of boxes separately. Similarly, the term group-name refers to both the simple-group-name and the compound-group-name.

A Two Dimensional Graphical Layout

By representing points, simple-groups and compound-groups as boxes, the graphical editor may display the contents of the XML file in a 2-dimensional graphical layout consisting of compound-group-boxes that contain simple-group-boxes which, in turn, contain point-boxes.

Thus in the detailed-view, the program shows how point-boxes are nested within a simple-group-box and how simple-group-boxes are nested within a compound-group-box.

FIG. 4 shows a zoomed-out version of a larger amount of the detailed-view of our example article “Apple, America and a Squeezed Middle Class”.

A Few Operations:

The graphical editor may provide many useful operations for the user. For example:

The editor can receive user selection of text from the contents of a point-box or group-box and copy such selected text to the point-name or the group-name of the point-box or group-box. FIG. 65 shows an example of selected-text 6501 and the command 6502 to save it as the title of the point-box.

Other examples of operations: On receiving commands from the user, the editor may:

automatically resize the length of the box to fit the contents of the box.

Break a point-box into two point-boxes

Break a group-box into two group-boxes

Merge two point-boxes into one point-box

Merge two group-boxes into one group-box b) A Brief Overview of the Graphical-Browse-View Graphical-browse-views are a set of hierarchical graphical views that together represent the entire article at various levels of detail. Together they provide multi-level summaries of the article and they may help the user browse to various parts of the article.

An Example of a Level-1 Graphical-Browse-View:

FIG. 6 shows the level-1 graphical-browse-view of the article titled “Apple, America and a Squeezed Middle Class”. The term “Level-1” means that it is at the top-level in the hierarchical set of graphical-browse-views.

The level-1 graphical-browse-view in our example contains two columns of elements. The elements are called browse-elements.

The 1$^{st}$ column is a compound-group-symbol. It contains a header-element 601 at the top and three member-elements 602 602 602 below it.

The column as a whole corresponds to the 1$^{st}$ higher-level compound-group listed in the 1$^{st}$ entry in Table-7 above.

The three member-elements in the column correspond to the three compound-groups that are contained in the 1$^{st}$ higher-level compound-group.

The 2$^{nd}$ column is a compound-group-symbol. It contains a header-element 603 and four member-elements 604 604 604 604 below it.

The column as a whole corresponds to the 2$^{nd}$ higher-level compound-group that is listed in the 2$^{nd}$ entry in Table-7 above.

The four member-elements in that column correspond to the three compound-groups and one point that are contained in the 2$^{nd}$ higher-level compound-group.

In this document, the term browse-element refers to any header-element, member-element or point-symbol. They are described in more detail later in this document.

As described earlier in this document, the program may save information about the points, simple-groups and compound-groups in an XML file. Such information may include the identification of all the outermost compound-groups, simple-groups and points, the order in which they may be displayed in the various views and the article-matter each of them may cover etc. The program may use such information in constructing and displaying the graphical-browse-views. In the hierarchical set of graphical-browse-views, the graphical-browse-views that are immediately below the level-1 graphical-browse-view are said to be level-2 graphical-browse-views.

The graphical-browse-views that are immediately below the level-2 graphical-browse-views are said to be level-3 graphical-browse-views and so on.

An Example of a Level-3 Graphical-Browse-View:

FIG. 7 shows a level-3 graphical-browse-view from the article titled “Apple, America and a Squeezed Middle Class”.

This graphical-browse-view contains six columns of browse-elements. Each column is a simple-group-symbol. The six columns of browse-elements are arranged in two horizontal sections. Each horizontal section is called a tier.

In this example, the 1$^{st}$ tier i.e. the upper tier 701 contains four columns of browse-elements. The 2nd tier 702 i.e. the lower tier contains two columns of browse-elements.

FIG. 7 also shows that a browse-element may contain a graphical image 703.

Browse-Element Text:

The text that is displayed in a browse-element is known as browse-element-text.

A browse-element may represent a compound-group, simple-group or a point.

When a browse-element represents a compound-group, the compound-group's name is displayed in form of browse-element-text.

When a browse-element represents a simple-group, the simple-group's name is displayed in form of browse-element-text.

When a browse-element represents a point, the point's name is displayed in form of browse-element-text.

c) A Brief Overview of the Text-Column

Text-column is a single-columnar view of the detailed-view.

FIG. 8 shows a snapshot of partial contents of the text-column 801 of the article titled "Apple, America and a Squeezed Middle Class".

The text column's snapshot in FIG. 8 shows simple-group-names 802, point-names 803 and the article-matter 804 under each point-name.

To the left of the text column is a narrow-frame 805 that shows the graphical-browse-views of the article.

d) A Brief Overview of the Collapsed-View

Collapsed-View.

The Program May Hide the Content of Boxes

To create the collapsed-view, the program may start with the detailed-view and it may hide the article-matter content of the point boxes. It may also hide any article-matter that may be present in the simple-group-boxes and compound-group-boxes.

The program may show the point-names of the point-boxes and the group-names of the group-boxes. It results in a large reduction in the vertical size of the view.

May Reduce the Width of Boxes

The program shows the point-names and group-names in a much reduced width instead of the original width.

In order to fit in such reduced width, the program may display the $2^{nd}$ version of the point-names and group-names in a format similar to two-line browse-element-text, instead of the $1^{st}$ version of the point-names and group-names. As a result, the width of the graphical view is reduced very much.

Enables the User to See the Overall Layout

The resulting view is called the collapsed-view. Due to its reduced height and width, the collapsed view may help the user to get a better feel of the overall layout of the detailed-view while still being able to easily read the point-names and group-names ($2^{nd}$ version).

FIG. 9 shows the collapsed-view of the article titled "Apple, America and a Squeezed Middle Class". Here the group-names 901 and point-names 902 are shown in almost half the original width. As a result, the width of the view is reduced by almost half.

Please refer to the zoomed-out detailed-view in FIG. 5. The collapsed view in FIG. 9 shows the layout of the detailed-view in terms of the relative placement of boxes. The point-names and group-names are shown in the collapsed-view and help the user in identifying the various boxes.

Expand Box to View the Content

When the user clicks on a point-name, the program may expand the point-box to its original height and width and display the article-matter contained in the point-box. FIG. 10 shows the collapsed view with two point-boxes in the expanded state 1001 and 1002.

When the user clicks on the point-names of those point-boxes that have been expanded, the program may collapse the point-boxes to their reduced height and width and hide the contents of those point-boxes.

How the Graphical Views are Used

In response to a user's commands, the program may display graphical views on one or more display units and/or produce audio output based on the text in the graphical views. By doing so, the program may help the user to grasp the information and the organization of the information in the article in significantly less time and may help the user to better recall the information and the organization of the information in the article at a later time.

Detailed-View

1. The graphical editor may enable the user to perform a wide variety of operations. For example, the user can add a new point by adding a new point-box in the detailed-view, enter text, graphics etc. in the point-box, edit the contents of the point-box.
   The user can modify a point-name, a group-name, move a point-box from one group-box to another group-box, delete a point-box, delete a group-box, add a new group-box, add a tier-divider etc.
2. The detailed-view is also useful for reading the article-matter. Its 2-dimensional layout allows a group of logically cohesive points to be visually clustered together. It enables the user to view those points with an easy glance instead of scrolling up and down in a column of text.

Graphical-Browse-Views

1. The user can get a quick overview of the article by browsing through the set of graphical-browse-views without even reading the text of the article. The graphical-browse-views provide a high-level summary as well as low-level i.e. detailed summary of the article.
2. When the user notices any point-name or group-name that is of interest, the user can navigate to the corresponding article-matter in the text-column.

Text-column—it is a single-columnar view of the detailed-view.

1. The text-column shows the article-matter. When the user commands the program to display the text-column, the program may display the text column to the right of the graphical-browse-views
2. The program may display the text in the traditional wrap-around format or in break-and-indent-format which is described later in this document.

Collapsed-View.

1. The collapsed-view helps the user see the overall layout of the detailed view. When the user has the overall view in sight, it may be easier for the user to move the point-boxes, group-boxes in order to improve the overall layout of the detailed-view.
   By encapsulating each point and its point-name in a point-box and a group of points in a group-box, the program may enable the user to easily move the point-boxes, group-boxes when the user needs to change the sequence of points in a group, change the sequence of groups in an article or to move a point-box from one group to another group or to move a group-box from one group to another group in order to improve the organization of the article.
2. The program may enable the user to expand the individual point-boxes to view their text-content while still being able to see the overall view. Viewing the content of one or more point-boxes while still seeing the overall view provides an alternative and advantageous mode of browsing.

The Detailed-View

The graphical editor may display the detailed-view of the arpage as a two-dimensional layout of group-boxes and point-boxes.

An Example of the Detailed-View

FIG. 4 shows a small part of the detailed-view of the example article "Apple, America and a Squeezed Middle Class".

The detailed-view shows a point-box 401 that contains:

a) the point-name 402:

"Steve Jobs to President Obama: Those offshore jobs are not coming back."

b) the article-matter 403 that is associated with this point

It also shows a point-box 404 that contains:

a) the point-name 405:

"The Vast scale of Overseas Factories and Workers' Quality have outpaced the U.S."

b) the associated article-matter 406 from the article

FIG. 4 shows the two point-boxes described above 401 404 together with a third point-box 407 are enclosed in a simple-group-box 408 that has the name:

"Obama: Why can't that work come home?"

That simple-group-box 408 (together with other simple-group-boxes that are outside the view of FIG. 4) is enclosed in a compound-group-box 409 that has the name "Has Apple's growth created jobs in America?" (Please refer to the 1$^{st}$ entry in Table 5. It lists the simple-groups that are grouped together to form the compound-group "Has Apple's growth created jobs in America?".)

Similarly, we see the point-box 410 named "The challenging goals of producing a new cellphone". That point-box, together with another point-box 411, is enclosed in a simple-group-box 412 that has the name "The goal of producing high quality iPhones at low cost meant manufacturing abroad" (Please refer to the 6th entry in Table 3.)

The simple-group-box "The goal of producing high quality iPhones at low cost meant manufacturing abroad" 412, and the simple-group-box 413 together with other simple-group-boxes that are outside the view of FIG. 4, are enclosed in a compound-group-box 414 that has the name "Asian supply chains and factories are fast, flexible and have resources". (Please refer to the 2nd entry in Table 5.)

The graphical editor may enable the user to perform operations such as editing, inserting, deleting, positioning of point-boxes, simple-group-boxes, and compound-group-boxes etc. in the detailed-view.

The Building-Blocks of the Detailed-View

The building blocks of the detailed-view are:

Point-box

Simple-group-box

Compound-group-box

As mentioned earlier,

Each point from the article is mapped to a point-box.

Each simple-group is mapped to a simple-group-box.

Each compound-group is mapped to a compound group-box.

In the detailed-view, the user can see how the point-boxes are grouped together and nested within simple-group-boxes which are in turn nested within compound-group-boxes.

The point-box, simple-group-box and compound-group-box are also used as building blocks in constructing the collapsed-view and the text column.

The Point-Box

Some of the components of a point-box may be:

1. Point-name (it is also referred to as the 1$^{st}$ version of point-name)
2. A 2$^{nd}$ version of point name. It is often shorter than the 1$^{st}$ version of point-name.
3. A 3rd version of point name. It is often shorter than the 2$^{nd}$ version of point-name. It serves as a part of a Universal Locator of Information Element (ULIE)
4. the article-matter that is associated with the point-name
5. A flag to indicate that the "2$^{nd}$ version of point-name provides sufficient information—the user need not view article-matter in the text-column or the pop-up-window"
6. Source-IDs
7. Subset-IDs, Subset-attributes
8. Text color and background color of the point-name
9. Text color and background color for the text content of the point-box
10. Keyword tags
11. Date-modified-on, version-ID FIG. 11 shows an example of the point-box. A point-box 1101 contains a point name and its associated article-matter 1102. The 1$^{st}$ version of the point-name 1103 is displayed at the top of the point-box.

As described earlier, the program may assign a point-name to a point in the article. It is also referred to as the 1$^{st}$ version of point-name. In addition, the program may assign a 2$^{nd}$ version of the point name and a 3$^{rd}$ version of the point-name to the point.

2$^{nd}$ Version of the Point-Name

The program may create a 2$^{nd}$ version of the point-name that describes the article-matter associated with the point and fits on the two lines of browse-element-text as described later in this document. The 2$^{nd}$ version of point-name is often shorter than the 1$^{st}$ version of point-name.

3$^{rd}$ Version of the Point-Name

The program may create a 3$^{rd}$ version of the point-name that may be made of keywords from the 1$^{st}$ and 2$^{nd}$ versions of the point-name or it may simply be a sequence of characters.

The 3$^{rd}$ version of the point-name of the point-box must be distinct from the 3$^{rd}$ version of the names of all its siblings. The 3$^{rd}$ version of the point-name may be used to construct the Universal Locator of Information Element (ULIE) as described later in this document.

The Simple-Group-Box

Some of the components of a simple-group-box may be:

1. Simple-group-name (it is also referred to as the 1$^{st}$ version of simple-group-name)
2. A 2$^{nd}$ version of simple-group-name. It is often shorter than the 1$^{st}$ version of simple-group-name.

3. A 3rd version of simple-group-name. It is often shorter than the $2^{nd}$ version of simple-group-name. It serves as a part of a Universal Locator of Information Element (ULIE)
4. Article-matter that belongs to the simple-group but was not suitable to be associated with a point-name—hence it is associated directly with the simple-group
5. Links to the points that are the children of the simple-group, the order in which they may be displayed in the simple-group-symbol and the various graphical-views.
6. Source-IDs
7. Subset-IDs, Subset-attributes
8. Text color and background color of the simple-group-name
9. Background color of the simple-group-box in the detailed-view
10. Background color of the text in member browse-elements in the simple-group-symbol
11. Keyword tags
12. Date-modified-on, version-ID
13. "keep expanded" setting FIG. 12 shows an example of the simple-group-box. A simple-group-box 1201 contains a simple-group-name and possibly any associated article matter. It encloses point-boxes 1203 1204 1205. The $1^{st}$ version of the simple-group-name 1202 is displayed at the top of the simple-group-box. Here the point-boxes inside the simple-group have been rearranged into two columns.

As mentioned earlier, the program may assign a simple-group-name to a simple-group in the article. It is also referred to as the $1^{st}$ version of simple-group-name. In addition, the program may assign a $2^{nd}$ version of the simple-group-name and a $3^{rd}$ version of the simple-group-name to the simple-group.

$2^{nd}$ Version of the Simple-Group-Name

The program may create a $2^{nd}$ version of the simple-group-name that fits on the two lines of browse-element-text as described later in this document. The $2^{nd}$ version of simple-group-name is often shorter than the $1^{st}$ version of simple-group-name. Like the $1^{st}$ version, the $2^{nd}$ version of the simple-group-name-describes the article-matter covered by the simple-group.

$3^{rd}$ Version of the Simple-Group-Name

The program may create a $3^{rd}$ version of the simple-group-name that may be made of keywords from the $1^{st}$ and $2^{nd}$ versions of the simple-group-name or it may simply be a sequence of characters.

The $3^{rd}$ version of the simple-group-name of the simple-group-box must be distinct from the $3^{rd}$ versions of the names of all its siblings.

The Compound-Group-Box

The components of a compound-group-box are:

1. Compound-group-name (it is also referred to as the $1^{st}$ version of compound-group-name)
2. A $2^{nd}$ version of compound-group-name. It is often shorter than the $1^{st}$ version of compound-group-name.
3. A 3rd version of compound-group-name. It is often shorter than the $2^{nd}$ version of compound-group-name. It serves as a part of a Universal Locator of Information Element (ULIE)
4. Article-matter that belongs to the compound-group but was not suitable to be associated with a point-name or a simple-group—hence it is directly associated with the compound-group
5. Links to the compound-groups, simple-groups and points that are the immediate children of the compound-group, the order in which they may be displayed in the compound-group-symbol and the various graphical-views.
6. Source-IDs
7. Subset-IDs, Subset-attributes
8. Text color and background color of the compound-group-name
9. Background color of the compound-group-box in the detailed-view
10. Background color of the text in member browse-elements in compound-group-symbol
11. Keyword tags
12. Date-modified-on, version-ID A compound-group-box contains a compound-group-name and possibly any associated article matter. It encloses point-boxes, simple-group-boxes and/or compound-group-boxes. FIG. 13 shows an example of the compound-group-box 1301. The $1^{st}$ version of the compound-group-name 1302 is displayed at the top of the compound-group-box. This compound-group-box contains six simple-group-boxes 1303 1304 1305 1306 1307 1308. Here the simple-group-boxes inside the compound-group-box have been rearranged into six columns.

The program may assign a $2^{nd}$ version of the compound-group-name and a $3^{rd}$ version of the compound-group-name to the compound-group.

$2^{nd}$ Version of the Compound-Group-Name

The program may create a $2^{nd}$ version of the compound-group-name that fits on the two lines of browse-element-text. The $2^{nd}$ version of compound-group-name is often shorter than the $1^{st}$ version. Like the $1^{st}$ version, it-describes the article-matter covered by the compound-group.

$3^{rd}$ Version of the Compound-Group-Name

The program may create a $3^{rd}$ version of the compound-group-name that may be made of keywords from the $1^{st}$ and $2^{nd}$ versions of the compound-group-name or it may simply be a sequence of characters.

The $3^{rd}$ version of the compound-group-name of the compound-group-box must be distinct from the $3^{rd}$ versions of the names of its siblings.

Special Operations on Point-Box, Simple-Group-Box, Compound-Group-Box

The program may provide special operations on a point-box:

1. Display the text content in break-and-indent-format
2. Display text content in wrap-around format
3. Display one or more of the $1^{st}$, $2^{nd}$, or $3^{rd}$ version of the point-name
4. Hide all versions of the point-name
5. Hide text contents of the point-box The program may provide similar operations on a simple-group-box and a compound-group-box.

The 3rd Version of the Names of Boxes is Used for Creating a Universal Locator of Information Element (ULIE)

A point-box may be at the outermost level or it may be nested inside a simple-group-box or a compound-group-box.

A simple-group-box may be at the outermost level or it may be nested inside a compound-group-box.

A compound-group-box may be at the outermost level or it may be nested inside a compound-group-box.

Given any point-box, simple-group-box or compound-group-box, either the given box is an outermost box or an outermost box may be reached by going to the given box's parent, then to parent's parent, then to parent's parent's parent and so on till an outermost box is reached. The path thus taken is a unique sequence of boxes from the given box to an outermost box. For each box in the arpage, the program detects the unique sequence of boxes from an outermost box to the given box and represents sequence of boxes by means of a sequence of $3^{rd}$ version of the names of boxes in the sequence.

Given that the $3^{rd}$ version of the name of a box is distinct from the $3^{rd}$ version of the names of its siblings, the sequence of $3^{rd}$ version of the names of boxes, as described above, may be used as a unique locator of any box within the arpage.

For example:

Consider the point-box having the point-name "The challenging goals of producing a new cellphone". Its $3^{rd}$ version of point-name is "goals of new cellphone"

- Its parent is a simple-group-box having the simple-group-name "The goal of producing high quality iPhones at low cost meant manufacturing abroad". Its $3^{rd}$ version of simple-group-name is "high quality at low cost"
  - Its parent is a compound-group having the compound-group-name "Asian supply chains and factories are fast, flexible and have resources". Its $3^{rd}$ version of compound-group-name" is "Asian fast flexible"
    - Its parent is a compound-group-box having the compound-group-name "Apple's job creation in U.S. is affected by manufacturing abroad". Its $3^{rd}$ version of compound-group-name is "Apple job creation". It is an outermost box.

A Locator within the Arpage

The program may create the sequence of $3^{rd}$ version of names of boxes that are in the path from the outermost box to the point-box in the example above as follows:

Apple Job Creation/Asian Fast Flexible/High Quality at Low Cost/Goals of New Cellphone Within the arpage, this sequence of $3^{rd}$ version of names may be used as a unique locator of the point-box under consideration.

As an optimization, the program may omit the names in the leading part of the sequence above if the remaining part of the sequence is unique in the arpage.

A Locator Over a Network or a Database Etc.

In the current art, the arpage may be located over the Internet by means of an URL such as "http://www.arzillion.com/MyarPg/UMGOJB/Apple-article"

In the arpage, the contents of the box may be termed as an "Information Element". By adding the box-locator at the end of the arpage's Internet-based URL, the program may create a new locator as follows:

"http://www.arzillion.com/MyarPg/UMGOJB/Apple-article/Apple job creation/Asian fast flexible/high quality at low cost/goals of new cellphone"

With such a locator, a point consisting of say, just a single sentence may be located over the Internet. Hence the new locator is called a "Universal Locator of Information Element (ULIE)"

Here the Internet has been referred to just as an example. The ULIE is not limited to the Internet. A similar ULIE may be constructed for locating a point in an article over any network, database etc.

Layout of the Detailed-View

In current art, an article's layout consists of continuous running text along with section headings that are inserted at various locations in such continuous text. In contrast, the program in the present method maps the points, simple groups and compound groups to a two-dimensional graphical layout called the detailed-view.

In the detailed view:

- the point-boxes are most often enclosed by simple-group-boxes.
- the simple-group-boxes are most often enclosed by compound-group-boxes
- the compound-group-boxes are often enclosed in compound-group-boxes.

Two Aspects

There are two aspects of two-dimensional layout of the detailed-view:

1. The program may perform the layout in such a pattern that it may enable the user to grasp the 2-dimensional layout quickly when the user sees the detailed-view of any article
2. Since a simple-group-box contains point-boxes that are logically cohesive, the program provides operations that may enable the user to rearrange the layout such that a simple-group's points may be visually clustered together.

Thus the user may be able to view those points with an easy glance instead of scrolling up and down in a single vertical column.

1st Aspect

1. The program may perform the layout in such a pattern that it may enable the user to grasp the 2-dimensional layout quickly when the user sees the detailed-view of any article

Structural Hierarchy of an Article is Different

The structural hierarchy of one article can be very different from the structural hierarchy of another article and again very different from the structural hierarchy of yet another article and so on.

In other words, the number of compound-group-boxes and their nested contents of compound-group-boxes, simple-group-boxes and point-boxes varies from article to article.

When the user begins to view the detailed-view of an article, the user does not have a prior knowledge of the structural hierarchy of the article. Still, the two-dimensional layout may be such that user can quickly grasp the structural hierarchy of the detailed-view.

In regards to the aspect mentioned above, the program may create the 2-dimensional layout as follows:

Place the Outermost Boxes Left to Right a) Each of the outermost compound-group-boxes, simple-group-boxes and the point-boxes may be placed side-by-side by the program in a left-to-right-placement-as-per-the-sequence-in-the-article.

Left-to-right-placement-as-per-the-sequence-in-the-article means that a compound-group-box, simple-group-box or the point-box that covers an earlier part of the article is placed to the left of a compound-group-box, simple-group-box or the point-box that covers a later part of the article If One of the Immediate Children is a Compound-Group Place the Immediate Children Left to Right Else Place the Immediate Children and their Children Top to Bottom b) The boxes that have already been placed may be visited by the program from left to right to detect the boxes whose inner boxes have not been placed yet. For each such-detected-box, the boxes that are directly contained by it may be placed by the program as follows:

If the such-detected-box contains at least one compound-group, then all the boxes that are directly contained by the such-detected-box may be placed side-by-side within the such-detected-box in a left-to-right-placement-as-per-the-sequence-in-the-article.

else all the boxes that are directly and indirectly contained by the such-detected-box may be placed in a single vertical column in the such-detected-box in a top-to-bottom-placement-as-per-the-sequence-in-the-article while preserving the nesting of the inner boxes.

Please note that when boxes are placed within a parent box, the width of the parent box may increase. It will result in shifting those boxes that are to its right further rightwards.

c) Step b may be repeated till all the inner boxes of all the boxes have been placed. In the description above, the order "as-per-the-sequence-in-the-article" has been used only as an example. The user may specify, via user settings or other means, a different order to be used as default. The information about the order in which the points, simple-groups and compound-groups may be displayed in various graphical views may be saved in the XML file.

As a Result, the Compound-Groups and their Siblings are Side by Side; their Inner Boxes are Placed Top to Bottom in a Vertical Column The resulting layout may enable the user to see the compound-groups and their siblings side-by-side in the computer display viewport and the user can see all the compound-groups by scrolling to the right. It may give the user a high-level view of the structural hierarchy of the article and a sense of predictability about the layout of any article.

FIG. 14 shows the layout of the detailed-view of our example article.

When the inner boxes of a compound-group are placed in a single vertical column, the point-boxes within a simple-group may not be visually clustered together. The user may have to scroll up or down and thereby lose sight of one point-box in order to view another point-box from the simple-group. This issue is addressed by the 2$^{nd}$ aspect below.

2$^{nd}$ Aspect

2. Since a simple-group-box contains point-boxes that are logically cohesive, the program provides operations that may enable the user to rearrange the layout such that a simple-group's points may be visually clustered together.

Thus the user may be able to view those points with an easy glance instead of scrolling up and down in a single vertical column.

In regards to the aspect mentioned above, the program may provide the operations to re-layout the point-boxes in a simple-group in two, three or more columns—as per the width of computer display viewport. In this way, the layout of point-boxes in a simple-group can fully utilize the width and height of the computer display viewport. It may enable the user to view those points with an easy glance.

The Program Enables the User to Change the Layout as Per the User's Preference

In summary, with operations mentioned above, the program may enable the user to change the layout so that the point-boxes in a simple-group may be placed in multiple columns and multiple rows within the simple-group.

Similarly, the program may enable the user to change the layout so that the simple-group-boxes in a compound-group are placed in multiple columns and multiple rows within the compound-group-box.

The user can also specify such operations as default operations and thus change the default layout described under aspect 1 above.

As mentioned earlier, the program may save the information about the order in which the points, simple-groups and compound-groups may be displayed in various graphical views in the XML file.

When the user moves point-boxes and group-boxes from one location to another location in the detailed-view or commands the program to rearrange the point-boxes or group-boxes in the detailed-view, such operations may result in changing the order in which the point-boxes and group-boxes are displayed in the detailed-view.

The program may save the new order in which the point-boxes and group-boxes are displayed in the detailed-view in the XML file. However, depending on the user-settings, the new order of displaying the point-boxes and group-boxes in the detailed-view may or may not automatically change the order in which the points, simple-groups and compound-groups are displayed in other views.

The program may provide user settings or operation which may enable the user to change the order in which the points, simple-groups and compound-groups are displayed in other views. Such changes in the order of display in other views may be based on the new order of display in the detailed-view or they may be independent of the order of display in the detailed-view.

The two-dimensional layout of the detailed-view and the background colors of point-boxes, simple-group-boxes and compound-group-boxes help the user in making greater use of visual memory and topographic memory of the human mind and thus makes it easier to view and recall the content and the organization of the article.

Break-and-Indent Text-Formatting

The program may display the article-text in many places such as the point-boxes, group-boxes, text-column, pop-up windows etc.

The program may display the text in the traditional formats or the break-and-indent format.

The break-and-indent formatting is described below.

In the current art, text is formatted in the traditional wrap-around format. In such a format, when a sentence spans two or more lines, it is difficult to readily grasp the whole sentence. As a result, a reader often has to read the sentence two or more times in order to fully grasp the sentence. The problem occurs regardless of whether the text is formatted in a single-column or in multiple-columns.

The program uses a new method of formatting the text which may enable the user to read and grasp the text more easily. It may format the text as follows:

a) Start each sentence on a new line
b) Place a vertical space between the end of a sentence and the start of the next sentence. An example of such vertical place is a blank line.

The program may break each sentence into a sequence of easy-to-grasp phrases and make the sentence easier to read by means of the following:

c) placing each phrase on a separate line
d) indenting the text on each line with regards to the text on other lines that are part of the same sentence.
e) In a long sentence, insert vertical space before a major part of the sentence. Such vertical space may be less than the vertical space that is placed between the end of a sentence and the start of the next sentence.

We use the term "break- and indent" to refer to such formatting.

The program may identify individual sentences in the article-text.

It may break each sentence into a sequence of phrases which when placed on separate lines will result in easier readability and understanding. The program may also compute the amount of indentation for each phrase so that when the phrases are placed on consecutive lines at their respective computed indentation, it may result in a better flow of reading and grasping the sentence.

In one embodiment of the invention, the program may break the sentences into phrases and determine the amounts of indentation of phrases as described below.

The program may use a few indent-sizes. Examples of indent sizes are:

1. Zero-indent: equivalent to 0 spaces
2. Very-small-indent: equivalent to about 2 spaces
3. Small-indent: in the range of about 3 to 5 spaces
4. Medium-indent: in the range of about 6 to 10 spaces
5. Large-indent: in the range of about 11 to 16 spaces
6. Very-Large-indent: in the range of about 17 to 32 spaces
7. "Toward-the-right-margin" indent: sufficiently large so that the end of the phrase reaches to or near the right margin. Based on the length of the phrase and indent position of the preceding lines in the current sentence, the actual value of "To the right-margin" indent may be in the range of any of the abovementioned indent-sizes or it may be significantly larger.

As described below, the program may pick one of these indent-sizes as the amount by which the text on a line is indented with regards to text on another line that is part of the current sentence.

Example 1

Consider the sentence:

Last year, it earned over $400,000 in profit per employee, more than Goldman Sachs,
Exxon Mobil or Google.

The program may break the sentence above into three phrases:

phrase#1: Last year,
phrase#2: it earned over $400,000 in profit per employee,
phrase#3: more than Goldman Sachs, Exxon Mobil or Google.

The program may place each phrase on a separate line and indent the text on each line as shown in FIG. 60 Example 1 and below. Formatting the sentence in this manner enables the user to identify the phrases in the sentence easily and provides an easy left-to-right flow in visually scanning the phrases.

Last year,
    it earned over $400,000 in profit per employee,
        more than Goldman Sachs, Exxon Mobil or Google.

The General Rule is:

Place phrase#1 at the left margin on the 1st line of the sentence. Indent phrase#2 by medium-indent with regards to phrase#1. Indent phrase#3 by medium-indent with regards to phrase#2. And so on.

Exceptions to this rule may occur as described in, but not limited to, specific relationships of phrases in examples below.

Breaking the Sentence into Phrases:

The program's identification of phrases in a sentence is not based on the definition of phrases as found in traditional grammar books. Rather, the program may identify successive phrases in a sentence based on their content and length so that when placed on separate lines, they may result in easier comprehension and a good flow of reading.

As an example, consider the following sentence:

I pledge allegiance to the flag of the United States of America.

In a traditional grammar book, the sentence above is separated into the following phrases:

I pledge allegiance
to the flag
of the United States of America.

However, the program may break the sentence into the phrases shown below in order to provide a better flow of reading.

I pledge allegiance to
    the flag of the United States of America.

Example 2

Consider the sentence:

Apple has become one of the best-known, most admired and most imitated companies on earth, in part through an unrelenting mastery of global operations.

The program may break the sentence above into five phrases:

phrase#1: Apple has become one of the
phrase#2: best-known, most admired
phrase#3: and most imitated companies on earth,
phrase#4: in part through
phrase#5: an unrelenting mastery of global operations.

The program may place each phrase on a separate line and indent the text on each line as shown in FIG. 60 Example 2 and below.

Apple has become one of the
  best-known, most admired
    and most imitated companies on earth,
      in part through
      an unrelenting mastery of global operations.

As given in the rule above, phrase#2 is indented by medium indent with regards to phrase#1.

Phrase#2 and phrase#3 together contain a list of adjectives that together identify a category of companies. Hence Phrase#2 and phrase#3 are more closely associated with each other than with the other phrases. Hence with regards to phrase#2, phrase#3 is indented by a small-indent. The small-indent keeps the two phrases visually close while still providing a left-to-right flow of downward visual scan.

With regards to phrase#3, phrase#4 is indented by medium-indent as given in the rule in example 1 above. Thus phrase#2 and phrase#3 are visually close to each other because of the small-indent. And phrase#4 is more distant from phrase#3 due to the medium-indent.

Phrase#4 and phrase#5 together provide the reason how Apple has become successful. Hence phrase#4 and phrase#5 are closely associated with each other. The information content of Phrase#5 is a lot more than the information content of phrase#4 to the extent that phrase#5 predominantly contains the reason how Apple has become successful. Hence phrase#5 is placed at the same indent as that of phrase#4. It makes phrase#5 more noticeable and phrase#4 less noticeable.

Here the general rule is:

When two consecutive phrases Phrase#n and phrase#n+1 are more closely associated with each other than with the other phrases of the sentence:

Indent phrase#n+1 by a small indent with regards to phrase#n.

Another General Rule is:

When two consecutive phrases Phrase#n and phrase#n+1 are closely associated with each other and are such that phrase#n is a phrase such as “in part through” or: “there simply aren't” and thus it contains much less information than phrase#n+1, then:

Indent phrase#n+1 by zero-indent with regards to phrase#n. In other words, place phrase#n+1 at the same indent as that of phrase#n

Example 3

In some instances, keeping a line at the same indent as the line preceding results in another desirable effect: it prevents monotonous indentation. Consider the variation (in FIG. 60 Example 3) of formatting the sentence above:

Apple has become one of the
  best-known, most admired
    and most imitated companies on earth,
      in part through
      an unrelenting mastery of global operations.

In this example, each line is indented by the same amount with regards to the line immediately preceding it. Such simple constant-increment-indenting looks monotonous and makes it difficult to focus on the phrases in the sentence.

This shows that simple constant-increment-indenting may not provide good results in long sentences.

Example 4

Consider the sentence:

In 1990, while Mr. Jobs was running NeXT, which was eventually bought by Apple, the executive told a reporter that “I'm as proud of the factory as I am of the computer.”

The program may break the sentence above into four phrases:

phrase#1: In 1990, while Mr. Jobs was running NeXT,
phrase#2: which was eventually bought by Apple,
phrase#3: the executive told a reporter that
phrase#4: “I'm as proud of the factory as I am of the computer.”

The program may place each phrase on a separate line and indent the text on each line as shown in FIG. 60 Example 4 and below.

In 1990, while Mr. Jobs was running NeXT,
  which was eventually bought by Apple,
the executive told a reporter the
  “I'm as proud of the factory as I am of the computer.”

In the example above, phrase#1 provides the timeframe for phrase#3 and phrase#4. Phrase#2 is closely associated with Phrase#1 because it describes “NeXT” that is mentioned in phrase#1. But phrase#1 is not dependent on phrase#2 to complete its information and the information content of phrase#2 is not important for the rest of the sentence. Thus phrase#2 is an appendage to phrase#1 and is of lesser importance.

Hence phrase#2 is placed with a large amount of indent below phrase#1. Phrase#3 is in logical continuation with phrase#1. Hence phrase#3 is placed with a medium amount of indent with regards to phrase#1. The indent provides a good left-to-right flow of downward visual scan of the overall sentence. Phrase#3 and phrase#4 are closely associated with each other and their information content is of comparable importance. Hence Phrase#4 is placed with a small indent with regards to phrase#3.

The General Rule is:

When two consecutive phrases phrase#n and phrase#n+1 are such that phrase#n+1 is an appendage of phrase#n and is less important to the other phrases in the sentence:

Indent phrase#n+1 by very-large-indent with regards to phrase#n.

Example 5

Consider the sentence:

A few years after Apple began building the Macintosh in 1983, for instance, Mr. Jobs bragged that it was “a machine that is made in America.”

In the sentence above, the phrase “A few years after Apple began building the Macintosh” as a whole provides the timeframe for the sentence. The words “in 1983, for instance,” as a separate phrase, do not provide a good flow for the sentence.

Hence the program keeps the phrase “A few years after Apple began building the Macintosh in 1983, for instance,” as a whole phrase. However, it does not fit on one line. Hence the program divides it into two phrases: “A few years after Apple began building” and “the Macintosh in 1983, for instance,”.

Thus the program may break the sentence above into four phrases:

phrase#1: A few years after Apple began building
phrase#2: the Macintosh in 1983, for instance,
phrase#3: Mr. Jobs bragged that
phrase#4: it was “a machine that is made in America.”

The program may place each phrase on a separate line and indent the text on each line as shown in FIG. 61 Example 5 and below.

A few years after Apple began building
  the Macintosh in 1983, for instance,
Mr. Jobs bragged that
  it was "a machine that is made in America."

Here phrase#2 is really a tail of phrase#1. Hence it is placed with a large-indent below phrase#1. While the amount of indent is large, the program limits the amount of indent so that the phrase can still fit on the line.

Phrase#3 is placed with a medium amount of indent with regards to phrase#1. Phrase#4 is closely associated with phrase#3. Hence Phrase#4 is placed with a small-indent with regards to phrase#3.

Example 6

Consider the sentence:

Most other American electronics companies had already gone abroad, and Apple, which at the time was struggling, felt it had to grasp every advantage.

The program may break the sentence above into four phrases:

phrase#1: Most other American electronics companies
phrase#2: had already gone abroad,
phrase#3: and Apple, which at the time was struggling,
phrase#4: felt it had to grasp every advantage.

The program may place each phrase on a separate line and indent the phrases as shown in FIG. 61 Example 6 and below.

Most other American electronic companies
  had already gone abroad,
and Apple which at the time was struggling,
  felt it had to grasp every advantage.

The sentence above is a compound sentence. It contains two independent clauses that are joined by the word "and". In other words: The sentence above is made of two major parts. Phrase#1 and phrase#2 together make the first major part and phrase#3 and phrase#4 together make the second major part.

In order to make the two major parts of the sentence noticeable, Phrase#3 is indented by a medium-indent with regards to phrase#1 and phrase#2 is indented by a large-indent with regards to phrase#1. To provide an overall left-to-right flow, phrase#4 is indented by a small-indent with regards to phrase#2.

The General Rule is:

When four consecutive phrases phrase#n, phrase#n+1, phrase#n+2 and phrase#n+3 are such that phrase#n and phrase#n+1 together form a major part of a sentence and similarly, phrase#n+3 and phrase#n+4 form a major part of the sentence:
- a) Indent phrase#n+2 by medium-indent with regards to phrase#n.
- b) Indent phrase#n+1 by a large-indent with regards to phrase#n.
- c) Indent phrase#n+3 by small-indent with regards to phrase#n+1.

Example 7

Consider the sentence:

Apple executives believe there simply aren't enough American workers with the skills the company needs or factories with sufficient speed and flexibility.

The program may break the sentence above into five phrases:

phrase#1: Apple executives believe
phrase#2: there simply aren't
phrase#3: enough American workers
phrase#4: with the skills the company needs
phrase#5: or factories with sufficient speed and flexibility.

The program may place each phrase on a separate line and indent the text on each line as shown in FIG. 61 Example 7 and below.

Apple executive believe
  there simply arent't
  enough American workers
    with the skills the company needs
  or factories with sufficient speed and flexibility.

Phrase#3 and phrase#5 together form a list. Hence phrase#5 is indented by very-small-indent with regard to phrase#3. Phrase#4 completes the information in phrase#3 hence it is indented by a larger amount under phrase#3. Placing phrase#3 at the same indent as phrase#2 makes phrase#3 more noticeable.

Placing phrase#3 at the same indent as phrase#2 provides another benefit. It prevents undue scatter.

The General Rule Regarding a List is:

A list may occur in the form of "x or y". Other forms of a list include "x, y or z", "x and y", "x, y and z" etc. A list may have other forms that are not listed here.

Here "x" is said to be a member of the list in which it occurs. Similarly, "y" is said to be a member of the list in which it occurs. Similarly, "z" is said to be a member of the list in which it occurs.

The word "or" may be grouped with the words that precede it or it may be grouped with the words that follow it (as shown in the example above). Similarly, the word "and" may be grouped with the words preceding it or the words that follow it.

Here "x", "y" and "z" each stands for a sequence of one or more phrases.

Each of "x", "y" and "z" may be a major part of the sentence and the indentation may be similar to the indentation of major parts described in the preceding example:

As in the present example, when three consecutive phrases phrase#n, phrase#n+1 and phrase#n+2 are such that phrase#n and phrase#n+1 together make one member of the list and phrase#n+2 is the start of the next member of the list:
- a) Indent phrase#n+2 by zero-indent or very-small-indent with regards to phrase#n.
  As a special case, If the members of the list are numbered or bulleted, then zero-indent shall be used.
- b) Indent phrase#n+1 by large-indent with regards to phrase#n.

The example below shows the undue scatter that would result if phrase#3 is indented by a non-zero amount with regards to phrase#2.

Example 8: An Example of Scatter

FIG. 61 Example 8

Apple executive believe
  there simply arent't
  enough American workers
    with the skills the company needs
  or factories with sufficient speed and flexibility.

In contrast with the example 7 above, Here phrase#3 is indented with regard to phrase#2. As a result, the sentence looks a bit scattered.

As a general guideline. it is better to keep the sentence compact and avoid scatter by indenting a phrase by zero-indent with regards to the phrase preceding it whenever the relationship between the phrases and content of the phrases permit it.

Example 9

Consider the sentence:

"Apple's an example of why it's so hard to create middle-class jobs in the U.S. now," said Jared Bernstein, who until last year was an economic adviser to the White House.

The program may break the sentence above into six phrases:

phrase#1: "Apple's an example of
phrase#2: why it's so hard
phrase#3: to create middle-class jobs in the U.S. now,"
phrase#4: said Jared Bernstein,
phrase#5: who until last year was
phrase#6: an economic adviser to the White House.

The program may place each phrase on a separate line and indent the text on each line as shown in FIG. 62 Example 9 and below.

"Apples's an example of
  why it's so hard
    to create middle-class jobs in the U.S. now,"
      said Jared Bernstin,
      who until last year was
      an economic adviser to the White House.

Here, in the context of the article's subject matter, the quote is more important than the source of the quote. Hence the source of the quote is indented by a large amount. Also, phrase#6 is made more noticeable than phrase#4 and phrase#5 by placing them all at the same indent.

The General Rule:

When a quote is followed by phrases that together contain the name and description of the speaker or author of the quote, those phrases are indented to the far right such that they do not exceed the right-margin.

Example 10

Consider the sentence:

Apple employs 43,000 people in the United States and 20,000 overseas, a small fraction of the over 400,000 American workers at General Motors in the 1950s, or the hundreds of thousands at General Electric in the 1980s.

The program may break the sentence above into eight phrases:

phrase#1: Apple employs
phrase#2: 43,000 people in the United States
phrase#3: and 20,000 overseas,
phrase#4: a small fraction of the
phrase#5: over 400,000 American workers
phrase#6: at General Motors in the 1950s,
phrase#7: or the hundreds of thousands
phrase#8: at General Electric in the 1980s.

The program may place each phrase on a separate line and indent the text on each line as shown in FIG. 62 Example 10 and below.

Apple employs
  43,000 people in the United States
    and 20,000 overseas,
    a small fraction of the
      over 400,000 American workers
        at General Motors in the 1950s,
      or the hundreds of thousands
        at General Electric in the 1980s.

Since the sentence is quite long, the program may insert small vertical space 6301 before the line that contains phrase#4 and also 6301 before the line that contains phrase#7 as shown in FIG. 63. It helps the user in visually grasping the major parts of the sentence. Such vertical space may be less than the vertical space 6302 that is placed between the end of a sentence and the beginning of the next sentence.

The General Rule is:

When a sentence is broken into five or more phrases, a small vertical space may be inserted before each major part of a sentence. Such vertical spacing may be less than the vertical spacing that is inserted after the end of sentence and before the beginning of a sentence.

The collection of example and rules above is not exhaustive. The examples illustrate the relationships that the phrases may have with one another and how the relationships may be helpful in computing the amount of indent. The program may apply many more rules than are shown above. Also, the program may apply exceptions when a prescribed indent causes a phrase to exceed the right-margin. In another embodiment of the invention, the rules may be different and the resulting break-up of sentences into phrases and amount of indentation of phrases may differ from those shown in the examples above.

The "break-and-indent" formatting may help the user in the following manner:

1. Enable the user to visually pick the phrases easily.
2. Indent the phrases on their respective lines to provide a good visual flow of reading. As the user progresses downward line-by-line, an overall left-to-right flow of visual scan helps the user maintain visual continuity among the parts of the sentence.
3. Make the more important phrases in the sentence more noticeable than the less important phrases of the sentence.
4. Show each phrase's relationship to other phrases in the sentence—which phrases are closely related to each other, which phrases are not closely related to each other, which phrases form a list of 2 or more items etc.
5. Make it easier for the user to notice major parts of a sentence.

Example 11

Consider the sentence:

"I won't sell a product that gets scratched," he said tensely. The only solution was using unscratchable glass instead. "I want a glass screen, and I want it perfect in six weeks." This example contains three sentences. The program starts each sentence on a new line and inserts vertical space, such as a blank line, between the end of a sentence and the start of the next sentence (in FIG. 62 Example 11)

"I won't sell a product that gets scratched," he said tensely.

The only solution was
  using unscratchable glass instead.
  "I want a glass screen,
    and I want it perfect in six weeks."

The first two sentences lead to the third sentence. Hence the program indents the third sentence with regard to the first two sentences. This also provides an overall left-to-right flow in downward visual scan of the three sentences.

Thus, depending on the context in the article, phrase#1 of a sentence may be placed at an indent instead of placing at the left margin of the $1^{st}$ line of the sentence.

Example 12

Computing module may include
1. a bus
2. processing logic
3. an input device
4. an output device
5. a communication interface
6. a memory Computing module may include
other components (not shown) that aid in
receiving, transmitting, and/or processing data.

The General Rule is:
When a list contains numbered items or bulleted items, the program may display the 1st phrase of each item at the same indent as shown above.

Break-and-indent formatting of text may be identified by one or more of the following:
a) starting each sentence on a new line
b) Placing a vertical space between the end of a sentence and the start of the next sentence
c) Identifying successive phrases in the sentence based on their content and length so that when placed on separate lines, they may result in easier comprehension and a good flow of reading
d) Placing each phrase on a separate line.
e) Indenting the text on each line with regards to the text on other lines that are part of the same sentence.
The indentation is not uniformly incremental for each successive line. Rather, the amount of indentation of a phrase may have a value anywhere from zero-indent to very-large-indent or "Toward-the-right-margin" indent with regard to one or more lines in the same sentence as illustrated in the examples above.
In other words, the amount of indentation from line to line is non-uniform in nature. It is not simple constant-increment-indenting for successive lines. It is not indenting every alternate line nor a repetitive pattern of indenting found in poetry.
f) Separating two parts of a sentence by inserting vertical space between the end of one part and the start of the next part of the sentence.
g) Creating an overall left-to-right flow in the downward visual scan of reading the sentence.

Graphical-Browse-Views

The Building-Blocks of Graphical-Browse-Views

The building blocks of graphical-browse-views are:
the header-element
the member-element
the point-symbol
the simple-group-symbol
the compound-group-symbol We experimented to understand:
how the human mind can scan the main points of an article quickly,
how the spatial arrangement of such points can help the user in reading and remembering the main points of an article The results were helpful in designing the various graphical views.

The Browse-Element

The term browse-element refers to the header-element or member-element in a compound-group-symbol. The term browse-element also refers to the header-element or member-element in a simple-group-symbol. The term browse-element also refers to a point-symbol.

A browse-element may contain the 2nd version of a point-name, simple-group-name or compound-group-name. A browse-element is not restricted to having a specific shape, border, color etc.

The browse-element may be rectangular in shape, it may have a border at the bottom, it may have a color that is distinct from the background surrounding the browse-element and the program may perform an operation when the user clicks, touches or hovers on the browse-element.

The browse-element may have other shapes such as circular, elliptical or any other shape, it may have different kinds of borders or no border at all, its color may or may not be distinct from the background surrounding it, it may be of more than one color, the program may or may not perform an operation when the user clicks, touches or hovers on the browse-element. And so on.

Browse-Element-Text

The program may display a point-name, a simple-group-name or a compound-group-name in the browse-element. The 2nd version of the point-name, simple-group-name or compound-group-name is displayed in a specific format in the browse-element. The term "browse-element-text" refers to the text in the browse-element i.e. the point-name, simple-group-name or compound-group-name that is displayed in it.

A browse-element may contain one or more graphical images instead of browse-element-text. Also, a browse-element may contain both browse-element-text and one or more graphical images.

Icons in the Browse-Elements

In the browse-element, the program may display an icon to indicate the browse-element-type-and-action.

The browse-element-type-and-action icon indicates whether the browse-element represents a compound-group, simple-group or a point. It also indicates whether or not a pop-up window will be displayed when the user clicks on the browse-element.

The program may display a "branch-down" icon in the header-element of a compound-group-symbol. When the user clicks on or near the branch-down icon, the program may display the expansion of the compound-group-symbol.

Browse-Element-Text

The program may format the browse-element-text as follows:

1. The browse-element-text may occupy at most two lines in the browse-element.

Compute the Minimum-Required-Amount-of-Overlap

2. When the browse-element-text occupies two lines, as the two lines of text in the browse-element are viewed from left to right, the start of the text on the 2nd line shall be to the left of the end of the text on the 1st line.

In other words, the two lines shall have a horizontal overlap, or simply an overlap, from the start of the text on the 2nd line to the end of the text on the 1st line. FIG. 15 shows an example of such overlap 1501.

Such overlap shall not be too little. Hence, given the instance of the actual text to be placed on the $1^{st}$ line and the actual text to be placed on the $2^{nd}$ line of a browse-element, the program may compute the minimum-required-amount-of-overlap for that specific instance of browse-element-text.

Compute the Minimum Required Overhang of the Text on the $2^{nd}$ Line

3. When the browse-element-text occupies two lines, The text on the $2^{nd}$ line shall be indented so that the end of the text on the $2^{nd}$ line shall not be to the left of the end of the text on the $1^{st}$ line. It means that:

If the end of text on the $1^{st}$ line coincides with the end of available space on the $1^{st}$ line, then the end of the text on the $2^{nd}$ line shall also coincide with the end of available space on the $2^{nd}$ line, else the end of the text on the $2^{nd}$ line shall be to the right of the end of the text on the $1^{st}$ line.

The amount by which the end of the text on the $2^{nd}$ line is to the right of the end of the text on the $1^{st}$ line is called the overhang. FIG. 15 shows an example of such overhang 1502.

Given the actual text on the $1^{st}$ line and the actual text on the $2^{nd}$ line, the program may compute the minimum-required-amount by which the end of the text on the $2^{nd}$ line shall be to the right of the end of the text on the $1^{st}$ line. It is called the minimum-required-overhang-of-$2^{nd}$-textline.

Browse-Element-Text Shall be Bottom-Aligned

4. The two lines of browse-element-text shall be bottom-aligned in the browse-element (as opposed to being middle-aligned or top-aligned in the browse-element).

Additional Aspects a) Wherever possible, both lines shall not be completely full of text.

The first line shall have a few empty spaces at the end and the second line shall have a few empty spaces at its beginning. As a general guideline, the total amount of empty space on the two lines shall be more than 20% of the total length available for text on the two lines. While in a few browse-elements, the empty space may be less than 20%, in most of the browse-elements in a graphical-browse-view, the empty space shall exceed 20% for more efficient reading by the user.

b) In a column of browse-elements, alignment-of-end-of-$2^{nd}$-line among the browse-elements in that column may be achieved by applying the maximum possible indent without exceeding the right-margin on the $2^{nd}$ line if the abovementioned minimum overlap can still be achieved.

EXAMPLES

The following examples illustrate how the program may place a point-name, a simple-group-name or a compound-group-name in the two lines of browse-element-text:

Example 1

Consider the point-name:

Labor is a small expenditure in tech manufacturing.

The program may break the point-name above into two parts $1^{st}$ part: Labor is a small expenditure $2^{nd}$ part: in tech manufacturing Current Art Formatting of Two-Lines of Text Traditional and current art programs will display the point-name in one of the following formats Please refer to FIG. 64 Example 1.

Current Art Formatting Example #1:

Labor is a small expenditure in tech manufacturing

As shown above, current art programs typically do not indent the text on the $2^{nd}$ line. If they do indent the text on the $2^{nd}$ line, the amount of indent is a fixed amount without a consideration of where the text on the $2^{nd}$ line will end relative to the end of text on the $1^{st}$ line—as shown below:

Also, the traditional and current art programs always vertically center the text within rectangular area such as a menu item in user interface of computer systems. One common occurrence of such vertically centering of text is in the rectangular menu items that are presented in a columnar arrangement.

Current Art Formatting #2:

Labor is a small expenditure
in tech manufacturing

In the layout above, it is not easy to visually grasp the two lines of browse-element-text. Our research shows that the main reason is that the end of the text on the 2nd line is to the left of the end of the text on the 1st line.

Present Method's Formatting of Two-Lines of Text

The program may format the browse-element-text as shown below:

Labor is a small expenditure
  in tech manufacturing

In the layout above, it is easier to visually grasp the two lines of browse-element-text.

Our program may format the two parts of the point-name in the browse-element as shown above. The formatting is such that the end of the text on the 2nd line is to the right of the end of the text on the 1st line the requirements of minimum-required-amount-of-overlap as computed by the program for the point-name in our example is fulfilled minimum-required-overhang-of-2nd-textline as computed by the program for the point-name in our example is fulfilled.

The text is bottom-aligned in the rectangular area.

Such bottom-alignment may be seen in the member-elements that are presented in a column in the simple-group-symbols and compound-group-symbols in the various figures in this document. Such bottom-alignment may be seen in standalone point-symbols as well.

Such formatting makes it easier to visually grasp the two lines of browse-element-text as compared with the current art formatting shown above.

Example 2

Consider the point-name:

Apple—a highly admired company—its manufacturing is all offshore

The program may break the point-name above into two parts $1^{st}$ part: Apple—a highly admired company $2^{nd}$ part:—its manufacturing is all offshore Please refer to FIG. 64 Example 2.

Apple—a highly admired company
  its manufacturing is all offshore

In example above, the text on the $1^{st}$ line is so long that the requirement of the minimum-required-overhang-of-2nd-textline can not be fulfilled. In such cases, the program may place the text in the $2^{nd}$ line as far to the right as possible i.e. it ends at the right margin.

Example 3

Consider the point-name:

Solitude is a catalyst to innovation.

Even though the point-name above can fit on a single line, the program may examine the phrases in the point-name and break the point-name into two parts:

$1^{st}$ part:: Solitude is $2^{nd}$ part:: a catalyst to innovation.

Please refer to FIG. 64 Example 3.

Solitude is a catalyst to innovation

The text on the $1^{st}$ line starts at the left-margin. The program may place text on the $2^{nd}$ line as far to the right as possible while fulfilling the requirements of minimum-required-amount-of-overlap. and minimum-required-overhang-of-2nd-textline as computed by the program for the instance of browse-element-text above.

Algorithm

In one embodiment of the invention, the program may format a point-name in the form of browse-element-text by means of the algorithm described below.

In the following,

WBE represents the width of the browse-element.

LM represents the left-margin for text on $1^{st}$ line and $2^{nd}$ line.

RM represents the right-margin for text on $1^{st}$ line and $2^{nd}$ line.

AW represents the available width for text on $1^{st}$ line and $2^{nd}$ line.

$$AW=WBE-(LM+RM)$$

OARM represents optional-additional-right-margin for text on the $2^{nd}$ line.

The purpose of the optional-additional-right-margin is to leave an additional amount of empty space after the end of the text on the $2^{nd}$ line while fulfilling the requirements of minimum-required-amount-of-overlap and minimum-required-overhang-of-$2^{nd}$-textline.

FIG. 16 shows an example of the width of the browse-element and the margins mentioned above.

Create a point-name that fits within two lines

The program may analyze the meaning of the article-matter in the point-box and create a "$1^{st}$ version" point-name that adequately describes the content of the point-box.

If the "$1^{st}$ version" point-name thus created is shorter than 2×AW i.e. the total of available width for text on the two lines, then the program may assign it to be the "$2^{nd}$ version" of the point-name as well; otherwise, it may creates a "$2^{nd}$ version" of the point name that best describes the content of the point box and is shorter than 2×AW.

The program may use the $2^{nd}$ version of point-name as the point-name in the algorithm below.

1. If the point-name is shorter than AW i.e. it can fit within one line and if the program determines that point-name need not be broken into two parts for easy readability, then the browse-element-text consists of one line of text. Otherwise, the program may format the browse-element-text in two lines as follows.

2. The program may break the point-name into two parts such that:

the break occurs at a word boundary the $1^{st}$ part shall be displayed on the $1^{st}$ line and the $2^{nd}$ part shall be displayed on the $2^{nd}$ line in the browse-element the contents of $1^{st}$ line and $2^{nd}$ line together shall form an easy-to-read sequence.

3. If the length of the $1^{st}$ part is greater than AW or the length of the $2^{nd}$ part is greater than AW then:

the program may try to break the point-name into two parts such that each part is shorter than AW If it can not break the point-name into two such parts, it regenerates the $2^{nd}$ version of point-name so that it is shorter than the previous iteration of the $2^{nd}$ version of the point name and goes to step 1 above.

4. Based on the content of the $1^{st}$ part and $2^{nd}$ part, the program computes the minimum-required-amount-of-overlap.

5. Based on the content of the $1^{st}$ part and $2^{nd}$ part, the program computes the minimum-required-overhang-of-$2^{nd}$-textline.

Note: In computing the minimum-required-amount-of-overlap and the minimum-required-overhang-of-$2^{nd}$-textline, the program takes the length of the $2^{nd}$ part into account, so that the length of the $2^{nd}$ part is greater than (the minimum-required-amount-of-overlap+the minimum-required overhang-of-$2^{nd}$-textline)

6. Using the quantities computed in steps 4 and 5 above, it computes the indent for the $2^{nd}$ line as follows.

The text on the $1^{st}$ line starts at the left-margin

Let L1 represent the length of the $1^{st}$ part and L2 represent the length of the $2^{nd}$ part. The text in the $1^{st}$ part is placed on the $1^{st}$ line such that it starts at the left margin. Thus indent amount of the $1^{st}$ part=0. In other words, left margin is where the $1^{st}$ part starts.

Compute the maximum limit of indent of the text on the $2^{nd}$ line that allows the minimum required overlap max-limit-of-Indent-that-permits-the-required-overlap=(L1-minimum-required-amount-of-overlap)

if the indent is less than or equal to the limit computed above, then the minimum required overlap may be achieved.

Can the $2^{nd}$ part be allowed to end at optional-additional-right-margin?

```
Overhang-in-case-the-2nd-part-ends-at-optional-additional-right-margin
        = ( (WBE - LM - OARM - RM) - L1 ) ;
If (Overhang-in-case-the-2nd-part-ends-at-optional-additional-right-margin
        >= minimum-required-overhang-of-2nd-textline)
    ok-to-end-the-2nd-part-at-optional-additional-right-margin = TRUE;
else
    ok-to-end-the-2nd-part-at-optional-additional-right-margin = FALSE;
```

Compute the maximum possible amount of indent based on the right-margin or optional-additional-right-margin

```
If (ok-to-end-the-2nd-part-at-optional-additional-right-margin == TRUE)
    maximum possible indent = (WBE - LM - OARM - RM) - L2
else
    maximum possible indent = (WBE - LM - RM) - L2
```

Compute the indent for the $2^{nd}$ line

```
If (maximum possible indent >= max-limit-of-Indent-that-permits-the-
required-overlap)
    indent = max-limit-of-Indent-that-permits-the-required-overlap;
else
    indent = maximum possible indent;
```

The formatting of browse-element-text was described above by considering examples of point-names. It is similarly applicable to simple-group-names and compound-group-names.

In the case of a simple-group, the program may examine the meaning of the article-matter covered by the simple-group and create a simple-group-name based on the meaning. It may create a "$1^{st}$ version" simple-group-name that adequately describes the content of the point-box. It may create a "$2^{nd}$ version" of the simple-group-name in a manner similar to the creation of $2^{nd}$ version of point-name as described above and use the "$2^{nd}$ version" to form the browse-element-text. Similarly, the program may form the browse-element-text for a compound-group.

The program's formatting of browse-element-text may be identified by one or more of the following:

a) Non-uniform left-indenting of the text on the $2^{nd}$ line among many browse-elements (for example, among the member-elements in a simple-group-symbol or a compound-group-symbol or among the set of browse-elements in a graphical-browse-view) to ensure that the end of the text on the $2^{nd}$ line is not to the left of the end of the text on the $1^{st}$ line b) Browse-element-text is bottom-aligned in the browse-element Based on user settings, the program may allow three lines of text in the browse-element. However, grasping and recalling three lines of text is harder for the human mind than grasping and recalling two lines of text. Hence limiting the browse-element-text to two lines provides better results in the present method.

When the program allows three lines of text in the browse-element, the program may format the browse-element-text as shown below.

An engineer he rose and
  joined a diagnostic team
    in Apple's plant in California The text on the $1^{st}$ line starts at the left-margin. The program may place text on the $2^{nd}$ line so that it fulfills the requirements of minimum-required-amount-of-overlap, and minimum-required-overhang with regards to the text on the $1^{st}$ line as computed by the program for the instance of browse-element-text above and allows the program to place the text on the $3^{rd}$ line so that it fulfills the requirements of minimum-required-amount-of-overlap, and minimum-required-overhang with regards to the text on the $2^{nd}$ line as computed by the program for the instance of browse-element-text above.

Header-Element

In general, all the elements in compound-group-symbols and simple-group-symbols are referred to as browse-elements. More specifically, the browse-element at the top of a simple-group-symbol or a compound-group-symbol is called a header-element.

A header-element may differ from other browse-elements (such as a standalone point-symbols or member-elements in a simple-group-symbol or member-elements in a compound-group-symbol) in the following ways:

a) The header-element may be taller than other browse-elements b) Unlike other browse-elements, the browse-element-text in the header-element may be top-aligned and may have a larger top-margin.

c) The header-element may have larger margins to the left and right of its browse-element-text.

Examples of Browse-Element and Header-Element

FIG. 17 shows a browse-element 1701 in the form of a standalone point-symbol.

FIG. 18 shows a browse-element 1802 in form of a member-element in a simple-group-symbol. It also shows a header-element 1801 at the top of a simple-group-symbol.

FIG. 19 shows a browse-element 1902 in form of a member-element in a compound-group-symbol. It also shows a header-element 1901 at the top of a compound-group-symbol.

Double-Height Browse-Element

Occasionally, the program may determine or may receive input from the user that the content of the point-box or group-box can not be effectively described while limiting the point-name or the group-name to two lines of browse-element-text. In such cases, the program may extend the available space to four lines of browse-element-text and the program may create the 2nd version of the point-name or the group-name that can fit on four lines of a double-height browse-element 2001 as shown in FIG. 20. The program may break such a version of the point-name or the group-name into a maximum of four parts. The program may use the method described above to display the $1^{st}$ part and $2^{nd}$ part on the upper two lines of the double-height browse-element. Similarly, it may display the $3^{rd}$ part and 4th part (if present) on the lower two lines of the double-height browse-element. The double-height browse-element is useful for displaying four lines of browse-element-text while maintaining alignment among the member-elements of simple-group-symbols and compound-group-symbols that are displayed side-by-side. Based on user-settings or on receiving command from the user, the program may hide the lower half of a double-height browse-element. A double-height browse-element may contain browse-element-text and/or graphical image.

An Icon to Indicate the Browse-Element-Type-and-Action

The program may display an icon in the browse-element to indicate the browse-element-type-and-action. It may enable the user to anticipate what will happen if the user clicks the browse-element.

The browse-element-type-and-action icon may indicate the following:

whether the browse-element contains a) compound-group-name b) a simple-group-name or c) a point-name whether the program may display a pop-up window when the user clicks on the browse-element. Such a pop-up window may show a compound-group-symbol, simplegroup-symbol, or the article-matter. To indicate that a pop-up window will be displayed an arrow-shape is included in the icon.

FIG. 21 show the various instances of the browse-element-type-and-action icon.

A Pop-Up Window Will not be Displayed

Icon 2101 indicates that the browse-element contains a compound-group-name and the program may not display a pop-up window when the user clicks on the icon.

Icon 2102 indicates that the browse-element contains a simple-group-name and the program may not display a pop-up window when the user clicks on the icon.

Icon 2103 indicates that the browse-element contains a point-name and the program may not display a pop-up window when the user clicks on the icon.

A Pop-Up Window Will be Displayed

Icon 2104 indicates that the browse-element contains a compound-group-name and the program may display a pop-up window when the user clicks on the icon. The pop-up window shall contain the compound-group-symbol whose header-element shall contain the said compound-group-name.

Icon 2105 indicates that the browse-element contains a simple-group-name and the program may display a pop-up window when the user clicks on the icon. The pop-up window shall contain the simple-group-symbol whose header-element shall contain the said simple-group-name.

Icon 2106 indicates that the browse-element contains a point-name and the program may display a pop-up window when the user clicks on the icon.

The pop-up window shall contain the article-matter associated with the said point-name.

The browse-element is the most basic building block of graphical-browse-views. The point-symbol, the simple-group-symbol and the compound-group-symbol are each made of one or more browse-elements.

Point-Symbol

A point-symbol represents a point in the article and the corresponding point-box.

The point-symbol consists of a single browse-element that contains the 2nd version of the point-name.

The program may display the point-symbol in a graphical-browse-view or in a pop-up window. Such a pop-up window may be displayed to provide a preview of the points from the article or it may be displayed in response to a browse operation by the user. FIG. 17 shows a point-symbol 1701.

When the user clicks on a point-symbol, the program may present the article-matter that is covered by the point represented by the point-symbol. Such article-matter may be presented in a pop-up window or it may be presented in the text-column that is described later in this document.

The operation of presenting the article-matter includes, but is not limited to, display of article-text, graphics, tables, slides, mathematical expressions, output of audio in form of audio and/or text, display of video etc.

Miniature Version of the Point-Symbol

A miniature version 2406 of a point-symbol is shown in FIG. 24. The miniature version of the point-symbol may have the same color as the point-symbol. The miniature version of the point-symbol may or may not show the point-name.

The program may use the miniature version of the point-symbol to construct the miniature version of graphical-browse-view as described later in this document.

Simple Group-Symbol

As described earlier in this document, a simple-group is a collection of one or more points from the article.

A simple-group-symbol represents a simple-group and the corresponding simple-group-box.

The program may display the simple-group-symbol in a graphical-browse-view or in a pop-up window. Such a pop-up window may be displayed to provide a preview of the points from the article or it may be displayed in response to a browse operation by the user.

A simple-group-symbol consists of a vertical column of browse-elements, namely a header-element followed by member browse-elements:

The header-element shows the simple-group's name.

below the header-element are browse-elements that correspond to the points that are contained in the simple-group. They are referred to as member browse-elements. In a simple-group-symbol, each member browse-element contains the corresponding point's point-name in the form of browse-element-text.

Large Vertical Gap Between the Text in Header-Element and the Text in the $1^{st}$ Member-Element Often a graphical-browse-view may contain many simple-group-symbols. There, the simple-group-symbols' member browse-elements together provide a summary of the part of the article that is covered by those simple-group-symbols.

Hence it is important that the user be able to focus on the member-elements without being distracted by the text in the header-elements of the simple-group-symbols.

As shown in FIG. 18, the program may provide a large vertical distance 1804 between the text in the header-element and the text in the $1^{st}$ member-browse-element by:

making the vertical size of the header-element greater than a regular browse-element and positioning the simple-group-name higher up within the header-element.

Alternatively, the uppermost member-element may have a greater vertical size than the remaining member-elements in the simple-group-symbol.

FIG. 18 shows a simple-group-symbol 1803.

Order of Points in the Simple-Group-Symbol

In the member-elements, the program may display the point-names as per the ordering information that is saved in the XML file.

Initially, when the program analyzes the article and saves the information in the XML file, the program may order the points as per the order of their occurrence in the article or it may order them as per a sequence determined by user-settings or user input.

The program may provide user settings or operations which may enable the user to change the order in which the point-names are displayed in the simple-group-symbol and save the new ordering information in the XML file.

The program may display the following icons in the header-element of the simple-group-symbol:

an "expand/contract" icon a "display-article-matter" icon

Display of Article-Matter

When the user clicks on or near the "display-article-matter" icon in the header-element of the simple-group-symbol, the program may display the article-matter that is covered by the simple group. Such article-matter may be displayed in a pop-up window or it may be displayed in the text-column that is described later in this document.

Each member-element in the simple-group-symbol corresponds to a point. When the user clicks on a member-element in the simple-group-symbol, the program may display the article-matter that is covered by the corresponding point. Such article-matter may be displayed in a pop-up window or it may be displayed in the text-column that is described later in this document.

Expansion/Contraction of a Simple-Group-Symbol

When the user clicks on or near the "expand/contract" icon in the header-element of the simple-group-symbol, the program may contract the simple-group-symbol so that only the header-element is visible and the member browse-elements shall be hidden.

When the user clicks on or near the "expand/contract" icon again, the program may expand the simple-group-symbol so that the member browse-elements shall become visible.

The contraction and expansion of the simple-group-symbol happens "in-place" i.e. within the current graphical-browse-view.

The Simple-Group-Symbol May Remain in the Expanded State

The program may display a simple-group-symbol in the expanded state and inhibit its contraction—in which case, it may hide the "expand/contract" icon.

Miniature Version of the Simple-Group-Symbol

A miniature version 1805 of a simple-group-symbol is shown in FIG. 18. The miniature version of the simple-group-symbol may be made of miniature versions of the simple-group-symbol's header-element and member-elements. The miniature versions of the header-element and member-elements may have the same color as the header-element and member-elements. These miniature versions may or may not show any text in them.

The program may use the miniature version of simple-group-symbol to construct the miniature version of graphical-browse-view as described later in this document.

Compound Group-Symbol

As described earlier in this document, a compound-group may contain compound-groups and/or simple-groups and/or points.

A compound-group-symbol represents a compound-group and the corresponding compound-group-box.

A compound-group-symbol consists of a vertical column of browse-elements, namely a header-element followed by member browse-elements:

The header-element shows the compound-group-name.

below the header-element are browse-elements that corresponding to the compound-groups, simple-groups and points that are the immediate children of the said compound-group. They are referred to as member browse-elements or member-elements. A member-element that corresponds to a compound-group, contains that compound-group's name. A member-element that corresponds to a simple-group, contains that simple-group's name. A member-element that corresponds to a point, contains that point's name.

The program may provide a large vertical distance between the text in the header-element and the text in the 1$^{st}$ member-browse-element by:

making the vertical size of the header-element greater than a regular browse-element and positioning the simple-group-name higher up within the header-element.

The program may display the compound-group-symbol in a graphical-browse-view or in a pop-up window. Such a pop-up window may be displayed to provide a preview of the points from the article or it may be displayed in response to a browse operation by the user.

FIG. 19 shows a compound-group-symbol 1903.

Order of Nested Compound-Groups, Simple-Groups, and Points in Compound-Group-Symbol In the member-elements, the program may display the names of nested compound-groups, simple-groups, and points as per the ordering information that is saved in the XML file.

Initially, when the program analyzes the article and saves the information in the XML file, the program may order the nested compound-groups, simple-groups, and points as per the order of their occurrence in the article or it may order them as per a sequence determined by user-settings or user input.

The program may provide user settings or operations which may enable the user to change the order in which the compound-group-names, simple-group-names or point-names are displayed in the compound-group-symbol and save the new ordering information in the XML file.

The program may display the following icons in the header-element of the compound-group-symbol:

a "branch-down" icon a "display-article-matter" icon

Clicking on the Header-Element

When the user clicks on or near the "display-article-matter" icon in the header-element of the compound-group-symbol, the program may display the article-matter that is covered by the compound-group. Such article-matter may be displayed in a pop-up window or it may be displayed in the text-column that is described later in this document.

When the user clicks on or near the "branch-down" icon in the header-element of the compound-group-symbol, the program may display the graphical-browse-view of the compound-group as described later in this document.

Clicking on the Member-Elements

Each member-element in the compound-group-symbol corresponds to a compound-group, simple-group or a point.

- When the user clicks on a member-element that corresponds to a compound-group, the program may display the compound-group-symbol of that compound-group. Such compound-group-symbol may be displayed in a pop-up window
- When the user clicks on a member-element that corresponds to a simple-group, the program may display the simple-group-symbol of that simple-group. Such simple-group-symbol may be displayed in a pop-up window
- When the user clicks on a member-element that corresponds to a point, the program may display the article-matter that is covered by that point. Such article-matter may be displayed in a pop-up window or it may be displayed in the text-column that is described later in this document.

Miniature Version of the Compound-Group-Symbol

A miniature version 1904 of a compound-group-symbol is shown in FIG. 19 The miniature version of the compound-group-symbol may be made of miniature versions of the compound-group-symbol's header-element and member-elements. The miniature versions of the header-element and member-elements may have the same color as the header-element and member-elements. These miniature versions may or may not show any text in them.

A special icon 1905 at the top of the miniature version of a compound-group-symbol helps to distinguish it from the miniature version of a simple-group-symbol.

The program may use the miniature version of the compound-group-symbol to construct the miniature version of graphical-browse-view as described later in this document.

The miniature version of a compound-group-symbol is also known as miniature compound-group-symbol.

Color Scheme

We researched into

- how background colors can help the user in visually grasping a group of point names
- how the choice of background colors can help in associating related groups of points.

Based on our results, the program may apply a color scheme to compound-group-symbols, simple-group-symbols and point-symbols.

It may set the background color of the text in browse-elements depending on the context of occurrence of the browse-elements.

In a graphical-browse-view:

1. A Point-Name as a Standalone Point-Symbol

- When a point-name is not displayed as part of a simple-group-symbol or a compound-group-symbol, it may be displayed in form of a single browse-element. The program may display the background color of the browse-element-text as per the background color of the point-name that is specified in the point-box.

2. A Point-Name in a Member-Element in a Simple-Group-Symbol

- When a point-name is displayed in a member-element of a simple-group-symbol, the program may ignore the background color of the point-name that is specified in the point-box.
- Instead, the program may display the background color of the text in member-element as per the "background color of the text in member browse-elements in the simple-group-symbol" that is specified in the simple-group-box.
- Hence the text in all the member-elements in a simple-group-symbol may have the same background color. It may thus enable the user to read and grasp the browse-element-text in the simple-group-symbol quickly.

3. A Point-Name as a Member-Element in a Compound-Group-Symbol

- When a point-name is displayed in a member-element of a compound-group-symbol, the program may ignore the background color of the point-name that is specified in the point-box.
- Instead, the program may display the background color of the text in member-element as per the "background color of the text in member browse-elements in the compound-group-symbol" that is specified in the compound-group-box.
- Hence the text in all the member-elements in a compound-group-symbol may have the same background color. It may thus enable the user to read and grasp the browse-element-text in the compound-group-symbol quickly.

1. A Simple-Group-Name in a Header-Element

- When a simple-group-name is displayed in the header-element of a simple-group-symbol, the program may display background color of simple-group-name in the header-element as per the "background color of the simple-group-name" that is specified in the simple-group-box.

2. A Simple-Group-Name in a Member-Element in a Compound-Group-Symbol

- When a simple-group-name is displayed in a member-element of a compound-group-symbol, the program may ignore the background color of the simple-group-name that is specified in the simple-group-box.
- Instead, program may display the background color of the text in member-element as per the "background color of the text in member browse-elements in the compound-group-symbol" that is specified in the compound-group-box.
- Hence the text in all the member-elements in a compound-group-symbol may have the same background color. It may thus enable the user to read and grasp the browse-element-text in the compound-group-symbol quickly.

1. A Compound-Group-Name in a Header-Element

- When a compound-group-name is displayed in the header-element of a compound-group-symbol, the program may display the background color of the header-element as per the background color of the compound-group-name that is specified in the compound-group-box.

2. A Compound-Group-Name in a Member-Element in a Compound-Group-Symbol

- When a compound-group-name is displayed in a member-element of a compound-group-symbol, the program may ignore the background color of the compound-group-name that is specified in the compound-group-box.

Instead, program may display the background color of the text in member-element as per the "background color of the text in member browse-elements in the compound-group-symbol" that is specified in the compound-group-box that corresponds to the compound-group-symbol.

Hence the text in all the member-elements in a compound-group-symbol may have the same background color. It may thus enable the user to read and grasp the browse-element-text in the compound-group-symbol quickly.

Dominant Color of Group-Symbols

All the text in the member-elements in a simple-group-symbol may have the same background color. The background color of the text in the member-elements is also known as the dominant color of the simple-group-symbol.

All the text in the member-elements in a compound-group-symbol may have the same background color. The background color of the text in the member-elements is also known as the dominant color of the compound-group-symbol.

Color Selection

In the description below, the colors are expressed in terms of color specification parameters hue, saturation and luminosity with each parameter measured on a scale of 0 to 255. The parameter values hue=0; saturation=0; luminosity=0 together represent black color and the parameter values hue=255; saturation=255; luminosity=255 together represent white color.

In all simple-group-symbols and compound-group-symbols, the background colors of the text in member-elements are such that the value of luminosity is in the range 218 to 226. Most such background colors are clustered around luminosity=222.

Assigning the Dominant Color of Compound-Group-Symbols

To assign the dominant color of compound-group-symbols, the program may use a set of colors such that the value of the parameter hue of each color in the set is spaced widely apart from the values of the parameter hue for each of the other colors of the set.

Thus, to human perception, each color in the set is easy to differentiate from the other colors in the set. This set of colors serves as the palette for the compound-group-symbols' dominant colors.

Colors from this set are assigned as dominant colors of compound-groups in a graphical-browse-view. As a result, the dominant color of a compound-group-symbol is easily distinguishable from the dominant colors of the neighboring compound-groups in a graphical-browse-view.

The Dominant Color of Simple-Group-Symbols are Clustered Around the Dominant Color of the Parent Compound-Group-Symbol As we will see later, when the user expands a compound-group-symbol, it results in the display of the graphical-browse-view of the compound-group.

Such graphical-browse-view contains the simple-group-symbols of the simple-groups that are immediate children of that compound-group.

The dominant colors of simple-group-symbols are assigned from a set of colors that is associated with the dominant color of the parent compound-group-symbol. The colors in this set are closely clustered around the dominant color of the parent compound-group-symbol.

Graphical-Browse-Views

A graphical-browse-view is a representation of a compound-group in terms of the symbols of its immediate children.

The $2^{nd}$ version of compound-group's name may serve as the name of the graphical-browse-view and the program may display it at the top of graphical-browse-view.

Representing the Innermost Compound-Groups

The program may display the graphical-browse-view 2501 shown in FIG. 25 to represent the compound-group named "Has Apple's growth created jobs in America?".

Please refer to entry 1 of table 5. It shows that the compound-group "Has Apple's growth created jobs in America?" is composed of six simple-groups whose names are:

1. Obama: Why can't that work come home?
2. Apple—a highly admired company but its manufacturing is all outside the

U.S.

3. Despite huge product volume its has a very small U.S. workforce
4. In the past: "Made in America" Now: Made Offshore
5. Measuring Apple's jobs creation is not simple in the global picture
6. Apple's U.S. manpower does not need to scale up The graphical-browse-view in FIG. 25 consists of the simple-group-symbols 2503 2504 2505 2506 2507 2508 of the six simple-groups listed above.

The name of the compound-group may serve as the name of its graphical-browse-view and the program may display it above the graphical-browse-view. For example, in FIG. 25, the name 2502 of the graphical-browse-view "Has Apple's growth created jobs in America?" is displayed at the top of the graphical-browse-view.

Similarly, the program may represent the compound-group "Asian supply chains and factories are fast, flexible and have resources" with the graphical-browse-view 2601 shown in FIG. 26.

the compound-group "Resources of Foxconn City include a huge workforce" with the graphical-browse-view 2701 shown in FIG. 27.

the compound-group "Eric Saragoza's career at Apple reflects loss of middle-class jobs" with the graphical-browse-view 2801 shown in FIG. 28 the compound-group "Apple's meteoric rise in revenue has not returned skilled jobs to U.S." with the graphical-browse-view 2901 shown in FIG. 29.

the compound-group "How do you bring the jobs back to U.S.?" with the graphical-browse-view 3001 shown in FIG. 30.

Representation of Higher-Level Compound-Groups

The program may represent the higher-level compound-group named "Apple's job creation and manufacturing abroad" with the graphical-browse-view 2301 shown in FIG. 23.

Please refer to entry 1 in table 7. It shows that the compound-group "Apple's job creation in U.S. is affected by manufacturing abroad" is composed of three compound-groups whose group-names are:

1. Has Apple's growth created jobs in America?
2. Asian supply chains and factories are fast, flexible and have resources
3. Resources of Foxconn City include a huge workforce The graphical-browse-view in FIG. 23 consists of the compound-group-symbols 2302 2303 2304 of the three compound-groups listed above.

The program may represent the other higher-level compound-group named "Jobs in America: Past, present and future" with the graphical-browse-view 2401 shown in FIG. 24.

Representation of the Whole Article

Finally, the program may represent the whole article with the graphical-browse-view 2201 shown in FIG. 22. We call it the Level-1 graphical-browse-view. It consists of the symbols of the outermost boxes of the article.

As we will see later, the hierarchical set graphical-browse-views are very useful in browsing:

They provide a multi-level summary of the article.

They help the user to navigate to any target area of the article.

Representing a Compound-Group at Various Levels of Graphical-Browse-Views

A compound-group may be represented in many forms, including the following:

as a graphical-browse-view as a miniature-view i.e. the miniature version of a graphical-browse-view as a compound-group-symbol in the graphical-browse-view that represents its parent as miniature version of a compound-group-symbol in the miniature version of the graphical-browse-view that represents its parent.

as a member-element in the graphical-browse-view that represents its parent's parent Consider the compound-group named "Has Apple's growth created jobs in America?". It is represented in the following forms:

As a Graphical-Browse-View

As we saw, the program represents the compound-group named "Has Apple's growth created jobs in America?" with the graphical-browse-view 2501 shown in FIG. 25.

We express the relationship of the graphical-browse-view and the compound-group by saying:

"it is the graphical-browse-view of the said compound-group."

or

"the graphical-browse-view is an expansion of the said compound-group or

"the graphical-browse-view is an expansion of the compound-group-symbol of the said compound-group or "the said compound-group is represented by the graphical-browse-view"

As a Miniature-View i.e. the Miniature Version of a Graphical-Browse-View

As we saw, the program represents the compound-group named "Has Apple's growth created jobs in America?" with the graphical-browse-view 2501 shown in FIG. 25. The miniature-view 2509 is the miniature version of the graphical-browse-view. Hence the miniature-view 2509 represents the compound-group named "Has Apple's growth created jobs in America?".

As a Compound-Group-Symbol in the Parent's View

As we saw, the compound-group under consideration namely "Has Apple's growth created jobs in America?" is contained by the higher-level compound-group "Apple's job creation and manufacturing abroad" of which the graphical-browse-view is shown in FIG. 23.

Hence the graphical-browse-view of the higher-level compound-group "Apple's job creation and manufacturing abroad" contains the compound-group-symbol 2302 of "Has Apple's growth created jobs in America?".

Thus a compound-group is represented by its compound-group-symbol in its parent compound-group's graphical-browse-view.

As a Miniature Version of Compound-Group-Symbol in the in the Miniature Version of the Graphical-Browse-View that Represents its Parent As we saw, the graphical-browse-view 2301 shown in FIG. 23 represents the parent of the compound-group under consideration namely "Has Apple's growth created jobs in America?".

As described later in this document, the miniature-view 2309 is the miniature version of the graphical-browse-view of the parent of the compound-group under consideration namely "Has Apple's growth created jobs in America?". In that miniature-view, the miniature version 2310 of compound-group-symbol represents the compound-group under consideration namely "Has Apple's growth created jobs in America?".

Thus a compound-group is represented by the miniature version of compound-group-symbol in the in the miniature version of the graphical-browse-view that represents its parent As a Member Browse-Element in the Parent's Parent's Graphical-Browse-View Finally, in the graphical-browse-view of the whole article shown in FIG. 22, the compound-group "Has Apple's growth created jobs in America?" is represented in form of a member browse-element 2202.

Representing a Simple-Group at Various Levels of Graphical-Browse-Views

A simple-group can be represented in various forms that include the following:

as a simple-group-symbol as miniature version of a simple-group-symbol as a member-element.

Consider the simple-group named "Obama: Why can't that work come home?".

As a Simple-Group-Symbol in the Graphical-Browse-View of its Parent Compound-Group In FIG. 25, the graphical-browse-view of "Has Apple's growth created jobs in America?" contains the simple-group-symbol 2503 named "Obama: Why can't that work come home?".

As a Miniature Version of Simple-Group-Symbol in the Miniature Version of the Graphical-Browse-View of its Parent Compound-Group In FIG. 25, the miniature-view 2509 is the miniature version of the graphical-browse-view of "Has Apple's growth created jobs in America?". In that miniature-view, the miniature version 2510 of the simple-group-symbol represents the simple-group "Obama: Why can't that work come home?".

As a Member Browse-Element in the Compound-Group-Symbol of its Parent Compound-Group As an example, in FIG. 23, in the compound-group-symbol of "Has Apple's growth created jobs in America?" the simple-group named "Obama: Why can't that work come home?" is represented in the form of a member browse-element 2305

The Idea Underlying the Graphical-Browse-Views

Often, a simple-group may contain anywhere from 2 to 8 points and covers a small part of an article.

Through experimentation, we found that if we represented each simple-group with an individual graphical-browse-view, we ended up with too many individual graphical-browse-views. Each of such graphical-browse-views contained too little information and being numerous, they were hard to grasp and recall collectively.

Often a compound-group contains anywhere from 2 to 8 simple-groups and covers a substantial part of an article.

Through experimentation, we found that if we represented each compound-group with an individual graphical-browse-view, such a graphical-browse-view contained a substantial and manageable amount of information to justify a separate graphical-browse-view.

Thus each compound-group may be represented by an individual graphical-browse-view.

Place IDs

The program may assign a place-ID to each compound-group-symbol, simple-group-symbol and point-symbol in each graphical-browse-view:

In FIG. 22, above the top-left corner of the $1^{st}$ compound-group-symbol, the numeral "1" 2203 is displayed. Hence the place-ID of the $1^{st}$ compound-group-symbol is 1.

Above the top-left corner of the $2^{nd}$ compound-group-symbol, the numeral "2" 2204 is displayed. Hence the place-ID of the $2^{nd}$ compound-group-symbol is 2.

Place-IDs in Expansion of the Compound-Group-Symbol

FIG. 23 shows the expanded graphical-browse-view of the $1^{st}$ compound-group.

Since the $1^{st}$ compound-group-symbol had the place-ID "1", in its expansion, the program may display place-IDs "1A" 2306, "1B" 2307 and "1C" 2308.

Similarly, when the compound-group-symbol at the place-ID "1B" is expanded, FIG. 26 shows that the place-IDs in its expansion are "1B1", "1B2", "1B3", "1B4" and "1B5".

Benefits of Having Place-IDs

With the place-ID, The program may enable the user to have a feel for the location of the symbols in the graphical-browse hierarchy.

The place-IDs also give the user a feel for the location of the symbols in the overall article—near the beginning, in the middle or near the end of the article.

Place-ID's are especially useful:

when the user is viewing a lower-level i.e. deeper graphical-browse-view when the graphical-browse-area becomes narrower due to the appearance of the text-column.

Place-ID provides a convenient way to refer to a compound-group-symbol, simple-group-symbol or point-symbol—for example, in FIG. 24, the compound-group-symbol "Apple's rise in revenue has not returned skilled jobs to U.S." 2403 may be referred to as the compound-group-symbol at place-ID "2B".

The program may display 2902 place-ID "2B" of the compound-group-symbol above its expansion i.e. above its graphical-browse-view 2901 in FIG. 29 and also below its miniature-view 2903 in FIG. 29.

Layout of the Graphical-Browse-View

As mentioned earlier, the program may save the information about the order in which the points, simple-groups and compound-groups may be displayed in various graphical views in the XML file.

To construct the graphical-browse-view, the program may place the compound-group-symbols, simple-group-symbols and point-symbols in a horizontal row in a left-to-right order as per the ordering information that is saved in the XML file.

Generally, the left-to-right order of the compound-group-symbols, simple-group-symbols and point-symbols in the graphical-browse-view of a given compound-group corresponds to:

the top-to-bottom order of the compound-group-names, simple-group-names and point-names in the member-elements of the compound-group-symbol of that given compound-group.

When placing the symbols in a horizontal row in a left-to-right order, when the right edge of the display area is reached, the program starts a new horizontal row below the current row and continues to place the symbols in the new horizontal row in a left-to-right order.

As mentioned earlier, each horizontal row is called a tier.

As a special case, when there are not sufficient symbols to fill the full width of the last tier, the program may place the symbols in a right-justified placement in the last tier, as shown in FIG. 25, FIG. 26 and FIG. 29. Such right-justified placement may not be done in the first tier even if it is the last tier.

The placement of the compound-group-symbols, simple-group-symbols and point-symbols in the graphical-browse-view shall be such that:

in a horizontal visual scan of the graphical-browse-view, each line of text in each header-element, member-element or point-symbol shall be in alignment with any corresponding lines of text in other header-elements, member-elements or point-symbols that may be to its left or right.

Placement of Point-Symbols in a Graphical-Browse-View

When a standalone point-symbol occurs in a graphical-browse-view and it is preceded by a simple-group-symbol or a compound-group-symbol, then instead of placing it in a separate column, the program may place the point-symbol 3201 below the simple-group-symbol or the compound-group-symbol that precedes it, as shown in FIG. 32

However, if two or more consecutive point-symbols occur in a graphical-browse-view, the program may place them in a single new column.

User Options for Deviating from the Layout Described Above

The program provides customization settings so that the user can direct the program such that the program may start a new tier before placing a certain compound-group-symbol, simple-group-symbol or a point-symbol even if the current tier is not full i.e. the right-edge of the display has not been reached.

The program provides customization settings using which the user can direct the program such that when there are not sufficient symbols to fill the full width of the last tier, the program may place the symbols in a left-justified placement in the last tier, as shown in FIG. 31.

Similarly, the user can direct the program to stack the symbols immediately below the symbols instead of starting a new tier.

Miniature Version of Graphical-Browse-Views

For each graphical-browse-view, the program may create a miniature version of the graphical-browse-view. It is also known as miniature-view.

To create the miniature-view

For each compound-group-symbol, simple-group-symbol or point-symbol that is present in the graphical-browse-view, the program may place a corresponding miniature version of the compound-group-symbol, simple-group-symbol or point-symbol in the miniature-view.

The relative positions of the miniature versions of the compound-group-symbol, simple-group-symbol or point-symbol in the miniature-view may be similar to the relative positions of the corresponding compound-group-symbol, simple-group-symbol or point-symbol in the graphical-browse-view.

As described earlier, the miniature version of the compound-group-symbols are distinguished by the special icon 1905 as shown in FIG. 19.

When the user clicks on the miniature version of a compound-group-symbol in a miniature-view, the program may display the corresponding graphical-browse-view.

This will be described in more detail, later in the document.

The miniature version of the level-1 graphical-browse-views is called level-1 miniature-view.

The miniature version of a level-2 graphical-browse-views is called a level-2 miniature-view.

The miniature version of a level-3 graphical-browse-views is called a level-3 miniature-view. And so on.

As described later in this document, the program may display the miniature-views to enable the user to navigate to the various graphical-browse-views and the article-matter corresponding to those graphical-browse-views.

As described earlier in this document, a miniature-view represents a compound-group. By constructing and displaying the miniature-views, the program may present a graphical identification of the article-matter that is covered by the compound-group that is represented by the miniature-view.

By presenting a graphical identification of article-matter, the program may enable the user to associate the miniature-view with the corresponding article-matter and it may help the user to remember the article-matter by means of the miniature-view.

The program may enable the use of the miniature-view as a graphical identification of the corresponding graphical-browse-view and article-matter in a manner similar to QR-code. The name of the graphical-browse-view may serve as the name of its miniature-view and it may be displayed below the miniature-view.

How the Graphical-Browse-Views Help the User

The graphical-browse-views are useful because they provide:

Summary of the Article-Matter a graphical-browse-view contains many browse-elements in the form of member-elements in compound-group-symbols or simple-group-symbols or in the form of points-symbols.

The browse-element-text in those browse-elements collectively provides a summary of the article-matter covered by that graphical-browse-view.

Organization the grouping of point-names in simple-groups and the grouping of groups in compound-groups shows the organization of the article's content Navigation each browse-element is useful for navigating to the corresponding article-matter in the article also, the user can navigate from one graphical-browse-view to another graphical-browse-view.

The Graphical-Browse-Views Provide a Multi-Level Summary of the Article

A graphical-browse-view contains a few compound-group-symbols and/or simple-group-symbols and/or point-symbols.

The compound-group-symbols, simple-group-symbols and point-symbol are all made of browse-elements.

In this way, the graphical-browse-view contains many browse-elements. The browse-element-text in those browse-elements collectively provides a summary of the part of the article that is covered by the graphical-browse-view.

Each compound-group-symbol, simple-group-symbol and point-symbol contributes to the summary provided by the graphical-browse-view.

When a graphical-browse-view contains a compound-group-symbol, the header-element and the member-elements of the compound-group-symbol provide a high-level summary of the part of the article that is covered by the compound-group-symbol.

On receiving a command from the user, the program may expand the compound-group-symbol to show its corresponding graphical-browse-view. Such a graphical-browse-view provides a more detailed summary of the same part of the article.

When a graphical-browse-view contains a simple-group-symbol, the header-element and the member-elements of the simple-group-symbol provide a summary of the part of the article that is covered by the simple-group-symbol.

The simple-group-symbol can not be expanded. Its member-elements represent individual points. Hence the simple-group-symbol provides a detailed point-by-point summary of the part of the article covered by the simple-group-symbol.

When a graphical-browse-view contains a point-symbol, the point-symbol contributes its point-name to the overall summary provided by the graphical-browse-view.

A higher-level compound-group represents a larger part of the article.

A nested i.e. lower-level compound-group represents a sub-part i.e. a smaller part of the article within the larger part of the article.

In Case of Our Example Article, the Full Set of Graphical-Browse-Views Provide Article-Summaries at Three Distinct Levels of Detail The full set of the graphical-browse-views of our example provide summaries at three distinct levels of detail:

- At the top level is the whole article. The graphical-browse-view of the whole article is shown in FIG. 22. It is the level-1 graphical-browse-view. It provides a highest-level summary of the whole article.
- At the next lower level are the two high-level compound-groups. Their graphical-browse-views in FIG. 23 and FIG. 24 together provide a high-level summary of the whole article
- At the next lower level are the six nested compound-groups plus one point-name. The graphical-browse-views of the six nested groups in FIG. 25 through FIG. 30 together with the point-name provide a detailed summary of the whole article.

In this way, the graphical-browse-views of the example article provide three summaries of the whole article; each summary is at a different level of detail.

The Graphical-Browse-View of a Higher-Level Compound-Group Provides a High-Level Summary of a Larger Part of the Article Consider the 1$^{st}$ higher-level compound-group. It is named "Apple's job creation and manufacturing abroad".

- it represents a large section—almost half of the article
- it is represented by the graphical-browse-view shown in FIG. 23
- by reading the browse-element-text in the graphical-browse-view, the user can get a high-level summary of almost half of the article that is covered by the compound-group

The Graphical-Browse-View of a Nested i.e. Lower-Level Compound-Group Provides a Detailed Summary of a Smaller Part of the Article The higher-level compound-group that we just considered contains three nested compound groups. Their names are:

1. Has Apple's growth created jobs in America?
2. Asian supply chains and factories are fast, flexible and have resources
3. Resources of Foxconn City include a huge workforce Each of these nested compound groups covers a smaller part of the article within the large part covered by the higher-level compound-group.

Consider one of the nested compound-groups, named "Has Apple's growth created jobs in America?":

- it represents a small part of the article within the larger part mentioned above
- it is represented by the graphical-browse-view shown in FIG. 25
- by reading the browse-element-text in the graphical-browse-view, the user can get a detailed summary of the small part of the article covered by this nested compound-group.
- in FIG. 25, the browse-element-type icons indicate that the member-elements represent individual points in the article.
- Hence the summary provided by the graphical-browse-view is at the level of individual points in the article. In other words, it is a detailed summary of the small part of the article.

Together, the graphical-browse-views of the three nested compound-groups provide a detailed summary of the larger part of the article that is covered by the higher-level compound-group.

The 2$^{nd}$ Higher-Level Compound-Group in Our Example Article

Consider the other higher-level compound-group "Jobs in America: Past, present and future":

- its graphical-browse-view provides a high-level summary of the 2$^{nd}$ half of the article
- It contains three nested compound-groups and one point-name
- The graphical-browse-views of the three nested compound-groups plus the point-name provide a detailed summary of the 2$^{nd}$ half of the article

Sometimes a Graphical-Browse-View Provides the Summary of its Corresponding Section at a Mixed Level of Detail Sometimes the level of detail is not uniformly the same among the parts of a graphical-browse-view. As an example, consider the graphical-browse-view in FIG. 33.

- This graphical-browse-view contains one simple-group-symbol 3301 and one compound-group-symbol 3302.
- The member-elements 3303 of the simple-group-symbol contain point-names. Hence together, the member-elements provide a detailed point-by-point summary of the part of the article covered by the simple-group-symbol 3301.
- In this graphical-browse-view, the member-elements 3304 of the compound-group-symbol contain the names of nested compound-groups. Hence together, the member-elements provide a high-level summary of the part of the article covered by the compound-group-symbol 3302.

Thus the different parts of this graphical-browse-view provide a summary at different levels of detail.

The following is a description of how the program may enable the user to browse with the graphical-browse-views.

To Browse in an Article

FIG. 34. shows a part of a webpage displayed by the program. It contains a list of article titles including "Apple, America and a Squeezed Middle Class" 3401. In this view, the program may format the article title as per the formatting of browse-element-text that was described earlier in this document with the exception that it may not bottom-align the article title in the available area.

A Pop-Up Shows a Part of Level-1 Graphical-Browse-View

When a user clicks on the article title, the program may display a pop-up window 3501 as shown in FIG. 35. The pop-up window may contain a part 3502 of the level-1 graphical-browse-view. By providing the group-names and point-names which are displayed as browse-element-text in the pop-up window, the program may provide a preview of high-level summary of the article in the pop-up window. By clicking the arrows at the bottom of the pop-up, the user may bring other parts of the summary into the view.

The Graphical-Browse-Area

When the user clicks "Read more . . . " at the bottom of the pop-up window, the program may open a graphical-browse-area 3600 below the article title area (FIG. 36). The graphical-browse-area contains:

a) the level-1 graphical-browse-view 3601 of the article
b) a set of icons above the graphical-browse-view.
   These icons may enable help the user to perform the following operations:
   Show/hide text-column 3608
   "scroll-left" 3604 or "scroll-right" 3605 to display other graphical-browse-views
c) miniature-views area 3602.
   Initially, in the miniature-views-area, the program may display the miniature-view of the level-1 graphical-browse-view of the article.
   Initially, level-1 graphical-browse-view may be the current graphical-browse-view. Hence the program may highlight the border 3603 of its corresponding miniature-view in a distinct color to indicate that it is the current miniature-view.

Full Width/Narrower Width of the Graphical-Browse-Area

The graphical-browse-area may occupy the full width of the webpage.

Later, when the user performs an operation that results in displaying the text-column, the graphical-browse-area may occupy a narrower width. The user can close the text-column so that graphical-browse-area occupies the full-width of the webpage again.

Navigating in Graphical-Browse-Views

The program may display the level-1 graphical-browse-view of the article.

The program may enable the user to display other graphical-browse-views of the article by performing any of the following operations:

1) Expand a compound-group-symbol from the current graphical-browse-view.
   As a result of this operation, the program may replace the current graphical-browse-view with the expansion of the compound-group-symbol.
2) When the user clicks on a miniature-view in the miniature-views-area, the program may display the graphical-browse-view that corresponds to the clicked miniature-view.
3) Use the operations provided in a pop-up window (the pop-up window is described later this document)
4) click the "scroll-left" or "scroll-right" icons to display other graphical-browse-views that are at the same level as the current graphical-browse-view.

1) Expand a Compound-Group-Symbol from the Current Graphical-Browse-View

As described earlier, a compound-group may be represented by a compound-group-symbol and a graphical-browse-view. The graphical-browse-view is said to be the expansion of the compound-group-symbol As an example, consider the compound-group-symbol "Apple's job creation and manufacturing abroad" 3609 in level-1 graphical-browse-view shown in FIG. 36.

When the user clicks on or near the "branch-down" icon (3606 in the header-element of the compound-group-symbol, the program may display its expansion i.e. the graphical-browse-view named "Apple's job creation and manufacturing abroad" in place of the current graphical-browse-view as shown in FIG. 37.

Details of the Operation

When the user clicks on or near the "branch-down" icon (3606 in the header-element of the compound-group-symbol, that compound-group-symbol is said to be the operation's "target compound-group-symbol".

The compound-group it represents is said to be the "target compound-group". And its corresponding graphical-browse-view is referred to as the "target graphical-browse-view".

Since the target graphical-browse-view is the expansion of a compound-group-symbol in the current graphical-browse-view, the current graphical-browse-view is said to be the "parent graphical-browse-view", or "parent view" for short, of the "target graphical-browse-view".

As a result of the operation, the program may display the target graphical-browse-view in place of the current graphical-browse-view.

Thus the target graphical-browse-view now becomes the "current graphical-browse-view" or "current view" for short.

In other words, the graphical-browse-view named "Apple's job creation and manufacturing abroad" becomes the current graphical-browse-view as shown in FIG. 37.

The Concept of Children of a Graphical-Browse-View

Consider the graphical-browse-view in FIG. 37.

It contains three compound-group-symbols 3701 3702 3703.

Its miniature-view 3707 of the current graphical-browse-view contains three miniature versions of compound-group-symbols 3704 3705 3706.

Its miniature-view 3707 of the current graphical-browse-view is the parent of three miniature-views 3708 3709 3710.

A given graphical-browse-view may contain zero or more compound-group-symbols.

Each of the compound-group-symbols may be expanded to display its corresponding graphical-browse-view.

Each such graphical-browse-view is said to be a child of the given graphical-browse-view.

Hence if N is the number of compound-group-symbols in the given graphical-browse-view, then:

there are N graphical-browse-views that are the children of the given graphical-browse-view.

The miniature-views of those N graphical-browse-views are said to be the children of the miniature-view of the given graphical-browse-view.

The miniature-view of the given graphical-browse-view is said to be the parent of each of those N children miniature-views.

the miniature-view of the given graphical-browse-view contains N miniature versions of compound-group-symbols.

Each child miniature-view corresponds to a miniature version of compound-group-symbol in the parent miniature-view.

Effect of Displaying a Graphical-Browse-View on the Miniature-Views Area

When the program displays a target graphical-browse-view, its corresponding miniature view is said to be the target miniature-view.

As described above, the target graphical-browse-view replaces the current graphical-browse-view and thus itself becomes the current graphical-browse-view.

However, the target-miniature-view may not necessarily replace the current miniature-view. Rather it may be placed in the miniature-view area in a sequence with the parent miniature-view and children miniature-views as described below.

The effect on the miniature-views area may be as follows:

If the target miniature view is already being displayed in the miniature-view area, the program may highlight its border in a distinct color to indicate that it is the current miniature-view and thus the target miniature-view becomes the current miniature-view If the target miniature view is not currently displayed in the miniature-view area, then the program may perform the following operations:

If the target miniature view is a level-2 miniature-view then (please refer to FIG. 38):

If any level-2, level-3, level-4 etc. miniature-views are already displayed in the miniature-views area, the program may remove them from the miniature-views area Inside the level-1 miniature-view, the program may display a border 3801 of distinct color around the miniature compound-group-symbol that corresponds to the target miniature-view The program may display the target miniature-view 3802 to the right of level-1 miniature-view. The name 3803 of the target miniature-view may be displayed below the target miniature-view.

The program may highlight the border of the target miniature-view in a distinct color 3804 to indicate that it is the current miniature-view. Thus the target miniature-view becomes the current miniature-view Based on user settings, the program may display all those miniature-views that are children of the target miniature-view. Such children 3805 3806 3807 may be displayed to the right of the target miniature-view 3802.

If the target miniature view is a level-3 miniature-view then (please refer to FIG. 39):

If any level-2, level-3, level-4 etc. miniature-views are already displayed in the miniature-views area, the program may remove them from the miniature-views area The target miniature-view's parent miniature-view is a level-2 miniature-view. The program may display the target miniature-view's parent miniature-view 3901 along with its name 3902 to the right of level-1 miniature-view.

Based on user settings, the program may display all those miniature-views that are children of the level-2 miniature-view. Such children 3903 3904 3905 may be displayed to the right of the level-2 miniature-view, The program may display the target miniature-view 3904 to the right of level-2 miniature-view. The name 3906 of the target miniature-view may be displayed below the target miniature-view.

The program may highlight the border of the target miniature-view in a distinct color 3907 to indicate that it is the current miniature-view. Thus the target miniature-view becomes the current miniature-view In level-1 miniature-view, the program may display a border 3908 in distinct color around the miniature compound-group-symbol that corresponds to the level-2 miniature-view In level-2 miniature-view, the program may display a border 3909 of distinct color around the miniature compound-group-symbol that corresponds to the target miniature-view If the target miniature view is a level-4 miniature-view then (please refer to FIG. 40):

If any level-2, level-3, level-4 etc. miniature-views are already displayed in the miniature-views area, the program may remove them from the miniature-views area The target miniature-view's parent miniature-view's parent miniature-view is a level-2 miniature-view. The program may display the target miniature-view's parent miniature-view's parent miniature-view 4001 along with its name 4002 to the right of level-1 miniature-view.

Based on user settings, the program may display all those miniature-views that are children 4003 4004 4005 4006 of the level-2 miniature-view. Such children may be displayed to the right of the level-2 miniature-view, The target miniature-view's parent miniature-view is a level-3 miniature-view. The program may display the target miniature-view's parent miniature-view 4005 along with its name 4007 to the right of level-2 miniature-view.

The program may display the target miniature-view 4008 to the right of level-3 miniature-view. The name 4009 of the target miniature-view may be displayed below the target miniature-view.

The program may highlight its border 4010 in a distinct color to indicate that it is the current miniature-view. Thus the target miniature-view becomes the current miniature-view In level-1 miniature-view, the program may display a border 4011 in distinct color around the miniature compound-group-symbol that corresponds to the level-2 miniature-view.

In level-2 miniature-view, the program may display a border 4012 in distinct color around the miniature compound-group-symbol that corresponds to the level-3 miniature-view In level-3 miniature-view, the program may display a border 4013 in distinct color around the miniature compound-group-symbol that corresponds to the target miniature-view An example of compact arrangement of miniature-views:

Based on user settings, the program may display all the children of level-2 miniature-view in a compact arrangement (4101 in FIG. 41) by keeping the target miniature-view's parent miniature-view 4102 in the foreground and hiding the other children of level-2 miniature-view behind it.

Operations that Take the User to Another Graphical-Browse-View

1) Expand a compound-group-symbol from the current graphical-browse-view.

This operation may replace the current graphical-browse-view with the expansion of the compound-group-symbol.

(This operation has been described above. It is listed here in order to provide continuity with the list of items below.)

2) Use a miniature-view in the miniature-views-area to display another graphical-browse-view Examples When the user clicks on a miniature compound-group-symbol 3607 in FIG. 36, the program may display the expansion of the corresponding compound-group-symbol.

The resulting expansion i.e. the graphical-browse-view is shown in FIG. 37.

When the user clicks on a miniature view 3808 in FIG. 38, but not on a miniature compound-group-symbol in it, the program may display the graphical-browse-view corresponding to the miniature-view.

The resulting display is shown in FIG. 39.

3) Use the operations provided in a pop-up window (the pop-up window is described later this document)

4) click the "scroll-left" or "scroll-right" icons to display other graphical-browse-views that are at the same level as the current graphical-browse-view.

Viewing the Article's Summaries—Each at a Different Level of Detail

The user can view the summary of an article at many levels of detail as described below.

Level-1 Summary of the Article

FIG. 22 shows the level-1 graphical-browse-view of the article. It contains two compound group-symbols.

The header-elements of the two compound-group-symbols show that the $1^{st}$ compound-group's name is "Apple's job creation and manufacturing abroad".

the 2nd compound-group's name is "Jobs in America: Past, present and future":

The $1^{st}$ compound-group-symbol represents a large part i.e. a major section of the article and its member-elements provide a high-level summary of that section i.e. "Apple's job creation and manufacturing abroad".

The 2nd compound-group-symbol represents the remaining part of the article and its member-elements provide a high-level summary i.e. the major points of that section.

The member-elements of the two compound-group-symbols together show the main points i.e. a high-level summary of the whole article. It is referred to as level-1 summary of the article.

Thus level-1 graphical-browse-view represents the whole article and it provides a high-level summary of the whole article.

Level-2 Summary of the Article

By expanding the two compound-group-symbols one by one, the user can view the level-2 graphical-browse-views.

Since there are two compound-group-symbols in level-1 view, there are two graphical-browse-views at level-2.

The two level-2 graphical-browse-views together provide the level-2 summary of the article.

a) FIG. 23 shows the first of the two level-2 views. Its name is "Apple's job creation and manufacturing abroad".

It contains three compound-group-symbols 2302 2303 2304. The member-elements of the three compound-group-symbols together show the level-2 summary of the article-section corresponding to "Apple's job creation and manufacturing abroad"

b) FIG. 24 shows the second of the two level-2 views. Its name is "Jobs in America: Past, present and future".

It contains three compound-group-symbols 2402 2403 2404 and one point-symbol 2405. The member-elements of the three compound-group-symbols together with the point-symbol show the level-2 summary of the article-section corresponding to "Jobs in America: Past, present and future":

Level-3 Summary of the Article

By expanding the compound-group-symbols in level-2 graphical-browse-views, the user can view the level-3 graphical-browse-views.

Since there are three compound-group-symbols in each of two level-2 views, there are six graphical-browse-views at level-3.

The member-elements of the six level-3 graphical-browse-views together provide the level-3 summary i.e. the detailed summary of the article.

Focusing on a Part of the Article Instead of the Whole Article

The user does not have to view the complete level-1, level-2 or level-3 summary of the whole article. Instead the user may focus on any part of the article that is of interest to the user:

When the user notices a compound-group-symbol that the user is interested in, the user can expand that compound-group-symbol to view its graphical-browse-view. From that graphical-browse-view, the user can then go deeper by expanding any compound-group-symbols that are of interest to the user.

Probe the Lower Levels by Means of Pop-Up Windows—by Clicking on a Browse-Element in the Current Graphical-Browse-View Instead of expanding the compound-groups to go deeper, the user can probe the lower levels by viewing pop-up windows while staying in the current graphical-browse-view.

In a Compound-Group-Symbol:

In a compound-group-symbol, each member-element corresponds to a compound-group, a simple-group or a point.

a) When the user clicks on a member-element 4201 that corresponds to a compound-group, the program may display the compound-group-symbol 4203 represented by the member-element in a pop-up window 4202 as shown in FIG. 42.

b) When the user clicks on a member-element 4301 that corresponds to a simple-group, the program may display the simple-group-symbol 4303 represented by the member-element in a pop-up window 4302 as shown in FIG. 43.

c) When the user clicks on a member-element 4401 that corresponds to a point, the program may display the article-matter 4403 of that point in a pop-up window 4402 as shown in FIG. 44.

In a Simple-Group-Symbol:

In a simple-group-symbol, each member-element corresponds to a point.

When the user clicks on a member-element 4501, the program may display the article-matter 4503 of the corresponding point in a pop-up window 4502 as shown in FIG. 45.

When the current graphical-browse-view contains a point-symbol that is not part of a simple-group-symbol or compound-group-symbol in the current graphical-browse-view:

When the user clicks on the point-symbol 4601, the program may display the article-matter 4603 of the corresponding point in a pop-up window 4602 as shown in FIG. 46.

Click in a Pop-Up Window to Display One More Pop-Window

When a pop-up window is displayed as described above and the pop-up window contains a compound-group-symbol and the user clicks on a member-element in the compound-group-symbol:

the program may display a new pop-up window that contains a compound-group-symbol, a simple-group-symbol or the article-matter of a point as described in a, b, and c above.

As an example, in FIG. 47, a pop-up window 4701 contains a compound-group-symbol 4702. When the user clicks a member-element 4703 that corresponds to a simple-group, the program may display the simple-group-symbol 4705 represented by the member-element in a new pop-up window 4704.

When the pop-up window contains a simple-group-symbol and the user clicks on a member-element in the simple-group-symbol:

the program displays a new pop-up window that contains the article-matter of the corresponding point.

As an example, in FIG. 48, a pop-up window 4801 contains a simple-group-symbol 4802

When the user clicks a member-element 4803, the program may display the article-matter 4805 of the corresponding point in a new pop-up window 4804.

Click on a Header-Element to Display the Whole Group's Article-Matter in a Pop-Up Window In the graphical-browse-view or in a pop-window that is displayed as described above, when the user clicks on or near the "display-article-matter" icon in the header-element of a compound-group-symbol or a simple-group-symbol, the program may display the article-matter covered by the corresponding compound-group or the simple-group in a pop-up-window.

As an example, in FIG. 49, a pop-up window 4901 contains a simple-group-symbol 4902

When the user clicks on or near the "display-article-matter" icon 4903 in the header-element, the program may display the article-matter 4905 covered by the whole simple-group in a pop-up window 4904.

View the Context by Displaying Higher-Level Compound-Group-Symbols in Pop-Up Windows When the user is viewing a graphical-browse-view, the program may enable the user to view the context by displaying the compound-group-symbols from the parent graphical-browse-views.

As and example, FIG. 50 shows a level-3 graphical-browse-view named "Resources of Foxconn City include a huge workforce" from the article "Apple and job creation in America". When the user clicks the "Show Context" icon 5001, the program may display a pop-up window 5101 as shown in FIG. 51.

The pop-up window contains the compound-group-symbol 5102 whose expansion is the current level-3 graphical-browse-view 5103.

In the compound-group-symbol, the header-element contains the compound-group-name "Resources of Foxconn City include a huge workforce".

The compound-group-symbol is from the level-2 graphical-browse-view that is the parent of the current graphical-browse-view.

The member-elements of the compound-group-symbol are simple-group-names 5104 5105 5106 5107 that also appear in the header-elements 5108 5109 5110 5111 of simple-group-symbols in the current graphical-browse-view.

Since expanding the compound-group-symbol in level-2 graphical-browse-view results in the display of the current level-3 graphical-browse-view, the compound-group-symbol 5101 thus provides a high-level context for the current graphical-browse-view 5102.

When the user clicks the "Further higher-level context" icon 5112, the program may expand the pop-up window and show a compound-group-symbol 5201 from level-1 graphical-browse-view as shown in FIG. 52.

The compound-group-symbol from level-1 has a member-element 5201 that represents the compound-group-symbol 5202 from level-2 graphical-browse-view.

The compound-group-symbol from level-1 provides a higher-level context for the compound-group-symbol from the level-2 graphical-browse-view.

Together, the compound-group-symbol 5201 from level-1 and compound-group-symbol 5202 from level-2 provide the context for the current level-3 graphical-browse-view 5203.

The Text-Browse-Mode

The program may enable the user to view the complete article-matter by displaying the text-column alongside the graphical-browse-views.

As an example, in FIG. 53, when the user clicks the "Show/hide text-column" icon 5301, the program may make the graphical-browse-area narrower 5401 and display the text-column 5402 to the right, as shown in FIG. 54.

The text-column is a single-columnar version of the detailed view. In FIG. 54, the text column shows the higher compound-group-name 5403, the nested compound-group-name 5404, simple-group-name 5405, point-name 5406 and the article-matter 5407.

When user scrolls up/down in the text column, the program may bring other parts of the article-matter into the view.

Narrower Graphical-Browse-Area

When the width of the graphical-browse-area reduces from the full width of the webpage to a narrower width, the user can still perform the operations described above, such as:

1) Expand a compound-group-symbol from the current graphical-browse-view.
2) Use a miniature-view in the miniature-views-area to display another graphical-browse-view
3) Use the operations provided in a pop-up window
4) click the "scroll-left" or "scroll-right" icons to display other graphical-browse-views that are at the same level as the current graphical-browse-view.

Operations in the Text-Column

In the text-column, the following operations on the point-boxes may be available:

a) Show the text-content in break-and-indent format
As shown in FIG. 55, when the user clicks the "Break-and-Indent-Mode" icon 5501 to activate the break-and-indent mode, the program may display the article-text 5502 in the break-and-indent format.
b) Show the text-content in wrap-around format
When the user clicks the "Break-and-Indent-Mode" icon to deactivate the break-and-indent mode, the program may display the article-text in the wrap-around format 5408 as shown in FIG. 54.
c) Hide the text-content of the point-boxes while keeping the point-names visible. As a result, the user can see the sequence of just the point-names within each simple-group.
When the user clicks the "Show Article-Matter" icon 5601 to deactivate it, the program may hide the article-matter in the text-column as shown in FIG. 56. In this mode the program may display only the higher compound-group-names 5602, the nested compound-group-names 5603, simple-group-names 5604, point-names 5605. In this mode, the program enables the user to view the outline of the article.
d) Hide the higher compound-group-names, the nested compound-group-names, simple-group-names, the point-names while keeping the article-matter visible.
In this mode, the program enables the user to read the article-matter in a continuous manner 5701, as shown in FIG. 57, without being interrupted by group-names and point-names.
e) Show the point-names and text-content in all point-boxes
f) Show only the point-names as seen in FIG. 66.
g) Hide both the point-name and text-content in all point-boxes; with the compound-group-name and simple-group-name still visible
h) Show only the simple-group-names as seen in FIG. 67.
i) Show only the inner compound-group-names as seen in FIG. 68.

And so on.

Correspondence Between the Text-Column and the Graphical-Browse-View in Narrow Width a) Color tags are used to show the correspondence of the point-boxes in the text-column and those browse-elements in the graphical-browse-view that represent the corresponding points in the article.

For example, in FIG. 58, the browse-element 5801 corresponds to the point-box 5802 in the text-column. Hence the program displays color tags 5803 5804 in the browse-element 5801 and the point-box 5802 respectively. Both color tags 5803 5804 have the same color; namely, Red=248; Green=103; Blue=16. Thus they indicate that the browse-element 5801 and the point-box 5802 correspond to each other.

Similarly, the program displays the color tags 5807 5808 that have the same color; namely, Red=218; Green=248; Blue=16. They indicate that the browse-element 5805 and the point-box 5806 correspond to each other.

Similarly, the program displays color tags 5811 5812 that have the same color; namely, Red=16; Green=158; Blue=248. They indicate that the browse-element 5809 and the point-box 5810 correspond to each other.

The program may add color tags to the browse-elements when the program brings their corresponding article-matter into the viewable area of the text-column. The program may remove color tags from the browse-elements when the program moves their corresponding article-matter out of the viewable area of the text-column.

b) When the user clicks on a browse-element in the graphical-browse-view, the program may bring the start of the corresponding group-box or point-box into view in the text-column. The group-box or the point-box and the browse-element, both are surrounded by a dashed-line rectangle.

c) When the user clicks in a point-box in the text-column, the corresponding browse-element in the graphical-browse-view comes into view. Both the browse-element and the point-box are surrounded by a dashed-line rectangle Other Operations that Display the Text-Column The program may display the text-column when the user clicks on "Show text-column" icon 4806 in an article-matter pop-up window (as shown in FIG. 48). The program may make the graphical-browse-area narrower and may display the text-column to its right (as shown in FIG. 59).

The content of text-column is positioned to show the article-matter 5901 corresponding to the content 4805 of the pop-up window.

In Continuation of the Previous Process Description

As we saw previously, the program may identify points, simple-groups and compound-groups in the article and construct a set of hierarchical graphical browse-views of the article.

A compound-group may contain compound-groups and/or simple-groups and/or points. A simple-group may contain one or more points.

We saw that a graphical-browse-view is a representation of a compound-group in terms of the symbols of immediate children of the compound-group.

An article may be thought of as consisting of one or more sections. Each of those sections may be thought of as being divided into one or more sections. Each of those sections may be thought of as being further divided into one or more sections and so on. With such a generalized concept of a section in an article, a graphical-browse-view may be thought of as providing a summary of a section of the article. Also, a compound-group-symbol, a simple-group-symbol or a point-symbol may be thought of as providing a summary of a corresponding section of the article.

Navigating in Graphical-Browse-Views

We saw that the program may display the level-1 graphical-browse-view of the article. And the program may enable the user to display other graphical-browse-views of the article by performing operations such as:

5) Expand a compound-group-symbol from the current graphical-browse-view.
   - As a result of this operation, the program may the display the expansion of the compound-group-symbol in place of current graphical-browse-view.
6) When the user clicks on a miniature-view in the miniature-views-area, the program may display the graphical-browse-view that corresponds to the clicked miniature-view.
7) Use the operations provided in a pop-up window.
8) click the "scroll-left" or "scroll-right" icons to display other graphical-browse-views that are at the same level as the current graphical-browse-view.

We saw that, when the program displays a graphical-browse-view, it may display the parent miniature-view, the current miniature-view, and children miniature-views in the miniature-views-area.

We saw that the program may enable the user to view summaries of the article at various levels.

- Level-1 graphical-browse-view may provide a highest-level summary of the whole article.
- A graphical-browse-view at level-2 may provide a more detailed summary of the corresponding section from the article. And so on.
- The lowest-level graphical-browse-view may provide the most detailed summary of the corresponding section from the article.

Any given graphical-browse-view may contain zero or more compound-group-symbols.

- Each of the compound-group-symbols may be expanded to display its corresponding graphical-browse-view. Each such graphical-browse-view is said to be a child of the given graphical-browse-view.
- The given graphical-browse-view is said to be the parent of each such graphical-browse-view.
- Each such graphical-browse-view corresponds to a compound-group-symbol in the parent graphical-browse-view. The miniature-view of each such graphical-browse-view corresponds to that compound-group-symbol in the parent graphical-browse-view.

We also saw that the program may enable the user to view the article-matter corresponding to a point, a simple-group, or a compound-group etc. It also may enable the user to view the article-matter of the whole article.

Arranging the Miniature-Views as a Tree

Below, we describe how the program may display the miniature-views arranged as a tree.

We illustrate the process by considering an article titled "Ch 4. Changing the Management Model". The program may receive the article or one or more parts of the article in one or many possible forms as described before.

The program may perform natural language processing and it may receive input from the user. In one embodiment of the invention, it may perform operations such as, but not limited to, identifying the sequence of points in the article, creating a point-name for each point, identifying simple-groups, creating names for simple-groups, identifying compound-groups, creating names for compound-groups, creation of point-boxes, simple-group-boxes, compound-group-boxes, point-symbols, simple-group-symbols, compound-group-symbols, break-and-indent formatting, formatting of browse-element-text, creating the various graphical views, etc. and it may receive user input as aid in performing such operations.

The Set of Graphical-Browse-Views of an Article in Our Example

FIG. 71 shows the level-1 graphical-browse-view 7101 of the article titled "Ch 4. Changing the Management Model". It contains two compound group-symbols. The term "Level-1" means that it is at the top-level in the hierarchical set of graphical-browse-views.

The header-elements of the two compound-group-symbols show that

- the 1$^{st}$ compound-group-symbol's name 7102 is "New Mantra—Reverse Innovation in Emerging Markets".
- the 2$^{nd}$ compound-group-symbol's name 7103 is "Applying Reverse Innovation—with Local Growth Teams":

Since there are two compound-group-symbols in level-1 view, there are two graphical-browse-views at level-2. The graphical-browse-views at level-2 are children of the graphical-browse-view at level-1.

The First of the Two Level-2 Views a) FIG. 72 shows the first of the two level-2 views. Its name 7201 is "New Mantra—Reverse Innovation in Emerging Markets".

- It contains one simple-group-symbol 7202 and two compound-group-symbols 7203 7204.
- The header-elements show that
  - the simple-group-symbol's name 7205 is "Reverse Innovation in Action".
    - A simple-group-symbol may not be expanded to a more detailed level of summary. Its member-elements represent individual points.
    - Hence the simple-group-symbol provides a detailed point-by-point summary of the part of the article covered by the simple-group-symbol.
  - the 1$^{st}$ compound-group-symbol's name 7206 is "Glocalization in GE—inability to grow in developing world".
  - the 2$^{nd}$ compound-group-symbol's name 7207 is "The Antidote—Reverse Innovate & Create Local Growth Teams".
- Each of the two compound-group-symbols may be expanded to a level-3 graphical-browse-view:
  - The 1$^{st}$ compound-group-symbol may be expanded to a level-3 graphical-browse-view 7301 named "Glocalization in GE—inability to grow in developing world". It is shown in FIG. 73. It is a level-3 graphical-browse-view. It contains four simple-group-symbols 7302, 7303, 7304 and 7305. It does not contain compound-group symbols. Hence none of the contents of this graphical-browse-view can be expanded into further graphical-browse-views.
    - The simple-group-symbols can not be expanded to a more detailed level of summary. Their member-elements represent individual points.

Hence this graphical-browse-view provides a detailed point-by-point summary of the part of the article covered by it.

The 2nd compound-group-symbol may be expanded to a level-3 graphical-browse-view 7401 "The Antidote—Reverse Innovate & Create Local Growth Teams". It is shown in FIG. 74. It is a level-3 graphical-browse-view. It contains three simple-group-symbols 7402, 7403 and 7404. It does not contain compound-group symbols. Hence none of the contents of this graphical-browse-view can be expanded into further graphical-browse-views.

The simple-group-symbols can not be expanded to a more detailed level of summary. Their member-elements represent individual points.

Hence this graphical-browse-view provides a detailed point-by-point summary of the part of the article covered by it.

The two level-3 graphical-browse-views 7301, 7401 described above are children of level-2 graphical-browse-view named "New Mantra—Reverse Innovation in Emerging Markets".

The Second of the Two Level-2 Views b) FIG. 75 shows the second of the two level-2 views. Its name is "Applying Reverse Innovation—with Local Growth Teams" 7501.

It contains four compound-group-symbols 7502, 7503, 7504 and 7505:

The header-elements show that the 1st compound-group-symbol's name is "Building LGTs from the Ground Up" 7506.

the 2nd compound-group-symbol's name is "Create Links to Global Resources—gain advantage over local rivals" 7507.

the 3rd compound-group-symbol's name is "Managing Disciplined Experiments will help LGT maximize learning" 7508.

the 4th compound-group-symbol's name is "Reverse Innovation—Cannibalization & New Strengths" 7509.

Each of the four compound-groups may be expanded to a level-3 graphical-browse-view:

The 1st compound-group-symbol 7502 may expand to a graphical-browse-view 7601 named "Building LGTs from the Ground Up". It is shown in FIG. 76. It is a level-3 graphical-browse-view. It contains three simple-group-symbols 7602, 7603, 7604 and one compound-group-symbol 7605.

The three simple-group-symbols can not be expanded to a more detailed level of summary. Their member-elements represent individual points.

Hence the three simple-group-symbols provide a detailed point-by-point summary of the part of the article covered by them.

the compound-group's name 7606 is "GE's ultrasound business evolution—illustrates LGT building principles".

The compound-group-symbol 7605 may expand to a level-4 graphical-browse-view 7701 named "GE's ultrasound business evolution—illustrates LGT building principles", shown in FIG. 77:

The graphical-browse-view 7701 "GE's ultrasound business evolution—illustrates LGT building principles" is a child of level-3 graphical-browse-view 7601 named "Building LGTs from the Ground Up". It is a level-4 graphical-browse-view. It contains three simple-group-symbols 7702, 7703, and 7704. It does not contain compound-group symbols. Hence none of the contents of this graphical-browse-view can be expanded into further graphical-browse-views.

The simple-group-symbols can not be expanded to a more detailed level of summary. Their member-elements represent individual points.

Hence the graphical-browse-view 7701 "GE's ultrasound business evolution—illustrates LGT building principles" provides a detailed point-by-point summary of the part of the article covered by it.

The 2nd compound-group-symbol 7503 may expand to a graphical-browse-view 7801 "Create Links to Global Resources—gain advantage over local rivals". It is shown in FIG. 78. It is a level-3 graphical-browse-view. It contains two point-symbols 7802 and 7803 and four simple-group-symbols 7804, 7805, 7806 and 7807. It does not contain compound-group symbols. Hence none of the contents of this graphical-browse-view can be expanded into further graphical-browse-views.

The simple-group-symbols can not be expanded to a more detailed level of summary. Their member-elements represent individual points. The points can not be expanded to a more detailed level of summary.

Hence this graphical-browse-view provides a detailed point-by-point summary of the part of the article covered by it.

The 3rd compound-group-symbol 7504 may expand to a graphical-browse-view 7901 named "Managing Disciplined Experiments will help LGT maximize learning". It is shown in FIG. 79. It is a level-3 graphical-browse-view. It may be considered to be a sequence of four parts:

1. a point-symbol 7902.

The point can not be expanded to a more detailed level of summary.

Hence the point provides a detailed point summary of the part of the article covered by it.

2. a compound-group-symbol 7903 named "Focus on Resolving Critical Unknowns".

The compound-group-symbol 7903 may expand to a level-4 graphical-browse-view 8001 named "Focus on Resolving Critical Unknowns", shown in FIG. 80:

The graphical-browse-view 8001 "Focus on Resolving Critical Unknowns" is a child of level-3 graphical-browse-view 7901 named "Managing Disciplined Experiments will help LGT maximize learning". It is a level-4 graphical-browse-view. It contains three simple-group-symbols 8002, 8003, and 8004. It does not contain compound-group symbols. Hence none of the contents of this graphical-browse-view can be expanded into further graphical-browse-views.

The simple-group-symbols can not be expanded to a more detailed level of summary. Their member-elements represent individual points.

Hence the graphical-browse-view "Focus on Resolving Critical Unknowns" provides a detailed point-by-point summary of the part of the article covered by it.

3. three simple-group-symbols 7904, 7905, 7906 that are named "Create a Custom Scorecard", "Revise Plans Frequently", "Hold LGT Leaders accountable for Learning, not Results Against Plan" respectively.

The three simple-group-symbols can not be expanded to a more detailed level of summary. Their member-elements represent individual points.

Hence the three simple-group-symbols provide a detailed point-by-point summary of the part of the article covered by them.

4. one compound-group-symbol 7907 named "Exploiting Global Opportunities to the fullest". It may expand to a level-4 graphical-browse-view 8101 named "Exploiting Global Opportunities to the fullest", shown in FIG. 81:

The graphical-browse-view 8101 "Exploiting Global Opportunities to the fullest" is a child of level-3 graphical-browse-view named "Managing Disciplined Experiments will help LGT maximize learning". It is a level-4 graphical-browse-view. It contains four simple-group-symbols 8102, 8103, 8104 and 8105. It does not contain compound-group symbols. Hence none of the contents of this graphical-browse-view can be expanded into further graphical-browse-views.

The simple-group-symbols can not be expanded to a more detailed level of summary. Their member-elements represent individual points.

Hence the graphical-browse-view "Focus on Resolving Critical Unknowns" provides a detailed point-by-point summary of the part of the article covered by it.

The 4th compound-group-symbol 7505 may expand to a graphical-browse-view 8201 named "Reverse Innovation—Cannibalization & New Strengths". It is shown in FIG. 82. It is a level-3 graphical-browse-view. It contains three simple-group-symbols 8202, 8203, and 8204. It does not contain compound-group symbols. Hence none of the contents of this graphical-browse-view can be expanded into further graphical-browse-views.

The simple-group-symbols can not be expanded to a more detailed level of summary. Their member-elements represent individual points. The points can not be expanded to a more detailed level of summary.

Hence this graphical-browse-view provides a detailed point-by-point summary of the part of the article covered by it.

The four level-3 graphical-browse-views 7601, 7801, 7901 and 8201 described above are children of level-2 graphical-browse-view named "Applying Reverse Innovation—with Local Growth Teams" 7501.

The following is a more concise description of the graphical-browse-views of the article in our example. Starting from the root node, it identifies a) the children of each graphical-browse-view b) any parts of the graphical-browse-view that provide a detailed point-by-point summary.

Level-1 graphical-browse-view 7101 is named "Ch 4. Changing the Management Model". It contains the top-level summary of the whole article. It has two children i.e. graphical-browse-views at level-2.

1) The name of the first level-2 graphical-browse-view is "New Mantra—Reverse Innovation in Emerging Markets" 7201. It has:

a) One simple-group-symbol 7202 named "Reverse Innovation in Action" that

Provides a detailed point-by-point summary of the part of the article covered by the simple-group-symbol.

b) A level-3 child graphical-browse-view 7301 named "Glocalization in GE—inability to grow in developing world".

It provides a detailed point-by-point summary of the part of the article covered by it.

c) A level-3 child graphical-browse-view 7401 named "The Antidote—Reverse Innovate & Create Local Growth Teams".

It provides a detailed point-by-point summary of the part of the article covered by it.

2) The name of second level-2 graphical-browse-view is "Applying Reverse Innovation—with Local Growth Teams" 7501. It has:

a) A level-3 child graphical-browse-view 7601 named "Building LGTs from the Ground Up".

It has:

1. three simple-group-symbols 7602, 7603, 7604 that provide a detailed point-by-point summary of the part of the article covered by the three simple-group-symbols.

2. A level-4 child graphical-browse-view 7701 named "GE's ultrasound business evolution—illustrates LGT building principles".

It provides a detailed point-by-point summary of the part of the article covered by it.

b) A level-3 child graphical-browse-view 7801 named "Create Links to Global Resources—gain advantage over local rivals".

It provides a detailed point-by-point summary of the part of the article covered by it.

c) A level-3 child graphical-browse-view 7901 named "Managing Disciplined Experiments will help LGT maximize learning".

It has:

1. a point-symbol 7902.

It provides a detailed point-by-point summary of the part of the article covered by it.

2. A level-4 child graphical-browse-view 8001 named "Focus on Resolving Critical Unknowns".

It provides a detailed point-by-point summary of the part of the article covered by it.

3. three simple-group-symbols 7904, 7905, 7906 that provide a detailed point-by-point summary of the part of the article covered by the three simple-group-symbols.

4. A level-4 child graphical-browse-view 8101 named "Exploiting Global Opportunities to the fullest".

It provides a detailed point-by-point summary of the part of the article covered by it.

d) A level-3 child graphical-browse-view 8201 named "Reverse Innovation—Cannibalization & New Strengths".

It provides a detailed point-by-point summary of the part of the article covered by it.

The program may display the miniature-views arranged in the form of a tree as shown in FIG. 83. A miniature-view and the name of the miniature-view form a node of the tree. The name of the miniature-view also serves as the name of the node. The program may arrange the leaf nodes in a row 8323 at the bottom of the tree.

The leaf nodes correspond to:

1) those graphical-browse-views that provide a detailed point-by-point summary of the sections of the article covered by them.

and 2) those parts of graphical-browse-views that provide a detailed point-by-point summary of the sections of the article covered by those parts.

To make the tree simpler, the program may display only the miniature-view at each node of the tree as shown in FIG. 84. In another simple version of the tree, the program may display only the name of miniature-view at each node in the tree as shown in FIG. 85. Although simpler to view, the trees in FIG. 84 and FIG. 85 are essentially the same as the tree in FIG. 83.

Parts of a Graphical-Browse-View that Provide Detailed Point-by-Point Summary A graphical-browse-view may consist of one or more point-symbols and/or one or more simple-group-symbols and/or one or more compound-group-symbols. The point-symbols, simple-group-symbols and compound-group-symbols appear in an ordered sequence in the graphical-browse-view.

For example, in FIG. 79, the graphical-browse-view 7901 contains an ordered sequence of one point-symbol 7902 followed by one compound-group-symbol 7903 followed by three simple-group-symbols 7904, 7905, 7906 followed by one compound-group-symbol 7907.

A compound-group-symbol may be expanded into a graphical-browse-view and hence a compound-group-symbol's member-elements together do not provide a detailed point-by-point summary of the section of the article covered by the compound-group-symbol.

A simple-group-symbol can not be expanded to a more detailed level of summary. Its member-elements represent individual points. Hence a simple-group-symbol provides a detailed point-by-point summary of the section of the article covered by the simple-group-symbol.

A point-symbol can not be expanded to a more detailed level of summary. Hence a point-symbol provides a detailed point summary of the section of the article covered by it.

Within the ordered sequence of point-symbols, simple-group-symbols and compound-group-symbols in a graphical-browse-view, the program may identify the longest strings of point-symbols and/or simple-group-symbols that are immediately followed by a compound-group-symbol or immediately preceded by a compound-group-symbol.

The program may consider each such string of point-symbols and/or simple-group-symbols as an individual part of the graphical-browse-view that provides a detailed point-by-point summary of the section of the article covered by that part.

As an example, the graphical-browse-view 7901 in FIG. 79 contains two such parts:

1) The point-symbol 7902 is the longest string of one or more point-symbols and/or one or more simple-group-symbols that is immediately followed by compound-group-symbol 7903

2) The sequence of three simple-group-symbols 7904, 7905, 7906 is the longest string of one or more point-symbols and/or one or more simple-group-symbols that is immediately preceded by compound-group-symbol 7903.

The sequence of three simple-group-symbols 7904, 7905, 7906 is also the longest string of one or more point-symbols and/or one or more simple-group-symbols that is immediately followed by compound-group-symbol 7907.

Thus the graphical-browse-view 7901 in FIG. 79 contains two parts, listed above, such that each part provides a detailed point-by-point summary of the section of the article covered by that part.

The program may construct a graphical-browse-view of each such part. The graphical-browse-view consists of an ordered sequence of the point-symbols and simple-group-symbols that belong to that part.

The graphical-browse-view of such a part is not the full expansion of a compound-group; rather it is a part of a graphical-browse-view that is a full expansion of a compound-group. Hence we may think of the graphical-browse-view of such a part as a quasi-graphical-browse view. However, in the interest of brevity and simplicity, we call it a graphical-browse-view in the following description.

The program may create a name of such part's graphical-browse-view by taking a few words from the name of the first point-symbol or simple-simple-group-symbol and follow those words with ellipses " . . . " followed by a few words from the second point-symbol or simple-group-symbol and follow those words with ellipses " . . . " and so on. Or the program may receive input from the user to aid it in naming the graphical-browse-view.

Based on graphical-browse-view of the part, the program may create the miniature view of the part. The name of the graphical-browse-view is assigned as the name of the miniature-view.

To create the miniature-view

For each simple-group-symbol or point-symbol that is present in the graphical-browse-view, the program may place a corresponding miniature version of the simple-group-symbol or point-symbol in the miniature-view.

The relative positions of the miniature versions of the simple-group-symbol or point-symbol in the miniature-view may be similar to the relative positions of the corresponding simple-group-symbol or point-symbol in the graphical-browse-view.

The miniature-view of such parts are displayed in the bottom-row of nodes of the tree as described further in this document.

Construction of the Tree

As mentioned above, the program may construct the tree such that those graphical-browse-views and parts of graphical-browse-views that provide a detailed point-by-point summary of the section of the article covered by them are represented in the bottom row of nodes of the tree.

Such arrangement may provide a user-friendly means to view the detailed point-by-point summary of the whole article or sections of the article by simply moving left to right along the nodes in the bottom-row of the tree and viewing the corresponding graphical-browse-views.

By reading the detailed point-by-point summary of the article the user may obtain most of the information available in the original article, in much less time.

By viewing the graphical-browse-views corresponding to the upper nodes of the tree, the user may obtain high-level summaries of the sections of the article that are covered by those graphical-browse-views.

The Root Node

The program may display the level-1 miniature-view 8301 i.e. the miniature-view of level-1 graphical-browse-view as the root node.

Level-1 graphical-browse-view provides the summary of the whole article. The program may assign the name of the article as the name of level-1 graphical-browse-view. The program may assign the name of the article as the name of the level-1 miniature-view i.e. the root node. As shown in FIG. 83 the name of the root node is "Ch 4. Changing the Management Model" 8302.

Children of the Root Node

There are two level-2 miniature-views, namely "New Mantra—Reverse Innovation in Emerging Markets" and "Applying Reverse Innovation—with Local Growth Teams" that are children of the level-1 miniature-view.

The program may display the miniature-views of the two level-2 graphical-browse-views as the children of the root node—in the order of appearance of the corresponding compound-group-symbols in level-1 graphical-browse-view.

Thus the program may display the miniature-view "New Mantra—Reverse Innovation in Emerging Markets" as the 1$^{st}$ child 8303 of the root node.

The program may display the miniature-view of the second level-2 graphical-browse-view "Applying Reverse Innovation—with Local Growth Teams" as the 2$^{nd}$ child 8304 of the root node.

Children of the node "New Mantra—Reverse Innovation in Emerging Markets"

Level-2 graphical-browse-view named "New Mantra—Reverse Innovation in Emerging Markets" 7201 (FIG. 72) has two level-3 children. But it also has a part that provides a detailed point-by-point summary. That part consists of one simple-group-symbol 7202 and it appears in the beginning of the graphical-browse-view and it is followed by two compound-group-symbols 7203, 7204 that expand into the two level-3 children.

Hence the program may display the miniature-view 8305 of the part that consists of one simple-group-symbol 7202 and the miniature-views of the two level-3 children 8306, 8307 as the children of the node "New Mantra—Reverse Innovation in Emerging Markets"—in the same order as the appearance of the corresponding part and compound-group-symbols in the graphical-browse-view 7201 named "New Mantra—Reverse Innovation in Emerging Markets"

1$^{st}$ Child:

As mentioned above, the part that provides a detailed point-by-point summary consists of one simple-group-symbol 7202. The program may construct a graphical-browse-view of the part. Based on the graphical-browse-view, the program may create a miniature-view of the part.

The simple-group-symbol's name 7205 is "Reverse Innovation in Action". Hence the program may assign "Reverse Innovation . . . " as the name of the part's graphical-browse-view and miniature-view.

FIG. 86 shows the part's graphical-browse-view 8601. Its name is "Reverse Innovation . . . ".

The miniature-view of the part "Reverse Innovation . . . " may be displayed by the program as the 1$^{st}$ child 8305 of the node "New Mantra—Reverse Innovation in Emerging Markets" 8303 as shown in FIG. 83.

Since the corresponding part provides a detailed point-by-point summary, the program may place the miniature view in the bottom-row of nodes in the tree.

2$^{nd}$ Child:

Next, the compound-group-symbol 7203 "Glocalization in GE—inability to grow in developing world" appears in the graphical-browse-view named "New Mantra—Reverse Innovation in Emerging Markets".

Hence the program may display the miniature-view 8306 named "Glocalization in GE—inability to grow in developing world" as the 2$^{nd}$ child of the node "New Mantra—Reverse Innovation in Emerging Markets".

Since the corresponding graphical-browse-view 7301, namely "Glocalization in GE—inability to grow in developing world" provides a detailed point-by-point summary, the program may place the miniature view "Glocalization in GE—inability to grow in developing world" in the bottom-row of nodes in the tree.

3$^{rd}$ Child:

Next, the compound-group-symbol 7204 "The Antidote—Reverse Innovate & Create Local Growth Teams" appears in the graphical-browse-view named "New Mantra—Reverse Innovation in Emerging Markets" 7201.

Hence the program may display the miniature-view 8307 named "The Antidote—Reverse Innovate & Create Local Growth Teams" as the 3$^{rd}$ child of the node "New Mantra—Reverse Innovation in Emerging Markets".

Since the corresponding graphical-browse-view 7401, namely "The Antidote—Reverse Innovate & Create Local Growth Teams" provides a detailed point-by-point summary, the program may place the miniature view 8307 "The Antidote—Reverse Innovate & Create Local Growth Teams" in the bottom-row of nodes in the tree.

Children of the Node "Applying Reverse Innovation—with Local Growth Teams"

Level-2 graphical-browse-view 7501 named "Applying Reverse Innovation—with Local Growth Teams" has four level-3 children:

a) "Building LGTs from the Ground Up", b) "Create Links to Global Resources—gain advantage over local rivals", c) "Managing Disciplined Experiments will help LGT maximize learning", and d) "Reverse Innovation—Cannibalization & New Strengths"

Hence the program may display the miniature-views of the children as the children of the node 8304 "Applying Reverse Innovation—with Local Growth Teams"—in the same order as the appearance of the corresponding compound-group-symbols in the graphical-browse-view named "Applying Reverse Innovation—with Local Growth Teams."

1$^{st}$ Child:

First, the compound-group-symbol 7502 "Building LGTs from the Ground Up" appears in the graphical-browseview 7501 named "Applying Reverse Innovation—with Local Growth Teams".

Hence the program may display the miniature-view 8313 named "Building LGTs from the Ground Up" as the 1st child of the node 8304 "Applying Reverse Innovation—with Local Growth Teams".

2nd Child:

Next, the compound-group-symbol 7503 "Create Links to Global Resources—gain advantage over local rivals" appears in the graphical-browse-view 7501 named "Applying Reverse Innovation—with Local Growth Teams".

Hence the program may display the miniature-view 8314 named "Create Links to Global Resources—gain advantage over local rivals" as the 2nd child of the node 8304 "Applying Reverse Innovation—with Local Growth Teams".

Since the corresponding graphical-browse-view 7801, namely "Create Links to Global Resources—gain advantage over local rivals" provides a detailed point-by-point summary, the program may place the miniature view 8314 "Create Links to Global Resources—gain advantage over local rivals" in the bottom-row of nodes in the tree.

3rd Child:

Next, the compound-group-symbol 7504 "Managing Disciplined Experiments will help LGT maximize learning" appears in the graphical-browse-view 7501 named "Applying Reverse Innovation—with Local Growth Teams".

Hence the program may display the miniature-view 8315 named "Managing Disciplined Experiments will help LGT maximize learning" as the 3rd child of the node 8304 "Applying Reverse Innovation—with Local Growth Teams".

4th Child:

Next, the compound-group-symbol 7505 "Reverse Innovation—Cannibalization & New Strengths" appears in the graphical-browse-view 7501 named "Applying Reverse Innovation—with Local Growth Teams".

Hence the program may display the miniature-view 8316 named "Reverse Innovation—Cannibalization & New Strengths" as the 2nd child of the node 8304 "Applying Reverse Innovation—with Local Growth Teams".

Since the corresponding graphical-browse-view 8201, namely "Reverse Innovation—Cannibalization & New Strengths" provides a detailed point-by-point summary, the program may place the miniature view 8316 "Reverse Innovation—Cannibalization & New Strengths" in the bottom-row of nodes in the tree.

Children of the Node "Building LGTs from the Ground Up"

The Level-3 graphical-browse-view 7601 named "Building LGTs from the Ground Up" has one level-4 child. But it also has a part that provides a detailed point-by-point summary. That part consists of three simple-group-symbols 7602, 7603, 7604 and it appears in the beginning of the graphical-browse-view and it is followed by a compound-group-symbol 7605 that expands into the level-4 child.

Hence the program may display the miniature-view of the abovementioned part and the miniature-view of the level-4 child as the children of the node 8313 "Building LGTs from the Ground Up"—in the same order as the appearance of the corresponding part and compound-group-symbols in the graphical-browse-view 7601 named "Building LGTs from the Ground Up".

1st Child:

As mentioned above, the part that provides a detailed point-by-point summary consists of three simple-group-symbols 7602, 7603, 7604. The program may construct a graphical-browse-view of the part. Based on the graphical-browse-view, the program may create a miniature-view of the part.

The names of three simple-group-symbols 7602, 7603, 7604 are "Interactions among people must be purposefully created in LGTs", "Populating the LGT with the best available talent", and "LGT's should have experts who innovate in emerging markets". Hence the program may assign "Interactions among . . . Populating the LGT LGT's should have . . . " as the name of the part's graphical-browse-view and miniature-view.

FIG. 87 shows the part's graphical-browse-view 8701. Its name is "Interactions among . . . Populating the LGT . . . LGT's should have . . . ".

The part's miniature-view "Interactions among . . . Populating the LGT LGT's should have . . . " may be displayed by the program as the 1st child 8317 of the node 8313 "Building LGTs from the Ground Up" as shown in FIG. 83.

Since the corresponding part provides a detailed point-by-point summary, the program may place the part's miniature view in the bottom-row of nodes in the tree.

2nd Child:

Next, the compound-group-symbol 7605 "GE's ultrasound business evolution—illustrates LGT building principles" appears in the graphical-browse-view named "Building LGTs from the Ground Up".

Hence the program may display the miniature-view 8318 named "GE's ultrasound business evolution—illustrates LGT building principles" as the 2nd child of the node 8313 "Building LGTs from the Ground Up".

Since the corresponding graphical-browse-view 7701, namely "GE's ultrasound business evolution—illustrates LGT building principles" provides a detailed point-by-point summary, the program may place the node 8318 "GE's ultrasound business evolution—illustrates LGT building principles" in the bottom-row of nodes in the tree.

Children of the Node "Managing Disciplined Experiments Will Help LGT Maximize Learning"

The Level-3 graphical-browse-view 7901 named "Managing Disciplined Experiments will help LGT maximize learning" has two level-4 children. But it also has two parts that provides a detailed point-by-point summary. The first part consists of one point-symbol 7902 and it appears in the beginning of the graphical-browse-view and it is followed by a compound-group-symbol 7903—which, in turn, is followed by the second part that consists of three simple-group-symbols 7904, 7905, 7906—the second part, in turn, is followed by a compound-group-symbol 7907.

The program may display the miniature-views of the two parts and the miniature-views of the two level-4 children as the children of the node 8315 "Managing Disciplined Experiments will help LGT maximize learning"—in the same order as the appearance of the corresponding parts and compound-group-symbols in the graphical-browse-view 7901 named "Managing Disciplined Experiments will help LGT maximize learning"

1st Child:

As mentioned above, the part that provides a detailed point-by-point summary consists of one point-symbol 7902. The program may construct a graphical-browse-view of the part. Based on the graphical-browse-view, the program may create a miniature-view of the part.

The point-symbol's name is "It's less important to deliver on plan than state hypotheses about future". Hence the program may assign "It's less important . . . " as the name of the part's graphical-browse-view and miniature-view.

FIG. 88 shows the part's graphical-browse-view 8801. Its name is "It's less important . . . ".

The miniature-view 8319 of the part "It's less important . . . " may be displayed by the program as the 1st child of the node 8315 "Managing Disciplined Experiments will help LGT maximize learning" as shown in FIG. 83.

Since the corresponding part provides a detailed point-by-point summary, the program may place the miniature view in the bottom-row of nodes in the tree.

2nd Child:

Next, the compound-group-symbol 7903 "Focus on Resolving Critical Unknowns" appears in the graphical-browse-view named "Managing Disciplined Experiments will help LGT maximize learning".

Hence the program may display the miniature-view 8320 named "Focus on Resolving Critical Unknowns" as the 2nd child of the node 8315 "Managing Disciplined Experiments will help LGT maximize learning".

Since the corresponding graphical-browse-view 8001, namely "Focus on Resolving Critical Unknowns" provides a detailed point-by-point summary, the program may place the node 8320 "Focus on Resolving Critical Unknowns" in the bottom-row of nodes in the tree.

3rd Child:

As mentioned above, the part that provides a detailed point-by-point summary consists of three simple-group-symbols 7904, 7905, 7906. The program may construct a graphical-browse-view of the part. Based on the graphical-browse-view, the program may create a miniature-view of the part.

The names of three simple-group-symbols 7904, 7905, 7906 are "Create a Custom Scorecard", "Revise Plans Frequently", and "Hold LGT Leaders accountable for Learning, not Results Against Plan". Hence the program may assign "Create a Custom . . . Revise Plans . . . Hold LGT Leaders . . . " as the name of the part's graphical-browse-view and miniature-view.

FIG. 89 shows the part's graphical-browse-view "Create a Custom . . . Revise Plans . . . Hold LGT Leaders . . . ".

The part's miniature-view 8321 "Create a Custom . . . Revise Plans . . . Hold LGT Leaders . . . " may be displayed by the program as the 3rd child of the node 8315

"Managing Disciplined Experiments will help LGT maximize learning" as shown in FIG. 83.

Since the corresponding part provides a detailed point-by-point summary, the program may place the node 8321 "Create a Custom Scorecard" in the bottom-row of nodes in the tree.

4th Child:

Next, the compound-group-symbol 7907 "Exploiting Global Opportunities to the fullest" appears in the graphical-browse-view named "Managing Disciplined Experiments will help LGT maximize learning".

Hence the program may display the miniature-view 8322 named "Exploiting Global Opportunities to the fullest" as the 4th child of the node 8315 "Managing Disciplined Experiments will help LGT maximize learning".

Since the corresponding graphical-browse-view 8101, namely "Exploiting Global Opportunities to the fullest" provides a detailed point-by-point summary, the program may place the node 8322 "Exploiting Global Opportunities to the fullest" in the bottom-row of nodes in the tree.

Displaying the Names of Miniature-Views in the Same Format as Browse-Element-Text Most of the names of miniature-views may also be found in browse-elements in one or more graphical-browse-views. In those occurrences, the program may format the names as per the formatting of browse-element-text that was described earlier. The program may use the same format to display the names of miniature-views in the tree as well. As shown FIG. 83, the program may display names in the upper nodes using the same format as the browse-element-text and may display the names in the bottom-row using a narrower format so that the tree does not become excessively wide. But the narrow formatting of the names in the bottom-row may degrade the readability of the names in the bottom-row nodes. Hence the program may display the tree as shown in FIG. 90.

Displaying Miniature-Views in the Bottom-Row Nodes and List of Names Below it

As shown in FIG. 90, the program may display only the miniature-views 9001 in the bottom-row nodes of the tree and the program may display, in the upper nodes, only the names 9002 of miniature-views using the same format as the browse-element-text. This method prevents the tree from becoming excessively wide. Below the bottom-row of nodes, the program may display the list of names 9003 of the bottom-row nodes as shown in FIG. 90. The list of names may be scrolled leftward or rightward by the program so that the those names in the list that are not in the view may be brought into the view.

Labels to Correlate Bottom-Row-Nodes with the Names in the List of Names

The program may display the bottom-row nodes with numeric labels 1, 2, 3 . . . etc. 9004, 9005, 9006 as shown in FIG. 90. Also, the program may display the names in the list of names with numeric labels 1, 2, 3 . . . etc. 9007, 9008, 9009 as shown in FIG. 90. Such labels may help the user correlate the bottom-row nodes of the tree with the names in the list of names. For example, the labels 9005 and 9008 both have the value "2". Hence the tree node at 9002 has the name shown at 9006. Instead of numeric labels, the program may use alphabetic, alphanumeric and/or symbolic labels or a combination thereof.

The program may also display the names of bottom-row nodes in columnar lists 9101 below their respective parent nodes as shown in FIG. 91. Thus the program may hide the bottom-row nodes and show the names of bottom-row-nodes in a columnar arrangement below their respective parent nodes.

The names of bottom-row nodes are also known as low-level headings.

To Browse in an Article

FIG. 92 shows a part of a webpage displayed by the program. It contains a list of article titles including "Ch 4.

Changing the Management Model" 9201. In this view, the program may format the article title as per the formatting of browse-element-text with the exception that it may not bottom-align the article title in the available area.

When a user clicks on an article title such as "Ch 4. Changing the Management Model" 9201, the program may display the low-level headings 9301 as shown in FIG. 93.

As described earlier, a low-level heading is the name of a node in the bottom-row of the tree and its corresponding graphical-browse-view provides a detailed point-by-point summary of a section of the article. When the user clicks on a low-level heading, the program may display the corresponding graphical-browse-view.

For example, when a user clicks the 2nd low-level heading from the top, namely "Glocalization in GE—inability to grow in developing world", the program may display the browse-area as shown in FIG. 94. The browse-area shows the graphical-browse-view 9401 "Glocalization in GE—inability to grow in developing world" which corresponds to the 2nd node in the bottom-row of nodes in the tree.

"Previous Section" and "Next Section" Icons

When a user clicks the "Next Section" icon 9402, the program may display the graphical-browse-view corresponding to the next node in the bottom-row of nodes in the tree.

For example, when the graphical-browse-view 9401 corresponding to the 2nd node in the bottom-row of nodes in the tree is displayed as shown in FIG. 94 and the user clicks the "Next Section" icon 9402, the program may display the graphical-browse-view 9501 corresponding to the 3rd node in the bottom-row of the tree, namely "The Antidote—Reverse Innovate & Create Local Growth Teams" as shown in FIG. 95.

When a user clicks the "Previous Section" icon 9502, the program may display the graphical-browse-view corresponding to the previous node in the bottom-row of nodes in the tree.

By clicking the "Previous Section" and "Next Section" icons, the user can view, one by one, all the graphical-browse-views that correspond to the bottom-row of nodes of the tree and thus view the detailed point-by-point summary of the whole article.

Display the Miniature-Views of the Bottom-Row Nodes of the Tree

When the user clicks the "Show bottom-row-nodes" icon 9503, the program may display the miniature-views 9601 of the bottom-row nodes of the tree as shown in FIG. 96. The miniature-view that corresponds to the currently displayed graphical-browse-view is indicated by a distinctive border around the miniature-view" 9602.

In addition, the program may display the list of low-level headings 9603 i.e. names of the bottom-row nodes". In the list, the name of the currently displayed graphical-browse-view is highlighted with a distinct color of text. The program may enable the user to scroll the contents of the list to the left or right by clicking the "Previous low-level heading" 9604 and "Next low-level heading" icons 9605.

When the user clicks on a miniature view, the program may display the corresponding graphical-browse-view. For example, when the user clicks on the 5th miniature-view 9606 (whose name is "GE's ultrasound business evolution—illustrates LGT building principles") in the bottom-row nodes, the program may display the corresponding graphical-browse-view 9701 as shown in FIG. 97.

Display all Low-Level Headings

When a user clicks the "Show all low-level headings" icon 9702, the program may show a columnar grouping of low-level headings 9802 as shown in FIG. 98. Here, each column contains those low-level headings that have the same immediate parent in the tree. When the total set of columns exceeds the width of the viewport, the program may enable the user to scroll the set of columns to the left or right by clicking the "Previous Column" 9803 and "Next Column" 9804 icons.

Click on a Low-Level Heading

When the user clicks on a low-level heading in the columnar arrangement as shown in FIG. 98 or in the single-row arrangement as shown in FIG. 96, the program may display the corresponding graphical-browse-view. For example, when the user clicks on the low-level heading "The Antidote—Reverse Innovate & Create Local Growth Teams" 9703 in FIG. 97, the program may display the corresponding graphical-browse-view 9902 named "The Antidote—Reverse Innovate & Create Local Growth Teams" as shown in FIG. 99.

Display the Headings of Simple-Group-Symbols and Compound-Group-Symbols at the Bottom of the Tier A graphical-browse-view may contain point-symbols and/or simple-group-symbols and/or compound-group-symbols that may be arranged in one or more tiers. The member browse-elements of the various symbols together provide a summary of the part of the article that is covered by the graphical-browse-view.

Hence it is important that the user be able to focus on the member-elements without being distracted by the text in the header-elements of the simple-group-symbols and compound-group-symbols.

When the user clicks on the "Show headings at the bottom" icon 9903, the program may display the header-elements 9904, 9905, 9906 of the simple-group-symbols at the bottom of the tier 10002, 10003, 10004 as shown in FIG. 100. Aligning the header-elements side-by-side at the bottom of the tier keeps the header-elements easier to read than placing each header-element immediately below the last member-element in its respective simple-group-symbol. Similarly, the program may display the header-elements of compound-group-symbols at the bottom of the tier.

When the user clicks on the "Show headings at the top" icon 10005, the program may display the header-elements 9904, 9905, 9906 at the top of the simple-group-symbols and compound-group-symbols as shown in FIG. 99.

Display Upper-Level Nodes of the Tree

When the user clicks the "Show Upper Nodes" icon 9704 as shown in FIG. 97, the program may display the upper-level nodes. Since the bottom-row of nodes was already displayed, when the program displays the upper-level nodes, the user can see the whole tree 10101 as shown in FIG. 101.

To reduce the visual complexity of the tree, initially, the program may display small symbols such as, but not limited to, small circles 10102 in place of the upper nodes of the tree as shown in FIG. 101. When a user clicks on an upper node such as 10103, the program may display the miniature-views 10201 in all upper nodes of the tree and display the graphical-browse-view 10202 corresponding to the upper node that was clicked, as shown in FIG. 102.

When the user clicks the "Show high-level headings" icon 10203, the program may display the names 10301 of the miniature-views in the upper nodes as shown in FIG. 103.

Display Only the Header-Elements of Group-Symbols in a Graphical-Browse-View

FIG. 104 shows the graphical-browse-view named "Managing Disciplined Experiments will help LGT maximize learning". It contains one point-symbol, two compound-group-symbols and three simple-group-symbols.

In each group-symbol, the member-elements may provide a summary of the section covered by the group-symbol. The header-element of a group-symbol summarizes the information provided by the member-elements of that group-symbol.

Thus the member-elements of all the group-symbols in the graphical-browse-view together provide the summary of the sections covered by those group-symbols while the header-elements of all the group-symbols in the graphical-browse-view together provide the overview of the sections covered by those group-symbols.

When the user clicks the "Show only the column-headings" icon 10402, the program may hide the member-elements and display the graphical-browse-view as shown in FIG. 105. In FIG. 105, the header-elements together provide an overview of the sections covered by the group-symbols.

The present invention can be realized in hardware, software, or a combination of hardware and software. An implementation of the method and system of the present invention can be realized in a centralized fashion in one computer system, or in a distributed fashion where different elements are spread across several interconnected computer systems.

In one embodiment of the invention, the method and system of the present invention can be realized in a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in different material form. Significantly, this invention can be embodied in other specific forms without departing from the spirit or essential attributes.

Examples of computer system include a laptop, a desktop, a tablet computer, a mobile telephone, a personal digital assistant etc. Any kind of computer system, or other apparatus adapted for carrying out the methods described herein, is suited to perform the functions described herein.

FIG. 69 shows a block diagram of exemplary components of a computer system. A computer system 6901 may include a bus 6902, processing logic 6903, input devices 6904, output devices 6905, a communication interface 6906, and a memory 6907. Computer system 6901 may include other components (not shown) that aid in receiving, transmitting, and/or processing data. Moreover, other configurations of components in computer system 6901 are possible.

Bus 6902 may include a path that permits communication among the components of computer system 6901. Processing logic 6903 may interpret and execute instructions. Memory 6907 may store instructions, data, etc. Memory may include RAM or another type of dynamic storage device, ROM or another type of static storage device, some other type of memory such as magnetic or optical recording medium and its corresponding drive etc.

Operating system 6908 include software instructions to manage hardware and software resources of computer system. Operating system 6908 may include Linux, Solaris, Windows, OS X, IOS, Android, an embedded operating system etc. Applications 6909 and application data 6910 may provide services and applications that may be available on computer system.

Input devices 6904 may allow a user to input information into computer system. Input devices may include keyboard, mouse, pen, microphone, remote control, audio capture device, touch-screen display etc. Output devices 6905 may output information to the user. It may include display units, printers, speakers, LEDs etc. Input devices and output devices may allow a user to activate and interact with a particular service or application, such as a web browser or an application to search for and discover information.

Communication interface 6906 may include receivers and transmitters that enable computer system to communicate with other devices or systems. Communication interface may include network interface cards such as Ethernet card, a wireless network interface. It may also include USB ports, Bluetooth interface, radio-frequency identification interface, near-field communications interface etc.

Computer system 6901 may perform the operations described herein in response to processing logic 6903 executing software instructions stored in a computer-readable medium, such as memory 6907. A computer-readable medium may include a physical and/or logical memory device. The software instructions may be read into memory 6907 from another computer-readable medium or from another device via communication interface 6906. The software instructions stored in memory 6907 may cause processing logic 6903 to perform methods that are described herein.

In another embodiment, the method and system of the present invention can be realized in a distributed fashion where different elements are spread across several computer systems that may be interconnected via one or more networks.

As an example FIG. 70 shows a user's computer system 7001 and a server 7003 that are connected via a network 7002. The user may activate a web browser on the computer system. The web browser may execute Javascript, HTML, etc.

The computer system may interact with the server via the network to provide the user with the ability to download from the server, whole or parts of the computer program described herein together with a list of articles and parts of XML files described herein for those articles.

The web browser may execute parts of the program and show the list of articles on a display unit to the user. The user may click a particular article entry in order to preview its high-level summary as described earlier. The user may command the program to display the full high-level summary. Such command may cause the computer system to interact with the server via the network and download from the server, more parts of the program and more parts of or the whole XML file described herein for that article.

The program may display the level-1 graphical-browse-view to the user. On viewing the high-level summary in level-1 graphical-browse-view, the user may command the program to display the lower-level graphical browse-views. If the needed parts of the XML file and the needed parts of program have already been downloaded from the server, the program may display the desired graphical-browse-view to the user. Otherwise, the command may cause the computer system to interact with the server via the network and download from the server, more parts of the program and more parts of or the whole XML file described herein for that article. And so on.

The program may enable the user to perform editing via the graphical editor as described earlier in this document. When the user commands the program to save the XML file, the program may cause the computer system to interact with the server via the network and upload the XML file to the server where the XML file may be stored. Alternatively, the program may enable the user to save the XML file locally in the computer system. The sequence of operations above presents an example of the interaction between the user's computer, the network and the server. A user's sessions may consist of much longer and varied sequences of a much broader variety of operations.

The network 180 may include, but not be limited to, one or more of: an Internet protocol (IP) based network, a local area network (LAN), a wide area network (WAN), a personal area network (PAN), an intranet, the Internet, a cellular network, a fiber-optic network, a public-switched telephone network (PSTN) or another type of network.

The exemplary configuration of devices in FIG. 70 is illustrated for simplicity. The network may be connected to thousands or millions of users' computer systems. In some embodiments, the functions performed by two or more devices may be performed by any one device. Likewise, in some embodiments, the functions performed by any one device may be performed by multiple devices. The connections in FIG. 70 may also be wireless or wired.

In consideration of computer systems having the means of producing audio output and receiving voice commands, the operation of showing information on display unit(s) may be accompanied by or may be substituted by producing audio output relevant to the said information. Such production of audio output may include, but not be limited to, text to voice synthesis. In consideration of computer systems having touch-interface, voice-command interface, eye-tracking interface etc., the operation of receiving input includes receiving voice commands as well as input from keyboard, mouse, touch, trackball, tracking of eye movement, eye direction etc.

Aspects of the invention are described below.

In a first aspect, a method of generating a multi-level summary of an article, the method comprising: generating, by a computing device, a low-level summary from article-matter in an article; generating, by the computing device, a mid-level summary based on the low-level summary and the article-matter; and generating, by the computing device, an upper-level summary based on the mid-level summary, the low-level summary, and the article-matter.

In a second aspect, the method of the first aspect may further comprise: receiving the article; analyzing the article-matter to identify points in the article, wherein a point is a unit of information expressed in one or more sentences, phrases, or words; generating a summary of each point, wherein the summary of a point is a point-name and the point-name is shorter than, equal to, or longer than the length of article-matter it covers; and displaying the low-level summary in an outline format.

In a third aspect, the method of the second aspect may further comprise identifying groups of related points, and for each group of related points, generating a summary by analyzing the point-names of the points in the group and the article-matter covered by the points in the group, wherein each group of points is a simple-group, the summary of a group of points is a simple-group-name, and the simple-group and the simple-group-name covers the points in the group and the corresponding point-names, and wherein the simple-group and the simple-group-name covers the article-matter covered by the points in the group.

In a fourth aspect, the method of the third aspect may further comprise identifying groups of related simple-groups, and any related points that are not part of any group so far, and for each group of related simple-groups, and any related points, generating a short summary by analyzing the simple-group-names of the simple-groups in the group, the point-names of the points in the simple-groups in the group, the point-names of the points in the group, and the article-matter covered by the simple-groups and points in the group, wherein each such group of simple-groups and points is a compound-group and the short summary of a group of simple-groups and points is a compound-group-name, wherein the compound-group and the compound-group-name cover the simple-groups and points in the group and the corresponding simple-group-names and point-names, and wherein the compound-group and the compound-group-name cover the article-matter covered by the simple-groups and points in the group.

In a fifth aspect, the method of the fourth aspect may further comprise generating the point-names such that a majority of the displayed point-names have a length less than 105 characters excluding spaces, wherein, when generating a point-name shorter than 105 characters omits important information, generating the point-name having a length less than 210 characters excluding spaces.

In a sixth aspect, the method of the fifth aspect may further comprise generating the point-names such that a majority of the point-names contain a complete declarative sentence or the predicate part of a complete sentence In a seventh aspect, the method of the sixth aspect may further comprise displaying point-names in at most two lines of text and wherein, when a point-name can not be displayed in two lines of text, displaying the point name in four lines of text wherein the four lines of text are displayed as two pairs of lines of text wherein the vertical space between lines in the first pair is small and the vertical space between the lines in the second pair is small and the vertical space between the two pairs is much larger than the vertical space between the lines in a pair.

In an eighth aspect, the method of the seventh aspect may further comprise: generating the simple-group-names such that each displayed simple-group-name is shorter than 105 characters excluding spaces and includes a complete declarative sentence or the predicate part of a complete sentence; and generating the compound-group-names such that each displayed compound-group-name is shorter than 105 characters excluding spaces and includes a complete declarative sentence or the predicate part of a complete sentence.

In a ninth aspect, the method of the eighth aspect may further comprise comprising: generating the point-names such that a) more than 65% of the point-names are such that each of the corresponding points covers three or fewer sentences in the article-matter, b) more than 45% of the point-names are such that each of the corresponding points covers two or fewer sentences in the article-matter, or c) more than 15% of the point-names are such that each of the corresponding points covers one sentence or less than one sentence in the article-matter.

In a tenth aspect, the method of the fourth aspect may further comprise: generating a higher level of summary by identifying groups of related compound-groups and any related simple-groups that are not part of any group so far, and any related points that are not part of any group so far, and for each such group of related compound-groups, any related simple-groups, and any related points, generating a short summary by analyzing the compound-group-names of the compound-groups in the group, the simple-group-names of any simple-groups in the group, the point-names of any points in the group, and the article-matter covered by the compound-groups, simple-groups and points in the group, wherein each such group of compound-groups, simple-groups and points is a higher-compound-group and the short summary of a group of compound-groups, simple-groups and points is a higher-compound-group-name wherein the higher-compound-group and higher-compound-group-name cover the compound-groups, simple-groups and points in the group and the corresponding compound-group-names, simple-group-names and point-names and wherein the higher-compound-group and the higher-compound-group-name cover the article-matter covered by the compound-groups, simple-groups and points in the group.

In an eleventh aspect, the method of the tenth aspect may further comprise: displaying a low-level summary of the article as a sequence of point-names of all points drawn from the article; displaying a mid-level summary of the article as a sequence of simple-group-names of all simple-groups drawn from the article; displaying an upper-level summary of the article as a sequence of compound-group-names of all compound-groups drawn from the article and displaying a higher-level summary of the article as a sequence of higher-compound-group-names of all higher-compound-groups drawn from the article.

Aspects may relate to mapping summaries to graphical-browse-views. In a twelfth aspect, a method of displaying a low-level summary of the article-matter covered by a simple-group in the form of a simple-group-symbol, and the method may further comprise: generating a symbol of a simple-group by: formatting the simple-group-name of the simple-group and the point-name of each point contained by the simple-group in a columnar arrangement such that the simple-group-name occurs at the top, followed by the point-name of a first point in the simple-group followed by the point-name of a second point in the simple-group and so on, till the point-name of a last point in the simple-group occurs at the bottom in the columnar arrangement wherein such a columnar arrangement of the simple-group-name and point-names is a simple-group-symbol and the order of point-names in the simple-group-symbol is as per the order of the article-matter covered by the corresponding points in the overall article-matter; and displaying the simple-group-symbol.

In a thirteenth aspect, the method of the twelfth aspect may further comprise: wherein In a simple-group-symbol, the simple-group-name is the header-element of the simple-group-symbol and the point-names are the member-elements of the simple-group-symbol, displaying the header-element at the bottom of the simple-group-symbol i.e. below the last member-element of the simple-group-symbol, in response to a user command or a user setting; displaying the header-element at the top of the simple-group-symbol i.e. above the first member-element of the simple-group-symbol in response to a user command or a user setting; hiding the header-element of the simple-group-symbol in response to a user command or a user setting, and further, when the header-element is displayed at the top of the simple-group-symbol, displaying the header-element such that the vertical space between the text of the header-element and the text of the first member element is greater than the vertical space between the text of the first member-element and the second member-element.

In a fourteenth aspect, a method of displaying a low-level summary of the article-matter covered by a basic-compound-group, wherein a compound-group that does not contain any compound-group is called a basic-compound-group, the method may comprise: displaying, as per the method in the thirteenth aspect, the simple-group-symbol of each simple-group that is contained by the basic-compound-group and displaying point-names of the points that are contained by the basic-compound-group wherein such points are not contained by a simple-group and wherein the order of displaying the simple-group-symbols and the point-names is as per the order of the article-matter covered by the corresponding simple-groups and points in the overall article-matter.

In a fifteenth aspect, the method of the fourteenth aspect may further comprise: when the header-elements are displayed at the bottom of the simple-group-symbols and two or more simple-group-symbols are displayed side by side, displaying the simple-group-symbols such that the first member-elements of the simple-group-symbols are displayed at the same vertical level and the header-elements of the simple-group-symbols are displayed at the same vertical level with the result that the vertical space between the last member-element and the header-element is unequal among the simple-group-symbols that have an unequal number of member-elements In a sixteenth aspect, a method of displaying a graphical view of low-level summary of the article, the method comprising: for each basic-compound-group in the article, displaying, as per the method in the fifteenth aspect, a low-level summary of the article-matter covered by the basic-compound-group, for each simple-group in the article that is not contained by a basic-compound-group, displaying, as per the method in the thirteenth aspect, the simple-group-symbol of the simple-group, and displaying point-name of each point in the article that is not contained by a basic-compound-group and is not contained by a simple-group, wherein the order of displaying the point-names, simple-group-symbols and low-level-summaries of basic-compound-groups is as per the order of the article-matter covered by the corresponding points, simple-groups and basic-compound-groups in the overall article-matter.

In a seventeenth aspect, a method of displaying, in the form of a compound-group-symbol, a mid-level summary of the article-matter covered by a basic-compound-group, the method comprising: generating a symbol of a compound-group by: formatting the compound-group-name of the basic-compound-group, and the names of the members directly contained by the basic-compound-group, namely, the simple-group-name of each simple-group contained by the basic-compound-group and the point-name of each point directly contained by the basic-compound-group in a columnar arrangement such that the compound-group-name is at the top, followed by the name of a first member followed by the name of a second member and so on, till a last member is placed at the bottom in the columnar arrangement wherein such a columnar arrangement is called a compound-group-symbol, wherein the compound-group-name is called the header-element of the compound-group-symbol and the names of members are called member-elements of the compound-group-symbol and wherein the order of the simple-group-names and the point-names in the compound-group-symbol is as per the order of the article-matter covered by the corresponding simple-groups and points in the overall article-matter; and displaying the compound-group-symbol.

In an eighteenth aspect, a method of displaying a mid-level summary of the article-matter covered by a bas-par-compound-group, wherein a compound-group that contains one or more basic-compound-groups but no higher-compound-groups is called a bas-par-compound-group, the method comprising: displaying, as per the method in the seventeenth aspect, the compound-group-symbol of each basic-compound-group that is contained by the bas-par-compound-group and displaying simple-group-names of the simple-groups that are contained by the bas-par-compound-group wherein such simple-groups are not contained by a basic-compound-group and displaying point-names of the points that are contained by the bas-par-compound-group wherein each such point is not contained by a basic-compound-group and is not contained by a simple-group and the order of displaying the compound-group-symbols, simple-group-symbols, and the point-names is as per the order of the article-matter covered by the corresponding basic-compound-groups, simple-groups and points in the overall article-matter.

In a nineteenth aspect, a method of displaying a graphical view of mid-level summary of the article, the method comprising: for each bas-par-compound-group in the article, displaying, as per the method in the eighteenth aspect, a mid-level summary of the article-matter covered by the bas-par-compound-group, for each basic-compound-group in the article that is not contained by a bas-par-compound-group, displaying, as per the method in the seventeenth aspect, the compound-group-symbol of the basic-compound-group, for each simple-group in the article that is not contained by a bas-par-compound-group, and is not contained by a basic-compound-group, displaying the simple-group-name of that simple-group, and displaying point-name of each point in the article that is not contained by a bas-par-compound-group and is not contained by a basic-compound-group and is not contained by a simple-group wherein the order of displaying the point-names, simple-group-names, compound-group-symbols of basic-compound-groups and mid-level-summaries of bas-par-compound-groups is as per the order of the article-matter covered by the corresponding points, simple-groups, basic-compound-groups and bas-par-compound-groups in the overall article-matter.

Aspects may include mapping the multi-level summary to a layout of nested boxes. The method of the tenth aspect may further comprise a twentieth aspect, described below. In a twentieth aspect, a method of displaying the multi-level summary and the article-matter in a visual layout of nested boxes, the method comprising: for each point-name in the multi-level summary, displaying a box wherein the point-name is displayed as the title of the box and the article-matter covered by the point-name is displayed inside the box and wherein such a box is a point-box; for each simple-group-name in the multi-level summary, displaying a box wherein the simple-group-name is displayed as the title of the box and the article-matter directly covered by the simple-group-name is displayed inside the box and wherein such a box is a simple-group-box and wherein the simple-group-box encloses the point-boxes corresponding to the point-names that are covered by the simple-group-name; for each compound-group-name in the multi-level summary, displaying a box wherein the compound-group-name is displayed as the title of the box and the article-matter directly covered by the compound-group-name is displayed inside the box and wherein such a box is a compound-group-box and wherein the compound-group-box encloses the simple-group-boxes and point-boxes corresponding to the simple-group-names and point-names that are covered by the compound-group-name for each higher-compound-group-name in the multi-level summary, displaying a box wherein the higher-compound-group-name is displayed as the title of the box and the article-matter directly covered by the higher-compound-group-name is displayed in the box and wherein such a box is a higher-compound-group-box and wherein the higher-compound-group-box encloses the compound-group-boxes, simple-group-boxes and point-boxes corresponding to the compound-group-names, simple-group-names and point-names that are covered by the higher-compound-group-name.

In a twenty-first aspect, the method of the twentieth aspect may further comprise: performing special operations to receive input from the user wherein user-selected text in the article-matter displayed in a point-box is received by the computing device as the point-name and title of the point-box.

In a twenty-second aspect, a method of formatting and displaying human-readable text, by a computing device, for easy readability, the method comprising: displaying a sentence by identifying a sequence of phrases in a sentence, based on their content and length, wherein a phrase is a part of a sentence, displaying each phrase on a separate line, wherein the first phrase in the sentence is displayed on a first line, the second phrase in the sentence is displayed on a second line that is below the first line, and so on till the last phrase in the sentence is displayed on a last line.

In a twenty-third aspect, the method of the twenty-second aspect, further comprising: when a sentence occupies a sequence of five or more lines, inserting a vertical space between two consecutive lines wherein a significant part of the sentence ends on the first of the two consecutive lines or a significant part of the sentence begins on the second of the two consecutive lines.

In a twenty-fourth aspect, the method of the twenty-third aspect may further comprise: indenting phrases on the lines they are displayed on, wherein a phrase is indented by displaying empty space at the beginning of the line before the start of the phrase and wherein the computation of the amount of indent is based on the relationship of the phrase with other phrases of the sentence and also the relationships among the other phrases of the sentence and wherein the amount of indent is of non-uniform nature among the phrases of the sentence; it is not simple constant-increment-indenting for successive lines; nor a repetitive pattern of indenting found in poetry.

In a twenty-fifth aspect, the method of the twenty-fourth aspect, further comprising: Displaying each sentence so that it starts on a new line and displaying additional vertical space between a line on which a sentence ends and the line on which the next sentence begins.

Aspects may include browse-button-text related aspects. In a twenty-sixth aspect, 26. A method of displaying an informational item in two lines, wherein the informational item comprises human-readable text, the method comprising: dividing the text into two parts; displaying the first part of the text on a first line and displaying the second part of the text on a second line that is below the first line; displaying empty space at the beginning of the second line before the start of the second part of the text on the second line, such that, as the first line of text and the second line of text are viewed from left to right, the end of text on the second line occurs to the right of the end of text on the first line, wherein dividing the text into two parts includes dividing the text such that the first part of the text fits within one line of display and the second part of the text fits within one line of display.

In a twenty-seventh aspect, the method of the twenty-sixth aspect may further comprise: computing the amount of indent of the text on the second line to fulfill the condition that, as the two lines of text are viewed from left to right, the start of text on the second line occurs to the left of the end of text on the first line, wherein an informational item thus formatted is a browse-element.

In a twenty-eighth aspect, the method of the twenty-seventh aspect may further comprise: displaying a graphical shape behind the two lines of text or displaying borders on one or more sides of the two lines of text to define an area around the two lines of text.

In a twenty-ninth aspect, the method of the twenty-eighth aspect may further comprise: displaying the two lines of text in a bottom-aligned manner within the boundary of the shape or with regards to a border below the two lines of text while including a bottom margin between the text and the bottom of the shape or a border below the text, wherein the bottom margin is smaller than a top margin between the text and the top of the shape or a border above the text.

In a thirtieth aspect, the method of the twenty-seventh aspect, wherein a browse-element includes an informational item in two lines, may further comprise: displaying a group of two or more informational items; wherein the amount of indent in the second line of text in each browse-element is of non-uniform nature among the browse-elements in the group; wherein the amount of indent in the second line of text in the browse-elements is based on a computation to ensure that as the two lines of text in a browse-element are viewed from left to right, the end of text on the second line occurs to the right of the end of text on the first line, and the start of text on the second line occurs to the left of the end of text on the first line.

In a thirty-first aspect, the method of the thirtieth aspect may further comprise: displaying the group of informational items in a column of browse-elements such that each informational item is displayed as a browse-element above the browse-element of another informational item but for a browse-element of a last information item; and for a sub-group consisting of two or more informational items in the column, computing the amount of indent in the second line of text in the browse-elements to align the last character of the second text line of one informational item with the last character of the second text line of each of the remaining informational items in the subgroup.

The invention claimed is:

1. A method, performed by a computing device, of generating a point-by-point summary of one or more parts of an article, the method comprising:

receiving the article having article-matter;

receiving point-names of individual points of the article, wherein a point-name is a short sentence, a trimmed sentence, or a short phrase summary of a point;

assigning the point-names to the individual points of the article, wherein a point is a unit of information expressed in one or more sentences, phrases, or words that are in the article-matter;

receiving identification of one or more simple-groups, each simple-group having one or more points, wherein each simple-group covers the article-matter covered by the points comprising the simple-group;

generating a simple-group-symbol for each simple-group comprising a point-by-point summary of the simple-group, by:

formatting the point-names of points in the simple-group in a column such that for each point in the simple group, displaying the point names in a sequence beginning at the top of the column and ending at the bottom of the column, determining a width of the column such that at least three columns fit within the width of the display, determining a height of each column such that the column fits within the height of the display, assigning a width of a browse-element to be equal to the width of the column, displaying the simple-group-symbol for each simple-group, which includes:

displaying, on the display, a point-name in two lines, wherein the width of the point-name is less than the available width of two lines of the browse-element, wherein the available width of a line is calculated by determining the width of the browse-element minus a sum of the widths of the left and right margins, and wherein displaying a point-name in the two lines includes:

generating a point-browse-element, wherein the point browse-element contains the point-name displayed on the two lines, by:

dividing text of the point-name into a first part and a second part, such that the first part of the text fits within one line of the browse-element and the second part of the text fits within one line of the browse-element;

displaying the first part of the text on a first line and displaying the second part of the text on a second line that is below the first line;

indenting the text on the second line, such that, as the first line of text and the second line of text are viewed from left to right, the start of text on the second line occurs to the left of the end of text on the first line and the end of text on the second line occurs to the right of the end of the text on the first line, displaying, on the display, two or more point-browse-elements, wherein the amount of indent in the second line of text is of non-uniform nature among the point-browse-elements, and wherein the amount of indent in the second line of text in the point-browse-elements is such that:

as the two lines of text in a point-browse-element are viewed from left to right, the start of text on the second line occurs to the left of the end of the text on the first line, and the end of text on the second line occurs to the right of the end of text on the first line.

2. The method of claim 1, performed by a computing device, further comprising:

for one or more simple-groups, receiving a simple-group-name of each simple-group, wherein a simple-group-name is a next higher-level summary and a mid-level summary of a simple-group, wherein a mid-level summary of a simple-group is a mid-level summary of the article-matter covered by the simple-group, wherein the simple-group-name covers the article-matter covered by the simple-group, wherein the simple-group-name covers the point-names of the points that are in the simple-group, and wherein the simple-group-name covers the simple-group.

3. The method of claim 2, performed by a computing device, wherein a point-by-point summary is a low-level summary, further comprising:

in response to a user command or a program setting, displaying a mid-level summary of a simple-group above a low-level summary of the simple-group by: displaying the simple-group-name of the simple-group above the simple-group-symbol of the simple-group;

in response to a user command or a program setting, displaying a mid-level summary of a simple-group below a low-level summary of the simple-group by: displaying the simple-group-name of a simple-group below the simple-group-symbol of the simple-group; and in response to a user command or a program setting, hiding a simple-group-name that is being displayed above or below a simple-group-symbol.

4. The method of claim 2, performed by a computing device, further comprising:

identifying or receiving identification of one or more groups of simple-groups, and points that are not part of any group, wherein each group that contains one or more simple-groups is a compound-group, and wherein a compound-group covers the sum of article matter covered by the simple-groups and the points that are in the compound-group.

5. The method of claim 4, performed by a computing device, further comprising:

displaying a point-by-point summary of the article-matter covered by a compound-group by:

displaying the simple-group-symbol of each simple-group that is contained by the compound-group, and displaying point-names of the points that are contained by the compound-group wherein such points are not contained by a simple-group, wherein a point-by-point summary of a compound-group is a low-level summary of the compound-group.

6. The method of claim 4, performed by a computing device, further comprising:

displaying a mid-level summary of one or more compound-groups in the form of compound-group-symbols by:

for each compound-group, generating a symbol of the compound-group by:

formatting, in a column, the simple-group-names of simple-groups contained by the compound-group such that:

the simple-group-name of a first simple-group in the compound-group appears at the top, followed by the simple-group-name of a second simple-group in the compound-group and so on, until the simple-group-name of a last simple-group in the compound-group occurs at the bottom of the column, wherein such a column of the simple-group-names is a compound-group-symbol, wherein the compound-group-symbol is a mid-level summary of the compound-group, and wherein a mid-level summary of a compound-group is a mid-level summary of the article-matter covered by the compound-group; and displaying the compound-group-symbols.

7. The method of claim 6, performed by a computing device, further comprising:

displaying a simple-group-name on two lines, by:

dividing text of the simple-group-name into a first part and a second part such that the first part of the text fits within one line of display and the second part of the text fits within one line of display;

displaying the first part of the text on a first line and displaying the second part of the text on a second line that is below the first line; and indenting the text on the second line, such that, as the first line of text and the second line of text are viewed from left to right, the start of text on the second line occurs to the left of the end of text on the first line, and the end of text on the second line occurs to the right of the end of text on the first line, wherein a simple-group-name thus formatted is a browse-element that contains a simple-group-name, and wherein a browse-element that contains a simple-group-name is a simple-group-browse-element;

displaying two or more simple-group-browse-elements, wherein the amount of indent in the second line of text is of non-uniform nature among the simple-group-browse-elements, wherein the amount of indent in the second line of text in the simple-group-browse-elements is computed to ensure that:

as the two lines of text in a simple-group-browse-element are viewed from left to right, the start of text on the second line occurs to the left of the end of text on the first line, and the end of text on the second line occurs to the right of the end of text on the first line.

8. The method of claim 4, performed by a computing device, further comprising:

for one or more compound-groups, assigning a compound-group-name to each compound-group, wherein a compound-group-name is a next higher-level summary and upper-level summary of a compound-group, and wherein an upper-level summary of a compound-group is an upper-level summary of the article-matter covered by the compound-group, wherein the compound-group-name covers the article-matter covered by the compound-group, and wherein the compound-group-name covers the simple-groups and points in the compound-group and their corresponding simple-group-names and point-names.

9. The method of claim 8, performed by a computing device, further comprising:

displaying an upper-level summary of the article as a sequence of compound-group-names of all compound-groups from the article.

10. The method of claim 8, performed by a computing device, further comprising:

displaying the multiple levels of summary and the article-matter in a visual two-dimensional layout by:

displaying the outermost compound-group-boxes, simple-group-boxes and point-boxes side-by-side in a left-to-right-placement-as-per-the-sequence-in-the-article, wherein a compound-group-box, simple-group-box or the point-box that covers an earlier part of the article is placed to the left of a compound-group-box, simple-group-box or the point-box that covers a later part of the article, inside each of the compound-group-boxes and simple-group-boxes that are displayed, displaying the boxes of the immediate children of the corresponding compound-group or simple-group, wherein when one of the immediate children is a compound-group then the boxes of the immediate children are displayed in a left-to-right-placement-as-per-the-sequence-in-the-article, wherein a compound-group-box, simple-group-box or the point-box that covers an earlier part of the article is placed to the left of a compound-group-box, simple-group-box or the point-box that covers a later part of the article when none of the immediate children is a compound-group then the boxes of the immediate children are displayed in a top-to-bottom-placement-as-per-the-sequence-in-the-article, wherein a simple-group-box or the point-box that covers an earlier part of the article is placed above a simple-group-box or the point-box that covers a later part of the article, wherein a point-box shows the point-name as a title of the box and the article-matter covered by the corresponding point is displayed inside the point-box, and wherein a simple-group-box shows the simple-group-name as the title of the box and the article-matter directly covered by the corresponding simple-group is displayed inside the simple-group-box, and wherein the simple-group-box encloses the point-boxes corresponding to the point-names that are covered by the simple-group-name, wherein a compound-group-box shows the compound-group-name as the title of the box and the article-matter directly covered by the compound-group-name is displayed inside the box, and wherein the compound-group-box encloses the simple-group-boxes and point-boxes corresponding to the simple-group-names and point-names that are covered by the compound-group-name.

11. The method of claim 10, performed by a computing device, further comprising:

formatting and displaying the sentences in the article-matter in the point-box, simple-group-box, or compound-group-box by:

displaying a sentence by identifying a sequence of phrases in a sentence, based on content and length of the phrases, wherein a phrase is a part of a sentence, and displaying each phrase on a separate line, wherein a first phrase in the sentence is displayed on a first line, a second phrase in the sentence is displayed on a second line that is below the first line, and so on until the last phrase in the sentence is displayed on a last line.

12. The method of claim 11, performed by a computing device, further comprising:

indenting phrases on the lines they are displayed on, wherein the amount of indent of a phrase is based on a relationship of the phrase with other phrases of the sentence and also the relationships among the other phrases of the sentence, and wherein the amount of indent is of non-uniform nature among the phrases of the sentence, not constant-increment-indenting for successive lines, and not a repetitive pattern of indenting.

13. The method of claim 12, performed by a computing device, further comprising:

displaying each sentence so that it starts on a new line; and displaying additional vertical space between a line on which a sentence ends and the line on which the next sentence begins.

14. The method of claim 13, performed by a computing device, further comprising:

when a sentence occupies a sequence of five or more lines, inserting a vertical space between two consecutive lines wherein a significant part of the sentence ends on a first of the two consecutive lines or a significant part of the sentence begins on a second of the two consecutive lines.

15. A method, performed by a computing device, of generating graphical-browse-views of one or more parts of an article, the method comprising:

receiving the article having article-matter;

receiving point-names of individual points of the article, wherein a point-name is a short sentence, a trimmed sentence, or a short phrase summary of a point;

assigning the point-names to the individual points of the article, wherein a point is a unit of information expressed in one or more sentences, phrases, or words that are in the article-matter;

receiving identification of one or more simple-groups, each simple-group having one or more points, wherein each simple-group covers the article-matter covered by the points comprising the simple-group;

receiving, for one or more simple-groups, a simple-group-name of each simple-group, wherein a simple-group-name is a short sentence, a trimmed sentence, or a short phrase summary of a simple-group, wherein a simple-group-name is a mid-level summary of a simple-group, wherein a mid-level summary of a simple-group is a mid-level summary of the article-matter covered by the simple-group, wherein the simple-group-name covers the article-matter covered by the simple-group, and wherein the simple-group-name covers the point-names of the points that are in the simple-group;

receiving identification of one or more compound-groups, each compound-group having one or more simple-groups;

receiving identification of one or more compound-groups, each compound-group having one or more compound-groups; wherein a compound-group covers the sum of article matter covered by the compound-groups, the simple-groups and the points that are in the compound-group;

receiving, for one or more compound-groups, a compound-group-name of each compound-group, wherein a compound-group-name is a short sentence, a trimmed sentence, or a short phrase summary of a compound-group;

wherein a compound-group-name is a upper-level summary of a compound-group, wherein an upper-level summary of a compound-group is an upper-level summary of the article-matter covered by the compound-group, wherein the compound-group-name covers the article-matter covered by the compound-group, and wherein the compound-group-name covers compound-groups, the simple-groups and points in the compound-group and their corresponding compound-group-names, simple-group-names and point-names; and generating, for one or more compound-groups, wherein the compound group is a parent, a graphical-browse-view for each compound group, in the form of a graphical sequence of one or more columns by:

determining a width of each column such that at least three of the columns fit within the width of a display, determining a height of each column such that the column fits within the height of the display, wherein:

a column corresponds to a compound-group that is directly contained in the parent and the column is a compound-group-symbol and wherein the compound-group-symbol contains a summary of the article-matter covered by the compound-group, or the column corresponds to a simple-group that is directly contained in the parent and the column is a simple-group-symbol and wherein the simple-group-symbol contains a summary of the article-matter covered by the simple-group, or the column corresponds to one or more points that are directly contained in the parent and the column contains the corresponding point-symbols, wherein a browse-element that contains a point-name is point-symbol and wherein a point-symbol contains a summary of the corresponding point;

generating a simple-group-symbol for each simple-group in the parent by:

formatting the point-names of points in the simple-group in a column such that for each point in the simple group, displaying the point names in a sequence beginning at the top of the column and ending at the bottom of the column, and assigning a width of a browse-element to be equal to the width of the column, wherein such a column of point-names is a simple-group-symbol, wherein the simple-group-symbol is a point-by-point summary of the simple-group, wherein a point-by-point summary of a simple-group is a point-by-point summary of the article-matter covered by the simple-group, wherein a point-by-point summary is a low-level summary, and wherein a point-by-point summary of a simple-group is a low-level summary of the simple-group; and displaying, on the display, one or more graphical-browse-views, which includes:

displaying, on the display, a point-name in two lines, wherein the width of the point-name is less than the available width of two lines of the browse-element, wherein the available width of a line is calculated by determining the width of the browse-element minus a sum of the widths of the left and right margins, and wherein displaying a point name in two lines includes: generating a point-browse-element, wherein the point-browse-element contains the point-name displayed on the two lines, by:

dividing the text of the point-name into a first part and a second part, such that the first part of the text fits within one line of the browse-element and the second part of the text fits within one line of the browse-element;

displaying the first part of the text on a first line and displaying the second part of the text on a second line that is below the first line; and indenting the text on the second line, such that, as the first line of text and the second line of text are viewed from left to right, the start of text on the second line occurs to the left of the end of text on the first line and the end of text on the second line occurs to the right of the end of the text on the first line, displaying, on the display, two or more point-browse-elements, wherein the amount of indent in the second line of text is of non-uniform nature among the point-browse-elements, and wherein the amount of indent in the second line of text in the point-browse-elements is such that:

as the two lines of text in a point-browse-element are viewed from left to right, the start of text on the second line occurs to the left of the end of text on the first line, and the end of text on the second line occurs to the right of the end of text on the first line.

16. The method of claim 15, performed by a computing device, further comprising:

for one or more compound-groups, generating the compound-group-symbol of the compound-group by:

formatting, in a column, the compound-group-names of compound-groups, the simple-group-names of simple-groups and point-names of points that are directly contained by the compound-group such that:

the compound-group-names, simple-group-names and the point-names appear from the top of the column to the bottom of the column in the order that corresponds to the order in which the compound-groups, simple-groups and the points are directly contained by the compound-group wherein such a column is a compound-group-symbol, wherein the compound-group-symbol is a summary of the compound-group, and wherein a summary of a compound-group is a summary of the article-matter covered by the compound-group; and displaying the compound-group-symbols.

17. The method of claim 16, performed by a computing device, further comprising:

displaying a simple-group-name on two lines, by:

dividing text of the simple-group-name into a first part and a second part such that the first part of the text fits within one line of display and the second part of the text fits within one line of display;

displaying the first part of the text on a first line and displaying the second part of the text on a second line that is below the first line; and indenting the text on the second line, such that, as the first line of text and the second line of text are viewed from left to right, the start of text on the second line occurs to the left of the end of text on the first line, and the end of text on the second line occurs to the right of the end of text on the first line, wherein a simple-group-name thus formatted is a browse-element that contains a simple-group-name, and wherein a browse-element that contains a simple-group-name is a simple-group-browse-element;

displaying two or more simple-group-browse-elements, wherein the amount of indent in the second line of text is of non-uniform nature among the simple-group-browse-elements, wherein the amount of indent in the second line of text in the simple-group-browse-elements is computed to ensure that:

as the two lines of text in a simple-group-browse-element are viewed from left to right, the start of text on the second line occurs to the left of the end of text on the first line, and the end of text on the second line occurs to the right of the end of text on the first line.

18. The method of claim 15, performed by a computing device, further comprising:

displaying the multiple levels of summary and the article-matter in a visual two-dimensional layout by:

displaying the outermost compound-group-boxes, simple-group-boxes and the point-boxes side-by-side in a left-to-right-placement-as-per-the-sequence-in-the-article, wherein a compound-group-box, simple-group-box or a point-box that covers an earlier part of the article is placed to the left of a compound-group-box, simple-group-box or the point-box that covers a later part of the article;

inside each of the compound-group-boxes and simple-group-boxes that are displayed, displaying the boxes of the immediate children of the corresponding compound-group or simple-group, wherein when one of the immediate children is a compound-group then the boxes of the immediate children are displayed in a left-to-right-placement-as-per-the-sequence-in-the-article, wherein a compound-group-box, simple-group-box or the point-box that covers an earlier part of the article is placed to the left of a compound-group-box, simple-group-box or the point-box that covers a later part of the article when none of the immediate children is a compound-group then the boxes of the immediate children are displayed in a top-to-bottom-placement-as-per-the-sequence-in-the-article, wherein a simple-group-box or the point-box that covers an earlier part of the article is placed above a simple-group-box or the point-box that covers a later part of the article, wherein a point-box shows the point-name as a title of the box and the article-matter covered by the corresponding point is displayed inside the point-box, and wherein a simple-group-box shows the simple-group-name as the title of the box and the article-matter directly covered by the corresponding simple-group is displayed inside the simple-group-box, and wherein the simple-group-box encloses the point-boxes corresponding to the point-names that are covered by the simple-group-name;

wherein a compound-group-box shows the compound-group-name as the title of the box and the article-matter directly covered by the compound-group-name is displayed inside the box, and wherein the compound-group-box encloses the compound-group-boxes simple-group-boxes and point-boxes corresponding to the compound-group-names, simple-group-names and point-names that are covered by the compound-group-name.

19. The method of claim 18, performed by a computing device, further comprising:

formatting and displaying the sentences in the article-matter in the point-box, simple-group-box, or compound-group-box by:

displaying a sentence by identifying a sequence of phrases in a sentence, based on content and length of the phrases, wherein a phrase is a part of a sentence, and displaying each phrase on a separate line, wherein a first phrase in the sentence is displayed on a first line, a second phrase in the sentence is displayed on a second line that is below the first line, and so on until the last phrase in the sentence is displayed on a last line.

20. The method of claim 19, performed by a computing device, further comprising:

indenting phrases on the lines they are displayed on, wherein the amount of indent of a phrase is based on a relationship of the phrase with other phrases of the sentence and also the relationships among the other phrases of the sentence, and wherein the amount of indent is of non-uniform nature among the phrases of the sentence, not constant-increment-indenting for successive lines, and not a repetitive pattern of indenting.

21. The method of claim 20, performed by a computing device, further comprising:

displaying each sentence so that it starts on a new line; and displaying additional vertical space between a line on which a sentence ends and the line on which the next sentence begins.

22. The method of claim 21, performed by a computing device, further comprising:

when a sentence occupies a sequence of five or more lines, inserting a vertical space between two consecutive lines wherein a significant part of the sentence ends on a first of the two consecutive lines or a significant part of the sentence begins on a second of the two consecutive lines.

23. The method of claim 1, performed by a computing device, wherein a simple-group-name is a mid-level summary of a simple-group, the method further comprising:

receiving input to display, the article-matter that is covered by a point-name that is displayed in a simple-group-symbol; and in response to receiving input to display the said article-matter, displaying the article-matter that is covered by the point-name.

24. The method of claim 6, performed by a computing device, wherein a simple-group-name is a mid-level summary of a simple-group, the method further comprising:

receiving input to display a low-level summary of the simple-group that is covered by a simple-group-name that is displayed in a compound-group-symbol; and in response to receiving input to display the said low-level summary displaying the simple-group-symbol of the simple-group that is covered by the simple-group-name or displaying a sequence of points that are covered by the simple-group-name.

* * * * *